United States Patent
Chawla et al.

(10) Patent No.: US 11,922,222 B1
(45) Date of Patent: Mar. 5, 2024

(54) GENERATING A MODIFIED COMPONENT FOR A DATA INTAKE AND QUERY SYSTEM USING AN ISOLATED EXECUTION ENVIRONMENT IMAGE

(71) Applicant: Splunk Inc., San Francisco, CA (US)

(72) Inventors: Gaurav Chawla, San Jose, CA (US); Mehul Goyal, Pleasanton, CA (US); Sanish Mahadik, Santa Clara, CA (US); Sumeet Rohatgi, Fremont, CA (US)

(73) Assignee: Splunk Inc., San Francisco, CA (US)

( * ) Notice: Subject to any disclaimer, the term of this patent is extended or adjusted under 35 U.S.C. 154(b) by 1017 days.

(21) Appl. No.: 16/777,612

(22) Filed: Jan. 30, 2020

(51) Int. Cl.
  *G06F 9/46* (2006.01)
  *G06F 8/71* (2018.01)
  *G06F 9/455* (2018.01)
  *G06F 9/50* (2006.01)

(52) U.S. Cl.
  CPC .............. *G06F 9/5077* (2013.01); *G06F 8/71* (2013.01); *G06F 9/45558* (2013.01); *G06F 2009/45562* (2013.01); *G06F 2009/4557* (2013.01)

(58) Field of Classification Search
  CPC .................................................. G06F 9/44–54
  See application file for complete search history.

(56) References Cited

U.S. PATENT DOCUMENTS

| | | |
|---|---|---|
| 5,187,750 A | 2/1993 | Behera |
| 5,623,652 A | 4/1997 | Vora et al. |
| 5,812,793 A | 9/1998 | Shakib et al. |
| 5,913,214 A | 6/1999 | Madnick et al. |
| 5,918,049 A | 6/1999 | Syväniemi |
| 5,941,969 A | 8/1999 | Ram et al. |
| 6,009,422 A | 12/1999 | Ciccarelli |
| 6,081,883 A | 6/2000 | Popelka et al. |
| 6,154,781 A | 11/2000 | Bolam et al. |
| 6,185,666 B1 | 2/2001 | Murray et al. |
| 6,205,441 B1 | 3/2001 | Al-Omari et al. |

(Continued)

FOREIGN PATENT DOCUMENTS

| | | |
|---|---|---|
| CN | 103729447 A | 4/2014 |
| CN | 105893205 A | 8/2016 |

(Continued)

OTHER PUBLICATIONS

Bakliwal S., "A Comprehensive Guide to Apache Flink Ecosystem Components," published Feb. 17, 2017; 7 pages.

(Continued)

*Primary Examiner* — Bing Zhao
(74) *Attorney, Agent, or Firm* — Knobbe, Martens Olson & Bear, LLP

(57) ABSTRACT

A control plane system can be used to manage or generated components in a shared computing resource environment. To generate a modified components, the control plane system can receive receiving configurations of a component. The configurations can include software versions and/or parameters for the component. Using the configurations, the control plane system can generate an image of a modified component, and communicate the image to a master node in the shared computing resource environment. The master node can provides one or more instances of the modified component for use based on the received image.

29 Claims, 19 Drawing Sheets

(56) References Cited

U.S. PATENT DOCUMENTS

| | | |
|---|---|---|
| 6,282,537 B1 | 8/2001 | Madnick et al. |
| 6,408,294 B1 | 6/2002 | Getchius et al. |
| 6,430,553 B1 | 8/2002 | Ferret |
| 6,463,454 B1 | 10/2002 | Lumelsky et al. |
| 6,466,980 B1 | 10/2002 | Lumelsky et al. |
| 6,490,585 B1 | 12/2002 | Hanson et al. |
| 6,505,191 B1 | 1/2003 | Baclawski |
| 6,578,131 B1 | 6/2003 | Larson et al. |
| 6,786,418 B1 | 9/2004 | Francois |
| 6,920,396 B1 | 7/2005 | Wallace et al. |
| 7,007,275 B1 | 2/2006 | Hanson et al. |
| 7,039,764 B1 | 5/2006 | Shetty et al. |
| 7,233,939 B1 | 6/2007 | Ziauddin |
| 7,249,192 B1 | 7/2007 | Brewer et al. |
| 7,290,196 B1 | 10/2007 | Annayya et al. |
| 7,370,068 B1 | 5/2008 | Pham et al. |
| 7,505,985 B2 | 3/2009 | Kilroy |
| 7,536,686 B2 * | 5/2009 | Tan .................... G06Q 30/0283 717/176 |
| 7,634,511 B1 | 12/2009 | Freiheit et al. |
| 7,685,109 B1 | 3/2010 | Ransil et al. |
| 7,685,281 B1 | 3/2010 | Saraiya et al. |
| 7,689,553 B2 | 3/2010 | Zuzarte |
| 7,689,633 B1 | 3/2010 | Li et al. |
| 7,698,267 B2 | 4/2010 | Papakonstantinou et al. |
| 7,702,610 B2 | 4/2010 | Zane et al. |
| 7,769,722 B1 | 8/2010 | Bergant et al. |
| 7,895,359 B2 | 2/2011 | Reed et al. |
| 7,937,344 B2 | 5/2011 | Baum et al. |
| 7,962,464 B1 | 6/2011 | Brette et al. |
| 8,019,725 B1 * | 9/2011 | Mulligan .................. G06F 8/61 717/176 |
| 8,112,425 B2 | 2/2012 | Baum et al. |
| 8,190,593 B1 | 5/2012 | Dean |
| 8,195,922 B2 | 6/2012 | Chen et al. |
| 8,412,696 B2 | 4/2013 | Zhang et al. |
| 8,504,620 B2 | 8/2013 | Chi et al. |
| 8,527,645 B1 | 9/2013 | Proffit et al. |
| 8,589,375 B2 | 11/2013 | Zhang et al. |
| 8,589,403 B2 | 11/2013 | Marquardt et al. |
| 8,589,432 B2 | 11/2013 | Zhang et al. |
| 8,601,112 B1 | 12/2013 | Nordstrom et al. |
| 8,682,925 B1 | 3/2014 | Marquardt et al. |
| 8,719,520 B1 | 5/2014 | Piszczek et al. |
| 8,738,587 B1 | 5/2014 | Bitincka et al. |
| 8,738,629 B1 | 5/2014 | Bitincka et al. |
| 8,751,529 B2 | 6/2014 | Zhang et al. |
| 8,761,077 B2 | 6/2014 | Kim et al. |
| 8,762,367 B2 | 6/2014 | Burger et al. |
| 8,769,493 B2 * | 7/2014 | Arnold ...................... G06F 8/63 718/1 |
| 8,788,525 B2 | 7/2014 | Neels et al. |
| 8,788,526 B2 | 7/2014 | Neels et al. |
| 8,793,225 B1 | 7/2014 | Bitincka et al. |
| 8,806,361 B1 | 8/2014 | Noel et al. |
| 8,838,678 B1 | 9/2014 | Weiss |
| 8,849,891 B1 | 9/2014 | Suchter et al. |
| 8,874,755 B1 | 10/2014 | Deklich et al. |
| 8,874,961 B2 | 10/2014 | Pillai et al. |
| 8,924,476 B1 | 12/2014 | Granström et al. |
| 8,935,257 B1 | 1/2015 | Vermuri et al. |
| 8,935,302 B2 | 1/2015 | Flynn et al. |
| 8,959,221 B2 | 2/2015 | Morgan |
| 8,983,912 B1 | 3/2015 | Beedgen et al. |
| 8,983,994 B2 | 3/2015 | Neels et al. |
| 8,990,148 B1 | 3/2015 | Ziegler et al. |
| 9,015,197 B2 | 4/2015 | Richards et al. |
| 9,087,030 B2 | 7/2015 | Basile |
| 9,087,090 B1 | 7/2015 | Cormier et al. |
| 9,124,612 B2 | 9/2015 | Vasan et al. |
| 9,128,636 B2 | 9/2015 | Arakawa |
| 9,128,980 B2 | 9/2015 | Neels et al. |
| 9,128,985 B2 | 9/2015 | Marquartd |
| 9,130,971 B2 | 9/2015 | Vasan et al. |
| 9,135,560 B1 | 9/2015 | Saurabh et al. |
| 9,173,801 B2 | 11/2015 | Merza |
| 9,185,007 B2 | 11/2015 | Fletcher et al. |
| 9,215,240 B2 | 12/2015 | Merza et al. |
| 9,244,999 B2 | 1/2016 | Jin et al. |
| 9,248,068 B2 | 2/2016 | Merza |
| 9,256,467 B1 | 2/2016 | Singh et al. |
| 9,262,519 B1 | 2/2016 | Saurabh |
| 9,286,413 B1 | 3/2016 | Coates et al. |
| 9,292,620 B1 | 3/2016 | Hoover et al. |
| 9,342,571 B1 | 5/2016 | Kurtic et al. |
| 9,378,088 B1 | 6/2016 | Piszczek et al. |
| 9,426,045 B2 | 8/2016 | Fletcher et al. |
| 9,426,172 B2 | 8/2016 | Merza |
| 9,432,396 B2 | 8/2016 | Merza |
| 9,438,470 B2 | 9/2016 | Brady, Jr. et al. |
| 9,438,515 B2 | 9/2016 | McCormick et al. |
| 9,489,385 B1 | 11/2016 | Ladola |
| 9,495,427 B2 | 11/2016 | Adabi et al. |
| 9,514,146 B1 | 12/2016 | Wallace et al. |
| 9,514,189 B2 | 12/2016 | Bitincka et al. |
| 9,558,194 B1 | 1/2017 | Srivastav et al. |
| 9,589,012 B2 | 3/2017 | Neels et al. |
| 9,672,116 B1 | 6/2017 | Chopra et al. |
| 9,672,274 B1 | 6/2017 | Goo |
| 9,722,951 B2 | 8/2017 | Almadi |
| 9,734,180 B1 | 8/2017 | Graham et al. |
| 9,753,935 B1 | 9/2017 | Tobin et al. |
| 9,779,015 B1 | 10/2017 | Oikarinen et al. |
| 9,806,978 B2 | 10/2017 | McAlister et al. |
| 9,838,292 B2 | 12/2017 | Polychronis |
| 9,900,397 B1 | 2/2018 | Cope et al. |
| 9,959,062 B1 | 5/2018 | Piszczek et al. |
| 9,984,128 B2 | 5/2018 | Vasan et al. |
| 9,990,386 B2 | 6/2018 | Marquardt et al. |
| 9,992,741 B2 | 6/2018 | Trainin et al. |
| 9,996,400 B2 | 6/2018 | Nakagawa et al. |
| 10,025,795 B2 | 7/2018 | Fokoue-Nkoutche et al. |
| 10,031,922 B2 | 7/2018 | Fokoue-Nkoutche et al. |
| 10,037,341 B1 | 7/2018 | Bassov et al. |
| 10,049,160 B2 | 8/2018 | Bitincka et al. |
| 10,091,100 B1 | 10/2018 | Duerk |
| 10,095,993 B1 | 10/2018 | Bar-Menachem et al. |
| 10,127,258 B2 | 11/2018 | Lamas et al. |
| 10,142,204 B2 | 11/2018 | Nickolov et al. |
| 10,318,491 B1 | 6/2019 | Graham et al. |
| 10,318,511 B2 | 6/2019 | De Smet et al. |
| 10,320,638 B1 | 6/2019 | Lauinger et al. |
| 10,353,965 B2 | 7/2019 | Pal et al. |
| 10,437,653 B2 | 10/2019 | Cyr et al. |
| 10,445,311 B1 | 10/2019 | Saurabh et al. |
| 10,452,632 B1 | 10/2019 | Simmen et al. |
| 10,474,723 B2 | 11/2019 | Hodge et al. |
| 10,528,599 B1 | 1/2020 | Pandis et al. |
| 10,534,794 B2 | 1/2020 | Dageville et al. |
| 10,558,656 B2 | 2/2020 | Wells et al. |
| 10,585,951 B2 | 3/2020 | Bhattacharjee et al. |
| 10,592,561 B2 | 3/2020 | Bhattacharjee et al. |
| 10,592,562 B2 | 3/2020 | Pal et al. |
| 10,592,563 B2 | 3/2020 | Pal et al. |
| 10,599,723 B2 | 3/2020 | Bhattacharjee et al. |
| 10,599,724 B2 | 3/2020 | Pal et al. |
| 10,606,856 B2 | 3/2020 | Bath et al. |
| 10,657,146 B2 | 5/2020 | Bath et al. |
| 10,726,009 B2 | 7/2020 | Pal et al. |
| 10,769,148 B1 | 9/2020 | Binkert et al. |
| 10,776,355 B1 | 9/2020 | Bataskis et al. |
| 10,776,374 B2 | 9/2020 | Valine et al. |
| 10,795,884 B2 | 10/2020 | Bhattacharjee et al. |
| 10,896,182 B2 | 1/2021 | Bhattacharjee et al. |
| 10,956,415 B2 | 3/2021 | Pal et al. |
| 10,977,260 B2 | 4/2021 | Pal et al. |
| 10,984,044 B1 | 4/2021 | Batsakis et al. |
| 10,999,164 B1 | 5/2021 | Sridhar et al. |
| 11,003,714 B1 | 5/2021 | Batsakis et al. |
| 11,010,435 B2 | 5/2021 | Pal et al. |
| 11,023,463 B2 | 6/2021 | Pal et al. |
| 11,023,539 B2 | 6/2021 | Pal et al. |
| 11,080,345 B2 | 8/2021 | Pal et al. |
| 11,106,734 B1 | 8/2021 | Batsakis et al. |

(56) References Cited

U.S. PATENT DOCUMENTS

| | | |
|---|---|---|
| 11,126,632 B2 | 9/2021 | Pal et al. |
| 11,151,137 B2 | 10/2021 | Bhattacharjee et al. |
| 11,157,498 B1 | 10/2021 | James et al. |
| 11,163,758 B2 | 11/2021 | James et al. |
| 11,176,208 B2 | 11/2021 | Pal et al. |
| 11,222,066 B1 | 1/2022 | Batsakis et al. |
| 11,232,100 B2 | 1/2022 | Bhattacharjee et al. |
| 11,238,112 B2 | 2/2022 | Hodge et al. |
| 11,243,963 B2 | 2/2022 | Pal et al. |
| 11,250,056 B1 | 2/2022 | Batsakis et al. |
| 11,269,939 B1 | 3/2022 | Sammer et al. |
| 11,281,706 B2 | 3/2022 | Pal et al. |
| 11,294,941 B1 | 4/2022 | Sammer et al. |
| 11,314,753 B2 | 4/2022 | Pal et al. |
| 11,321,321 B2 | 5/2022 | Bhattacharjee et al. |
| 11,334,543 B1 | 5/2022 | Anwar et al. |
| 11,341,131 B2 | 5/2022 | Pal et al. |
| 11,392,654 B2 | 7/2022 | Pal et al. |
| 11,416,528 B2 | 8/2022 | Pal et al. |
| 11,442,935 B2 | 9/2022 | Pal et al. |
| 11,461,334 B2 | 10/2022 | Bhattacharjee et al. |
| 11,494,380 B2 | 11/2022 | Rao et al. |
| 11,500,875 B2 | 11/2022 | Bhattacharjee et al. |
| 11,537,311 B1 | 12/2022 | Dhupelia et al. |
| 11,550,847 B1 | 1/2023 | Batsakis et al. |
| 11,562,023 B1 | 1/2023 | Batsakis et al. |
| 11,567,993 B1 | 1/2023 | Batsakis et al. |
| 11,580,107 B2 | 2/2023 | Pal et al. |
| 11,586,627 B2 | 2/2023 | Bhattacharjee et al. |
| 11,586,692 B2 | 2/2023 | Bhattacharjee et al. |
| 11,593,377 B2 | 2/2023 | Bhattacharjee et al. |
| 11,604,795 B2 | 3/2023 | Pal et al. |
| 11,615,087 B2 | 3/2023 | Pal et al. |
| 11,615,104 B2 | 3/2023 | Pal et al. |
| 11,620,336 B1 | 4/2023 | Batsakis et al. |
| 11,636,105 B2 | 4/2023 | Pal et al. |
| 11,663,227 B2 | 5/2023 | Pal et al. |
| 2001/0016821 A1 | 8/2001 | DeBusk et al. |
| 2002/0070968 A1 | 6/2002 | Austin et al. |
| 2002/0112123 A1 | 8/2002 | Becker et al. |
| 2002/0138471 A1 | 9/2002 | Dutta et al. |
| 2002/0152299 A1 | 10/2002 | Traversat et al. |
| 2003/0014403 A1 | 1/2003 | Chandrasekar et al. |
| 2003/0066033 A1 | 4/2003 | Direen et al. |
| 2003/0106015 A1 | 6/2003 | Chu et al. |
| 2003/0120682 A1 | 6/2003 | Bestgen et al. |
| 2003/0130993 A1 | 7/2003 | Mendelevitch et al. |
| 2003/0154238 A1 | 8/2003 | Murphy et al. |
| 2003/0167270 A1 | 9/2003 | Werme et al. |
| 2003/0188198 A1 | 10/2003 | Holdsworth et al. |
| 2003/0229620 A1 | 12/2003 | Carlson et al. |
| 2004/0122845 A1 | 5/2004 | Lohman et al. |
| 2004/0117345 A1 | 6/2004 | Bamford et al. |
| 2004/0143604 A1 | 7/2004 | Glenner et al. |
| 2004/0230571 A1 | 11/2004 | Robertson |
| 2005/0022047 A1 | 1/2005 | Chandrasekaran |
| 2005/0027796 A1 | 2/2005 | San Andres et al. |
| 2005/0066027 A1 | 3/2005 | Hakiel et al. |
| 2005/0102325 A1 | 5/2005 | Gould et al. |
| 2005/0192937 A1 | 9/2005 | Barsness et al. |
| 2005/0289232 A1 | 12/2005 | Ebert |
| 2006/0026211 A1 | 2/2006 | Potteiger |
| 2006/0155720 A1 | 7/2006 | Feinberg |
| 2006/0161560 A1 | 7/2006 | Khandelwal et al. |
| 2006/0173993 A1* | 8/2006 | Henseler ............... G06F 8/63 709/224 |
| 2006/0184998 A1 | 8/2006 | Smith et al. |
| 2006/0212607 A1 | 9/2006 | Riethmuller |
| 2006/0224587 A1 | 10/2006 | Zamir et al. |
| 2006/0224603 A1 | 10/2006 | Correll |
| 2006/0248045 A1 | 11/2006 | Toledano et al. |
| 2006/0259460 A1 | 11/2006 | Zurek et al. |
| 2006/0271504 A1 | 11/2006 | Anderson et al. |
| 2007/0033155 A1 | 2/2007 | Landsman |
| 2007/0050328 A1 | 3/2007 | Li et al. |
| 2007/0100873 A1 | 5/2007 | Yako et al. |
| 2007/0136311 A1 | 6/2007 | Kasten et al. |
| 2007/0143261 A1 | 6/2007 | Uppala |
| 2007/0156842 A1 | 7/2007 | Vermeulen et al. |
| 2007/0168336 A1 | 7/2007 | Ransil et al. |
| 2007/0168656 A1 | 7/2007 | Paganetti et al. |
| 2007/0198641 A1 | 8/2007 | Dorai et al. |
| 2007/0208669 A1 | 9/2007 | Rivette et al. |
| 2007/0283194 A1 | 12/2007 | Villella et al. |
| 2008/0010337 A1 | 1/2008 | Hayes et al. |
| 2008/0033927 A1 | 2/2008 | Richards et al. |
| 2008/0065591 A1 | 3/2008 | Guzenda |
| 2008/0071755 A1 | 3/2008 | Barsness et al. |
| 2008/0162592 A1 | 7/2008 | Huang et al. |
| 2008/0208844 A1 | 8/2008 | Jenkins |
| 2008/0215546 A1 | 9/2008 | Baum et al. |
| 2008/0275857 A1 | 11/2008 | Dettinger et al. |
| 2008/0294660 A1 | 11/2008 | Patterson et al. |
| 2008/0300835 A1 | 12/2008 | Hixon |
| 2009/0006148 A1 | 1/2009 | Bacalski et al. |
| 2009/0006527 A1 | 1/2009 | Gingell et al. |
| 2009/0007125 A1 | 1/2009 | Barsness et al. |
| 2009/0125526 A1 | 5/2009 | Neufeld |
| 2009/0129163 A1 | 5/2009 | Danilak |
| 2009/0132488 A1 | 5/2009 | Wehrmeister et al. |
| 2009/0183162 A1 | 7/2009 | Kindel et al. |
| 2009/0193042 A1 | 7/2009 | Hornibrook et al. |
| 2009/0204551 A1 | 8/2009 | Wang et al. |
| 2009/0216781 A1 | 8/2009 | Chauvet et al. |
| 2009/0234799 A1 | 9/2009 | Betawadkar-Norwood et al. |
| 2009/0248764 A1 | 10/2009 | Day et al. |
| 2009/0292810 A1 | 11/2009 | Hotta et al. |
| 2009/0327242 A1 | 12/2009 | Brown et al. |
| 2010/0005056 A1 | 1/2010 | Bayliss |
| 2010/0005134 A1 | 1/2010 | Zamir et al. |
| 2010/0005151 A1 | 1/2010 | Gokhale |
| 2010/0011031 A1 | 1/2010 | Huang et al. |
| 2010/0011252 A1 | 1/2010 | Rivoir |
| 2010/0106934 A1 | 4/2010 | Calder et al. |
| 2010/0125565 A1 | 5/2010 | Burger et al. |
| 2010/0153375 A1 | 6/2010 | Bilas et al. |
| 2010/0153431 A1 | 6/2010 | Burger |
| 2010/0199042 A1 | 8/2010 | Bates et al. |
| 2010/0229108 A1 | 9/2010 | Gerson et al. |
| 2010/0262740 A1 | 10/2010 | Borchers et al. |
| 2010/0332461 A1 | 12/2010 | Friedman et al. |
| 2011/0055231 A1 | 3/2011 | Huck et al. |
| 2011/0060887 A1 | 3/2011 | Thatcher et al. |
| 2011/0078133 A1 | 3/2011 | Bordawekar et al. |
| 2011/0093491 A1 | 4/2011 | Zabback et al. |
| 2011/0099500 A1 | 4/2011 | Smith et al. |
| 2011/0125745 A1 | 5/2011 | Bright |
| 2011/0131200 A1 | 6/2011 | Zhou et al. |
| 2011/0173184 A1 | 7/2011 | Kelshikar et al. |
| 2011/0191373 A1 | 8/2011 | Botros et al. |
| 2011/0196804 A1 | 8/2011 | Sutter et al. |
| 2011/0213778 A1 | 9/2011 | Hess et al. |
| 2011/0213870 A1 | 9/2011 | Cai et al. |
| 2011/0231858 A1 | 9/2011 | Sampathkumar et al. |
| 2011/0246294 A1 | 10/2011 | Robb et al. |
| 2011/0289163 A1 | 11/2011 | Edwards et al. |
| 2011/0295968 A1 | 12/2011 | Takaoka et al. |
| 2011/0320550 A1 | 12/2011 | Lawson et al. |
| 2012/0066205 A1 | 3/2012 | Chappell et al. |
| 2012/0078869 A1 | 3/2012 | Bellville et al. |
| 2012/0078881 A1 | 3/2012 | Crump et al. |
| 2012/0079004 A1 | 3/2012 | Herman |
| 2012/0130986 A1 | 5/2012 | Abdellatif et al. |
| 2012/0130988 A1 | 5/2012 | Nica et al. |
| 2012/0130997 A1 | 5/2012 | Risvik et al. |
| 2012/0143873 A1 | 6/2012 | Saadat |
| 2012/0150819 A1 | 6/2012 | Lindahl et al. |
| 2012/0173728 A1 | 7/2012 | Haskins et al. |
| 2012/0166440 A1 | 8/2012 | Shmueli et al. |
| 2012/0197856 A1 | 8/2012 | Banka et al. |
| 2012/0197934 A1 | 8/2012 | Zhang et al. |
| 2012/0226712 A1 | 9/2012 | Vermeulen et al. |
| 2012/0254269 A1 | 10/2012 | Carmichael |
| 2012/0278346 A1 | 11/2012 | Han et al. |

(56) References Cited

U.S. PATENT DOCUMENTS

| | | |
|---|---|---|
| 2012/0310916 A1 | 12/2012 | Abadi et al. |
| 2013/0018868 A1 | 1/2013 | Chi et al. |
| 2013/0054649 A1 | 2/2013 | Potapov et al. |
| 2013/0060783 A1 | 3/2013 | Baum et al. |
| 2013/0066674 A1 | 3/2013 | Vasters |
| 2013/0067564 A1 | 3/2013 | Fok Ah Chuen et al. |
| 2013/0084826 A1 | 4/2013 | Mo et al. |
| 2013/0086040 A1 | 4/2013 | Patadia et al. |
| 2013/0097139 A1 | 4/2013 | Thoresen et al. |
| 2013/0110828 A1 | 5/2013 | Meyerzon et al. |
| 2013/0132392 A1 | 5/2013 | Kenedy et al. |
| 2013/0138626 A1 | 5/2013 | Delafranier et al. |
| 2013/0159251 A1 | 6/2013 | Skrenta et al. |
| 2013/0166502 A1 | 6/2013 | Walkauskas |
| 2013/0173160 A1 | 7/2013 | Meisels et al. |
| 2013/0173662 A1 | 7/2013 | Kaplinger et al. |
| 2013/0198475 A1 | 8/2013 | Serlet et al. |
| 2013/0204991 A1 | 8/2013 | Skjolsvold et al. |
| 2013/0212165 A1 | 8/2013 | Vermeulen et al. |
| 2013/0226971 A1 | 8/2013 | Shoolman et al. |
| 2013/0232187 A1 | 9/2013 | Workman et al. |
| 2013/0238706 A1 | 9/2013 | Desai |
| 2013/0246373 A1 | 9/2013 | Hansma et al. |
| 2013/0246608 A1 | 9/2013 | Liu et al. |
| 2013/0254761 A1 | 9/2013 | Reddy et al. |
| 2013/0311488 A1 | 11/2013 | Erdogan et al. |
| 2013/0318236 A1 | 11/2013 | Coates et al. |
| 2013/0325850 A1 | 12/2013 | Redmond et al. |
| 2013/0339298 A1 | 12/2013 | Muller et al. |
| 2013/0339567 A1 | 12/2013 | Carpentier et al. |
| 2014/0067759 A1 | 3/2014 | Aguilera et al. |
| 2014/0067792 A1 | 3/2014 | Erdogan et al. |
| 2014/0068343 A1 | 3/2014 | Nakajima et al. |
| 2014/0074810 A1 | 3/2014 | Wang et al. |
| 2014/0089511 A1 | 3/2014 | McLean |
| 2014/0095470 A1 | 4/2014 | Chen et al. |
| 2014/0129515 A1 | 5/2014 | Venkatesan et al. |
| 2014/0149355 A1 | 5/2014 | Gupta et al. |
| 2014/0156642 A1 | 6/2014 | Johnson et al. |
| 2014/0180651 A1 | 6/2014 | Lysak et al. |
| 2014/0181373 A1 | 6/2014 | George et al. |
| 2014/0188841 A1 | 7/2014 | Sun et al. |
| 2014/0188885 A1 | 7/2014 | Kulkarni et al. |
| 2014/0189858 A1 | 7/2014 | Chen et al. |
| 2014/0195558 A1 | 7/2014 | Murthy et al. |
| 2014/0214799 A1 | 7/2014 | Li et al. |
| 2014/0236889 A1 | 8/2014 | Vasan et al. |
| 2014/0236890 A1 | 8/2014 | Vasan et al. |
| 2014/0244585 A1 | 8/2014 | Sivasubramanian et al. |
| 2014/0255295 A1 | 9/2014 | Wang et al. |
| 2014/0278652 A1 | 9/2014 | Joyner et al. |
| 2014/0280021 A1 | 9/2014 | Singamshetty |
| 2014/0289414 A1 | 9/2014 | Chan et al. |
| 2014/0317084 A1 | 10/2014 | Chaudhry et al. |
| 2014/0324862 A1 | 10/2014 | Bingham et al. |
| 2014/0359598 A1 | 12/2014 | Oliver et al. |
| 2014/0380322 A1 | 12/2014 | Ailamaki et al. |
| 2015/0019537 A1 | 1/2015 | Neels et al. |
| 2015/0039757 A1 | 2/2015 | Petersen et al. |
| 2015/0049163 A1 | 2/2015 | Smurro |
| 2015/0058293 A1 | 2/2015 | Kobayashi et al. |
| 2015/0095570 A1 | 4/2015 | Lee |
| 2015/0100412 A1 | 4/2015 | Sterns et al. |
| 2015/0100616 A1 | 4/2015 | Imamura |
| 2015/0112966 A1 | 4/2015 | Tokuda et al. |
| 2015/0113162 A1 | 4/2015 | Chan et al. |
| 2015/0120684 A1 | 4/2015 | Bawaskar et al. |
| 2015/0134795 A1 | 5/2015 | Theimer et al. |
| 2015/0134796 A1 | 5/2015 | Theimer et al. |
| 2015/0149440 A1 | 5/2015 | Bornea et al. |
| 2015/0149501 A1 | 5/2015 | Prakash et al. |
| 2015/0149507 A1 | 5/2015 | Imaki |
| 2015/0149509 A1 | 5/2015 | Leu et al. |
| 2015/0149879 A1 | 5/2015 | Miller et al. |
| 2015/0161211 A1 | 6/2015 | Patel et al. |
| 2015/0161237 A1 | 6/2015 | Agarwal et al. |
| 2015/0161239 A1 | 6/2015 | Stepinski et al. |
| 2015/0169684 A1 | 6/2015 | Li et al. |
| 2015/0169686 A1 | 6/2015 | Elias et al. |
| 2015/0169786 A1 | 6/2015 | Jerzak et al. |
| 2015/0172148 A1 | 6/2015 | Ishida et al. |
| 2015/0180891 A1 | 6/2015 | Seward et al. |
| 2015/0188969 A1 | 7/2015 | Boshev et al. |
| 2015/0189033 A1 | 7/2015 | Han et al. |
| 2015/0199267 A1 | 7/2015 | Oh et al. |
| 2015/0199347 A1 | 7/2015 | Shnitko et al. |
| 2015/0207857 A1 | 7/2015 | Horton |
| 2015/0213631 A1 | 7/2015 | Vander Broek |
| 2015/0227624 A1 | 8/2015 | Busch et al. |
| 2015/0234682 A1 | 8/2015 | Dageville et al. |
| 2015/0244795 A1 | 8/2015 | Cantwell et al. |
| 2015/0254245 A1 | 9/2015 | Marais et al. |
| 2015/0254346 A1 | 9/2015 | Chang et al. |
| 2015/0295796 A1 | 10/2015 | Hsiao et al. |
| 2015/0295848 A1 | 10/2015 | Vlachogiannis et al. |
| 2015/0304879 A1 | 10/2015 | daCosta |
| 2015/0319256 A1 | 11/2015 | Casey |
| 2015/0324433 A1 | 11/2015 | Duffy et al. |
| 2015/0339312 A1 | 11/2015 | Lin et al. |
| 2015/0339357 A1 | 11/2015 | Carasso et al. |
| 2015/0341212 A1 | 11/2015 | Hsiao et al. |
| 2015/0347443 A1 | 12/2015 | Reid et al. |
| 2015/0347993 A1 | 12/2015 | Redmond et al. |
| 2015/0356153 A1 | 12/2015 | Schoening |
| 2015/0358433 A1 | 12/2015 | Parthasarathy et al. |
| 2015/0381725 A1 | 12/2015 | Haapaoja et al. |
| 2016/0026438 A1 | 1/2016 | Wolfram |
| 2016/0026684 A1 | 1/2016 | Mukherjee et al. |
| 2016/0027041 A1 | 1/2016 | Zhong et al. |
| 2016/0042039 A1 | 2/2016 | Kaufmann et al. |
| 2016/0044108 A1 | 2/2016 | Vermeulen et al. |
| 2016/0048408 A1 | 2/2016 | Madhu et al. |
| 2016/0050129 A1 | 2/2016 | Hoyne |
| 2016/0050261 A1 | 2/2016 | McDaid et al. |
| 2016/0055184 A1 | 2/2016 | Fokoue-Nkoutche et al. |
| 2016/0063037 A1 | 3/2016 | Savkli |
| 2016/0063209 A1 | 3/2016 | Malaviya |
| 2016/0070750 A1 | 3/2016 | Beutlberger et al. |
| 2016/0085639 A1 | 3/2016 | Abouzour et al. |
| 2016/0085810 A1 | 3/2016 | de Castro Alves et al. |
| 2016/0087880 A1 | 3/2016 | Shalita et al. |
| 2016/0092493 A1 | 3/2016 | Ko et al. |
| 2016/0092541 A1 | 3/2016 | Liu et al. |
| 2016/0092570 A1 | 3/2016 | Ago et al. |
| 2016/0092588 A1 | 3/2016 | Li |
| 2016/0110109 A1 | 4/2016 | Cowling et al. |
| 2016/0112531 A1 | 4/2016 | Milton et al. |
| 2016/0117129 A1 | 4/2016 | Shrader et al. |
| 2016/0117373 A1 | 4/2016 | Dang et al. |
| 2016/0139849 A1 | 5/2016 | Chaw et al. |
| 2016/0140174 A1 | 5/2016 | Weyerhaeuser et al. |
| 2016/0140196 A1 | 5/2016 | Kobayashi et al. |
| 2016/0150002 A1 | 5/2016 | Hildrum et al. |
| 2016/0156579 A1 | 6/2016 | Kaufmann |
| 2016/0162478 A1 | 6/2016 | Blassin et al. |
| 2016/0170987 A1 | 6/2016 | Kesselman |
| 2016/0180557 A1 | 6/2016 | Yousaf et al. |
| 2016/0188669 A1 | 6/2016 | Duffy et al. |
| 2016/0188742 A1 | 6/2016 | Ingvoldstad et al. |
| 2016/0203135 A1 | 7/2016 | Bhattacharjee et al. |
| 2016/0210340 A1 | 7/2016 | Cai et al. |
| 2016/0212007 A1 | 7/2016 | Alatorre et al. |
| 2016/0283511 A1 | 9/2016 | Fokoue-Nkoutche et al. |
| 2016/0283528 A1 | 9/2016 | Benke et al. |
| 2016/0286013 A1 | 9/2016 | Yu et al. |
| 2016/0291942 A1 | 10/2016 | Hutchison |
| 2016/0292166 A1 | 10/2016 | Russell |
| 2016/0306849 A1 | 10/2016 | Curino et al. |
| 2016/0316014 A1 | 10/2016 | Radu et al. |
| 2016/0335062 A1 | 11/2016 | Teodorescu et al. |
| 2016/0335352 A1 | 11/2016 | Teodorescu et al. |
| 2016/0343093 A1 | 11/2016 | Riland et al. |
| 2016/0357828 A1 | 12/2016 | Tobin et al. |
| 2016/0364093 A1 | 12/2016 | Denton et al. |

(56) References Cited

U.S. PATENT DOCUMENTS

| | | |
|---|---|---|
| 2016/0364424 A1 | 12/2016 | Chang et al. |
| 2016/0373521 A1 | 12/2016 | Washbrook et al. |
| 2017/0006135 A1 | 1/2017 | Siebel et al. |
| 2017/0010947 A1 | 1/2017 | Lu et al. |
| 2017/0012909 A1 | 1/2017 | Lieu |
| 2017/0024390 A1 | 1/2017 | Vuppala et al. |
| 2017/0024912 A1 | 1/2017 | de Castro Alves et al. |
| 2017/0026441 A1 | 1/2017 | Moudy et al. |
| 2017/0031599 A1 | 2/2017 | Bowman et al. |
| 2017/0031937 A1 | 2/2017 | Bowman et al. |
| 2017/0031988 A1 | 2/2017 | Sun et al. |
| 2017/0034023 A1 | 2/2017 | Nickolov et al. |
| 2017/0039239 A1 | 2/2017 | Saadat-Panah et al. |
| 2017/0046374 A1 | 2/2017 | Fletcher et al. |
| 2017/0046445 A1 | 2/2017 | Cormier et al. |
| 2017/0060903 A1 | 3/2017 | Botea et al. |
| 2017/0061286 A1 | 3/2017 | Kumar et al. |
| 2017/0097957 A1 | 4/2017 | Bourbonnais et al. |
| 2017/0103116 A1 | 4/2017 | Hu et al. |
| 2017/0111675 A1 | 4/2017 | Song et al. |
| 2017/0116289 A1 | 4/2017 | Deshmukh et al. |
| 2017/0083588 A1 | 5/2017 | Lang et al. |
| 2017/0124151 A1 | 5/2017 | Ji et al. |
| 2017/0147224 A1 | 5/2017 | Kumar et al. |
| 2017/0147640 A1 | 5/2017 | Gaza et al. |
| 2017/0149624 A1 | 5/2017 | Chitti et al. |
| 2017/0149625 A1 | 5/2017 | Chitti et al. |
| 2017/0154057 A1 | 6/2017 | Wu et al. |
| 2017/0169336 A1 | 6/2017 | Singhal et al. |
| 2017/0170990 A1 | 6/2017 | Gaddehosur et al. |
| 2017/0178253 A1 | 6/2017 | Koufogiannakis et al. |
| 2017/0180289 A1 | 6/2017 | Chiappone et al. |
| 2017/0185574 A1 | 6/2017 | Fern et al. |
| 2017/0185648 A1 | 6/2017 | Kavulya et al. |
| 2017/0199910 A1 | 7/2017 | Konik et al. |
| 2017/0213257 A1 | 7/2017 | Murugesan et al. |
| 2017/0219357 A1 | 8/2017 | Pfeifle |
| 2017/0220685 A1 | 8/2017 | Yan et al. |
| 2017/0228257 A1 | 8/2017 | Gallagher |
| 2017/0228460 A1 | 8/2017 | Amel et al. |
| 2017/0242630 A1 | 8/2017 | Kephart et al. |
| 2017/0243132 A1 | 8/2017 | Sainani et al. |
| 2017/0255790 A1 | 9/2017 | Barrett et al. |
| 2017/0262551 A1 | 9/2017 | Cho et al. |
| 2017/0286507 A1 | 10/2017 | Hosogi et al. |
| 2017/0286518 A1 | 10/2017 | Horowitz et al. |
| 2017/0300536 A1 | 10/2017 | Gupta et al. |
| 2017/0300702 A1 | 10/2017 | Tegegne et al. |
| 2017/0329543 A1 | 11/2017 | Slater et al. |
| 2017/0373935 A1 | 12/2017 | Subramanian et al. |
| 2018/0004745 A1 | 1/2018 | Finkelstein et al. |
| 2018/0011655 A1 | 1/2018 | Gredler et al. |
| 2018/0032478 A1 | 2/2018 | Felderman et al. |
| 2018/0032570 A1 | 2/2018 | Miller et al. |
| 2018/0046503 A1 | 2/2018 | Feng et al. |
| 2018/0052765 A1 | 2/2018 | Imbierski |
| 2018/0060389 A1 | 3/2018 | Hwang |
| 2018/0060395 A1 | 3/2018 | Pathak et al. |
| 2018/0060399 A1 | 3/2018 | Lee et al. |
| 2018/0060586 A1 | 3/2018 | Xiao et al. |
| 2018/0075097 A1 | 3/2018 | Hwang |
| 2018/0081579 A1 | 3/2018 | Verrilli et al. |
| 2018/0089258 A1 | 3/2018 | Bhattacharjee et al. |
| 2018/0089259 A1 | 3/2018 | James et al. |
| 2018/0089262 A1 | 3/2018 | Bhattacharjee et al. |
| 2018/0089265 A1 | 3/2018 | Gerard |
| 2018/0089267 A1 | 3/2018 | Hatem et al. |
| 2018/0089269 A1 | 3/2018 | Pal et al. |
| 2018/0089272 A1 | 3/2018 | Bath et al. |
| 2018/0089276 A1 | 3/2018 | Victor et al. |
| 2018/0089278 A1 | 3/2018 | Bhattacharjee et al. |
| 2018/0089306 A1 | 3/2018 | Pal et al. |
| 2018/0089312 A1 | 3/2018 | Pal et al. |
| 2018/0089324 A1 | 3/2018 | Pal et al. |
| 2018/0089328 A1 | 3/2018 | Bath et al. |
| 2018/0113902 A1 | 4/2018 | Chen et al. |
| 2018/0121426 A1 | 5/2018 | Barsness et al. |
| 2018/0123918 A1 | 5/2018 | Steinhauser et al. |
| 2018/0157711 A1 | 6/2018 | Lee |
| 2018/0159782 A1 | 6/2018 | Madan et al. |
| 2018/0165331 A1 | 6/2018 | Zhang et al. |
| 2018/0173753 A1 | 6/2018 | Pei et al. |
| 2018/0173759 A1 | 6/2018 | Barsness et al. |
| 2018/0218017 A1 | 8/2018 | Milrud |
| 2018/0218045 A1 | 8/2018 | Pal et al. |
| 2018/0225095 A1 | 8/2018 | Kamalakantha et al. |
| 2018/0285417 A1 | 10/2018 | Lazovic et al. |
| 2018/0322017 A1 | 11/2018 | Maccanti et al. |
| 2018/0322168 A1 | 11/2018 | Levine et al. |
| 2018/0348715 A1 | 12/2018 | Bandaru et al. |
| 2018/0349095 A1 | 12/2018 | Wu et al. |
| 2018/0373756 A1 | 12/2018 | Madala |
| 2019/0065278 A1 | 2/2019 | Jeuk et al. |
| 2019/0095241 A1 | 3/2019 | Ago et al. |
| 2019/0095493 A1 | 3/2019 | Bhattacharjee et al. |
| 2019/0095494 A1 | 3/2019 | Bhattacharjee et al. |
| 2019/0098106 A1 | 3/2019 | Mungel et al. |
| 2019/0109848 A1 | 4/2019 | Clark et al. |
| 2019/0138638 A1 | 5/2019 | Pal et al. |
| 2019/0138639 A1 | 5/2019 | Pal et al. |
| 2019/0138640 A1 | 5/2019 | Pal et al. |
| 2019/0138641 A1 | 5/2019 | Pal et al. |
| 2019/0138642 A1 | 5/2019 | Pal et al. |
| 2019/0147084 A1 | 5/2019 | Pal et al. |
| 2019/0147085 A1 | 5/2019 | Pal et al. |
| 2019/0147086 A1 | 5/2019 | Pal et al. |
| 2019/0147092 A1 | 5/2019 | Pal et al. |
| 2019/0163796 A1 | 5/2019 | Hodge et al. |
| 2019/0163821 A1 | 5/2019 | Pal et al. |
| 2019/0163822 A1 | 5/2019 | Bhattacharjee et al. |
| 2019/0163823 A1 | 5/2019 | Bhattacharjee et al. |
| 2019/0163824 A1 | 5/2019 | Pal et al. |
| 2019/0163840 A1 | 5/2019 | Pal et al. |
| 2019/0163841 A1 | 5/2019 | Bhattacharjee et al. |
| 2019/0163842 A1 | 5/2019 | Pal et al. |
| 2019/0171676 A1 | 6/2019 | Pal et al. |
| 2019/0171677 A1 | 6/2019 | Pal et al. |
| 2019/0171678 A1 | 6/2019 | Pal et al. |
| 2019/0229924 A1 | 7/2019 | Chhabra et al. |
| 2019/0236182 A1 | 8/2019 | Tiyyagura et al. |
| 2019/0258631 A1 | 8/2019 | Pal et al. |
| 2019/0258632 A1 | 8/2019 | Pal et al. |
| 2019/0258635 A1 | 8/2019 | Pal et al. |
| 2019/0258636 A1 | 8/2019 | Bhattacharjee et al. |
| 2019/0258637 A1 | 8/2019 | Bhattacharjee et al. |
| 2019/0272271 A1 | 9/2019 | Bhattacharjee et al. |
| 2019/0294344 A1 | 9/2019 | Hahn et al. |
| 2019/0310977 A1 | 10/2019 | Pal et al. |
| 2019/0349426 A1 | 11/2019 | Smith et al. |
| 2019/0379650 A1 | 12/2019 | Hale et al. |
| 2020/0004794 A1 | 1/2020 | Pal et al. |
| 2020/0050586 A1 | 2/2020 | Pal et al. |
| 2020/0050607 A1 | 2/2020 | Pal et al. |
| 2020/0050612 A1 | 2/2020 | Bhattacharjee et al. |
| 2020/0057818 A1 | 2/2020 | Kim |
| 2020/0065303 A1 | 2/2020 | Bhattacharjee et al. |
| 2020/0065340 A1 | 2/2020 | Hodge et al. |
| 2020/0133916 A1 | 4/2020 | Liao et al. |
| 2020/0167395 A1 | 5/2020 | Pal et al. |
| 2020/0301941 A1 | 9/2020 | Wilson et al. |
| 2020/0327252 A1 | 10/2020 | McFall et al. |
| 2020/0364223 A1 | 11/2020 | Pal et al. |
| 2020/0364279 A1 | 11/2020 | Pal et al. |
| 2021/0034625 A1 | 2/2021 | Shah et al. |
| 2021/0049177 A1 | 2/2021 | Bhattacharjee et al. |
| 2021/0117425 A1 | 4/2021 | Rao et al. |
| 2021/0149895 A1 | 5/2021 | Tran et al. |
| 2021/0224051 A1 | 7/2021 | Bequet et al. |
| 2021/0294801 A1 | 9/2021 | Pal et al. |
| 2021/0303570 A1 | 9/2021 | Kondiles et al. |
| 2021/0357470 A1 | 11/2021 | James et al. |
| 2021/0390103 A1 | 12/2021 | Cejudo et al. |
| 2022/0156335 A1 | 5/2022 | Bhattacharjee et al. |
| 2022/0261385 A1 | 8/2022 | Anwar et al. |

(56) References Cited

U.S. PATENT DOCUMENTS

| | | | |
|---|---|---|---|
| 2022/0269727 A1 | 8/2022 | Batsakis et al. |
| 2022/0327125 A1 | 10/2022 | Pal et al. |
| 2022/0327149 A1 | 10/2022 | Pal et al. |
| 2022/0405331 A1 | 12/2022 | Pal et al. |
| 2023/0144450 A1 | 5/2023 | Bhattacharjee et al. |
| 2023/0147068 A1 | 5/2023 | Rao et al. |
| 2023/0177047 A1 | 6/2023 | Pal et al. |

FOREIGN PATENT DOCUMENTS

| | | |
|---|---|---|
| CN | 107506447 A | 12/2017 |
| CN | 109299110 A | 2/2019 |
| CN | 109416643 A | 3/2019 |
| EP | 3 675 418 | 7/2020 |
| KR | 20200004835 | 1/2020 |
| WO | WO 2007/062429 | 5/2007 |
| WO | WO 2020/027867 | 2/2020 |
| WO | WO 2020/220216 | 11/2020 |

OTHER PUBLICATIONS

Beame et al., "Communication Steps for Parallel Query Processing", PODS '13: Proceedings of the 32nd ACM SIGMOD-SIGACT-SIGAI Symposium on Principles of Database Systems; Jun. 2013, pp. 273-284.

Bitincka et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010; 9 pages.

Carraso D., "Exploring Splunk," published by CITO Research, New York, NY, Apr. 2012; 156 pages.

Chen et al., "ParaLite: Supporting Collective Queries in Database System to Parallelize User-Defined Executable," 2012 12th IEEE/ACM International Symposium on Cluster, Clout and Grid Computing, IEEE Computer Society, pp. 474-481, May 2012.

Friedman, et al., SQL/MapReduce: A Practical Approach to Self-Describing, Polymorphic, and Parallelizable Use-Defined Functions, Proc. VLDB Endow, 2 pp. 1402-1413 Aug. 2009.

Han et al., "Elastic Allocator: An Adaptive Task Scheduler for Streaming Query in the Cloud," IEEE Computer Society—2014, IEEE 8th International Symposium on Service Oriented System Engineering, pp. 284-289, 2014.

Hu et al., Dynamic Optimization of Subquery Processing in Grid Database, Third International Conference on Natural Communication, 6 pages, vol. 5, Nov. 2007.

Jayaram, SQLShack: "SQL Union overview, usage, and examples," https://sqlshack.com/sql/sql-sub-queries.htm. 2021, in 13 pages.

Kafka + Flink: A Practical, How-To Guide (ververica.com), Sep. 2, 2015; 13 pages.

Keystone Real-time Stream Processing Platform, The Netflix Tech Blog, Sep. 10, 2018, retrieved from https://netflixtechblog.com/keystone-real-time-stream-processing-platform-a3ee651812a?gi=71cc12ef6b89.

Myers W., Skating Out the Graphics Display Pipeline, 1984; 6 pages.

Nadanam et al., "QOS Evaluation for Web Services in Cloud computing," IEEE, 2012, ICCCNT'12, Jul. 26-28, 2012, Coimbatore, India.

Netflix Keystone SPaaS: Real-time Stream Processing as a Service—ABD320—re:Invent 2017 clip slide, retrieved from https://www.slideshare.net/AmazonWebServices/netflix-keystone-spaas-realtime-stream-processing-as-a-service-abd320-reinvent-2017.

Nguyen et al., "An IndexScheme for Similarity Search on Cloud Computing using MapReduce over Docker Container," IMCOM '16: Proceedings of the 10 International Conferenceon Ubiquitous Information Management and Communication Jan. 2016 Article No. 60 pp. 1-6 9year: 2016).

Pääkkönen et al., "Reference Architecture and Classification of Technologies, Products and Services for Big Data Systems," Big Data Research vol. 2, Issue 4, Dec. 2015, pp. 166-186.

Slaml 10 Reports, Workshop on Managing Systems via Log Analysis and Machine Learning Techniques. ; login: Feb. 2011—Conference Reports—vol. 36, No. 1, pp. 104-110.

Splunk Enterprise Overview 8.0.0—splunk > turn data into doing—copyright 2020 Splunk Inc.—in 17 pages—Retrieved from Splunk Documentation <URL: https://docs.splunk.com/Documentation> on May 20, 2020; 17 pages.

Splunk Cloud User Manual 8.0.2004—splunk> turn data in doing—copyright 2020 Splunk Inc.—in 66 pages—Retrieved from Splunk Documentation <URL: https://docs.splunk.com/Documentation> on May 20, 2020; 66 pages.

Splunk Quick Reference Guide, updated 2019, available online at https://www.splunk.com/pdfs/solution-guides/splunk-quick-reference-guide.pdf, retrieved May 20, 2020; 6 pages.

"Subqueries with the INSERT Statement," https://www.tutorialspoint.com/sql/sql-sub-queries.htm. (Aug. 3, 2021); 4 pages.

Vaid K., Workshop on Managing Systems via log Analysis and Machine Learning Techniques (SLAML '10), ;login: vol. 36, No. 1, Oct. 3, 2010, Vancouver, BC, Canada; 7 pages.

Wu S., Building Stream Processing as a Service (SPaaS), retrieved from https://cdn.oreillystatic.com/en/assets/1/event/281/Building%20stream%20processing%20as%20a%20service%20at%20Netflix%20Presentation.pdf. Netflix Presentation Dec. 2017; 113 pages.

Yasu et al., Performance of Splunk for the TDAQ Information Service at the ATLAS Experiment, 2014 19th IEEE-NPSS Real Time Conference, 6 pages, May 2014.

U.S. Appl. No. 15/276,717, filed Sep. 26, 2016, Pal et al.
U.S. Appl. No. 15/339,825, filed Oct. 31, 2016, Hodge et al.
U.S. Appl. No. 15/339,833, filed Oct. 31, 2016, Bhattacharjee et al.
U.S. Appl. No. 15/339,835, filed Oct. 31, 2016, Bhattacharjee et al.
U.S. Appl. No. 15/339,840, filed Oct. 31, 2016, Pal et al.
U.S. Appl. No. 15/339,845, filed Oct. 31, 2016, Bhattacharjee et al.
U.S. Appl. No. 15/339,847, filed Oct. 31, 2016, Pal et al.
U.S. Appl. No. 15/339,853, filed Oct. 31, 2016, Pal et al.
U.S. Appl. No. 15/339,886, filed Oct. 31, 2016, Bath et al.
U.S. Appl. No. 15/339,889, filed Oct. 31, 2016, Bath et al.
U.S. Appl. No. 15/665,148, filed Jul. 8, 2020, Pal et al.
U.S. Appl. No. 15/665,159, filed Jul. 31, 2022, Pal et al.
U.S. Appl. No. 15/665,187, filed Jul. 31, 2017, Bhattacharjee et al.
U.S. Appl. No. 15/665,197, filed Jul. 31, 2017, Bhattacharjee et al.
U.S. Appl. No. 15/665,248, filed Jul. 31, 2017, James et al.
U.S. Appl. No. 15/665,279, filed Jul. 31, 2017, Pal et al.
U.S. Appl. No. 15/665,302, filed Jul. 31, 2017, Bhattacharjee et al.
U.S. Appl. No. 15/665,339, filed Jul. 31, 2017, Pal et al.
U.S. Appl. No. 15/967,567, filed Apr. 30, 2018, Batsakis et al.
U.S. Appl. No. 15/967,570, filed Apr. 30, 2018, Sammer et al.
U.S. Appl. No. 15/967,573, filed Apr. 30, 2018, Batsakis et al.
U.S. Appl. No. 15/967,574, filed Apr. 30, 2018, Batsakis et al.
U.S. Appl. No. 15/967,578, filed Apr. 30, 2018, Batsakis et al.
U.S. Appl. No. 15/967,581, filed Apr. 30, 2018, Sammer et al.
U.S. Appl. No. 15/967,582, filed Apr. 30, 2018, Batsakis et al.
U.S. Appl. No. 15/967,585, filed Apr. 30, 2018, Batsakis et al.
U.S. Appl. No. 15/967,586, filed Apr. 30, 2018, Batsakis et al.
U.S. Appl. No. 15/967,587, filed Apr. 30, 2018, Batsakis et al.
U.S. Appl. No. 15/967,588, filed Apr. 30, 2018, Batsakis et al.
U.S. Appl. No. 15/967,590, filed Apr. 30, 2018, Batsakis et al.
U.S. Appl. No. 15/967,591, filed Apr. 30, 2018, Batsakis et al.
U.S. Appl. No. 15/967,595, filed Apr. 30, 2018, Batsakis et al.
U.S. Appl. No. 16/000,664, filed Jun. 5, 2018, Batsakis et al.
U.S. Appl. No. 16/000,688, filed Jun. 5, 2018, Sammer et al.
U.S. Appl. No. 16/051,197, filed Jul. 31, 2018, Pal et al.
U.S. Appl. No. 16/051,203, filed Jul. 31, 2018, Pal et al.
U.S. Appl. No. 16/051,215, filed Jul. 31, 2018, Pal et al.
U.S. Appl. No. 16/051,223, filed Jul. 31, 2018, Pal et al.
U.S. Appl. No. 16/051,300, filed Jul. 31, 2018, Pal et al.
U.S. Appl. No. 16/051,304, filed Jul. 31, 2022, Pal et al.
U.S. Appl. No. 16/051,310, filed Jul. 31, 2018, Pal et al.
U.S. Appl. No. 16/146,990, filed Sep. 28, 2018, Pal et al.
U.S. Appl. No. 16/147,129, filed Sep. 28, 2018.
U.S. Appl. No. 16/147,165, filed Sep. 28, 2018, Pal et al.

(56) References Cited

OTHER PUBLICATIONS

U.S. Appl. No. 16/147,209, filed Sep. 28, 2018, James et al.
U.S. Appl. No. 16/147,344, filed Sep. 28, 2021, James et al.
U.S. Appl. No. 16/147,350, filed Sep. 28, 2018, Pal et al.
U.S. Appl. No. 16/177,256, filed Oct. 31, 2021, Aleti et al.
U.S. Appl. No. 16/264,430, filed Jan. 31, 2019, Pal et al.
U.S. Appl. No. 16/264,441, filed Jan. 31, 2019, Pal et al.
U.S. Appl. No. 16/264,462, filed Jan. 31, 2019, Pal et al.
U.S. Appl. No. 16/397,922, filed Apr. 29, 2019, Bhattacharjee et al.
U.S. Appl. No. 16/397,930, filed Apr. 29, 2019, Pal et al.
U.S. Appl. No. 16/397,968, filed Apr. 29, 2019, Bhattacharjee et al.
U.S. Appl. No. 16/397,970, filed Apr. 29, 2019, Bhattacharjee et al.
U.S. Appl. No. 16/398,031, filed Apr. 29, 2019, Pal et al.
U.S. Appl. No. 16/398,038, filed Apr. 29, 2019, Pal et al.
U.S. Appl. No. 16/398,044, filed Apr. 29, 2019, Pal et al.
U.S. Appl. No. 16/430,983, filed Jun. 4, 2019, Pal et al.
U.S. Appl. No. 16/570,545, filed Sep. 13, 2019, Pal et al.
U.S. Appl. No. 16/675,026, filed Nov. 5, 2019, Hodge et al.
U.S. Appl. No. 16/657,867, filed Oct. 18, 2019, Bhattacharjee et al.
U.S. Appl. No. 16/657,872, filed Oct. 18, 2019, Bhattacharjee et al.
U.S. Appl. No. 16/657,894, filed Oct. 18, 2019, Pal et al.
U.S. Appl. No. 16/657,916, filed Oct. 18, 2022, Bhattacharjee et al.
U.S. Appl. No. 16/657,924, filed Oct. 18, 2019, Anwar et al.
U.S. Appl. No. 16/777,602, filed Jan. 30, 2020, Pal et al.
U.S. Appl. No. 16/945,587, filed Jul. 31, 2020, Pal et al.
U.S. Appl. No. 16/945,658, filed Jul. 31, 2020, Pal et al.
U.S. Appl. No. 17/086,043, filed Oct. 30, 2020, Bhattacharjee et al.
U.S. Appl. No. 17/196,577, filed Mar. 9, 2021, Pal et al.
U.S. Appl. No. 17/233,193, filed Apr. 16, 2021, Batsakis et al.
U.S. Appl. No. 17/443,811, filed Jul. 27, 2021, James et al.
U.S. Appl. No. 17/445,701, filed Aug. 23, 2021, Batsakis et al.
U.S. Appl. No. 17/589,764, filed Jan. 31, 2022, Bhattacharjee et al.
U.S. Appl. No. 17/646,841, filed Jan. 3, 2022, Batsakis et al.
U.S. Appl. No. 17/655,302, filed Mar. 17, 2022, Pal et al.
U.S. Appl. No. 17/658,792, filed Apr. 11, 2022, Pal et al.
Dayal U., "Of Nests and Trees: A Unified Approach to Processing Queries That Contain Nested Subqueries, Aggregates, and Quantifiers." Proceedings of the 13th Int'l Conference on Very Large Data Bases [VLDB], Brighton, 1987, pp. 197-208.
Gotz et al., "A methodology for interactive mining and visual analysis of clinical event patterns using electronic health record data". Journal Biomed Info. Apr. 1, 2014;48: 148-159.
Huang et al., "Query-aware Locality-sensitive Hashing for Approximate Nearest Neighbor Search", In Proceedings of the VLDB Endowment. Sep. 1, 2015;9(1):1-2 in 12 pages.
Kuo et al., "Query Expansion for Hash-based Image Object Retrieval". In Proceedings of the 17th ACM international conference on Multimedia Oct. 19, 2009 (pp. 65-74).
Limsopatham et al., "Learning to Combine Representations for Medical Records Search". SIGIR'13, Jul. 28-Aug. 1, 2013, ACM 2013; pp. 833-836.
Wongsuphasawat et al., "Querying event sequences by exact match or similarity search: Design and empirical evaluation". Interacting with Computers. Mar. 1, 2012;24(2): 55-68.
Zhu et al., "Combining Multi-level Evidence for Medical Record Retrieval". SHB'12, Oct. 29, 2012, ACM 2012; pp. 49-56.
U.S. Appl. No. 17/074,236, filed Oct. 19, 2020, Andrada et al.
U.S. Appl. No. 17/589,712, filed Jan. 31, 2022, Batsakis et al.
U.S. Appl. No. 17/661,528, filed Apr. 29, 2022, Rao B.
U.S. Appl. No. 17/661,529, filed Apr. 29, 2022, Rao B.
U.S. Appl. No. 17/816,254, filed Jul. 29, 2022, Arora et al.
U.S. Appl. No. 17/816,132, filed Jul. 29, 2022, Arora et al.
U.S. Appl. No. 18/051,470, filed Oct. 31, 2022, Bhattacharjee et al.
U.S. Appl. No. 18/051,481, filed Oct. 31, 2022, Rao et al.
U.S. Appl. No. 18/181,900, filed Mar. 10, 2023, Pal et al.
U.S. Appl. No. 18/326,802, filed May 31, 2023, Andrade et al.

* cited by examiner

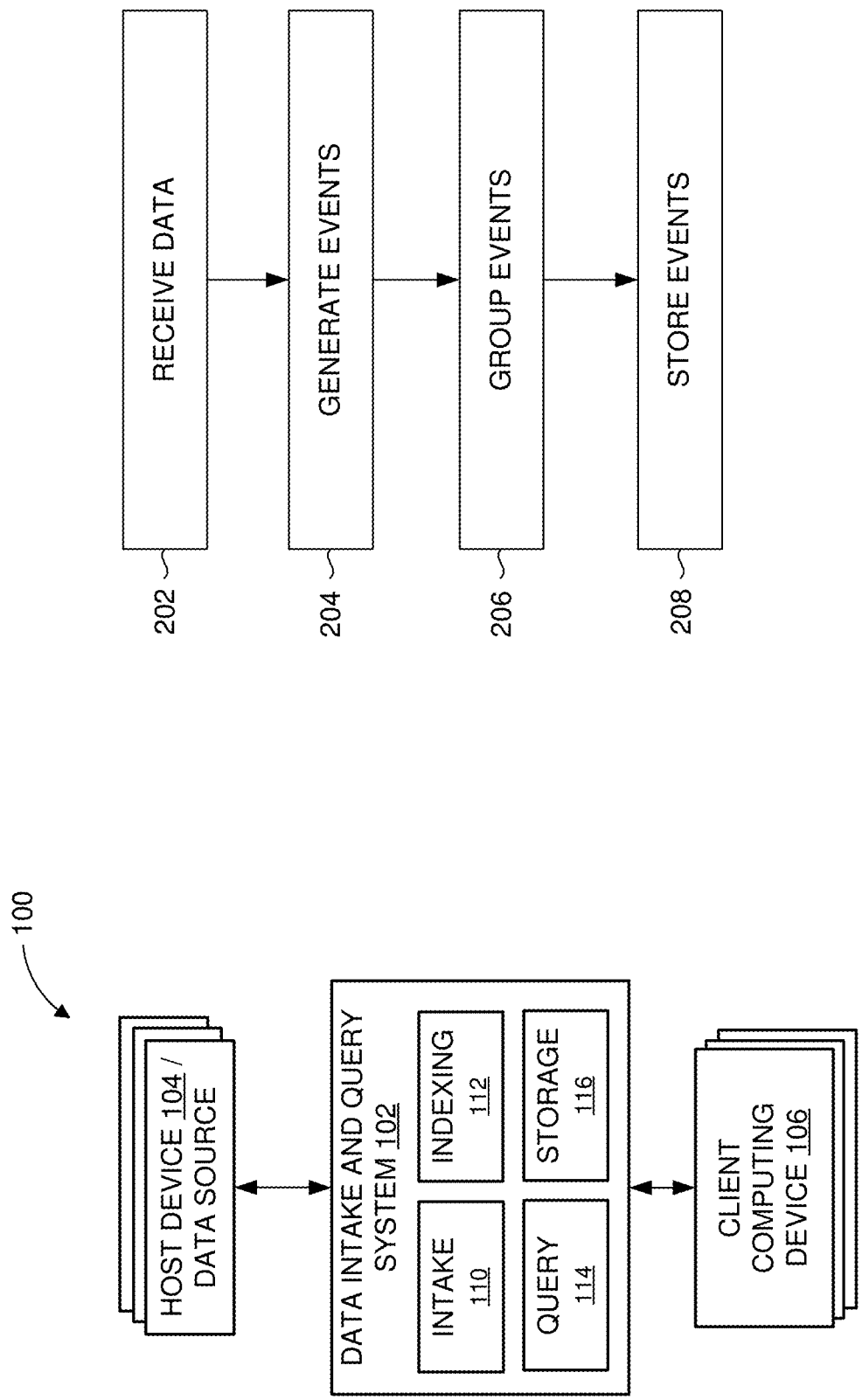

```
                                        ┌─ 302
                                        ▼
                                              ┌─302A
127.0.0.1 – eva [10/Oct/2000:13:55:36 -0700] "GET/apache.gif HTTP/1.0" 200  2326  0.0947
127.0.0.1 – emerson [10/Oct/2000:13:56:36 -0700] "GET/eastwood.gif HTTP/1.0" 200 2980
0.0899          ┌─302C          └─302B
127.0.0.3 – eliza [10/Oct/2000:13:57:36 -0700] "GET/ezra.gif HTTP/1.0" 200 2900 0.0857
[Sunday Oct 10 1:58:33 2010] [error] [client 127.10.1.1.015] File does not exist: /home/emmeline/
pub_html/images/alisia.gif          ┌─302E                      └─302D
91.205.189.15 - - [28/Apr/2014:18:22:16] *GET /oldlink?itemId=EST-
14&JSESSIONID=SD6SL7FF7ADFF53113 HTTP 1.1" 200 1665 "http://
www.buttercupgames.com/oldlink?itemId=EST-14" "Mozilla/5.0 (Windwos NT 6.1; WOW 64)
AppleWebKit/536.5 (KHTML, like Gecko) Chrome/19.0.1084.46 Safari/536.5" 159
        ┌─ 304
        ▼
docker: {
        container_id: f7360a148a670c4c257f4ee024be81284b6017d72ae41ea8ee5d
}                                       ┌─304A
kubernetes: {                          /
        container_name: kube-apiserver
        host: ip-172-20-43-173.ec2.internal
        labels: {
           k8s-app: kube-apiserver
        }
master_url: https://100.64.0.1:443/api
namespace_id: e5af26aa-4ef9-11e8-a4e1-0a2bf2ab4bba
namespace_name: kube-system
pod_id: 0a73017b-4efa-11e8-a4e1-0a2bf2ab4bba                    ┌─304B
pod_name: kube-apiserver-ip-172-20-43-173.ec2.internal         /
}
log: I0503 23:04:12.595203    1 wrap.go:42] GET /apis/admissionregistrations.k8s.io/v1beta1/
validatingwebhookconfiguration 200 [[kube-apiserver/v1.9.3 (linux/amd64) kubernetes/d283541]
127.0.0.1:55026 stream: stdout
time: 2018-05-03T23:04:12.619948395Z
}
        ┌─ 306
```

| time | ID | CPU | memory |
|---|---|---|---|
| 10/10/00 12:01:00.013 | eliza | 14% | 80% |
| 10/10/00 12:01:05.153 | eva | 26% | 70% |

GENERATING A MODIFIED COMPONENT FOR A DATA INTAKE AND QUERY SYSTEM USING AN ISOLATED EXECUTION ENVIRONMENT IMAGE

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems preprocess data based on anticipated data analysis needs. In particular, specified data items may be extracted from the generated data and stored in a data system to facilitate efficient retrieval and analysis of those data items at a later time. At least some of the remainder of the generated data is typically discarded during preprocessing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it. Although the availability of vastly greater amounts of diverse data on diverse data systems provides opportunities to derive new insights, it also gives rise to technical challenges to search and analyze the data in a performant way.

BRIEF DESCRIPTION OF THE DRAWINGS

The present disclosure is illustrated by way of example, and not limitation, in the figures of the accompanying drawings, in which like reference numerals indicate similar elements.

FIG. 1 is a block diagram of an embodiment of a data processing environment.

FIG. 2 is a flow diagram illustrating an embodiment of a routine implemented by the data intake and query system to process, index, and store data.

FIG. 3A is a block diagram illustrating an embodiment of machine data received by the data intake and query system.

DETAILED DESCRIPTION

Figure 3B:
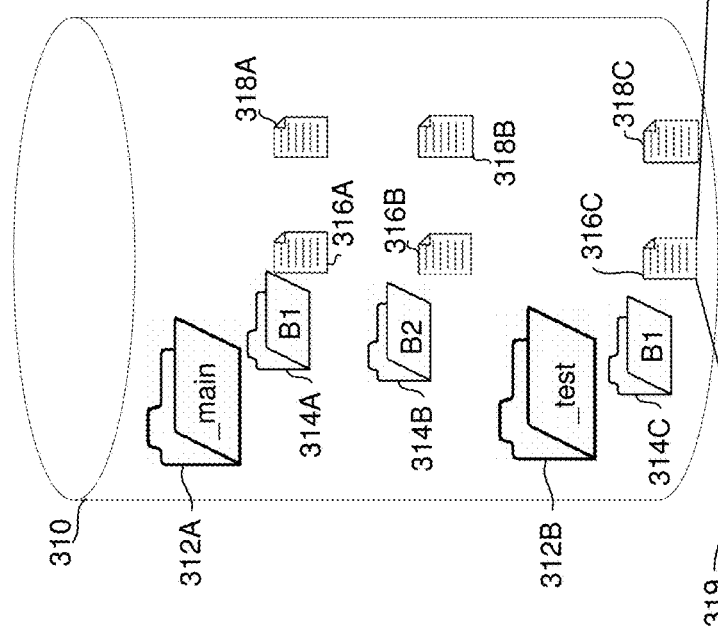
FIGS. 3B and 3C are block diagrams illustrating embodiments of various data structures for storing data processed by the data intake and query system.

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically preprocess the data based on anticipated data-analysis needs. For example, pre-specified data items may be extracted from the machine data and stored in a database to facilitate efficient retrieval and analysis of those data items at search time. However, the rest of the machine data typically is not saved and is discarded during preprocessing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that concurrently report these types of information.

These challenges can be addressed by using an event-based data intake and query system, such as the SPLUNK® ENTERPRISE, SPLUNK® CLOUD, or SPLUNK® CLOUD SERVICE system developed by Splunk Inc. of San Francisco, California. These systems represent the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, metrics data, tracing data, and other data input sources.

In the data intake and query system, machine data is collected and stored as "events." An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp. The time stamp may be derived from the portion of machine data in the event, determined through interpolation between temporally proximate events having known timestamps, and/or may be determined based on other configurable rules for associating timestamps with events.

In some instances, machine data can have a predefined structure, where data items with specific data formats are stored at predefined locations in the data. For example, the machine data may include data associated with fields in a database table. In other instances, machine data may not have a predefined structure (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system can use flexible schema to specify how to extract information from events. A flexible schema may be developed and redefined as needed. The flexible schema can be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp, and stores the events. The system enables users to run queries against the stored events to, for example, retrieve events that meet filter criteria specified in a query, such as criteria indicating certain keywords or having specific values in defined fields. Additional query terms can further process the event data, such as, by transforming the event data, etc.

As used herein, the term "field" can refer to a location in the machine data of an event containing one or more values for a specific data item. A field may be referenced by a field name associated with the field. As will be described in more detail herein, in some cases, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file can include one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source-type. When events are to be searched based on a particular field name specified in a search, the system can use one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system can utilize a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from machine data or events. In some cases, an extraction rule comprises a regular expression, where a sequence of characters form a search pattern. An extraction rule comprising a regular expression is referred to herein as a regex rule. The system applies a regex rule to machine data or an event to extract values for a field associated with the regex rule, where the values are extracted by searching the machine data/event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources.

In some embodiments, the configuration files and/or extraction rules described above can be stored in a catalog, such as a metadata catalog. In certain embodiments, the content of the extraction rules can be stored as rules or actions in the metadata catalog. For example, the identification of the data to which the extraction rule applies can be referred to a rule and the processing of the data can be referred to as an action.

1.0. Operating Environment

FIG. 1 is a block diagram of an embodiment of a data processing environment 100. In the illustrated embodiment, the environment 100 includes a data intake and query system 102, one or more host devices 104, and one or more client computing devices 106 (generically referred to as client device(s) 106).

The data intake and query system 102, host devices 104, and client devices 106 can communicate with each other via one or more networks, such as a local area network (LAN), wide area network (WAN), private or personal network, cellular networks, intranetworks, and/or internetworks using any of wired, wireless, terrestrial microwave, satellite links, etc., and may include the Internet. Although not explicitly shown in FIG. 1, it will be understood that a client computing device 106 can communicate with a host device 104 via one or more networks. For example, if the host device 104 is configured as a web server and the client computing device 106 is a laptop, the laptop can communicate with the web server to view a website.

1.1. Client Devices

A client device 106 can correspond to a distinct computing device that can configure, manage, or sends queries to the system 102. Examples of client devices 106 may include, without limitation, smart phones, tablet computers, handheld computers, wearable devices, laptop computers, desktop computers, servers, portable media players, gaming devices, or other device that includes computer hardware (e.g., processors, non-transitory, computer-readable media, etc.) and so forth. In certain cases, a client device 106 can include a hosted, virtualized, or containerized device, such as an isolated execution environment, that shares computing resources (e.g., processor, memory, etc.) of a particular machine with other isolated execution environments.

The client devices 106 can interact with the system 102 (or a host device 104) in a variety of ways. For example, the client devices 106 can communicate with the system 102 (or a host device 104) over an Internet (Web) protocol, via a gateway, via a command line interface, via a software developer kit (SDK), a standalone application, etc. As another example, the client devices 106 can use one or more executable applications or programs to interface with the system 102.

1.2. Host Devices

A host device 104 can correspond to a distinct computing device or system that includes or has access to data that can be ingested, indexed, and/or searched by the system 102. Accordingly, in some cases, a client device 106 may also be a host device 104 (e.g., it can include data that is ingested by the system 102 and it can submit queries to the system 102).

The host devices 104 can include, but are not limited to, servers, sensors, routers, personal computers, mobile devices, internet of things (IOT) devices, or hosting devices, such as computing devices in a shared computing resource environment on which multiple isolated execution environment (e.g., virtual machines, containers, etc.) can be instantiated, or other computing devices in an IT environment (e.g., device that includes computer hardware, e.g., processors, non-transitory, computer-readable media, etc.). In certain cases, a host device 104 can include a hosted, virtualized, or containerized device, such as an isolated execution environment, that shares computing resources (e.g., processor, memory, etc.) of a particular machine (e.g., a hosting device or hosting machine) with other isolated execution environments.

As mentioned host devices 104 can include or have access to data sources for the system 102. The data sources can include machine data found in log files, data files, distributed file systems, streaming data, publication-subscribe (pub/sub) buffers, directories of files, data sent over a network, event logs, registries, streaming data services (examples of which can include, by way of non-limiting example, Amazon's Simple Queue Service ("SQS") or Kinesis™ services, devices executing Apache Kafka™ software, or devices implementing the Message Queue Telemetry Transport (MQTT) protocol, Microsoft Azure EventHub, Google Cloud PubSub, devices implementing the Java Message Service (JMS) protocol, devices implementing the Advanced Message Queuing Protocol (AMQP)), cloud-based services (e.g., AWS, Microsoft Azure, Google Cloud, etc.), operating-system-level virtualization environments (e.g., Docker), container orchestration systems (e.g., Kubernetes), virtual machines using full virtualization or paravirtualization, or other virtualization technique or isolated execution environments.

In some cases, one or more applications executing on a host device may generate various types of machine data during operation. For example, a web server application executing on a host device 104 may generate one or more web server logs detailing interactions between the web server and any number of client devices 106 or other devices. As another example, a host device 104 implemented as a router may generate one or more router logs that record information related to network traffic managed by the router. As yet another example, a database server application executing on a host device 104 may generate one or more logs that record information related to requests sent from other devices (e.g., web servers, application servers, client devices, etc.) for data managed by the database server. Similarly, a host device 104 may generate and/or store computing resource utilization metrics, such as, but not limited to, CPU utilization, memory utilization, number of processes being executed, etc. Any one or any combination of the files or data generated in such cases can be used as a data source for the system 102.

In some embodiments, an application may include a monitoring component that facilitates generating performance data related to host device's operating state, including monitoring network traffic sent and received from the host device and collecting other device and/or application-specific information. A monitoring component may be an integrated component of the application, a plug-in, an extension, or any other type of add-on component, or a stand-alone process.

Such monitored information may include, but is not limited to, network performance data (e.g., a URL requested, a connection type (e.g., HTTP, HTTPS, etc.), a connection start time, a connection end time, an HTTP status code, request length, response length, request headers, response headers, connection status (e.g., completion, response time (s), failure, etc.)) or device performance information (e.g., current wireless signal strength of the device, a current connection type and network carrier, current memory performance information, processor utilization, memory utilization, a geographic location of the device, a device orientation, and any other information related to the operational state of the host device, etc.), device profile information (e.g., a type of client device, a manufacturer, and model of the device, versions of various software applications installed on the device, etc.) In some cases, the monitoring component can collect device performance information by monitoring one or more host device operations, or by making calls to an operating system and/or one or more other applications executing on a host device for performance information. The monitored information may be stored in one or more files and/or streamed to the system 102.

In general, a monitoring component may be configured to generate performance data in response to a monitor trigger in the code of a client application or other triggering application event, as described above, and to store the performance data in one or more data records. Each data record, for example, may include a collection of field-value pairs, each field-value pair storing a particular item of performance data in association with a field for the item. For example, a data record generated by a monitoring component may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data. Examples of functionality that enables monitoring performance of a host device are described in U.S. patent application Ser. No. 14/524,748, entitled "UTILIZING PACKET HEADERS TO MONITOR NETWORK TRAFFIC IN ASSOCIATION WITH A CLIENT DEVICE," filed on 27 Oct. 2014, and which is hereby incorporated by reference in its entirety for all purposes.

In some embodiments, such as in a shared computing resource environment (or hosted environment), a host device 104 may include logs or machine data generated by an application executing within an isolated execution environment (e.g., web server log file if the isolated execution environment is configured as a web server or database server log files if the isolated execution environment is configured as database server, etc.), machine data associated with the computing resources assigned to the isolated execution environment (e.g., CPU utilization of the portion of the CPU allocated to the isolated execution environment, memory utilization of the portion of the memory allocated to the isolated execution environment, etc.), logs or machine data generated by an application that enables the isolated execution environment to share resources with other isolated execution environments (e.g., logs generated by a Docker manager or Kubernetes manager executing on the host device 104), and/or machine data generated by monitoring the computing resources of the host device 104 (e.g., CPU utilization, memory utilization, etc.) that are shared between the isolated execution environments. Given the separation (and isolation) between isolated execution environments executing on a common computing device, in certain embodiments, each isolated execution environment may be treated as a separate host device 104 even if they are, in fact, executing on the same computing device or hosting device.

Accordingly, as used herein, obtaining data from a data source may refer to communicating with a host device 104 to obtain data from the host device 104 (e.g., from one or more data source files, data streams, directories on the host device 104, etc.). For example, obtaining data from a data source may refer to requesting data from a host device 104 and/or receiving data from a host device 104. In some such cases, the host device 104 can retrieve and return the requested data from a particular data source and/or the system 102 can retrieve the data from a particular data source of the host device 104 (e.g., from a particular file stored on a host device 104).

1.4. Data Intake and Query System Overview

The data intake and query system 102 can ingest, index, and/or store data from heterogeneous data sources and/or host devices 104. For example, the system 102 can ingest, index, and/or store any type of machine data, regardless of the form of the machine data or whether the machine data matches or is similar to other machine data ingested, indexed, and/or stored by the system 102. In some cases, the system 102 can generate events from the received data, group the events, and store the events in buckets. The system 102 can also search heterogeneous data that it has stored or search data stored by other systems (e.g., other system 102 systems or other non-system 102 systems). For example, in response to received queries, the system 102 can assign one or more components to search events stored in the storage system or search data stored elsewhere.

As will be described herein in greater detail below, the system 102 can use one or more components to ingest, index, store, and/or search data. In some embodiments, the system 102 is implemented as a distributed system that uses multiple components to perform its various functions. For example, the system 102 can include any one or any combination of an intake system 110 (including one or more components) to ingest data, an indexing system 112 (including one or more components) to index the data, a storage system 116 (including one or more components) to store the data, and/or a query system 114 (including one or more components) to search the data, etc.

In the illustrated embodiment, the system 102 is shown having four subsystems 110, 112, 114, 116. However, it will be understood that the system 102 may include any one or any combination of the intake system 110, indexing system 112, query system 114, or storage system 116. Further, in certain embodiments, one or more of the intake system 110, indexing system 112, query system 114, or storage system 116 may be used alone or apart from the system 102. For example, the intake system 110 may be used alone to glean information from streaming data that is not indexed or stored by the system 102, or the query system 114 may be used to search data that is unaffiliated with the system 102.

In certain embodiments, the components of the different systems may be distinct from each other or there may be some overlap. For example, one component of the system 102 may include some indexing functionality and some searching functionality and thus be used as part of the indexing system 112 and query system 114, while another computing device of the system 102 may only have ingesting or search functionality and only be used as part of those respective systems. Similarly, the components of the storage system 116 may include data stores of individual components of the indexing system and/or may be a separate shared data storage system, like Amazon S3, that is accessible to distinct components of the intake system 110, indexing system 112, and query system 114.

In some cases, the components of the system 102 are implemented as distinct computing devices having their own computer hardware (e.g., processors, non-transitory, computer-readable media, etc.) and/or as distinct hosted devices (e.g., isolated execution environments) that share computing resources or hardware in a shared computing resource environment.

For simplicity, references made herein to the intake system 110, indexing system 112, storage system 116, and query system 114 can refer to those components used for ingesting, indexing, storing, and searching, respectively. However, it will be understood that although reference is made to two separate systems, the same underlying component may be performing the functions for the two different systems. For example, reference to the indexing system indexing data and storing the data in the storage system 116 or the query system searching the data may refer to the same component (e.g., same computing device or hosted device) indexing the data, storing the data, and then searching the data that it stored.

1.4.1. Intake System Overview

As will be described in greater detail herein, the intake system 110 can receive data from the host devices 104 or data sources, perform one or more preliminary processing operations on the data, and communicate the data to the indexing system 112, query system 114, storage system 116, or to other systems (which may include, for example, data processing systems, telemetry systems, real-time analytics systems, data stores, databases, etc., any of which may be operated by an operator of the system 102 or a third party). Given the amount of data that can be ingested by the intake system 110, in some embodiments, the intake system 110 can include multiple distributed computing devices or components working concurrently to ingest the data.

The intake system 110 can receive data from the host devices 104 in a variety of formats or structures. In some embodiments, the received data corresponds to raw machine data, structured or unstructured data, correlation data, data files, directories of files, data sent over a network, event logs, registries, messages published to streaming data sources, performance metrics, sensor data, image and video data, etc.

The preliminary processing operations performed by the intake system 110 can include, but is not limited to, associating metadata with the data received from a host device 104, extracting a timestamp from the data, identifying individual events within the data, extracting a subset of machine data for transmittal to the indexing system 112, enriching the data, etc. As part of communicating the data to the indexing system, the intake system 110 can route the data to a particular component of the intake system 110 or dynamically route the data based on load-balancing, etc. In certain cases, one or more components of the intake system 110 can be installed on a host device 104.

1.4.2. Indexing System Overview

As will be described in greater detail herein, the indexing system 112 can include one or more components (e.g., indexing nodes) to process the data and store it, for example, in the storage system 116. As part of processing the data, the indexing system can identify distinct events within the data, timestamps associated with the data, organize the data into buckets or time series buckets, convert editable buckets to non-editable buckets, store copies of the buckets in the storage system 116, merge buckets, generate indexes of the data, etc. In addition, the indexing system 112 can update various catalogs or databases with information related to the buckets (pre-merged or merged) or data that is stored in the storage system 116, and can communicate with the intake system 110 about the status of the data storage.

1.4.3. Query System Overview

As will be described in greater detail herein, the query system 114 can include one or more components to receive, process, and execute queries. In some cases, the query system 114 can use the same component to process and execute the query or use one or more components to receive and process the query (e.g., a search head) and use one or more other components to execute at least a portion of the query (e.g., search nodes). In some cases, a search node and an indexing node may refer to the same computing device or hosted device performing different functions. In certain cases, a search node can be a separate computing device or hosted device from an indexing node.

Queries received by the query system 114 can be relatively complex and identify a set of data to be processed and a manner of processing the set of data from one or more client devices 106. In certain cases, the query can be implemented using a pipelined command language or other query language. As described herein, in some cases, the query system 114 can execute parts of the query in a distributed fashion (e.g., one or more mapping phases or parts associated with identifying and gathering the set of data identified in the query) and execute other parts of the query on a single component (e.g., one or more reduction phases). However, it will be understood that in some cases multiple components can be used in the map and/or reduce functions of the query execution.

In some cases, as part of executing the query, the query system 114 can use one or more catalogs or databases to identify the set of data to be processed or its location in the storage system 116 and/or can retrieve data from the storage system 116. In addition, in some embodiments, the query system 114 can store some or all of the query results in the storage system 116.

1.4.4. Storage System Overview

In some cases, the storage system 116 may include one or more data stores associated with or coupled to the components of the indexing system 112 that are accessible via a system bus or local area network. In certain embodiments, the storage system 116 may be a shared storage system 116, like Amazon S3 or Google Cloud Storage, that are accessible via a wide area network.

As mentioned and as will be described in greater detail below, the storage system 116 can be made up of one or more data stores storing data that has been processed by the indexing system 112. In some cases, the storage system includes data stores of the components of the indexing system 112 and/or query system 114. In certain embodiments, the storage system 116 can be implemented as a shared storage system 116. The shared storage system 116 can be configured to provide high availability, highly resilient, low loss data storage. In some cases, to provide the high availability, highly resilient, low loss data storage, the shared storage system 116 can store multiple copies of the data in the same and different geographic locations and across different types of data stores (e.g., solid state, hard drive, tape, etc.). Further, as data is received at the shared storage system 116 it can be automatically replicated multiple times according to a replication factor to different data stores across the same and/or different geographic locations. In some embodiments, the shared storage system 116 can correspond to cloud storage, such as Amazon Simple Storage Service (S3) or Elastic Block Storage (EBS), Google Cloud Storage, Microsoft Azure Storage, etc.

In some embodiments, indexing system 112 can read to and write from the shared storage system 116. For example, the indexing system 112 can copy buckets of data from its local or shared data stores to the shared storage system 116. In certain embodiments, the query system 114 can read from, but cannot write to, the shared storage system 116. For example, the query system 114 can read the buckets of data stored in shared storage system 116 by the indexing system 112, but may not be able to copy buckets or other data to the shared storage system 116. In some embodiments, the intake system 110 does not have access to the shared storage system 116. However, in some embodiments, one or more components of the intake system 110 can write data to the shared storage system 116 that can be read by the indexing system 112.

As described herein, in some embodiments, data in the system 102 (e.g., in the data stores of the components of the indexing system 112, shared storage system 116, or search nodes of the query system 114) can be stored in one or more time series buckets. Each bucket can include raw machine data associated with a timestamp and additional information about the data or bucket, such as, but not limited to, one or more filters, indexes (e.g., TSIDX, inverted indexes, keyword indexes, etc.), bucket summaries, etc. In some embodiments, the bucket data and information about the bucket data is stored in one or more files. For example, the raw machine data, filters, indexes, bucket summaries, etc. can be stored in respective files in or associated with a bucket. In certain cases, the group of files can be associated together to form the bucket.

1.4.5. Other Components of the Data Intake and Query System

The system 102 can include additional components that interact with any one or any combination of the intake system 110, indexing system 112, query system 114, and/or storage system 116. Such components may include, but are not limited to an authentication system, orchestration system, one or more catalogs or databases, a gateway, etc.

An authentication system can include one or more components to authenticate users to access, use, and/or configure the system 102. Similarly, the authentication system can be used to restrict what a particular user can do on the system 102 and/or what components or data a user can access, etc.

An orchestration system can include one or more components to manage and/or monitor the various components of the system 102. In some embodiments, the orchestration system can monitor the components of the system 102 to detect when one or more components has failed or is unavailable and enable the system 102 to recover from the failure (e.g., by adding additional components, fixing the failed component, or having other components complete the tasks assigned to the failed component). In certain cases, the orchestration system can determine when to add components to or remove components from a particular system 110, 112, 114, 116 (e.g., based on usage, user/tenant requests, etc.). In embodiments where the system 102 is implemented in a shared computing resource environment, the orchestration system can facilitate the creation and/or destruction of isolated execution environments or instances of the components of the system 102, etc.

In certain embodiments, the system 102 can include various components that enable it to provide stateless services or enable it to recover from an unavailable or unresponsive component without data loss in a time efficient manner. For example, the system 102 can store contextual information about its various components in a distributed way such that if one of the components becomes unresponsive or unavailable, the system 102 can replace the unavailable component with a different component and provide the replacement component with the contextual information. In this way, the system 102 can quickly recover from an unresponsive or unavailable component while reducing or eliminating the loss of data that was being processed by the unavailable component.

In some embodiments, the system 102 can store the contextual information in a catalog, as described herein. In certain embodiments, the contextual information can correspond to information that the system 102 has determined or learned based on use. In some cases, the contextual information can be stored as annotations (manual annotations and/or system annotations), as described herein.

In certain embodiments, the system 102 can include an additional catalog that monitors the location and storage of data in the storage system 116 to facilitate efficient access of the data during search time. In certain embodiments, such a catalog may form part of the storage system 116.

In some embodiments, the system 102 can include a gateway or other mechanism to interact with external devices or to facilitate communications between components of the system 102. In some embodiments, the gateway can be implemented using an application programming interface (API). In certain embodiments, the gateway can be implemented using a representational state transfer API (REST API).

1.4.6. On-Premise and Shared Computing Resource Environments

In some environments, a user of a system 102 may install and configure, on computing devices owned and operated by the user, one or more software applications that implement some or all of the components of the system 102. For example, with reference to FIG. 1, a user may install a software application on server computers owned by the user and configure each server to operate as one or more components of the intake system 110, indexing system 112, query system 114, shared storage system 116, or other components of the system 102. This arrangement generally may be referred to as an "on-premises" solution. That is, the system 102 is installed and operates on computing devices directly controlled by the user of the system 102. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 102 operate.

In certain embodiments, one or more of the components of the system 102 can be implemented in a shared computing resource environment. In this context, a shared computing resource environment or cloud-based service can refer to a service hosted by one more computing resources that are accessible to end users over a network, for example, by using a web browser or other application on a client device to interface with the remote computing resources. For example, a service provider may provide a system 102 by managing computing resources configured to implement various aspects of the system (e.g., intake system 110, indexing system 112, query system 114, shared storage system 116, other components, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

When implemented in a shared computing resource environment, the underlying hardware (non-limiting examples: processors, hard drives, solid-state memory, RAM, etc.) on which the components of the system 102 execute can be shared by multiple customers or tenants as part of the shared computing resource environment. In addition, when implemented in a shared computing resource environment as a cloud-based service, various components of the system 102 can be implemented using containerization or operating-system-level virtualization, or other virtualization technique. For example, one or more components of the intake system 110, indexing system 112, or query system 114 can be implemented as separate software containers or container instances. Each container instance can have certain computing resources (e.g., memory, processor, etc.) of an underlying hosting computing system (e.g., server, microprocessor, etc.) assigned to it, but may share the same operating system and may use the operating system's system call interface. Each container may provide an isolated execution environment on the host system, such as by providing a memory space of the hosting system that is logically isolated from memory space of other containers. Further, each container may run the same or different computer applications concurrently or separately, and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Implementing the system 102 in a shared computing resource environment can provide a number of benefits. In some cases, implementing the system 102 in a shared computing resource environment can make it easier to install, maintain, and update the components of the system 102. For example, rather than accessing designated hardware at a particular location to install or provide a component of the system 102, a component can be remotely instantiated or updated as desired. Similarly, implementing the system 102 in a shared computing resource environment or as a cloud-based service can make it easier to meet dynamic demand. For example, if the system 102 experiences significant load at indexing or search, additional compute resources can be deployed to process the additional data or queries. In an "on-premises" environment, this type of flexibility and scalability may not be possible or feasible.

In addition, by implementing the system 102 in a shared computing resource environment or as a cloud-based service can improve compute resource utilization. For example, in an on-premises environment if the designated compute resources are not being used by, they may sit idle and unused. In a shared computing resource environment, if the compute resources for a particular component are not being used, they can be re-allocated to other tasks within the system 102 and/or to other systems unrelated to the system 102.

As mentioned, in an on-premises environment, data from one instance of a system 102 is logically and physically separated from the data of another instance of a system 102 by virtue of each instance having its own designated hardware. As such, data from different customers of the system 102 is logically and physically separated from each other. In a shared computing resource environment, components of a system 102 can be configured to process the data from one customer or tenant or from multiple customers or tenants. Even in cases where a separate component of a system 102 is used for each customer, the underlying hardware on which the components of the system 102 are instantiated may still process data from different tenants. Accordingly, in a shared computing resource environment, the data from different tenants may not be physically separated on distinct hardware devices. For example, data from one tenant may reside on the same hard drive as data from another tenant or be processed by the same processor. In such cases, the system 102 can maintain logical separation between tenant data. For example, the system 102 can include separate directories for different tenants and apply different permissions and access controls to access the different directories or to process the data, etc.

In certain cases, the tenant data from different tenants is mutually exclusive and/or independent from each other. For example, in certain cases, Tenant A and Tenant B do not share the same data, similar to the way in which data from a local hard drive of Customer A is mutually exclusive and independent of the data (and not considered part) of a local hard drive of Customer B. While Tenant A and Tenant B may have matching or identical data, each tenant would have a separate copy of the data. For example, with reference again to the local hard drive of Customer A and Customer B example, each hard drive could include the same file. However, each instance of the file would be considered part of the separate hard drive and would be independent of the other file. Thus, one copy of the file would be part of Customer's A hard drive and a separate copy of the file would be part of Customer B's hard drive. In a similar manner, to the extent Tenant A has a file that is identical to a file of Tenant B, each tenant would have a distinct and independent copy of the file stored in different locations on a data store or on different data stores.

Further, in certain cases, the system 102 can maintain the mutual exclusivity and/or independence between tenant data even as the tenant data is being processed, stored, and searched by the same underlying hardware. In certain cases, to maintain the mutual exclusivity and/or independence between the data of different tenants, the system 102 can use tenant identifiers to uniquely identify data associated with different tenants.

In a shared computing resource environment, some components of the system 102 can be instantiated and designated for individual tenants and other components can be shared by multiple tenants. In certain embodiments, a separate intake system 110, indexing system 112, and query system 114 can be instantiated for each tenant, whereas the shared storage system 116 or other components (e.g., data store, metadata catalog, and/or acceleration data store, described below) can be shared by multiple tenants. In some such embodiments where components are shared by multiple tenants, the components can maintain separate directories for the different tenants to ensure their mutual exclusivity and/or independence from each other. Similarly, in some such embodiments, the system 102 can use different hosting computing systems or different isolated execution environments to process the data from the different tenants as part of the intake system 110, indexing system 112, and/or query system 114.

In some embodiments, individual components of the intake system 110, indexing system 112, and/or query system 114 may be instantiated for each tenant or shared by multiple tenants. For example, some individual intake system components (e.g., forwarders, output ingestion buffer) may be instantiated and designated for individual tenants, while other intake system components (e.g., a data retrieval subsystem, intake ingestion buffer, and/or streaming data processor), may be shared by multiple tenants.

In certain embodiments, an indexing system 112 (or certain components thereof) can be instantiated and designated for a particular tenant or shared by multiple tenants. In some embodiments where a separate indexing system 112 is instantiated and designated for each tenant, different resources can be reserved for different tenants. For example, Tenant A can be consistently allocated a minimum of four indexing nodes and Tenant B can be consistently allocated a minimum of two indexing nodes. In some such embodiments, the four indexing nodes can be reserved for Tenant A and the two indexing nodes can be reserved for Tenant B, even if Tenant A and Tenant B are not using the reserved indexing nodes.

In embodiments where an indexing system 112 is shared by multiple tenants, components of the indexing system 112 can be dynamically assigned to different tenants. For example, if Tenant A has greater indexing demands, additional indexing nodes can be instantiated or assigned to Tenant A's data. However, as the demand decreases, the indexing nodes can be reassigned to a different tenant, or terminated. Further, in some embodiments, a component of the indexing system 112 can concurrently process data from the different tenants.

In some embodiments, one instance of query system 114 may be shared by multiple tenants. In some such cases, the same search head can be used to process/execute queries for different tenants and/or the same search nodes can be used to execute query for different tenants. Further, in some such cases, different tenants can be allocated different amounts of compute resources. For example, Tenant A may be assigned more search heads or search nodes based on demand or based on a service level arrangement than another tenant. However, once a search is completed the search head and/or nodes assigned to Tenant A may be assigned to Tenant B, deactivated, or their resource may be re-allocated to other components of the system 102, etc.

In some cases, by sharing more components with different tenants, the functioning of the system 102 can be improved. For example, by sharing components across tenants, the system 102 can improve resource utilization thereby reducing the amount of resources allocated as a whole. For example, if four indexing nodes, two search heads, and four search nodes are reserved for each tenant then those compute resources are unavailable for use by other processes or tenants, even if they go unused. In contrast, by sharing the indexing nodes, search heads, and search nodes with different tenants and instantiating additional compute resources, the system 102 can use fewer resources overall while providing improved processing time for the tenants that are using the compute resources. For example, if tenant A is not using any search nodes 806 and tenant B has many searches running, the system 102 can use search nodes that would have been reserved for tenant A to service tenant B. In this way, the system 102 can decrease the number of compute resources used/reserved, while improving the search time for tenant B and improving compute resource utilization.

2.0. Data Ingestion, Indexing, and Storage

FIG. 2 is a flow diagram illustrating an embodiment of a routine implemented by the system 102 to process, index, and store data received from host devices 104. The data flow illustrated in FIG. 2 is provided for illustrative purposes only. It will be understood that one or more of the steps of the processes illustrated in FIG. 2 may be removed or that the ordering of the steps may be changed. Furthermore, for the purposes of illustrating a clear example, one or more particular system components are described in the context of performing various operations during each of the data flow stages. For example, the intake system 110 is described as receiving machine data and the indexing system 112 is described as generating events, grouping events, and storing events. However, other system arrangements and distributions of the processing steps across system components may be used. For example, in some cases, the intake system 110 may generate events.

At block 202, the intake system 110 receives data from a host device 104. The intake system 110 initially may receive the data as a raw data stream generated by the host device 104. For example, the intake system 110 may receive a data stream from a log file generated by an application server, from a stream of network data from a network device, or from any other source of data. Non-limiting examples of machine data that can be received by the intake system 110 is described herein with reference to FIG. 3A.

In some embodiments, the intake system 110 receives the raw data and may segment the data stream into messages, possibly of a uniform data size, to facilitate subsequent processing steps. The intake system 110 may thereafter process the messages in accordance with one or more rules to conduct preliminary processing of the data. In one embodiment, the processing conducted by the intake system 110 may be used to indicate one or more metadata fields applicable to each message. For example, the intake system 110 may include metadata fields within the messages, or publish the messages to topics indicative of a metadata field. These metadata fields may, for example, provide information related to a message as a whole and may apply to each event that is subsequently derived from the data in the message. For example, the metadata fields may include separate fields specifying each of a host, a source, and a sourcetype related to the message. A host field may contain a value identifying a host name or IP address of a device that generated the data. A source field may contain a value identifying a source of the data, such as a pathname of a file or a protocol and port related to received network data. A sourcetype field may contain a value specifying a particular sourcetype label for the data. Additional metadata fields may also be included, such as a character encoding of the data, if known, and possibly other values that provide information relevant to later processing steps. In certain embodiments, the intake system 110 may perform additional operations, such as, but not limited to, identifying individual events within the data, determining timestamps for the data, further enriching the data, etc.

At block 204, the indexing system 112 generates events from the data. In some cases, as part of generating the events, the indexing system 112 can parse the data of the message. In some embodiments, the indexing system 112 can determine a sourcetype associated with each message (e.g., by extracting a sourcetype label from the metadata fields associated with the message, etc.) and refer to a sourcetype configuration corresponding to the identified sourcetype to parse the data of the message. The sourcetype definition may include one or more properties that indicate to the indexing system 112 to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a sourcetype for the data is unknown to the indexing system 112, the indexing system 112 may infer a sourcetype for the data by examining the structure of the data. Then, the indexing system 112 can apply an inferred sourcetype definition to the data to create the events.

In addition, as part of generating events from the data, the indexing system 112 can determine a timestamp for each event. Similar to the process for parsing machine data, the indexing system 112 may again refer to a sourcetype definition associated with the data to locate one or more properties that indicate instructions for determining a timestamp for each event. The properties may, for example, instruct the indexing system 112 to extract a time value from a portion of data for the event (e.g., using a regex rule), to interpolate time values based on timestamps associated with temporally proximate events, to create a timestamp based on a time the portion of machine data was received or generated, to use the timestamp of a previous event, or use any other rules for determining timestamps, etc.

The indexing system 112 can also associate events with one or more metadata fields. In some embodiments, a timestamp may be included in the metadata fields. These metadata fields may include any number of "default fields" that are associated with all events, and may also include one more custom fields as defined by a user. In certain embodiments, the default metadata fields associated with each event may include a host, source, and sourcetype field including or in addition to a field storing the timestamp.

In certain embodiments, the indexing system 112 can also apply one or more transformations to event data that is to be included in an event. For example, such transformations can include removing a portion of the event data (e.g., a portion used to define event boundaries, extraneous characters from the event, other extraneous text, etc.), masking a portion of event data (e.g., masking a credit card number), removing redundant portions of event data, etc. The transformations applied to event data may, for example, be specified in one or more configuration files and referenced by one or more sourcetype definitions.

At block 206, the indexing system 112 can group events. In some embodiments, the indexing system 112 can group events based on time. For example, events generated within a particular time period or events that have a time stamp within a particular time period can be grouped together to form a bucket. A non-limiting example of a bucket is described herein with reference to FIG. 3B.

In certain embodiments, multiple components of the indexing system, such as an indexing node, can concurrently generate events and buckets. Furthermore, each indexing node that generates and groups events can concurrently generate multiple buckets. For example, multiple processors of an indexing node can concurrently process data, generate events, and generate buckets. Further, multiple indexing nodes can concurrently generate events and buckets. As such, ingested data can be processed in a highly distributed manner.

In some embodiments, as part of grouping events together, the indexing system 112 can generate one or more inverted indexes for a particular group of events. A non-limiting example of an inverted index is described herein with reference to FIG. 3C. In certain embodiments, the inverted indexes can include location information for events of a bucket. For example, the events of a bucket may be compressed into one or more files to reduce their size. The inverted index can include location information indicating the particular file and/or location within a particular file of a particular event.

In certain embodiments, the inverted indexes may include keyword entries or entries for field values or field name-value pairs found in events. In some cases, a field name-value pair can include a pair of words connected by a symbol, such as an equals sign or colon. The entries can also include location information for events that include the keyword, field value, or field value pair. In this way, relevant events can be quickly located. In some embodiments, fields can automatically be generated for some or all of the field names of the field name-value pairs at the time of indexing. For example, if the string "dest=10.0.1.2" is found in an event, a field named "dest" may be created for the event, and assigned a value of "10.0.1.2." In certain embodiments, the indexing system can populate entries in the inverted index with field name-value pairs by parsing events using one or more regex rules to determine a field value associated with a field defined by the regex rule. For example, the regex rule may indicate how to find a field value for a userID field in certain events. In some cases, the indexing system 112 can use the sourcetype of the event to determine which regex to use for identifying field values.

Figure 3C:
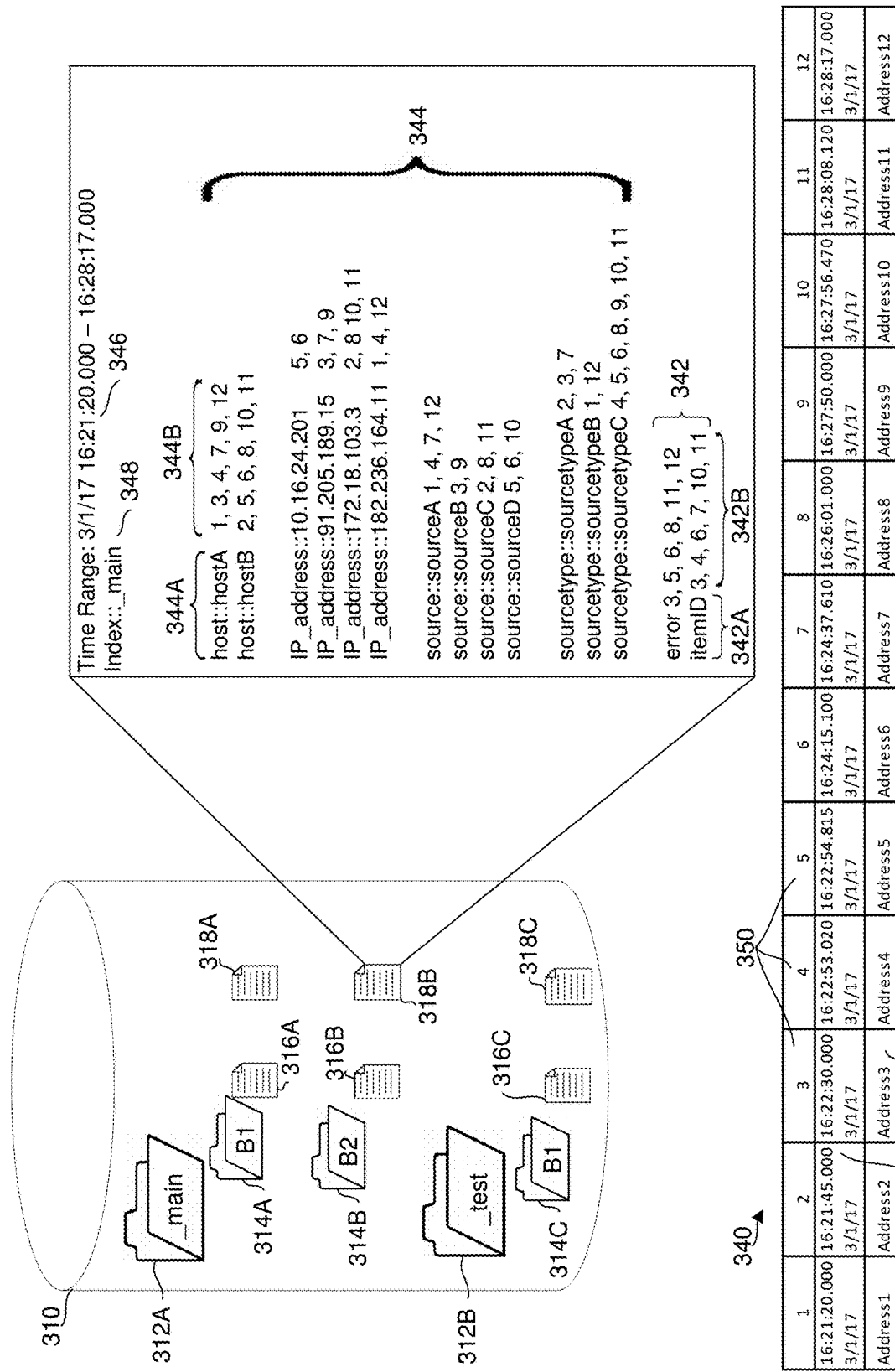

At block 208, the indexing system 112 stores the events with an associated timestamp in the storage system 116, which may be in a local data store and/or in a shared storage system. Timestamps enable a user to search for events based on a time range. In some embodiments, the stored events are organized into "buckets," where each bucket stores events associated with a specific time range based on the timestamps associated with each event. As mentioned, FIGS. 3B and 3C illustrate an example of a bucket. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

The indexing system 112 may be responsible for storing the events in the storage system 116. As mentioned, the events or buckets can be stored locally on a component of the indexing system 112 or in a shared storage system 116. In certain embodiments, the component that generates the events and/or stores the events (indexing node) can also be assigned to search the events. In some embodiments separate components can be used for generating and storing events (indexing node) and for searching the events (search node).

By storing events in a distributed manner (either by storing the events at different components or in a shared storage system 116), the query system 114 can analyze events for a query in parallel. For example, using map-reduce techniques, multiple components of the query system (e.g., indexing or search nodes) can concurrently search and provide partial responses for a subset of events to another component (e.g., search head) that combines the results to produce an answer for the query. By storing events in buckets for specific time ranges, the indexing system 112 may further optimize the data retrieval process by the query system 114 to search buckets corresponding to time ranges that are relevant to a query. In some embodiments, each bucket may be associated with an identifier, a time range, and a size constraint. In certain embodiments, a bucket can correspond to a file system directory and the machine data, or events, of a bucket can be stored in one or more files of the file system directory. The file system directory can include additional files, such as one or more inverted indexes, high performance indexes, permissions files, configuration files, etc.

In embodiments where components of the indexing system 112 store buckets locally, the components can include a home directory and a cold directory. The home directory can store hot buckets and warm buckets, and the cold directory stores cold buckets. A hot bucket can refer to a bucket that is capable of receiving and storing additional events. A warm bucket can refer to a bucket that can no longer receive events for storage, but has not yet been moved to the cold directory. A cold bucket can refer to a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, components of the indexing system 112 may also have a quarantine bucket that contains events having potentially inaccurate information, such as an incorrect timestamp associated with the event or a timestamp that appears to be an unreasonable timestamp for the corresponding event. The quarantine bucket may have events from any time range; as such, the quarantine bucket may always be searched at search time. Additionally, components of the indexing system may store old, archived data in a frozen bucket that is not capable of being searched at search time. In some embodiments, a frozen bucket may be stored in slower and/or larger memory, such as a hard disk, and may be stored in offline and/or remote storage.

In some embodiments, components of the indexing system 112 may not include a cold directory and/or cold or frozen buckets. For example, in embodiments where buckets are copied to a shared storage system 116 and searched by separate components of the query system 114, buckets can be deleted from components of the indexing system as they are stored to the storage system 116. In certain embodiments, the shared storage system 116 may include a home directory that includes warm buckets copied from the indexing system 112 and a cold directory of cold or frozen buckets as described above.

2.1. Machine Data and Data Storage Examples

FIG. 3A is a block diagram illustrating an embodiment of machine data received by the system 102. The machine data can correspond to data from one or more host devices 104 or data sources. As mentioned, the data source can correspond to a log file, data stream or other data structure that is accessible by a host device 104. In the illustrated embodiment of FIG. 3A, the machine data has different forms. For example, the machine data 302 may be log data that is unstructured or that does not have any clear structure or fields, and include different portions 302A-302E that correspond to different entries of the log and that separated by boundaries. Such data may also be referred to as raw machine data.

The machine data 304 may be referred to as structured or semi-structured machine data as it does include some data in a JSON structure defining certain field and field values (e.g., machine data 304A showing field name:field values container_name:kube-apiserver, host:ip-172-20-43-173.ec2.internal, pod_id:0a73017b-4efa-11e8-a4e1-0a2bf2ab4bba, etc.), but other parts of the machine data 304 is unstructured or raw machine data (e.g., machine data 304B). The machine data 306 may be referred to as structured data as it includes particular rows and columns of data with field names and field values.

In some embodiments, the machine data 302 can correspond to log data generated by a host device 104 configured as an Apache server, the machine data 304 can correspond to log data generated by a host device 104 in a shared computing resource environment, and the machine data 306 can correspond to metrics data. Given the differences between host devices 104 that generated the log data 302, 304, the form of the log data 302, 304 is different. In addition, as the log data 304 is from a host device 104 in a shared computing resource environment, it can include log data generated by an application being executed within an isolated execution environment (304B, excluding the field name "log:") and log data generated by an application that enables the sharing of computing resources between isolated execution environments (all other data in 304). Although shown together in FIG. 3A, it will be understood that machine data with different hosts, sources, or sourcetypes can be received separately and/or found in different data sources and/or host devices 104.

As described herein, the system 102 can process the machine data based on the form in which it is received. In some cases, the intake system 110 can utilize one or more rules to process the data. In certain embodiments, the intake system 110 can enrich the received data. For example, the intake system 110 may add one or more fields to the data received from the host devices 104, such as fields denoting the host, source, sourcetype, index, or tenant associated with the incoming data. In certain embodiments, the intake system 110 can perform additional processing on the incoming data, such as transforming structured data into unstructured data (or vice versa), identifying timestamps associated with the data, removing extraneous data, parsing data, indexing data, separating data, categorizing data, routing data based on criteria relating to the data being routed, and/or performing other data transformations, etc.

In some cases, the data processed by the intake system 110 can be communicated or made available to the indexing system 112, the query system 114, and/or to other systems. In some embodiments, the intake system 110 communicates or makes available streams of data using one or more shards. For example, the indexing system 112 may read or receive data from one shard and another system may receive data from another shard. As another example, multiple systems may receive data from the same shard.

As used herein, a partition can refer to a logical division of data. In some cases, the logical division of data may refer to a portion of a data stream, such as a shard from the intake system 110. In certain cases, the logical division of data can refer to an index or other portion of data stored in the storage system 116, such as different directories or file structures used to store data or buckets. Accordingly, it will be understood that the logical division of data referenced by the term partition will be understood based on the context of its use.

FIGS. 3B and 3C are block diagrams illustrating embodiments of various data structures for storing data processed by the system 102. FIG. 3B includes an expanded view illustrating an example of machine data stored in a data store 310 of the data storage system 116. It will be understood that the depiction of machine data and associated metadata as rows and columns in the table 319 of FIG. 3B is merely illustrative and is not intended to limit the data format in which the machine data and metadata is stored in various embodiments described herein. In one particular embodiment, machine data can be stored in a compressed or encrypted format. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

In the illustrated embodiment of FIG. 3B the data store 310 includes a directory 312 (individually referred to as 312A, 312B) for each index (or partition) that contains a portion of data stored in the data store 310 and a sub-directory 314 (individually referred to as 314A, 314B, 314C) for one or more buckets of the index. In the illustrated embodiment of FIG. 3B, each sub-directory 314 corresponds to a bucket and includes an event data file 316 (individually referred to as 316A, 316B, 316C) and an inverted index 318 (individually referred to as 318A, 318B, 318C). However, it will be understood that each bucket can be associated with fewer or more files and each sub-directory 314 can store fewer or more files.

In the illustrated embodiment, the data store 310 includes a _main directory 312A associated with an index "_main" and a _test directory 312B associated with an index "_test." However, the data store 310 can include fewer or more directories. In some embodiments, multiple indexes can share a single directory or all indexes can share a common directory. Additionally, although illustrated as a single data store 310, it will be understood that the data store 310 can be implemented as multiple data stores storing different portions of the information shown in FIG. 3C. For example, a single index can span multiple directories or multiple data stores.

Furthermore, although not illustrated in FIG. 3B, it will be understood that, in some embodiments, the data store 310 can include directories for each tenant and sub-directories for each index of each tenant, or vice versa. Accordingly, the directories 312A and 312B can, in certain embodiments, correspond to sub-directories of a tenant or include sub-directories for different tenants.

In the illustrated embodiment of FIG. 3B, two sub-directories 314A, 314B of the _main directory 312A and one sub-directory 312C of the _test directory 312B are shown. The sub-directories 314A, 314B, 314C can correspond to buckets of the indexes associated with the directories 312A, 312B. For example, the sub-directories 314A and 314B can correspond to buckets "B1" and "B2," respectively, of the index "_main" and the sub-directory 314C can correspond to bucket "B1" of the index "_test." Accordingly, even though there are two "B1" buckets shown, as each "B1" bucket is associated with a different index (and corresponding directory 312), the system 102 can uniquely identify them.

Although illustrated as buckets "B1" and "B2," it will be understood that the buckets (and/or corresponding sub-directories 314) can be named in a variety of ways. In certain embodiments, the bucket (or sub-directory) names can include information about the bucket. For example, the bucket name can include the name of the index with which the bucket is associated, a time range of the bucket, etc.

As described herein, each bucket can have one or more files associated with it, including, but not limited to one or more raw machine data files, bucket summary files, filter files, inverted indexes (also referred to herein as high performance indexes or keyword indexes), permissions files, configuration files, etc. In the illustrated embodiment of FIG. 3B, the files associated with a particular bucket can be stored in the sub-directory corresponding to the particular bucket. Accordingly, the files stored in the sub-directory 314A can correspond to or be associated with bucket "B1," of index "_main," the files stored in the sub-directory 314B can correspond to or be associated with bucket "B2" of index "_main," and the files stored in the sub-directory 314C can correspond to or be associated with bucket "B1" of index "_test."

FIG. 3B further illustrates an expanded event data file 316C showing an example of data that can be stored therein. In the illustrated embodiment, four events 320, 322, 324, 326 of the machine data file 316C are shown in four rows. Each event 320-326 includes machine data 330 and a timestamp 332. The machine data 330 can correspond to the machine data received by the system 102. For example, in the illustrated embodiment, the machine data 330 of events 320, 322, 324, 326 corresponds to portions 302A, 302B, 302C, 302D, respectively, of the machine data 302 after it was processed by the indexing system 112.

Metadata 334-338 associated with the events 320-326 is also shown in the table 319. In the illustrated embodiment, the metadata 334-338 includes information about a host 334, source 336, and sourcetype 338 associated with the events 320-326. Any of the metadata can be extracted from the corresponding machine data, or supplied or defined by an entity, such as a user or computer system. The metadata fields 334-338 can become part of, stored with, or otherwise associated with the events 320-326. In certain embodiments, the metadata 334-338 can be stored in a separate file of the sub-directory 314C and associated with the machine data file 316C. In some cases, while the timestamp 332 can be extracted from the raw data of each event, the values for the other metadata fields may be determined by the indexing system 112 based on information it receives pertaining to the host device 104 or data source of the data separate from the machine data.

While certain default or user-defined metadata fields can be extracted from the machine data for indexing purposes, the machine data within an event can be maintained in its original condition. As such, in embodiments in which the portion of machine data included in an event is unprocessed or otherwise unaltered, it is referred to herein as a portion of raw machine data. For example, in the illustrated embodiment, the machine data of events 320-326 is identical to the portions of the machine data 302A-302D, respectively, used to generate a particular event. Similarly, the entirety of the machine data 302 may be found across multiple events. As such, unless certain information needs to be removed for some reasons (e.g. extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various fields.

In other embodiments, the portion of machine data in an event can be processed or otherwise altered relative to the machine data used to create the event. With reference to the machine data 304, the machine data of a corresponding event (or events) may be modified such that only a portion of the machine data 304 is stored as one or more events. For example, in some cases, only machine data 304B of the machine data 304 may be retained as one or more events or the machine data 304 may be altered to remove duplicate data, confidential information, etc.

In FIG. 3B, the first three rows of the table 319 present events 320, 322, and 324 and are related to a server access log that records requests from multiple clients processed by a server, as indicated by entry of "access.log" in the source column 336. In the example shown in FIG. 3B, each of the events 320-324 is associated with a discrete request made to the server by a client. The raw machine data generated by the server and extracted from a server access log can include the IP address 1140 of the client, the user id 1141 of the person requesting the document, the time 1142 the server finished processing the request, the request line 1143 from the client, the status code 1144 returned by the server to the client, the size of the object 1145 returned to the client (in this case, the gif file requested by the client) and the time spent 1146 to serve the request in microseconds. In the illustrated embodiments of FIGS. 3A, 3B, all the raw machine data retrieved from the server access log is retained and stored as part of the corresponding events 320-324 in the file 316C.

Event 326 is associated with an entry in a server error log, as indicated by "error.log" in the source column 336 that records errors that the server encountered when processing a client request. Similar to the events related to the server access log, all the raw machine data in the error log file pertaining to event 326 can be preserved and stored as part of the event 326.

Saving minimally processed or unprocessed machine data in a data store associated with metadata fields in the manner similar to that shown in FIG. 3B is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

FIG. 3C illustrates an embodiment of another file that can be included in one or more subdirectories 314 or buckets. Specifically, FIG. 3C illustrates an exploded view of an embodiments of an inverted index 318B in the sub-directory 314B, associated with bucket "B2" of the index "_main," as well as an event reference array 340 associated with the inverted index 318B.

In some embodiments, the inverted indexes 318 can correspond to distinct time-series buckets. As such, each inverted index 318 can correspond to a particular range of time for an index. In the illustrated embodiment of FIG. 3C, the inverted indexes 318A, 318B correspond to the buckets "B1" and "B2," respectively, of the index "_main," and the inverted index 318C corresponds to the bucket "B1" of the index "_test." In some embodiments, an inverted index 318 can correspond to multiple time-series buckets (e.g., include information related to multiple buckets) or inverted indexes 318 can correspond to a single time-series bucket.

Each inverted index 318 can include one or more entries, such as keyword (or token) entries 342 or field-value pair entries 344. Furthermore, in certain embodiments, the inverted indexes 318 can include additional information, such as a time range 346 associated with the inverted index or an index identifier 348 identifying the index associated with the inverted index 318. It will be understood that each inverted index 318 can include less or more information than depicted. For example, in some cases, the inverted indexes 318 may omit a time range 346 and/or index identifier 348. In some such embodiments, the index associated with the inverted index 318 can be determined based on the location (e.g., directory 312) of the inverted index 318 and/or the time range of the inverted index 318 can be determined based on the name of the sub-directory 314.

Token entries, such as token entries 342 illustrated in inverted index 318B, can include a token 342A (e.g., "error," "itemID," etc.) and event references 342B indicative of events that include the token. For example, for the token "error," the corresponding token entry includes the token "error" and an event reference, or unique identifier, for each event stored in the corresponding time-series bucket that includes the token "error." In the illustrated embodiment of FIG. 3C, the error token entry includes the identifiers 3, 5, 6, 8, 11, and 12 corresponding to events located in the bucket "B2" of the index "_main."

In some cases, some token entries can be default entries, automatically determined entries, or user specified entries. In some embodiments, the indexing system 112 can identify each word or string in an event as a distinct token and generate a token entry for the identified word or string. In some cases, the indexing system 112 can identify the beginning and ending of tokens based on punctuation, spaces, etc. In certain cases, the indexing system 112 can rely on user input or a configuration file to identify tokens for token entries 342, etc. It will be understood that any combination of token entries can be included as a default, automatically determined, or included based on user-specified criteria.

Similarly, field-value pair entries, such as field-value pair entries 344 shown in inverted index 318B, can include a field-value pair 344A and event references 344B indicative of events that include a field value that corresponds to the field-value pair (or the field-value pair). For example, for a field-value pair sourcetype::sendmail, a field-value pair entry 344 can include the field-value pair "sourcetype::sendmail" and a unique identifier, or event reference, for each event stored in the corresponding time-series bucket that includes a sourcetype "sendmail."

In some cases, the field-value pair entries 344 can be default entries, automatically determined entries, or user specified entries. As a non-limiting example, the field-value pair entries for the fields "host," "source," and "sourcetype" can be included in the inverted indexes 318 as a default. As such, all of the inverted indexes 318 can include field-value pair entries for the fields "host," "source," and "sourcetype." As yet another non-limiting example, the field-value pair entries for the field "IP_address" can be user specified and may only appear in the inverted index 318B or the inverted indexes 318A, 318B of the index "_main" based on user-specified criteria. As another non-limiting example, as the indexing system 112 indexes the events, it can automatically identify field-value pairs and create field-value pair entries 344. For example, based on the indexing system's 212 review of events, it can identify IP_address as a field in each event and add the IP_address field-value pair entries to the inverted index 318B (e.g., based on punctuation, like two keywords separated by an '=' or ':' etc.). It will be understood that any combination of field-value pair entries can be included as a default, automatically determined, or included based on user-specified criteria.

With reference to the event reference array 340, each unique identifier 350, or event reference, can correspond to a unique event located in the time series bucket or machine data file 316B. The same event reference can be located in multiple entries of an inverted index 318. For example if an event has a sourcetype "splunkd," host "www1" and token "warning," then the unique identifier for the event can appear in the field-value pair entries 344 "sourcetype::splunkd" and "host::www1," as well as the token entry "warning." With reference to the illustrated embodiment of FIG. 3C and the event that corresponds to the event reference 3, the event reference 3 is found in the field-value pair entries 344 "host::hostA," "source::sourceB," "sourcetype::sourcetypeA," and "IP_address::91.205.189.15" indicating that the event corresponding to the event references is from hostA, sourceB, of sourcetypeA, and includes "91.205.189.15" in the event data.

For some fields, the unique identifier is located in only one field-value pair entry for a particular field. For example, the inverted index 318 may include four sourcetype field-value pair entries 344 corresponding to four different sourcetypes of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated embodiment of FIG. 3C, since the event reference 7 appears in the field-value pair entry "sourcetype::sourcetypeA," then it does not appear in the other field-value pair entries for the sourcetype field, including "sourcetype::sourcetypeB," "sourcetype::sourcetypeC," and "sourcetype::sourcetypeD."

The event references 350 can be used to locate the events in the corresponding bucket or machine data file 316. For example, the inverted index 318B can include, or be associated with, an event reference array 340. The event reference array 340 can include an array entry 350 for each event reference in the inverted index 318B. Each array entry 350 can include location information 352 of the event corresponding to the unique identifier (non-limiting example: seek address of the event, physical address, slice ID, etc.), a timestamp 354 associated with the event, or additional information regarding the event associated with the event reference, etc.

For each token entry 342 or field-value pair entry 344, the event reference 342B, 344B, respectively, or unique identifiers can be listed in chronological order or the value of the event reference can be assigned based on chronological data, such as a timestamp associated with the event referenced by the event reference. For example, the event reference 1 in the illustrated embodiment of FIG. 3C can correspond to the first-in-time event for the bucket, and the event reference 12 can correspond to the last-in-time event for the bucket. However, the event references can be listed in any order, such as reverse chronological order, ascending order, descending order, or some other order (e.g., based on time received or added to the machine data file), etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 3C, the entries are sorted first by entry type and then alphabetically.

In some cases, inverted indexes 318 can decrease the search time of a query. For example, for a statistical query, by using the inverted index, the system 102 can avoid the computational overhead of parsing individual events in a machine data file 316. Instead, the system 102 can use the inverted index 318 separate from the raw record data store to generate responses to the received queries. U.S. Pub. No. 2018/0293327, incorporated herein by reference for all purposes, includes a non-limiting example of how the inverted indexes 318 can be used during a data categorization request command. Additional information is disclosed in U.S. Pat. No. 8,589,403, entitled "COMPRESSED JOURNALING IN EVENT TRACKING FILES FOR METADATA RECOVERY AND REPLICATION," issued on 19 Nov. 2013; U.S. Pat. No. 8,412,696, entitled "REAL TIME SEARCHING AND REPORTING," issued on 2 Apr. 2011; U.S. Pat. Nos. 8,589,375 and 8,589,432, both also entitled "REAL TIME SEARCHING AND REPORTING," both issued on 19 Nov. 2013; U.S. Pat. No. 8,682,925, entitled "DISTRIBUTED HIGH PERFORMANCE ANALYTICS STORE," issued on 25 Mar. 2014; U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY," issued on 8 Sep. 2015; and U.S. Pat. No. 9,990,386, entitled "GENERATING AND STORING SUMMARIZATION TABLES FOR SETS OF SEARCHABLE EVENTS," issued on 5 Jun. 2018; each of which is hereby incorporated by reference in its entirety for all purposes, also include additional information regarding the creation and use of different embodiments of inverted indexes, including, but not limited to keyword indexes, high performance indexes and analytics stores, etc.

3.0. Query Processing and Execution

Figure 4A:
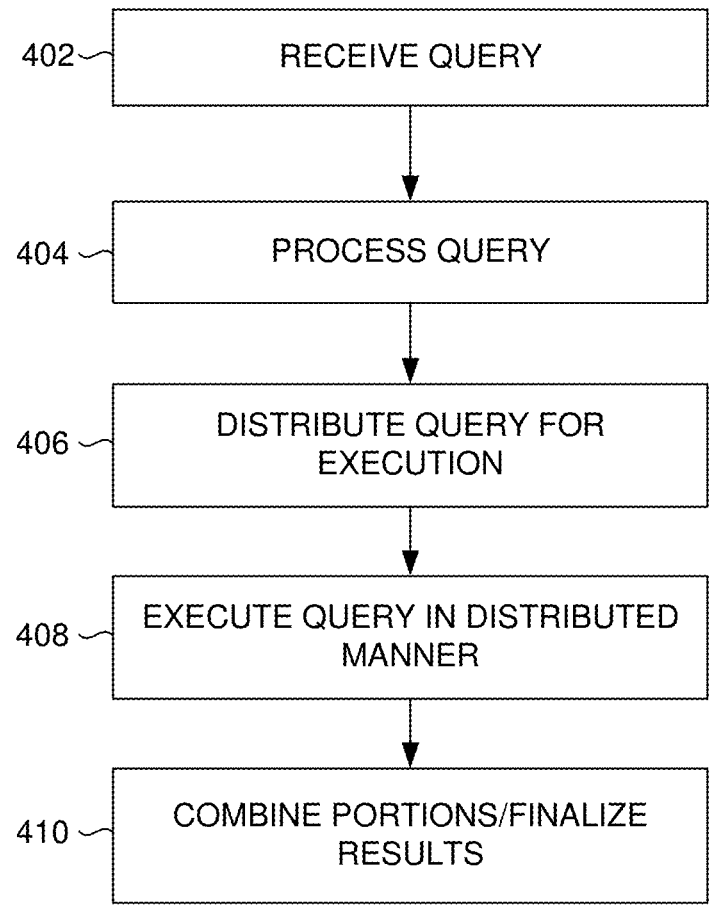
FIG. 4A is a flow diagram illustrating an embodiment of a routine implemented by the query system to execute a query.

FIG. 4A is a flow diagram illustrating an embodiment of a routine implemented by the query system 114 for executing a query. At block 402, the query system 114 receives a search query. As described herein, the query can be in the form of a pipelined command language or other query language and include filter criteria used to identify a set of data and processing criteria used to process the set of data.

At block 404, the query system 114 processes the query. As part of processing the query, the query system 114 can determine whether the query was submitted by an authenticated user and/or review the query to determine that it is in a proper format for the data intake and query system 102, has correct semantics and syntax, etc. In addition, the query system 114 can determine what, if any, configuration files or other configurations to use as part of the query.

In addition as part of processing the query, the query system 114 can determine what portion(s) of the query to execute in a distributed manner (e.g., what to delegate to search nodes) and what portions of the query to execute in a non-distributed manner (e.g., what to execute on the search head). For the parts of the query that are to be executed in a distributed manner, the query system 114 can generate specific commands, for the components that are to execute the query. This may include generating subqueries, partial queries or different phases of the query for execution by different components of the query system 114. In some cases, the query system 114 can use map-reduce techniques to determine how to map the data for the search and then reduce the data. Based on the map-reduce phases, the query system 114 can generate query commands for different components of the query system 114.

As part of processing the query, the query system 114 can determine where to obtain the data. For example, in some cases, the data may reside on one or more indexing nodes or search nodes, as part of the storage system 116 or may reside in a shared storage system or a system external to the system 102. In some cases, the query system 114 can determine what components to use to obtain and process the data. For example, the query system 114 can identify search nodes that are available for the query, etc.

At block 406, the query system 1206 distributes the determined portions or phases of the query to the appropriate components (e.g., search nodes). In some cases, the query system 1206 can use a catalog to determine which components to use to execute the query (e.g., which components include relevant data and/or are available, etc.).

At block 408, the components assigned to execute the query, execute the query. As mentioned, different components may execute different portions of the query. In some cases, multiple components (e.g., multiple search nodes) may execute respective portions of the query concurrently and communicate results of their portion of the query to another component (e.g., search head). As part of the identifying the set of data or applying the filter criteria, the components of the query system 114 can search for events that match the criteria specified in the query. These criteria can include matching keywords or specific values for certain fields. The searching operations at block 408 may use the late-binding schema to extract values for specified fields from events at the time the query is processed. In some embodiments, one or more rules for extracting field values may be specified as part of a sourcetype definition in a configuration file or in the query itself. In certain embodiments where search nodes are used to obtain the set of data, the search nodes can send the relevant events back to the search head, or use the events to determine a partial result, and send the partial result back to the search head.

At block 410, the query system 114 combines the partial results and/or events to produce a final result for the query. As mentioned, in some cases, combining the partial results and/or finalizing the results can include further processing the data according to the query. Such processing may entail joining different set of data, transforming the data, and/or performing one or more mathematical operations on the data, preparing the results for display, etc.

In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the query system 114 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring to the search jobs.

The query system 114 can also perform various operations to make the search more efficient. For example, before the query system 114 begins execution of a query, it can determine a time range for the query and a set of common keywords that all matching events include. The query system 114 may then use these parameters to obtain a superset of the eventual results. Then, during a filtering stage, the query system 114 can perform field-extraction operations on the superset to produce a reduced set of search results. This speeds up queries, which may be particularly helpful for queries that are performed on a periodic basis. In some cases, to make the search more efficient, the query system 114 can use information known about certain data sets that are part of the query to filter other data sets. For example, if an early part of the query includes instructions to obtain data with a particular field, but later commands of the query do not rely on the data with that particular field, the query system 114 can omit the superfluous part of the query from execution.

3.1. Pipelined Search Language

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can include filter criteria used to search or filter for specific data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all of the SPL commands in the sequence of SPL commands can be separated from one another by a pipe symbol "|." In such embodiments, a set of data, such as a set of events, can be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms or filter criteria at the beginning of the pipeline. Such search terms or filter criteria can include any combination of keywords, phrases, times, dates, Boolean expressions, fieldname-field value pairs, etc. that specify which results should be obtained from different locations. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g. calculation of an aggregate value related to the filtered events such as the average response time of servers with response times of less than 1 microsecond). Furthermore, the search command can allow events to be filtered by keyword as well as field criteria. For example, a search command can filter events based on the word "warning" or filter events based on a field value "10.0.1.2" associated with a field "clientip."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table. In some implementations, an event retrieved from an index in response to a query can be considered a row with a column for each field value. Columns can contain basic information about the data and/or data that has been dynamically extracted at search time.

Figure 4B:
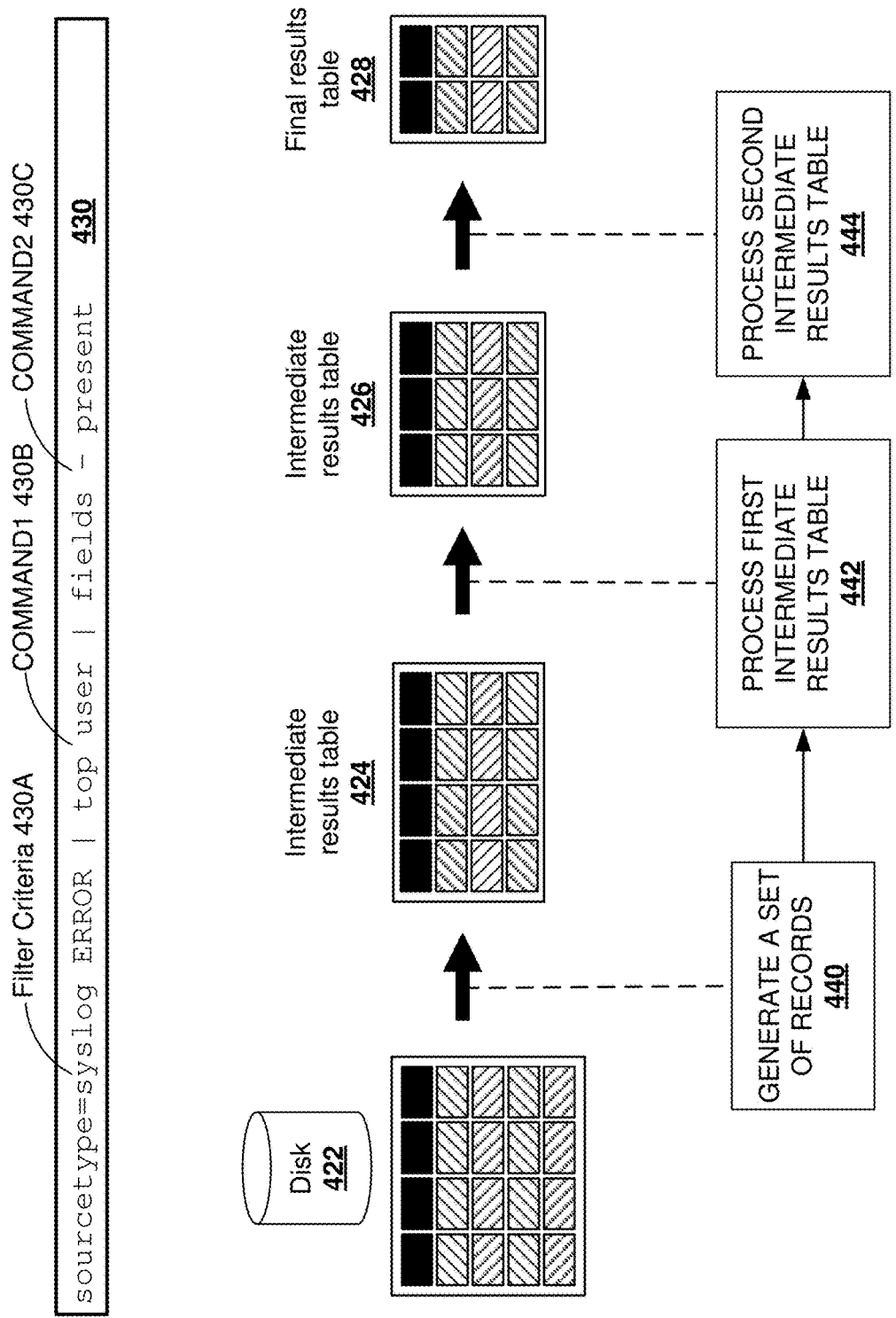
FIG. 4B provides a visual representation of the manner in which a pipelined command language or query can operate

FIG. 4B provides a visual representation of the manner in which a pipelined command language or query can operate in accordance with the disclosed embodiments. The query 430 can be input by the user and submitted to the query system 114. In the illustrated embodiment, the query 430 comprises filter criteria 430A, followed by two commands 430B, 430C (namely, Command1 and Command2). Disk 422 represents data as it is stored in a data store to be searched. For example, disk 422 can represent a portion of the storage system 116 or some other data store that can be searched by the query system 114. Individual rows of can represent different events and columns can represent different fields for the different events. In some cases, these fields can include raw machine data, host, source, and sourcetype.

At block 440, the query system 114 uses the filter criteria 430A (e.g., "sourcetype=syslog ERROR") to filter events stored on the disk 422 to generate an intermediate results table 424. Given the semantics of the query 430 and order of the commands, the query system 114 can execute the filter criteria 430A portion of the query 430 before executing Command1 or Command2.

Rows in the table 424 may represent individual records, where each record corresponds to an event in the disk 422 that satisfied the filter criteria. Columns in the table 424 may correspond to different fields of an event or record, such as "user," "count," percentage," "timestamp," or the raw machine data of an event, etc. Notably, the fields in the intermediate results table 424 may differ from the fields of the events on the disk 422. In some cases, this may be due to the late binding schema described herein that can be used to extract field values at search time. Thus, some of the fields in table 424 may not have existed in the events on disk 422.

Illustratively, the intermediate results table 424 has fewer rows than what is shown in the disk 422 because only a subset of events retrieved from the disk 422 matched the filter criteria 430A "sourcetype=syslog ERROR." In some embodiments, instead of searching individual events or raw machine data, the set of events in the intermediate results table 424 may be generated by a call to a preexisting inverted index.

At block 442, the query system 114 processes the events of the first intermediate results table 424 to generate the second intermediate results table 426. With reference to the query 430, the query system 114 processes the events of the first intermediate results table 424 to identify the top users according to Command1. This processing may include determining a field value for the field "user" for each record in the intermediate results table 424, counting the number of unique instances of each "user" field value (e.g., number of users with the name David, John, Julie, etc.) within the intermediate results table 424, ordering the results from largest to smallest based on the count, and then keeping only the top 10 results (e.g., keep an identification of the top 10 most common users). Accordingly, each row of table 426 can represent a record that includes a unique field value for the field "user," and each column can represent a field for that record, such as fields "user," "count," and "percentage."

At block 444, the query system 114 processes the second intermediate results table 426 to generate the final results table 428. With reference to query 430, the query system 114 applies the command "fields—present" to the second intermediate results table 426 to generate the final results table 428. As shown, the command "fields—present" of the query 430 results in one less column, which may represent that a field was removed during processing. For example, the query system 114 may have determined that the field "percentage" was unnecessary for displaying the results based on the Command2. In such a scenario, each record of the final results table 428 would include a field "user," and "count." Further, the records in the table 428 would be ordered from largest count to smallest count based on the query commands.

It will be understood that the final results table 428 can be a third intermediate results table, which can be pipelined to another stage where further filtering or processing of the data can be performed, e.g., preparing the data for display purposes, filtering the data based on a condition, performing a mathematical calculation with the data, etc. In different embodiments, other query languages, such as the Structured Query Language ("SQL"), can be used to create a query.

3.2. Field Extraction

As described herein, extraction rules can be used to extract field-value pairs or field values from data. An extraction rule can comprise one or more regex rules that specify how to extract values for the field corresponding to the extraction rule. In addition to specifying how to extract field values, the extraction rules may also include instructions for deriving a field value by performing a function on a character string or value retrieved by the extraction rule. For example, an extraction rule may truncate a character string or convert the character string into a different data format. Extraction rules can be used to extract one or more values for a field from events by parsing the portions of machine data in the events and examining the data for one or more patterns of characters, numbers, delimiters, etc., that indicate where the field begins and, optionally, ends. In certain embodiments, extraction rules can be stored in one or more configuration files. In some cases, a query itself can specify one or more extraction rules.

In some cases, extraction rules can be applied at data ingest by the intake system 110 and/or indexing system 112. For example, the intake system 110 and indexing system 112 can apply extraction rules to ingested data and/or events generated from the ingested data and store results in an inverted index.

The system 102 advantageously allows for search time field extraction. In other words, fields can be extracted from the event data at search time using late-binding schema as opposed to at data ingestion time, which was a major limitation of the prior art systems. Accordingly, extraction rules can be applied at search time by the query system 114. The query system can apply extraction rules to events retrieved from the storage system 116 or data received from sources external to the system 102. Extraction rules can be applied to all the events in the storage system 116 or to a subset of the events that have been filtered based on some filter criteria (e.g., event timestamp values, etc.).

Figure 4C:
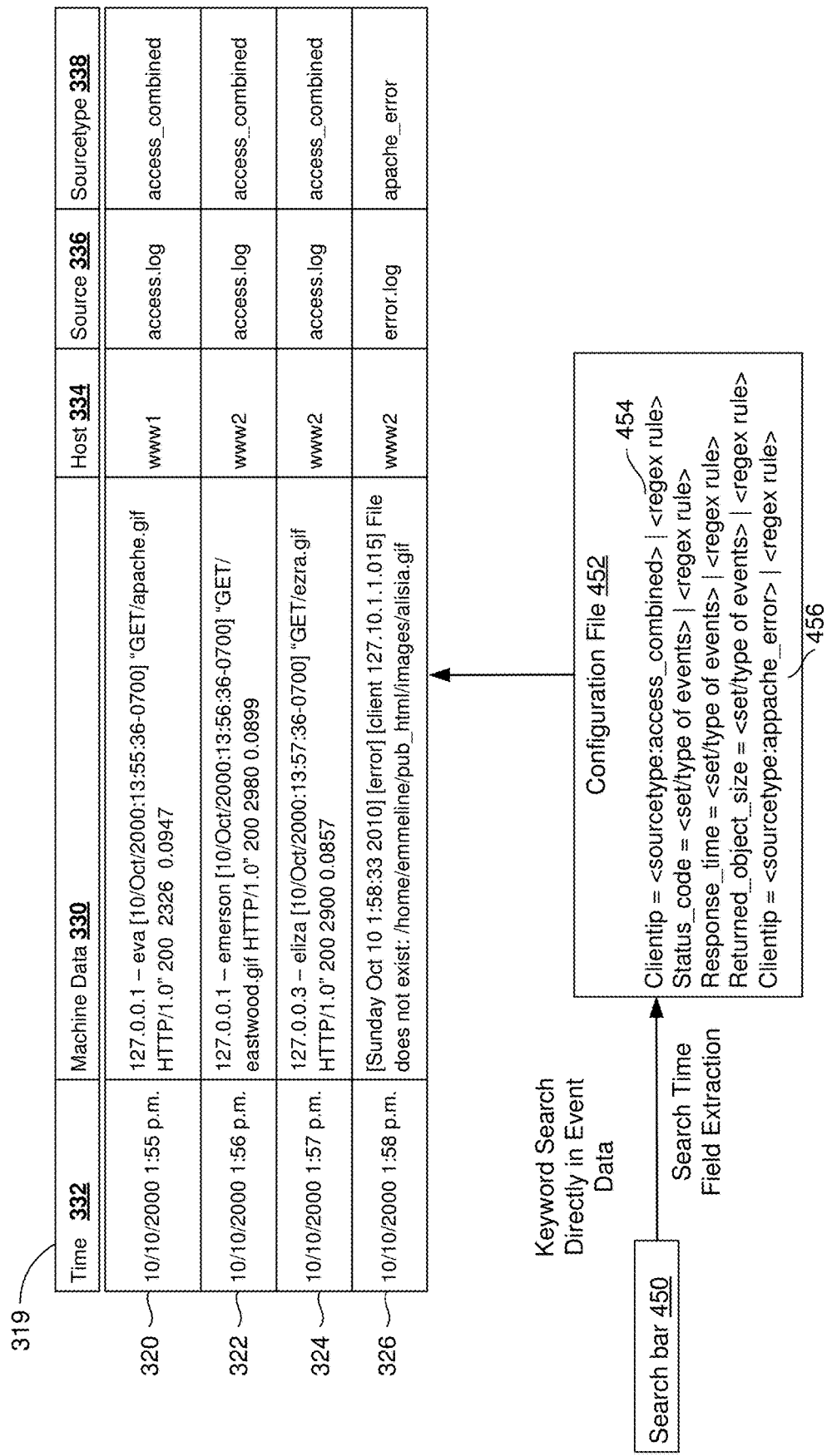
FIG. 4C is a block diagram illustrating an embodiment of a configuration file that includes various extraction rules that can be applied to events.

FIG. 4C is a block diagram illustrating an embodiment of the table 319 showing events 320-326, described previously with reference to FIG. 3B. As described herein, the table 319 is for illustrative purposes, and the events 320-326 may be stored in a variety of formats in an event data file 316 or raw record data store. Further, it will be understood that the event data file 316 or raw record data store can store millions of events. FIG. 4C also illustrates an embodiment of a search bar 450 for entering a query and a configuration file 452 that includes various extraction rules that can be applied to the events 320-326.

As a non-limiting example, if a user inputs a query into search bar 450 that includes only keywords (also known as "tokens"), e.g., the keyword "error" or "warning," the query system 114 can search for those keywords directly in the events 320-326 stored in the raw record data store.

As described herein, the indexing system 112 can optionally generate and use an inverted index with keyword entries to facilitate fast keyword searching for event data. If a user searches for a keyword that is not included in the inverted index, the query system 114 may nevertheless be able to retrieve the events by searching the event data for the keyword in the event data file 316 or raw record data store directly. For example, if a user searches for the keyword "eva," and the name "eva" has not been indexed at search time, the query system 114 can search the events 320-326 directly and return the first event 320. In the case where the keyword has been indexed, the inverted index can include a reference pointer that will allow for a more efficient retrieval of the event data from the data store. If the keyword has not been indexed, the query system 114 can search through the events in the event data file to service the search.

In many cases, a query include fields. The term "field" refers to a location in the event data containing one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the query, "status=404." This search query finds events with "status" fields that have a value of "404." When the search is run, the query system 114 does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "Nov 15 09:33:22 evaemerson."

FIG. 4C illustrates the manner in which configuration files may be used to configure custom fields at search time in accordance with the disclosed embodiments. In response to receiving a query, the query system 114 determines if the query references a "field." For example, a query may request a list of events where the "clientip" field equals "127.0.0.1." If the query itself does not specify an extraction rule and if the field is not an indexed metadata field, e.g., time, host, source, sourcetype, etc., then in order to determine an extraction rule, the query system 114 may, in one or more embodiments, locate configuration file 452 during the execution of the query.

Configuration file 452 may contain extraction rules for various fields, e.g., the "clientip" field. The extraction rules may be inserted into the configuration file 452 in a variety of ways. In some embodiments, the extraction rules can comprise regular expression rules that are manually entered in by the user.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system can then generate a regular expression that extracts those fields from similar events and store the regular expression as an extraction rule for the associated field in the configuration file 452.

In some embodiments, the indexing system 112 can automatically discover certain custom fields at index time and the regular expressions for those fields will be automatically generated at index time and stored as part of extraction rules in configuration file 452. For example, fields that appear in the event data as "key=value" pairs may be automatically extracted as part of an automatic field discovery process. Note that there may be several other ways of adding field definitions to configuration files in addition to the methods discussed herein.

Events from heterogeneous sources that are stored in the storage system 116 may contain the same fields in different locations due to discrepancies in the format of the data generated by the various sources. For example, event 326 also contains a "clientip" field, however, the "clientip" field is in a different format from events 320, 322, and 324. Furthermore, certain events may not contain a particular field at all. To address the discrepancies in the format and content of the different types of events, the configuration file 452 can specify the set of events to which an extraction rule applies. For example, extraction rule 454 specifies that it is to be used with events having a sourcetype "access_combined," and extraction rule 456 specifies that it is to be used with events having a sourcetype "apache_error." Other extraction rules shown in configuration file 452 specify a set or type of events to which they apply. In addition, the extraction rules shown in configuration file 452 include a regular expression for parsing the identified set of events to determine the corresponding field value. Accordingly, each extraction rule may pertain to only a particular type of event. Accordingly, if a particular field, e.g., "clientip" occurs in multiple types of events, each of those types of events can have its own corresponding extraction rule in the configuration file 452 and each of the extraction rules would comprise a different regular expression to parse out the associated field value. In some cases, the sets of events are grouped by sourcetype because events generated by a particular source can have the same format.

The field extraction rules stored in configuration file 452 can be used to perform search-time field extractions. For example, for a query that requests a list of events with sourcetype ".access_combined" where the "clientip" field equals "127.0.0.1," the query system 114 can locate the configuration file 452 to retrieve extraction rule 454 that allows it to extract values associated with the "clientip" field from the events where the sourcetype is "access_combined" (e.g., events 320-324). After the "clientip" field has been extracted from the events 320, 322, 324, the query system 114 can then apply the field criteria by performing a compare operation to filter out events where the "clientip" field does not equal "127.0.0.1." In the example shown in FIG. 4C, the events 320 and 322 would be returned in response to the user query. In this manner, the query system 114 can service queries with filter criteria containing field criteria and/or keyword criteria.

It should also be noted that any events filtered by performing a search-time field extraction using a configuration file 452 can be further processed by directing the results of the filtering step to a processing step using a pipelined search language. Using the prior example, a user can pipeline the results of the compare step to an aggregate function by asking the query system 114 to count the number of events where the "clientip" field equals "127.0.0.1."

By providing the field definitions for the queried fields at search time, the configuration file 452 allows the event data file or raw record data store to be field searchable. In other words, the raw record data store can be searched using keywords as well as fields, wherein the fields are searchable name/value pairings that can distinguish one event from another event and can be defined in configuration file 452 using extraction rules. In comparison to a search containing field names, a keyword search may result in a search of the event data directly without the use of a configuration file.

Further, the ability to add schema to the configuration file 452 at search time results in increased efficiency and flexibility. A user can create new fields at search time and simply add field definitions to the configuration file 452. As a user learns more about the data in the events, the user can continue to refine the late-binding schema by adding new fields, deleting fields, or modifying the field extraction rules in the configuration file for use the next time the schema is used by the system 102. Because the system 102 maintains the underlying raw data and uses late-binding schema for searching the raw data, it enables a user to continue investigating and learn valuable insights about the raw data long after data ingestion time. Similarly, multiple field definitions can be added to the configuration file to capture the same field across events generated by different sources or source-types. This allows the system 102 to search and correlate data across heterogeneous sources flexibly and efficiently.

3.3. Data Models

The system 102 can use one or more data models to search and/or better understand data. A data model is a hierarchically structured search-time mapping of semantic knowledge about one or more datasets. It encodes the domain knowledge used to build a variety of specialized searches of those datasets. Those searches, in turn, can be used to generate reports. Additional information regarding data models, their creation and their use is described in U.S. Pub. No. 2018/0293327; U.S. Pat. Nos. 8,788,525 and 8,788,526, both entitled "DATA MODEL FOR MACHINE DATA FOR SEMANTIC SEARCH," both issued on 22 Jul. 2014; U.S. Pat. No. 8,983,994, entitled "GENERATION OF A DATA MODEL FOR SEARCHING MACHINE DATA," issued on 17 Mar. 2015; U.S. Pat. No. 9,128,980, entitled "GENERATION OF A DATA MODEL APPLIED TO QUERIES," issued on 8 Sep. 2015; U.S. Pat. No. 9,589,012, entitled "GENERATION OF A DATA MODEL APPLIED TO OBJECT QUERIES," issued on 7 Mar. 2017; each of which is hereby incorporated by reference in its entirety for all purposes. Building reports using a report generation interface is further explained in U.S. patent application Ser. No. 14/503,335, entitled "GENERATING REPORTS FROM UNSTRUCTURED DATA," filed on 30 Sep. 2014, and which is hereby incorporated by reference in its entirety for all purposes.

3.4. Acceleration Techniques

The above-described system provides significant flexibility by enabling a user to analyze massive quantities of minimally-processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

Performing extraction and analysis operations at search time can involve a large amount of data and require a large number of computational operations, which can cause delays in processing the queries. In some embodiments, the system 102 can employ a number of unique acceleration techniques to speed up analysis operations performed at search time. These techniques include: performing search operations in parallel using multiple components of the query system 114, using an inverted index 118, and accelerating the process of generating reports. Additional acceleration techniques are described in U.S. application Ser. No. 15/967,590 and U.S. Pub. No. 2018/0293327, each of which is incorporated by reference herein for all purposes.

To facilitate faster query processing, a query can be structured such that multiple components of the query system 114 (e.g., search nodes) perform the query in parallel, while aggregation of search results from the multiple components is performed at a particular component (e.g., search head). For example, consider a scenario in which a user enters the query "Search "error" | stats count BY host." The query system 114 can identify two phases for the query, including: (1) subtasks (e.g., data retrieval or simple filtering) that may be performed in parallel by multiple components, such as search nodes, and (2) a search results aggregation operation to be executed by one component, such as the search head, when the results are ultimately collected from the search nodes.

Based on this determination, the query system 114 can generate commands to be executed in parallel by the search nodes, with each search node applying the generated commands to a subset of the data to be searched. In this example, the query system 114 generates and then distributes the following commands to the individual search nodes: "Search "error" | prestats count BY host." In this example, the "prestats" command can indicate that individual search nodes are processing a subset of the data and are responsible for producing partial results and sending them to the search head. After the search nodes return the results to the search head, the search head aggregates the received results to form a single search result set. By executing the query in this manner, the system effectively distributes the computational operations across the search nodes while reducing data transfers. It will be understood that the query system 114 can employ a variety of techniques to use distributed components to execute a query. In some embodiments, the query system 114 can use distributed components for only mapping functions of a query (e.g., gather data, applying filter criteria, etc.). In certain embodiments, the query system 114 can use distributed components for mapping and reducing functions (e.g., joining data, combining data, reducing data, etc.) of a query.

4.0. Example Use Cases

The system 102 provides various schemas, dashboards, and visualizations that simplify developers' tasks to create applications with additional capabilities, including but not limited to security, data center monitoring, IT service monitoring, and client/customer insights.

4.1. Security Features

An embodiment of an enterprise security application is as SPLUNK® ENTERPRISE SECURITY, which performs monitoring and alerting operations and includes analytics to facilitate identifying both known and unknown security threats based on large volumes of data stored by the system 102. The enterprise security application provides the security practitioner with visibility into security-relevant threats found in the enterprise infrastructure by capturing, monitoring, and reporting on data from enterprise security devices, systems, and applications. Through the use of the system 102 searching and reporting capabilities, the enterprise security application provides a top-down and bottom-up view of an organization's security posture.

Additional information related to various security applications is described in U.S. application Ser. No. 16/512,899;

U.S. Pat. No. 8,826,434, entitled "SECURITY THREAT DETECTION BASED ON INDICATIONS IN BIG DATA OF ACCESS TO NEWLY REGISTERED DOMAINS," issued on 2 Sep. 2014; U.S. Pat. No. 9,215,240, entitled "INVESTIGATIVE AND DYNAMIC DETECTION OF POTENTIAL SECURITY-THREAT INDICATORS FROM EVENTS IN BIG DATA," issued on 15 Dec. 2015; U.S. Pat. No. 9,173,801, entitled "GRAPHIC DISPLAY OF SECURITY THREATS BASED ON INDICATIONS OF ACCESS TO NEWLY REGISTERED DOMAINS," issued on 3 Nov. 2015; U.S. Pat. No. 9,248,068, entitled "SECURITY THREAT DETECTION OF NEWLY REGISTERED DOMAINS," issued on 2 Feb. 2016; U.S. Pat. No. 9,426,172, entitled "SECURITY THREAT DETECTION USING DOMAIN NAME ACCESSES," issued on 23 Aug. 2016; U.S. Pat. No. 9,432,396, entitled "SECURITY THREAT DETECTION USING DOMAIN NAME REGISTRATIONS," issued on 30 Aug. 2016; and U.S. App. Pub. No. 2013/0318236, entitled "KEY INDICATORS VIEW," filed on 31 Jul. 2013; each of which is hereby incorporated by reference in its entirety for all purposes.

4.2. Data Center Monitoring

An embodiment of a virtual machine monitoring application is SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Additional disclosure regarding the use of performance metrics for data center monitoring is described in U.S. application Ser. No. 16/512,899; U.S. Patent Application No. 2014/0324862, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT," filed on 29 Jan. 2014; U.S. Pat. No. 9,185,007, entitled "PROACTIVE MONITORING TREE WITH SEVERITY STATE SORTING," issued on 10 Nov. 2015, and U.S. Pat. No. 9,426,045, also entitled "PROACTIVE MONITORING TREE WITH SEVERITY STATE SORTING," issued on 23 Aug. 2016; and U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT," filed on 29 Jan. 2014; each of which is hereby incorporated herein by reference in its entirety for all purposes.

4.3. IT Service Monitoring

An embodiment of an IT monitoring application is SPLUNK® IT SERVICE INTELLIGENCE™, which performs monitoring and alerting operations. The IT monitoring application also includes analytics to help an analyst diagnose the root cause of performance problems based on large volumes of data stored by the system 102 as correlated to the various services an IT organization provides (a service-centric view). This differs significantly from conventional IT monitoring systems that lack the infrastructure to effectively store and analyze large volumes of service-related events.

Traditional service monitoring systems typically use fixed schemas to extract data from predefined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, an IT monitoring application system stores large volumes of minimally-processed service-related data at ingestion time for later retrieval and analysis at search time, to perform regular monitoring, or to investigate a service issue. To facilitate this data retrieval process, the IT monitoring application enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the events that pertains to the entity, whether produced by the entity itself or by another machine, and considering the many various ways the entity may be identified in machine data (such as by a URL, an IP address, or machine name). The service and entity definitions can organize events around a service so that all of the events pertaining to that service can be easily identified. This capability provides a foundation for the implementation of Key Performance Indicators.

Additional disclosure regarding IT Service Monitoring is described in U.S. application Ser. No. 16/512,899, incorporated by reference herein in its entirety.

4.4. Client or Customer Insights

As described herein, the system 102 can receive heterogeneous data from disparate systems. In some cases, the data from the disparate systems may be related and correlating the data can result in insights into client or customer interactions with various systems of a vendor. To aid in the correlation of data across different systems, multiple field definitions can be added to one or more configuration files to capture the same field or data across events generated by different sources or sourcetypes. This can enable the system 102 to search and correlate data across heterogeneous sources flexibly and efficiently.

Figure 4D:
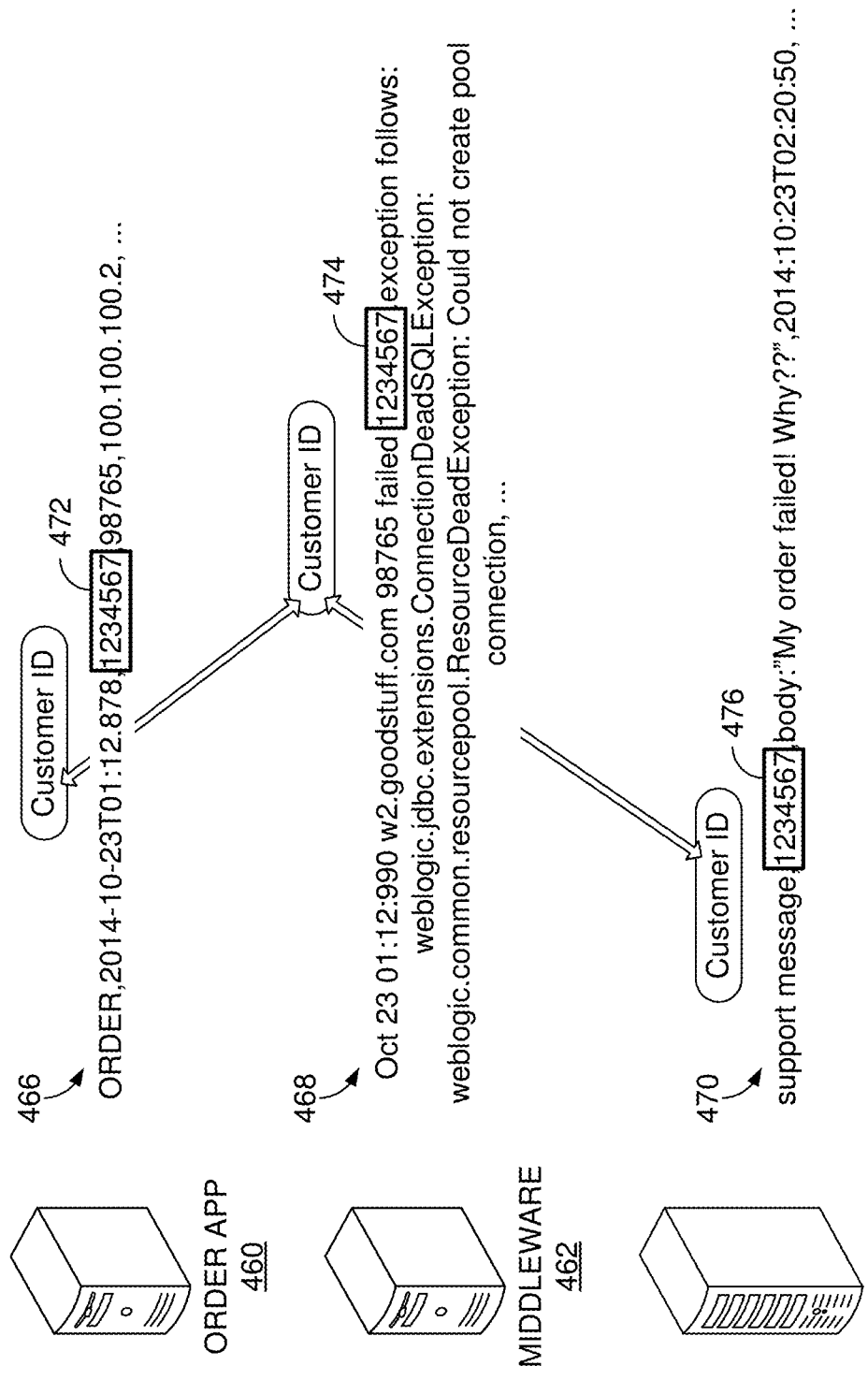
FIG. 4D is a block diagram illustrating an example scenario where a common customer identifier is found among log data received from disparate data sources.

As a non-limiting example and with reference to FIG. 4D, consider a scenario in which a common customer identifier is found among log data received from three disparate data sources. In this example, a user submits an order for merchandise using a vendor's shopping application program 460 running on the user's system. In this example, the order was not delivered to the vendor's server due to a resource exception at the destination server that is detected by the middleware code 462. The user then sends a message to the customer support server 464 to complain about the order failing to complete. The three systems 460, 462, 464 are disparate systems that do not have a common logging format. The shopping application program 460 sends log data 466 to the system 102 in one format, the middleware code 462 sends error log data 468 in a second format, and the support server 464 sends log data 470 in a third format.

Using the log data received at the system 102 from the three systems 460, 462, 464, the vendor can uniquely obtain an insight into user activity, user experience, and system behavior. The system 102 allows the vendor's administrator to search the log data from the three systems 460, 462, 464, thereby obtaining correlated information, such as the order number and corresponding customer ID number of the person placing the order. The system 102 also allows the administrator to see a visualization of related events via a user interface. The administrator can query the system 102 for customer ID field value matches across the log data from the three systems 460, 462, 464 that are stored in the storage system 116. While the customer ID field value exists in the data gathered from the three systems 460, 462, 464, it may be located in different areas of the data given differences in the architecture of the systems. The query system 114 obtains events from the storage system 116 related to the three systems 460, 462, 464. The query system 114 then applies extraction rules to the events in order to extract field values for the field "customer ID" that it can correlate. As described herein, the query system 114 may apply a different extraction rule to each set of events from each system when the event format differs among systems. In this example, a user interface can display to the administrator the events corresponding to the common customer ID field values 472, 474, and 476, thereby providing the administrator with insight into a customer's experience. The system 102 can provide additional user interfaces and reports to aid a user in analyzing the data associated with the customer.

5.0. Modular Data Intake and Query System Architecture

Figure 5:
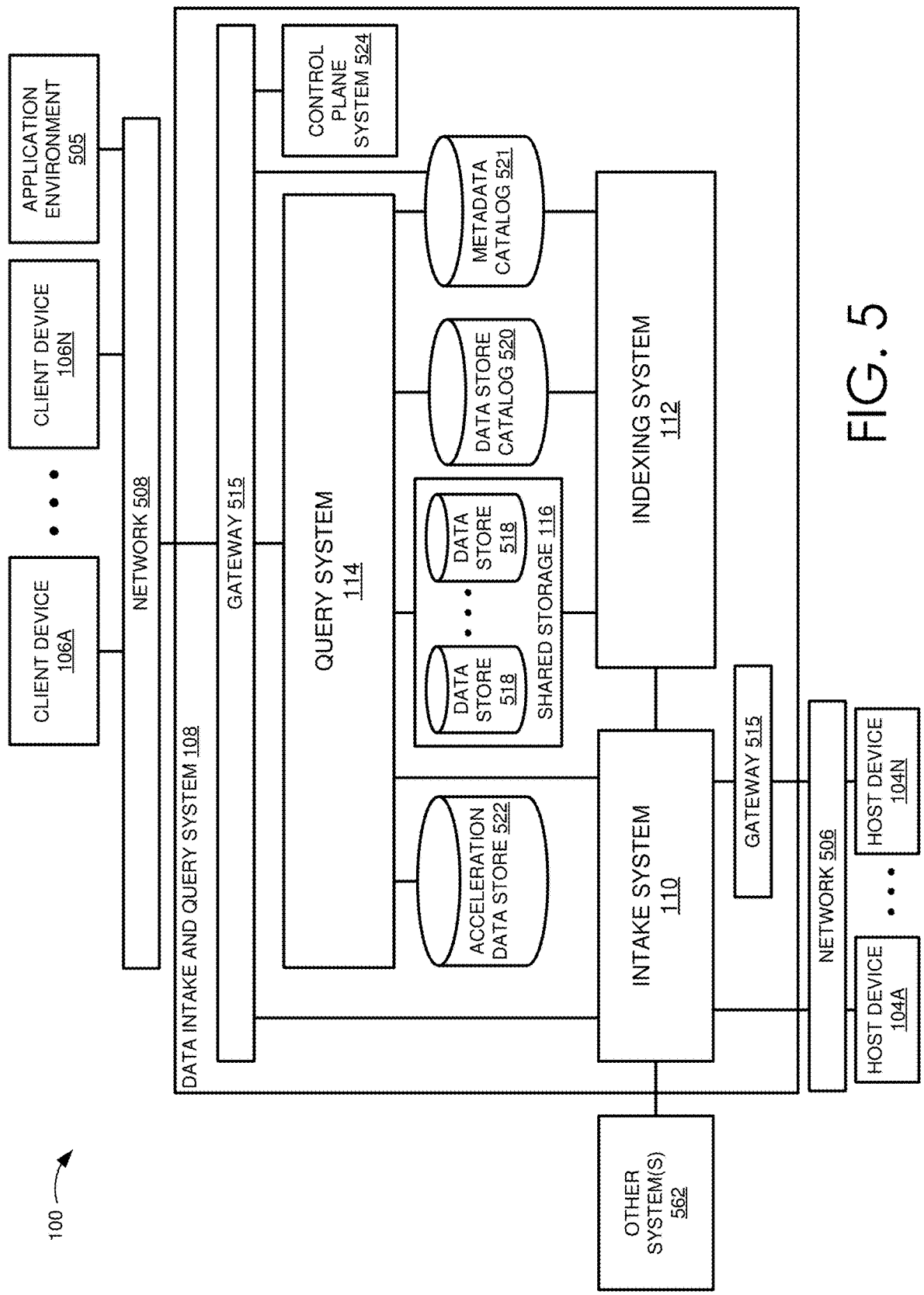
FIG. 5 is a block diagram illustrating an embodiment of a data intake and query system.

FIG. 5 is a block diagram of an embodiment of the data processing environment 100 showing an expanded view of an embodiment of the data intake and query system 102. In the illustrated embodiment, the environment 100 includes host devices 104A-104N, client devices 106A-106N, described previously with reference to FIG. 1, in communication with a data intake and query system 102 via networks 506, 508, respectively. The networks 506, 508 may be the same network or may be different networks. Further, the networks 506, 508 may be implemented as one or more LANs, WANs, cellular networks, intranetworks, and/or internetworks using any of wired, wireless, terrestrial microwave, satellite links, etc., and may include the Internet. In the illustrated embodiment of FIG. 5, an application environment 505 and other system(s) 562 are also shown as part of the data processing environment 100.

The application environment 505 can include tools, software modules (e.g., computer executable instructions to perform a particular function), etc., to enable application developers to create computer executable applications to interface with the data intake and query system 102. For example, application developers can identify particular data that is of particular relevance to them. The application developers can use the application environment 505 to build a particular application to interface with the data intake and query system 102 to obtain the relevant data that they seek, process the relevant data, and display it in a manner that is consumable or easily understood by a user. The applications developed using the application environment 505 can include their own backend services, middleware logic, front-end user interface, etc., and can provide facilities for ingesting use case specific data and interacting with that data. In some embodiments, the client devices 106 can use one or more executable applications or programs from the application environment 505 to interface with the data intake and query system 102.

In certain embodiments, the developed applications can be executed by a computing device or in an isolated execution environment of a shared computing resource environment, such as Kubernetes, AWS, Microsoft Azure, Google Cloud, etc. In addition, some embodiments, the application environments 505 can provide one or more isolated execution environments in which to execute the developed applications. In some cases, the applications are executed in an isolated execution environment or a computing device unrelated to the application environment 505.

As a non-limiting example, an application developed using the application environment 505 can include a custom web-user interface that may or may not leverage one or more UI components provided by the application environment 505. The application could include middle-ware business logic, on a middle-ware platform of the developer's choice. Furthermore, as mentioned the applications implemented using the application environment 505 can be instantiated and executed in a different isolated execution environment or different shared computing resource environment than the data intake and query system 102. As a non-limiting example, in embodiments where the data intake and query system 102 is implemented using a Kubernetes cluster, the applications developed using the application environment 505 can execute in a different Kubernetes cluster (or other shared computing resource environment) and interact with the data intake and query system 102 via the gateway 515.

The data intake and query system 102 can process and store data received data from the host devices 104 and execute queries on the data in response to requests received from the client devices 106. In the illustrated embodiment, the data intake and query system 102 includes a gateway 515, an intake system 110, an indexing system 112, a query system 114, a data store catalog 520, a metadata catalog 521, a query acceleration data store 522, and a control plane system 524. In the illustrated embodiment of FIG. 5, the storage system 116, described previously with reference to FIG. 1, is implemented as a shared storage system 116 including one or more data stores 518.

Although certain communication pathways are illustrated in FIG. 5, it will be understood that, in certain embodiments, any component of the data intake and query system 102 can interact with any other component of the data intake and query system 102. For example, the gateway 515 can interact with one or more components of the indexing system 112, one or more components of the intake system 110 can communicate with the metadata catalog 521, and/or the control plane system 524 can interact with all other components of the data intake and query system 102. Thus, data and/or commands can be communicated in a variety of ways within the data intake and query system 102.

As will be described in greater detail herein, the gateway 515 can provide an interface between one or more components of the data intake and query system 102 and other systems or computing devices, such as, but not limited to, client devices 106, the application environment 505, one or more host devices 104, and/or other systems 562.

As mentioned, the data intake and query system 102 can receive data from different host devices 104. In some cases, the host devices 104 can be associated with different tenants or customers. Further, each tenant may be associated with one or more indexes, hosts, sources, sourcetypes, or users. For example, company ABC, Inc. can correspond to one tenant and company XYZ, Inc. can correspond to a different tenant. While the two companies may be unrelated, each company may have a main index and test index (also referred to herein as a main partition or test partition) associated with it, as well as one or more host devices, data sources, or systems (e.g., billing system, CRM system, etc.). The data intake and query system 102 can concurrently receive and process the data from the various devices and sources of ABC, Inc. and XYZ, Inc.

In certain cases, although the data from different tenants can be processed together or concurrently, the data intake and query system 102 can take steps to avoid combining or co-mingling data from the different tenants. For example, the data intake and query system 102 can assign a tenant identifier for each tenant and maintain a separation between the data using the tenant identifier. In some cases, the tenant identifier can be assigned to the data at the host devices 104, or can be assigned to the data by the data intake and query system 102 at ingest.

As described herein, the intake system 110 can receive data from the host devices 104 or data sources, perform one or more preliminary processing operations on the data, and communicate the data to the indexing system 112, query system 114, storage system 116, or to other systems 562 (which may include, for example, data processing systems, telemetry systems, real-time analytics systems, data stores, databases, etc., any of which may be operated by an operator of the system 102 or a third party). Additional detail regarding the intake system 110 are described herein at least with reference to FIGS. 6A and 6B.

As described herein, the indexing system 112 can process the data and store it, for example, in the shared storage system 116. Additional detail regarding the indexing system 112 are described herein at least with reference to FIGS. 7A and 7B.

As described herein, the query system 114 can receive queries that identify a set of data to be processed and a manner of processing the set of data from one or more client devices 106, process the queries to identify the set of data, and execute the query on the set of data. In some cases, as part of executing the query, the query system 114 can use the data store catalog 520 to identify the set of data to be processed or its location in the shared storage system 116 and/or can retrieve data from the shared storage system 116 or the query acceleration data store 522. In addition, in some embodiments, the query system 114 can store some or all of the query results in the query acceleration data store 522. Additional detail regarding the query system 114 are described herein at least with reference to FIG. 8.

As described herein, the shared storage system 116 can be made up of one or more data stores 518 storing data that has been processed by the indexing system 112.

The data store catalog 520 can store information about the data stored in shared storage system 116, such as, but not limited to an identifier for a set of data or buckets, a location of the set of data, tenants or indexes associated with the set of data, timing information about the data, etc. For example, in embodiments where the data in shared storage system 116 is stored as buckets, the data store catalog 520 can include a bucket identifier for the buckets in shared storage system 116, a location of or path to the bucket in shared storage system 116, a time range of the data in the bucket (e.g., range of time between the first-in-time event of the bucket and the last-in-time event of the bucket), a tenant identifier identifying a customer or computing device associated with the bucket, and/or an index (also referred to herein as a partition) associated with the bucket, etc. In certain embodiments, the data intake and query system 102 includes multiple data store catalogs 520. For example, in some embodiments, the data intake and query system 102 can include a data store catalog 520 for each tenant (or group of tenants), each partition of each tenant (or group of indexes), etc. In some cases, the data intake and query system 102 can include a single data store catalog 520 that includes information about buckets associated with multiple or all of the tenants associated with the data intake and query system 102.

The indexing system 112 can update the data store catalog 520 as the indexing system 112 stores data in shared storage system 116. Furthermore, the indexing system 112 or other computing device associated with the data store catalog 520 can update the data store catalog 520 as the information in the shared storage system 116 changes (e.g., as buckets in shared storage system 116 are merged, deleted, etc.). In addition, as described herein, the query system 114 can use the data store catalog 520 to identify data to be searched or data that satisfies at least a portion of a query. In some embodiments, the query system 114 makes requests to and receives data from the data store catalog 520 using an application programming interface ("API").

As will be described in greater detail herein, at least with reference to FIG. 9, the metadata catalog 521 can store information about datasets used or supported by the data intake and query system 102 and/or one or more rules that indicate which data in a dataset to process and how to process the data from the dataset. The information about the datasets can include configuration information, such as, but not limited to the type of the dataset, access and authorization information for the dataset, location information for the dataset, physical and logical names or other identifiers for the dataset, etc. The rules can indicate how different data of a dataset is to be processed and/or how to extract fields or field values from different data of a dataset.

The metadata catalog 521 can also include one or more dataset association records. The dataset association records can indicate how to refer to a particular dataset (e.g., a name or other identifier for the dataset) and/or identify associations or relationships between the particular dataset and one or more rules or other datasets. In some embodiments, a dataset association record can be similar to a namespace in that it can indicate a scope of one or more datasets and the manner in which to reference the one or more datasets. As a non-limiting example, one dataset association record can identify four datasets: a "main" index dataset, a "test" index dataset, a "username" collection dataset, and a "username" lookup dataset. The dataset association record can also identify one or more rules for one or more of the datasets. For example, one rule can indicate that for data with the sourcetype "foo" from the "main" index dataset (or all datasets of the dataset association record), multiple actions are to take place, such as, extracting a field value for a "UID" field, and using the "username" lookup dataset to identify a username associated with the extracted "UID" field value. The actions of the rule can provide specific guidance as to how to extract the field value for the "UID" field from the sourcetype "foo" data in the "main" index dataset and how to perform the lookup of the username.

As described herein, the query system 114 can use the metadata catalog 521 to, among other things, interpret dataset identifiers in a query, verify/authenticate a user's permissions and/or authorizations for different datasets, identify additional processing as part of the query, identify one or more datasets from which to retrieve data as part of the query (also referred to herein as source datasets), determine how to extract data from datasets, identify configurations/definitions/dependencies to be used by search nodes to execute the query, etc.

In certain embodiments, the query system 114 can use the metadata catalog 521 to provide a stateless search service. For example, the query system 114 can use the metadata catalog 521 to dynamically determine the dataset configurations and rule configurations to be used to execute a query (also referred to herein as the query configuration parameters) and communicate the query configuration parameters to one or more search heads (or other query system 114 components). If the query system 114 determines that an assigned search head (or other component) becomes unavailable, the query system 114 can communicate the dynamically determined query configuration parameters (and query to be executed) to another search head (or component) without data loss and/or with minimal or reduced time loss.

In some embodiments, the metadata catalog 521 can be implemented using a database system, such as, but not limited to, a relational database system (non-limiting commercial examples: DynamoDB, Aurora DB, etc.). In certain embodiments, the database system can include entries for the different datasets, rules, and/or dataset association records. Moreover, as described herein, the metadata catalog 521 can be modified over time as information is learned about the datasets associated with or managed by the data intake and query system 102. For example, the entries in the database system can include manual or system annotations, as described herein.

The query acceleration data store 522 can store the results or partial results of queries, or otherwise be used to accelerate queries. For example, if a user submits a query that has no end date, the query system 114 can store an initial set of results in the query acceleration data store 522. As additional query results are determined based on additional data, the additional results can be combined with the initial set of results, and so on. In this way, the query system 114 can avoid re-searching all of the data that may be responsive to the query and instead search the data that has not already been searched.

As described herein, the control plane system 524 can provide a control plane for managing the various components of the data intake and query system 102. For example, the control plane system 524 can handle resource management, creation/destruction of components, high availability, load balancing, application or component upgrades/rollbacks, logging and monitoring, storage, networking, service discovery, performance and scalability, and other functions related to the management and configuration of the components of the data intake and query system 102.

5.1. Gateway and Authentication

As described herein, the gateway 515 can provide an interface between one or more components of the data intake and query system 102 (non-limiting examples: between components of the intake system 110, indexing system 112, query system 114, shared storage system 116, or other components of the data intake and query system 102), and other systems or computing devices, such as, but not limited to, client devices 106, the application environment 505, one or more host devices 104, and/or other systems 562 (not illustrated).

In some embodiments, the gateway 515 can be implemented using an application programming interface (API). In certain embodiments, the gateway 515 can be implemented using a representational state transfer API (REST API). In some such embodiments, the client devices 106 can communicate via one or more commands, such as GET, PUT, etc. However, it will be understood that the gateway 515 can be implemented in a variety of ways to enable the external devices and/or systems to interface with one or more components of the data intake and query system 102.

In some cases, one or more components of the data intake and query system 102 can include their own API. In such embodiments, the gateway 515 can communicate with the API of a component of the data intake and query system 102. Accordingly, the gateway 515 can translate requests received from an external device into a command understood by the API of the specific component of the data intake and query system 102. In this way, the gateway 515 can provide an interface between external devices and the API of the devices of the data intake and query system 102.

As illustrated in FIG. 5, in some embodiments, the host devices 104 can communicate with the data intake and query system 102 via the network 506 without passing through the gateway 515. As a non-limiting example, if the intake system 110 receives data from a host device 104 via a forwarder 602 (described in greater detail below), the intake system 110 may receive the data via the network 506 without going through the gateway 515. In certain embodiments, the host devices 104 can communicate the data to the intake system 110 via the network 506 using the gateway 515. As another non-limiting example, if the intake system 110 receives the data from a host device 104 via a HTTP intake point 622 (described in greater detail below), it may receive the data via the gateway 515. Accordingly, it will be understood that a variety of methods can be used to receive data from the host devices 104 via the network 506 or via the network 506 and the gateway 515.

In certain embodiments, the client devices 106 can communicate with the data intake and query system 102 via the gateway 515 to submit queries for execution, control parameters to modify components (e.g., add/modify/delete a dataset association record, dataset, rule, configuration, and/or action from the metadata catalog 521), or other requests the data intake and query system 102, etc. Based on the request, the gateway 515 can route the relevant information to the appropriate component of the data intake and query system 102. In certain cases, this may include translating the request into a command that can be interpreted by the component of the data intake and query system 102.

The gateway 515 can be used to improve the security of the components of the data intake and query system 102. For example, the gateway 515 may expose only a subset of components and/or a limited number of features of the components of the data intake and query system 102 to the external devices. In addition, the gateway 515 can provide authentication and/or authorization functionality. For example, with each request or command received by a client device 106, the gateway 515 can authenticate the client device 106 and/or determine whether the requester has sufficient permissions or authorizations to make the request. In certain embodiments, the system 102 can authenticate the user by providing their credentials to an external authentication system for authentication, etc. The system 102 can limit a user's permissions or functionality based on the authentication. In certain cases, the system 102 may require the user to be authenticated before the user is able to submit requests for a particular component of the data intake and query system 102, etc. Furthermore, individual components of the data intake and query system 102 may require separate authentications, etc.

5.2. Intake System

As detailed below, data may be ingested at the data intake and query system 102 through an intake system 110 configured to conduct preliminary processing on the data, and make the data available to downstream systems or components, such as the indexing system 112, query system 114, third party systems, etc.

Figure 6A:
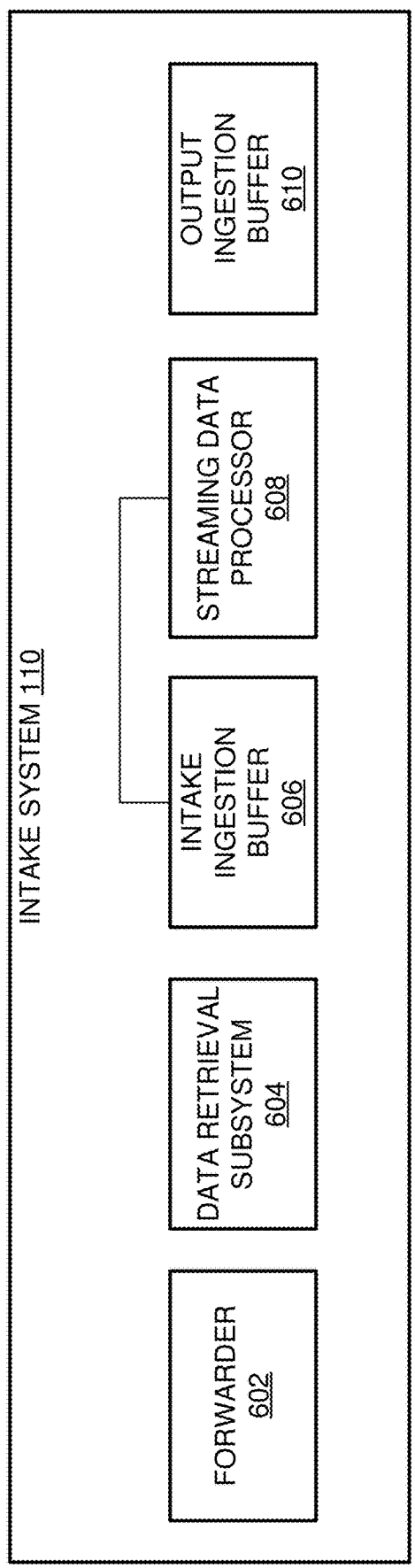
FIGS. 6A and 6B are block diagrams illustrating embodiments of an intake system.

One example configuration of an intake system 110 is shown in FIG. 6A. In example shown in FIG. 6A, the intake system 110 includes a forwarder 602, a data retrieval subsystem 604, an intake ingestion buffer 606, a streaming data processor 608, and an output ingestion buffer 610. As described in detail below, the components of the intake system 110 may be configured to process data according to a streaming data model, such that data ingested into the data intake and query system 102 is processed rapidly (e.g., within seconds or minutes of initial reception at the intake system 110) and made available to downstream systems or components. The initial processing of the intake system 110 may include search or analysis of the data ingested into the intake system 110. For example, the initial processing can transform data ingested into the intake system 110 sufficiently, for example, for the data to be searched by a query system 114, thus enabling "real-time" searching for data on the data intake and query system 102 (e.g., without requiring indexing of the data). In certain embodiments, the intake system can output results of its processing for review (without using the indexing system 112 and/or query system 114). Various additional and alternative uses for data processed by the intake system 110 are described below.

Figure 6B:
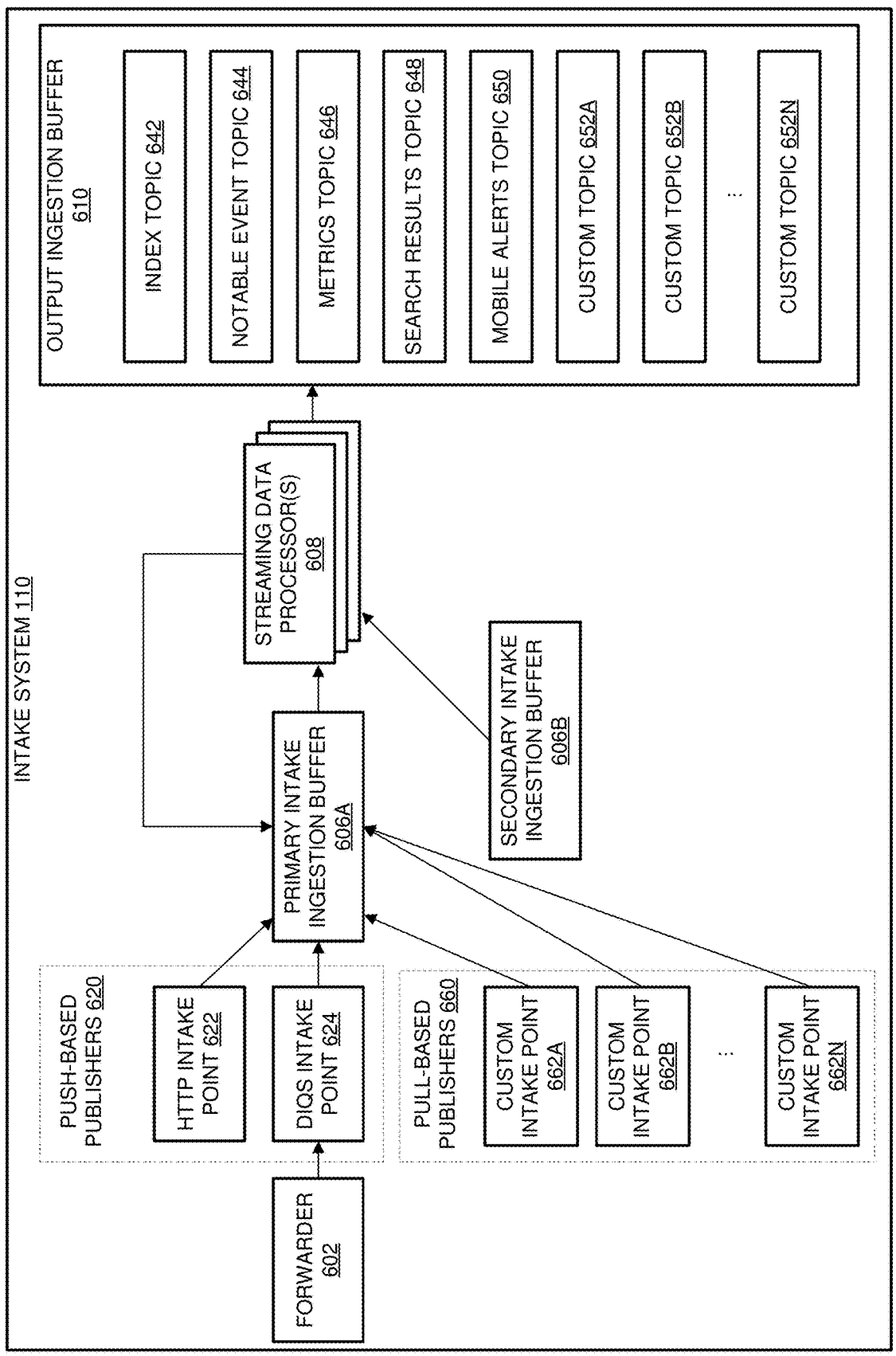

Although shown as separate components, the forwarder 602, data retrieval subsystem 604, intake ingestion buffer 606, streaming data processors 608, and output ingestion buffer 610, in various embodiments, may reside on the same computing device or be distributed across multiple computing devices in any combination. Any or all of the components of the intake system 110 can be implemented as isolated execution environments in a shared computing resource environment. It will be appreciated by those skilled in the art that the intake system 110 may have more of fewer components than are illustrated in FIGS. 6A and 6B. In addition, the intake system 110 could include various web services and/or peer-to-peer network configurations or inter container communication network provided by an associated container instantiation or orchestration platform. Thus, the intake system 110 of FIGS. 6A and 6B should be taken as illustrative. It will be understood that when implemented in a shared computing resource environment, the shared computing resource environment can include any proprietary or open source extensible computing technology, such as Apache Flink or Apache Spark, to enable fast or on-demand horizontal compute capacity scaling of the streaming data processor 608.

As noted above, the intake system 110 can function to conduct preliminary processing of data ingested at the data intake and query system 102. As such, the intake system 110 illustratively includes a forwarder 602 that obtains data from a host device 104 and transmits the data to a data retrieval subsystem 604. The data retrieval subsystem 604 may be configured to convert or otherwise format data provided by the forwarder 602 into an appropriate format for inclusion at the intake ingestion buffer and transmit the message to the intake ingestion buffer 606 for processing. Thereafter, a streaming data processor 608 may obtain data from the intake ingestion buffer 606, process the data according to one or more rules, and republish the data to either the intake ingestion buffer 606 (e.g., for additional processing) or to the output ingestion buffer 610, such that the data is made available to downstream components or systems. In this manner, the intake system 110 may repeatedly or iteratively process data according to any of a variety of rules, such that the data is formatted for use on the data intake and query system 102 or any other system. As discussed below, the intake system 110 may be configured to conduct such processing rapidly (e.g., in "real-time" with little or no perceptible delay), while ensuring resiliency of the data.

5.2.1. Forwarder

The forwarder 602 can include or be executed on a computing device configured to obtain data from a host device 104 and transmit the data to the data retrieval subsystem 604. In some implementations, the forwarder 602 can be installed on a computing device associated with the host device 104 or directly on the host device 104. While a single forwarder 602 is illustratively shown in FIG. 6A, the intake system 110 may include a number of different forwarders 602. Each forwarder 602 may illustratively be associated with a different host device 104. A forwarder 602 initially may receive the data as a raw data stream generated by the host device 104. For example, a forwarder 602 may receive a data stream from a log file generated by an application server, from a stream of network data from a network device, or from any other source of data. In some embodiments, a forwarder 602 receives the raw data and may segment the data stream into "blocks," possibly of a uniform data size, to facilitate subsequent processing steps. The forwarder 602 may additionally or alternatively modify data received, prior to forwarding the data to the data retrieval subsystem 604. Illustratively, the forwarder 602 may "tag" metadata for each data block, such as by specifying a source, sourcetype, or host associated with the data, or by appending one or more timestamp or time ranges to each data block. In certain embodiments, a forwarder 602 may also be configured to identify individual events within a block and communicate the events as part of the block.

In some embodiments, a forwarder 602 may comprise a service accessible to host devices 104 via a network 506. For example, one type of forwarder 602 may be capable of consuming vast amounts of real-time data from a potentially large number of host devices 104. The forwarder 602 may, for example, comprise a computing device which implements multiple data pipelines or "queues" to handle forwarding of network data to data retrieval subsystems 604.

5.2.2. Data Retrieval Subsystem

The data retrieval subsystem 604 illustratively corresponds to a computing device or hosted device which obtains data (e.g., from the forwarder 602), and transforms the data into a format suitable for publication on the intake ingestion buffer 606. Illustratively, where the forwarder 602 segments input data into discrete blocks, the data retrieval subsystem 604 may generate a message for each block, and publish the message to the intake ingestion buffer 606. Generation of a message for each block may include, for example, formatting the data of the message in accordance with the requirements of a streaming data system implementing the intake ingestion buffer 606, the requirements of which may vary according to the streaming data system. In one embodiment, the intake ingestion buffer 606 formats messages according to the protocol buffers method of serializing structured data. Thus, the intake ingestion buffer 606 may be configured to convert data from an input format into a protocol buffer format. Where a forwarder 602 does not segment input data into discrete blocks, the data retrieval subsystem 604 may itself segment the data. Similarly, the data retrieval subsystem 604 may append metadata to the input data, such as a source, sourcetype, or host associated with the data.

Generation of the message may include "tagging" the message with various information, which may be included as metadata for the data provided by the forwarder 602, and determining a "topic" for the message, under which the message should be published to the intake ingestion buffer 606. In general, the "topic" of a message may reflect a categorization of the message on a streaming data system. Illustratively, each topic may be associated with a logically distinct queue of messages, such that a downstream device or system may "subscribe" to the topic in order to be provided with messages published to the topic on the streaming data system.

In one embodiment, the data retrieval subsystem 604 may obtain a set of topic rules (e.g., provided by a user of the data intake and query system 102 or based on automatic inspection or identification of the various upstream and downstream components of the data intake and query system 102) that determine a topic for a message as a function of the received data or metadata regarding the received data. For example, the topic of a message may be determined as a function of the host device 104 from which the data stems. After generation of a message based on input data, the data retrieval subsystem can publish the message to the intake ingestion buffer 606 under the determined topic.

While the data retrieval subsystem 604 is depicted in FIG. 6A as obtaining data from the forwarder 602, the data retrieval subsystem 604 may additionally or alternatively obtain data from other sources, such as from the host device 104 and/or via the gateway 515. In some instances, the data retrieval subsystem 604 may be implemented as a plurality of intake points, each functioning to obtain data from one or more corresponding data sources (e.g., the forwarder 602, host devices 104, or any other data source), generate messages corresponding to the data, determine topics to which the messages should be published, and to publish the messages to one or more topics of the intake ingestion buffer 606.

One illustrative set of intake points implementing the data retrieval subsystem 604 is shown in FIG. 6B. Specifically, as shown in FIG. 6B, the data retrieval subsystem 604 of FIG. 6A may be implemented as a set of push-based publishers 620 or a set of pull-based publishers 630. The illustrative push-based publishers 620 operate on a "push" model, such that messages are generated at the push-based publishers 620 and transmitted to an intake ingestion buffer 606 (shown in FIG. 6B as primary and secondary intake ingestion buffers 606A and 606B, which are discussed in more detail below). As will be appreciated by one skilled in the art, "push" data transmission models generally correspond to models in which a data source determines when data should be transmitted to a data target. A variety of mechanisms exist to provide "push" functionality, including "true push" mechanisms (e.g., where a data source independently initiates transmission of information) and "emulated push" mechanisms, such as "long polling" (a mechanism whereby a data target initiates a connection with a data source, but allows the data source to determine within a timeframe when data is to be transmitted to the data source).

As shown in FIG. 6B, the push-based publishers 620 illustratively include an HTTP intake point 622 and a data intake and query system intake point 624. The HTTP intake point 622 can include a computing device configured to obtain HTTP-based data (e.g., as JavaScript Object Notation, or JSON messages) to format the HTTP-based data as a message, to determine a topic for the message (e.g., based on fields within the HTTP-based data), and to publish the message to the primary intake ingestion buffer 606A. Similarly, the data intake and query system 102 intake point 624 can be configured to obtain data from a forwarder 602, to format the forwarder data as a message, to determine a topic for the message, and to publish the message to the primary intake ingestion buffer 606A. In this manner, the data intake and query system 102 intake point 624 can function in a similar manner to the operations described with respect to the data retrieval subsystem 604 of FIG. 6A.

In addition to the push-based publishers 620, one or more pull-based publishers 630 may be used to implement the data retrieval subsystem 604. The pull-based publishers 630 may function on a "pull" model, whereby a data target (e.g., the primary intake ingestion buffer 606A) functions to continuously or periodically (e.g., each n seconds) query the pull-based publishers 630 for new messages to be placed on the primary intake ingestion buffer 606A. In some instances, development of pull-based systems may require less coordination of functionality between a pull-based publisher 630 and the primary intake ingestion buffer 606A. Thus, for example, pull-based publishers 630 may be more readily developed by third parties (e.g., other than a developer of the data intake and query system 102), and enable the data intake and query system 102 to ingest data associated with third party host devices 104. Accordingly, FIG. 6B includes a set of custom intake points 632A through 632N, each of which functions to obtain data from a third-party host device 104, format the data as a message for inclusion in the primary intake ingestion buffer 606A, determine a topic for the message, and make the message available to the primary intake ingestion buffer 606A in response to a request (a "pull") for such messages.

While the pull-based publishers 630 are illustratively described as developed by third parties, push-based publishers 620 may also in some instances be developed by third parties. Additionally or alternatively, pull-based publishers may be developed by the developer of the data intake and query system 102. To facilitate integration of systems potentially developed by disparate entities, the primary intake ingestion buffer 606A may provide an API through which an intake point may publish messages to the primary intake ingestion buffer 606A. Illustratively, the API may enable an intake point to "push" messages to the primary intake ingestion buffer 606A, or request that the primary intake ingestion buffer 606A "pull" messages from the intake point. Similarly, the streaming data processors 608 may provide an API through which ingestions buffers may register with the streaming data processors 608 to facilitate preprocessing of messages on the ingestion buffers, and the output ingestion buffer 610 may provide an API through which the streaming data processors 608 may publish messages or through which downstream devices or systems may subscribe to topics on the output ingestion buffer 610. Furthermore, any one or more of the intake points 622 through 632N may provide an API through which host devices 104 may submit data to the intake points. Thus, any one or more of the components of FIGS. 6A and 6B may be made available via APIs to enable integration of systems potentially provided by disparate parties.

The specific configuration of publishers 620 and 630 shown in FIG. 6B is intended to be illustrative in nature. For example, the specific number and configuration of intake points may vary according to embodiments of the present application. In some instances, one or more components of the intake system 110 may be omitted. For example, a host device 104 may in some embodiments publish messages to an intake ingestion buffer 606, and thus an intake point 632 may be unnecessary. Other configurations of the intake system 110 are possible.

5.2.3. Ingestion Buffer(s)

The intake system 110 is illustratively configured to ensure message resiliency, such that data is persisted in the event of failures within the intake system 110. Specifically, the intake system 110 may utilize one or more ingestion buffers, which operate to resiliently maintain data received at the intake system 110 until the data is acknowledged by downstream systems or components. In one embodiment, resiliency is provided at the intake system 110 by use of ingestion buffers that operate according to a publish-subscribe ("pub-sub") message model. In accordance with the pub-sub model, data ingested into the data intake and query system 102 may be atomized as "messages," each of which is categorized into one or more "topics." An ingestion buffer can maintain a queue for each such topic, and enable devices to "subscribe" to a given topic. As messages are published to the topic, the ingestion buffer can function to transmit the messages to each subscriber, and ensure message resiliency until at least each subscriber has acknowledged receipt of the message (e.g., at which point the ingestion buffer may delete the message). In this manner, the ingestion buffer may function as a "broker" within the pub-sub model. A variety of techniques to ensure resiliency at a pub-sub broker are known in the art, and thus will not be described in detail herein. In one embodiment, an ingestion buffer is implemented by a streaming data source. As noted above, examples of streaming data sources include (but are not limited to) Amazon's Simple Queue Service ("SQS") or Kinesis™ services, devices executing Apache Kafka™ software, or devices implementing the Message Queue Telemetry Transport (MQTT) protocol. Any one or more of these example streaming data sources may be utilized to implement an ingestion buffer in accordance with embodiments of the present disclosure.

With reference to FIG. 6A, the intake system 110 may include at least two logical ingestion buffers: an intake ingestion buffer 606 and an output ingestion buffer 610. As noted above, the intake ingestion buffer 606 can be configured to receive messages from the data retrieval subsystem 604 and resiliently store the message. The intake ingestion buffer 606 can further be configured to transmit the message to the streaming data processors 608 for processing. As further described below, the streaming data processors 608 can be configured with one or more data transformation rules to transform the messages, and republish the messages to one or both of the intake ingestion buffer 606 and the output ingestion buffer 610. The output ingestion buffer 610, in turn, may make the messages available to various subscribers to the output ingestion buffer 610, which subscribers may include the query system 114, the indexing system 112, or other third-party devices (e.g., client devices 106, host devices 104, etc.).

Both the input ingestion buffer 606 and output ingestion buffer 610 may be implemented on a streaming data source, as noted above. In one embodiment, the intake ingestion buffer 606 operates to maintain source-oriented topics, such as topics for each host device 104 from which data is obtained, while the output ingestion buffer operates to maintain content-oriented topics, such as topics to which the data of an individual message pertains. As discussed in more detail below, the streaming data processors 608 can be configured to transform messages from the intake ingestion buffer 606 (e.g., arranged according to source-oriented topics) and publish the transformed messages to the output ingestion buffer 610 (e.g., arranged according to content-oriented topics). In some instances, the streaming data processors 608 may additionally or alternatively republish transformed messages to the intake ingestion buffer 606, enabling iterative or repeated processing of the data within the message by the streaming data processors 608.

While shown in FIG. 6A as distinct, these ingestion buffers 606 and 610 may be implemented as a common ingestion buffer. However, use of distinct ingestion buffers may be beneficial, for example, where a geographic region in which data is received differs from a region in which the data is desired. For example, use of distinct ingestion buffers may beneficially allow the intake ingestion buffer 606 to operate in a first geographic region associated with a first set of data privacy restrictions, while the output ingestion buffer 610 operates in a second geographic region associated with a second set of data privacy restrictions. In this manner, the intake system 110 can be configured to comply with all relevant data privacy restrictions, ensuring privacy of data processed at the data intake and query system 102.

Moreover, either or both of the ingestion buffers 606 and 610 may be implemented across multiple distinct devices, as either a single or multiple ingestion buffers. Illustratively, as shown in FIG. 6B, the intake system 110 may include both a primary intake ingestion buffer 606A and a secondary intake ingestion buffer 606B. The primary intake ingestion buffer 606A is illustratively configured to obtain messages from the data retrieval subsystem 604 (e.g., implemented as a set of intake points 622 through 632N). The secondary intake ingestion buffer 606B is illustratively configured to provide an additional set of messages (e.g., from other host devices 104). In one embodiment, the primary intake ingestion buffer 606A is provided by an administrator or developer of the data intake and query system 102, while the secondary intake ingestion buffer 606B is a user-supplied ingestion buffer (e.g., implemented externally to the data intake and query system 102).

As noted above, an intake ingestion buffer 606 may in some embodiments categorize messages according to source-oriented topics (e.g., denoting a host device 104 from which the message was obtained). In other embodiments, an intake ingestion buffer 606 may in some embodiments categorize messages according to intake-oriented topics (e.g., denoting the intake point from which the message was obtained). The number and variety of such topics may vary, and thus are not shown in FIG. 6B. In one embodiment, the intake ingestion buffer 606 maintains only a single topic (e.g., all data to be ingested at the data intake and query system 102).

The output ingestion buffer 610 may in one embodiment categorize messages according to content-centric topics (e.g., determined based on the content of a message). Additionally or alternatively, the output ingestion buffer 610 may categorize messages according to consumer-centric topics (e.g., topics intended to store messages for consumption by a downstream device or system). An illustrative number of topics are shown in FIG. 6B, as topics 642 through 652N. Each topic may correspond to a queue of messages (e.g., in accordance with the pub-sub model) relevant to the corresponding topic. As described in more detail below, the streaming data processors 608 may be configured to process messages from the intake ingestion buffer 606 and determine which topics of the topics 642 through 652N into which to place the messages. For example, the index topic 642 may be intended to store messages, or data records, holding data that should be consumed and processed by the indexing system 112. The notable event topic 644 may be intended to store messages holding data that indicates a notable event at a host device 104 (e.g., the occurrence of an error or other notable event).

The metrics topic 646 may be intended to store messages holding metrics data for host devices 104. The search results topic 648 may be intended to store messages holding data responsive to a search query. The mobile alerts topic 650 may be intended to store messages holding data for which an end user has requested alerts on a mobile device. A variety of custom topics 652A through 652N may be intended to hold data relevant to end-user-created topics.

As will be described below, by application of message transformation rules at the streaming data processors 608, the intake system 110 may divide and categorize messages from the intake ingestion buffer 606, partitioning or sharding the messages into output topics relevant to a specific downstream consumer. In this manner, specific portions of data input to the data intake and query system 102 may be "divided out" and handled separately, enabling different types of data to be handled differently, and potentially at different speeds. Illustratively, the index topic 642 may be configured to include all or substantially all data included in the intake ingestion buffer 606. Given the volume of data, there may be a significant delay (e.g., minutes or hours) before a downstream consumer (e.g., the indexing system 112) processes a message in the index topic 642. Thus, for example, searching data processed by the indexing system 112 may incur significant delay.

Conversely, the search results topic 648 may be configured to hold only messages corresponding to data relevant to a current query. Illustratively, on receiving a query from a client device 106, the query system 114 may transmit to the intake system 110 a rule that detects, within messages from the intake ingestion buffer 606A, data potentially relevant to the query. The streaming data processors 608 may republish these messages within the search results topic 648, and the query system 114 may subscribe to the search results topic 648 in order to obtain the data within the messages. In this manner, the query system 114 can "bypass" the indexing system 112 and avoid delay that may be caused by that system, thus enabling faster (and potentially real time) display of search results.

While shown in FIGS. 6A and 6B as a single output ingestion buffer 610, the intake system 110 may in some instances utilize multiple output ingestion buffers 610.

As described herein, in some embodiments, components of the intake system 110 can be reserved for a particular tenant or shared by multiple tenants. In some such embodiments, a separate output ingestion buffer 610 can be instantiated for each tenant or used by multiple tenants. In embodiments, where an output ingestion buffer 610 is assigned to a particular tenant, the output ingestion buffer 610 process data from only one tenant. In some such embodiments, the output ingestion buffer 610 may not receive or process data from any other tenants.

In certain embodiments, the output ingestion buffer 610 can be shared by multiple tenants. In some such embodiments, a partition or shard of the output ingestion buffer can 610 include data records associated with different tenants. For example, a first shard can include data records associated with Tenant A and Tenant B. As another example, the first shard may only include data from Tenant A and a second shard may only include data from Tenant B. In either case, the output ingestion buffer 610 can concurrently process data from different tenants. In some such embodiments, the output ingestion buffer 610 can provide the data from different tenants to the same or different components of the indexing system 112. For example, as described herein, the indexing system 112, or certain components thereof, can be reserved for a particular tenant or shared across multiple tenants. Accordingly, the output ingestion buffer 610 may provide the data to an indexing system 112 of a particular tenant or an indexing system 112 that is shared by multiple tenants.

5.2.4. Streaming Data Processors

As noted above, the streaming data processors 608 may apply one or more rules to process messages from the intake ingestion buffer 606A into messages on the output ingestion buffer 610. These rules may be specified, for example, by an end user of the data intake and query system 102 or may be automatically generated by the data intake and query system 102 (e.g., in response to a user query).

Illustratively, each rule may correspond to a set of selection criteria indicating messages to which the rule applies, as well as one or more processing sub-rules indicating an action to be taken by the streaming data processors 608 with respect to the message. The selection criteria may include any number or combination of criteria based on the data included within a message or metadata of the message (e.g., a topic to which the message is published). In one embodiment, the selection criteria are formatted in the same manner or similarly to extraction rules, discussed in more detail below. For example, selection criteria may include regular expressions that derive one or more values or a sub-portion of text from the portion of machine data in each message to produce a value for the field for that message. When a message is located within the intake ingestion buffer 606 that matches the selection criteria, the streaming data processors 608 may apply the processing rules to the message. Processing sub-rules may indicate, for example, a topic of the output ingestion buffer 610 into which the message should be placed. Processing sub-rules may further indicate transformations, such as field or unit normalization operations, to be performed on the message. Illustratively, a transformation may include modifying data within the message, such as altering a format in which the data is conveyed (e.g., converting millisecond timestamps values to microsecond timestamp values, converting imperial units to metric units, etc.), or supplementing the data with additional information (e.g., appending an error descriptor to an error code). In some instances, the streaming data processors 608 may be in communication with one or more external data stores (the locations of which may be specified within a rule) that provide information used to supplement or enrich messages processed at the streaming data processors 608. For example, a specific rule may include selection criteria identifying an error code within a message of the primary ingestion buffer 606A, and specifying that when the error code is detected within a message, that the streaming data processors 608 should conduct a lookup in an external data source (e.g., a database) to retrieve the human-readable descriptor for that error code, and inject the descriptor into the message. In this manner, rules may be used to process, transform, or enrich messages.

The streaming data processors 608 may include a set of computing devices configured to process messages from the intake ingestion buffer 606 at a speed commensurate with a rate at which messages are placed into the intake ingestion buffer 606. In one embodiment, the number of streaming data processors 608 used to process messages may vary based on a number of messages on the intake ingestion buffer 606 awaiting processing. Thus, as additional messages are queued into the intake ingestion buffer 606, the number of streaming data processors 608 may be increased to ensure that such messages are rapidly processed. In some instances, the streaming data processors 608 may be extensible on a per topic basis. Thus, individual devices implementing the streaming data processors 608 may subscribe to different topics on the intake ingestion buffer 606, and the number of devices subscribed to an individual topic may vary according to a rate of publication of messages to that topic (e.g., as measured by a backlog of messages in the topic). In this way, the intake system 110 can support ingestion of massive amounts of data from numerous host devices 104.

In some embodiments, an intake system 110 may comprise a service accessible to client devices 106 and host devices 104 via a network. For example, one type of forwarder 602 may be capable of consuming vast amounts of real-time data from a potentially large number of client devices 106 and/or host devices 104. The forwarder may, for example, comprise a computing device which implements multiple data pipelines or "queues" to handle forwarding of network data to indexers. A forwarder 602 may also perform many of the functions that are performed by an indexer. For example, a forwarder 602 may perform keyword extractions on raw data or parse raw data to create events. A forwarder 602 may generate timestamps for events. Additionally or alternatively, a forwarder 602 may perform routing of events to indexers. A data store 518 may contain events derived from machine data from a variety of sources all pertaining to the same component in an IT environment, and this data may be produced by the machine in question or by other components in the IT environment.

5.3. Indexing System

Figure 7B:
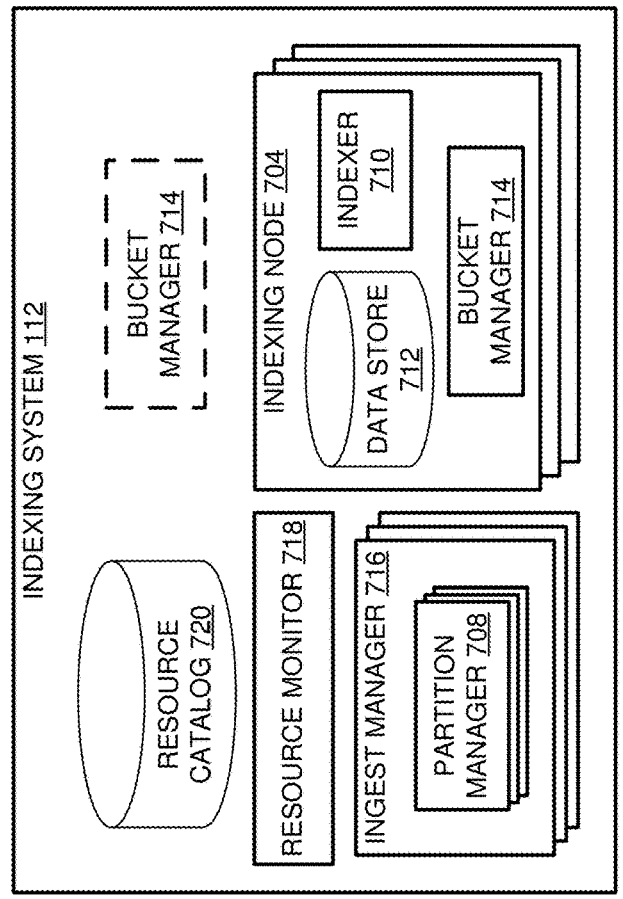
FIGS. 7A and 7B are block diagrams illustrating embodiment of an indexing system.
Figure 7A:
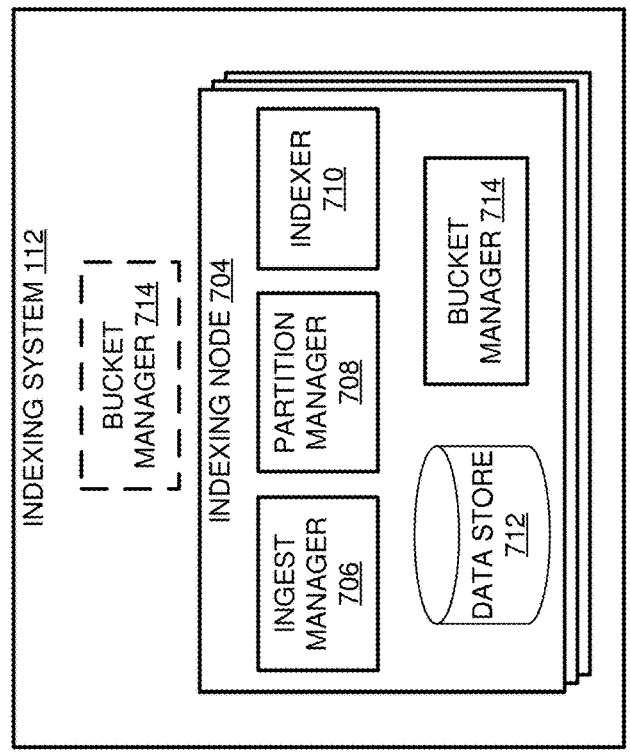

FIGS. 7A and 7B are block diagrams illustrating embodiment of an indexing system 112.

As described herein, in some embodiments, an indexing system 112 can be instantiated for each distinct tenant. For example, in some cases, the embodiment of the indexing system 112 illustrated in FIG. 7A can be configured for a single tenant. In some such cases, each tenant can be assigned a separate bucket manager 714, and indexing node(s) 704, including separate ingest manager(s) 706, partition managers 708, indexers 710, and data stores 712, etc. In such embodiments, the indexing node(s) 704, ingest manager(s) 706, and partition managers 708 may only process data associated with one tenant.

In certain embodiments, one or more components of the indexing system can be shared between multiple tenants. For example, in certain cases, the embodiment of the indexing system 112 illustrated in FIG. 7B can be configured for use by multiple tenants. In some such cases, an ingest manager 706, partition manager 708, and/or indexing node 704 may concurrently receive and process data from multiple tenants. In addition, in the illustrated embodiment of FIG. 7B, the indexing system 112 can include a resource monitor 718 and a resource catalog 720.

It will be understood that the indexing system 112 can include fewer or more components. For example, in some embodiments, the shared storage system 116, the bucket manager 714, or the data store catalog 520 can form part of the indexing system 112, etc. In addition, although illustrated as part of the indexing system 112, it will be understood that the resource monitor 718 and the resource catalog 720 can, in some embodiments, be separate or independent of the indexing system 112. For example, in certain embodiments, the indexing system 112 and/or query system 114 can communicate with the resource monitor 718 and resource catalog 720 similar to the way in which the indexing system 112 and query system 114 can communicate with the data store catalog 520 and/or metadata catalog 521.

As detailed herein, the ingestion buffer 610 communicates one or more data streams to the indexing system 112 using multiple shards or partitions. The data from a particular partition can be referred to as, or include, one or more data records. In some cases, the data records from a particular partition correspond to data associated with different tenants, users, etc. In certain embodiments, the data records can include data to be processed by the indexing system 112 to generate one or more events or location information of the data to be processed by the indexing system 112 to generate one or more events. For example, the data records can include a file identifier and a pointer to the location of a file that includes the data to be processed by the indexing system 112 to generate one or more events. In some embodiments, the data records can include a tenant identifier that identifies the tenant associated with the file or data to be processed.

The indexing system 112 can receive, process, and store data corresponding to the shards or partitions. For example, the indexing system 112 can generate events that include a portion of machine data associated with a timestamp and store the events in buckets based on one or more of the timestamps, tenants, indexes, etc., associated with the data. Moreover, the indexing system 112 can include various components that enable it to provide a stateless indexing service, or indexing service that is able to rapidly recover without data loss if one or more components of the indexing system 112 become unresponsive or unavailable.

As described herein, each of the components of the indexing system 112 can be implemented using one or more computing devices as distinct computing devices or as one or more isolated execution environments. For example, in some embodiments, one or more of the bucket managers 714, the resource catalog 720, the resource monitors 718, the ingest managers 706, and/or the indexing nodes 704 can be implemented as distinct computing devices with separate hardware, memory, and processors. In certain embodiments, one or more bucket managers 714, resource catalogs 720, resource monitors 718, ingest managers 706, and/or indexing nodes 704 can be implemented on the same or across different computing devices as isolated execution environments.

5.3.2. Ingest Manager

One or more ingest managers 706 can receive the one or more data streams from the partitions (or shards). Each ingest manager 706 can be implemented as a distinct computing device, virtual machine, container, container of a pod, or a process or thread associated with a container. For example, in the illustrated embodiment of FIG. 7A, the ingest manager 706 is shown as part of an indexing node 704, such as a container of an indexing node pod. As another example, in the illustrated embodiment of FIG. 7A, the ingest manager 706 is shown as being separate from the indexing nodes 704, such as a container or pod that is separate from the indexing node container or pod.

Depending on the architecture of the indexing system 112, the functions of the ingest manager can vary. For example, when implemented as part of an indexing node, the ingest manager 706 can be used to distribute the data of one tenant between the indexing nodes 704 of that tenant. In such embodiments, the ingest manager can manage the processing of the data of the data stream(s) of a tenant by the indexing nodes 704 of that tenant. In some such embodiments, each indexing node 704 can include one or more ingest managers 706.

When instantiated separately from the indexing node 704, such as in a shared computing resource environment, the ingest manager(s) 706 can be used to distribute data associated with different tenants to different indexing nodes 704. In addition, in some such embodiments, the ingest manager(s) 706 be scaled separately or independently from the indexing nodes 704. For example, in some cases, the ingest manager 706 can have a 1:1 correspondence to indexing nodes 704. In other cases, the ingest managers 706 can have a one-to-many or many-to-one correspondence to indexing nodes 704. As will be described herein, in some cases, when instantiated separately from the indexing nodes, the ingest manager 706 (or partition managers 708) can concurrently process data from multiple tenants and communicate the data from multiple tenants to different indexing nodes 704, each of which can concurrently process data from different tenants.

In certain embodiments, an ingest manager 706 can generate one or more partition managers 708 to manage the partitions or streams of data received from the intake system 110. For example, the ingest manager 706 can generate or assign a separate partition manager 708 for each partition or shard received from an output ingestion buffer 610. As another example, the ingest manager 706 can generate or assign a single partition manager 708 for multiple partitions.

In certain embodiments, data records can include a location marker. For example, the ingest manager 706 or partition manager 708 can receive (and/or store) the location markers in addition to or as part of the data records received from the ingestion buffer 610. Accordingly, the ingest manager 706 can track the location of the data in the ingestion buffer 610 that the ingest manager 706 (for example, a partition manager 708) has received from the ingestion buffer 610. In some embodiments, the ingest manager 706 stores the read pointers or location marker in one or more data stores, such as but not limited to, shared storage system 116, DynamoDB, S3, or another type of storage system, shared storage system, or networked storage system, etc. As the indexing nodes 704 are assigned to process data records, or as an indexing node 704 processes a data record, and the markers are updated by the intake system 110, the ingest manager 706 can be updated to reflect the changes to the read pointers or location markers. In this way, if a partition manager 708 becomes unresponsive or unavailable, the ingest manager 706 can assign a different partition manager 708 to manage the data stream without losing context of what data is to be read from the intake system 110. Accordingly, in some embodiments, by using the ingestion buffer 610 and tracking the location of the location markers in the shards of the ingestion buffer, the indexing system 112 can aid in providing a stateless indexing service.

In some embodiments, such as where the ingest manager 706 is implemented as part of an indexing node 704, the ingest manager 706 can be implemented as a background process, or daemon, in the indexing node 704 and the partition managers 708 can be implemented as threads, copies, or forks of the background process. In some cases, an ingest manager 706 can copy itself, or fork, to create a partition manager 708 or cause a template process to copy itself, or fork, to create each new partition manager 708, etc. This may be done for multithreading efficiency or for other reasons related to containerization and efficiency of managing indexers 710. In certain embodiments, the ingest manager 706 generates a new process for each partition manager 708. In some cases, by generating a new process for each partition manager 708, the ingest manager 706 can support multiple language implementations and be language agnostic. For example, the ingest manager 706 can generate a process for a partition manager 708 in python and create a second process for a partition manager 708 in golang, etc.

5.3.3. Partition Manager

A partition manager 708 can manage the distribution of the data records received from one or more partitions or shards of the ingestion buffer 610 to the indexing nodes 704. As mentioned, the ingest manager 706 can generate or assign one or more partition managers 708 for each partition or shard, or can assign a single partition manager 708 for more than one partition or shard. A partition manager 708 can be implemented as a distinct computing device, virtual machine, container, container of a pod, or a process or thread associated with a container. In some cases, the partition manager 708 can be implemented as part of the indexing node 704 (non-limiting example shown in FIG. 7A), as a sub-component of the ingest manager 706 (non-limiting example shown in FIG. 7B), or as a separate component of the indexing system 112.

In some cases, managing the distribution of data records can include, but is not limited to, communicating one or more data records, or portions thereof, to an indexing node 704 (for example, to an indexer 710) for processing, monitoring the indexing node 704, monitoring the size of data being processed by the indexing node 704, instructing the indexing node 704 to move the data to shared storage system 116, or reporting the storage of the data to the intake system 110.

A partition manager 708 can receive data records from one or more partition(s) and can distribute the data records to one or more indexing nodes 704. In certain embodiments, such as the embodiment shown in FIG. 7A, the partition manager 708 can assign data records to one or more indexing nodes 704 based on their availability.

In some embodiments, such as the embodiment shown in FIG. 7B, the partition manager 708 can communicate a data record to an indexing node 704 for processing based on a data identifier associated with the data record. In certain embodiments, the data records received from a partition of the intake system 110 can be associated with different data identifiers (non-limiting examples: tenant identifier, data source identifier, sourcetype identifier, etc.). For example, the data records received from the ingestion buffer 610 can be associated with different tenants. In some cases, using the data identifier, the partition manager 708 can determine which indexing node 704 is to process a particular data record. For example, based on a tenant identifier, the partition manager 708 can communicate data records associated with the same tenant to the same indexing node 704 (or group of indexing nodes 704). Accordingly, a particular partition manager 708 can process data records from different tenants, data sources, or with different sourcetypes.

In some embodiments, the partition manager 708 can determine which indexing node 704 to process the data based on an indexing node assignment. In certain embodiments, the partition manager 708 can determine the indexing node assignment itself or receive the indexing node assignment from another component of the data intake and query system 102 or indexing system 112, such as the resource catalog 720 or resource monitor 718.

In some cases, the partition manager 708 can selectively and dynamically distribute data records associated with different tenants to different indexing nodes 704 for processing. Furthermore, in certain embodiments, the partition manager 708 and/or ingest manager 706 can track which indexing node 704 is assigned to process which data record. In this way, if an indexing node 704 fails or becomes unresponsive, the partition manager 708 can know which data records are to be reassigned to other indexing nodes 704. In some embodiments, the partition manager 708 receives data from a pub-sub messaging system, such as the ingestion buffer 610. As described herein, the ingestion buffer 610 can have one or more streams of data and one or more shards or partitions associated with each stream of data. Each stream of data can be separated into shards and/or other partitions or types of organization of data. In certain cases, each shard can include data from multiple tenants, indexes, etc. For example, one shard can include records from Tenants A, B, and C, and a second shard can include records from Tenants B, C, and D.

In some cases, each shard can correspond to data associated with a particular tenant, index, source, sourcetype, etc. Accordingly, in some embodiments, the indexing system 112 can include a partition manager 708 for individual tenants, indexes, sources, sourcetypes, etc. In some cases, based on the tenant identifier associated with a particular data record, the indexing system 112 can manage and process the data differently. For example, the indexing system 112 can assign more indexing nodes 704 to process data from one tenant than another tenant, or store buckets associated with one tenant or index more frequently to the shared storage system 116 than buckets associated with a different tenant or index, etc.

In certain embodiments, each shard can include data associated with multiple tenants, indexes, sources, or sourcetypes. In some such embodiments, the partition manager 708 assigned to a particular shard can concurrently process data associated with multiple tenants, indexes, sources, or sourcetypes.

In some embodiments, a partition manager 708 receives data from one or more of the shards or partitions of the ingestion buffer 610. The partition manager 708 can forward one or more data records from the shards/partitions to indexing nodes 704 for processing. In some cases, the amount or size of the data record(s) coming through a partition may exceed the partition's (or ingestion buffer's 610) throughput. For example, 7 MB/s of data records may be sent to an ingestion buffer 610 for a particular partition, but the ingestion buffer 610 may be able to process only 2 MB/s of data per partition. Accordingly, in some embodiments, one or more data records can include a reference to a location in storage where the indexing node 704 can retrieve data. For example, a reference pointer to the data to be processed can be placed in the ingestion buffer 610 rather than putting the data to be processed itself into the ingestion buffer 610. The reference pointer can reference a chunk of data or a file that is larger than the throughput of the ingestion buffer 610 for that partition. In this way, the data intake and query system 102 can increase the throughput of individual partitions of the ingestion buffer 610. In some embodiments, the partition manager 708 can obtain the reference pointer from the ingestion buffer 610 and retrieve data from the referenced storage for processing. In certain embodiments, the partition manager 708 forwards the data record with the reference pointer to the indexing node 704 and the indexing node 704 retrieves the data from the referenced storage location. In some cases, the referenced storage to which reference pointers in the ingestion buffer 610 point can correspond to the shared storage system 116 or other shared storage or local storage. In some implementations, the chunks of data to which the reference pointers refer may be directed to the shared storage system 116 from intake system 110, e.g., streaming data processor 608 or ingestion buffer 610.

In certain embodiments, as an indexing node 704 processes the data record(s), stores the data in buckets, and generates (inverted) indexes of the data, the partition manager(s) 708 can monitor the indexing node 704 (and/or the indexer(s) 710). For example, a partition manager 708 can monitor the size of the data on an indexer 710 (inclusive or exclusive of the data store 712). In some cases, the size of the data on an indexer 710 can correspond to the data that is actually received from the particular partition of the intake system 110 (or retrieved using the data received from the particular partition), as well as data generated by the indexer 710 based on the received data (e.g., inverted indexes, summaries, etc.), and may correspond to one or more buckets. For instance, the indexer 710 may have generated one or more buckets for each tenant and/or index associated with data being processed in the indexer 710. In some cases, such as when multiple indexers 710 process the data records from the same index, the aggregated size of the data on each of those indexers 710 can correspond to the data that is actually received from the particular partition of the intake system 110, as well as data generated by the indexers 710 based on the received data.

Based on a bucket roll-over policy, the partition manager 708 can instruct the indexer(s) 710 to convert editable groups of data or buckets (e.g., hot buckets) to non-editable groups or buckets (e.g., warm buckets) and/or copy the data associated with the partition to shared storage system 116. In some embodiments, the bucket roll-over policy can indicate that the data, which may have been indexed by the indexer(s) 710 and stored in the data store 712 in various buckets, is to be copied to shared storage system 116 based on any one or any combination of a determination that the size of the data satisfies a threshold size (collective size or individual size of a bucket), a threshold number of buckets created, timing, etc. In some cases, the bucket roll-over policy can include different threshold sizes for different data associated with different data identifiers identifying different tenants, data sources, sourcetypes, hosts, users, partitions, partition managers, or the like. Additional details regarding the bucket roll-over policy is described in U.S. application Ser. No. 16/264,299 entitled "AUTOMATICALLY GENERATING METADATA FOR A METADATA CATALOG BASED ON DETECTED CHANGES TO THE METADATA CATALOG," U.S. Ser. No. 16/513,555 entitled "DYNAMICALLY ASSIGNING A SEARCH HEAD AND SEARCH NODES FOR A QUERY," U.S. Ser. No. 16/512,899 entitled "AUTHENTICATING A USER TO ACCESS A DATA INTAKE AND QUERY SYSTEM," U.S. Ser. No. 16/513,365 entitled "IDENTIFYING AN INDEXING NODE TO PROCESS DATA USING A RESOURCE CATALOG," and U.S. Ser. No. 16/657,664 entitled "DATA-DETERMINANT QUERY TERMS," each of which is incorporated herein by reference herein for all purposes (hereinafter the "Incorporated Applications").

Based on an acknowledgement that the data associated with a tenant, data source, sourcetype, host, user, partition, partition manager, or the like, has been stored in shared storage system 116, the partition manager 708 can communicate to the intake system 110, either directly or through the ingest manager 706 that the data has been stored and/or that the location marker or read pointer can be moved or updated. In some cases, the partition manager 708 receives the acknowledgement that the data has been stored from shared storage system 116 and/or from the indexing node 704, such as from the indexer 710. In certain embodiments, which will be described in more detail herein, the intake system 110 does not receive a communication that the data stored in intake system 110 has been read and processed until after that data has been stored in shared storage system 116.

The acknowledgement that the data has been stored in the shared storage system 116 can also include location information about the data within the shared storage system 116. For example, the acknowledgement can provide a link, map, or path to the copied data in the shared storage system 116. Using the information about the data stored in shared storage system 116, the partition manager 708 can update the data store catalog 520. For example, the partition manager 708 can update the data store catalog 520 with an identifier of the data (e.g., bucket identifier, tenant identifier, partition identifier, etc.), the location of the data in shared storage system 116, a time range associated with the data, etc. In this way, the data store catalog 520 can be kept up-to-date with the contents of the shared storage system 116.

Moreover, as additional data is received from the intake system 110, the partition manager 708 can continue to communicate the data to the indexing nodes 704, monitor the size or amount of data on an indexer 710, instruct an indexer 710 to copy the data to shared storage system 116, communicate the successful storage of the data to the intake system 110, and update the data store catalog 520.

As a non-limiting example, consider the scenario in which the intake system 110 communicates a plurality of data records from a particular partition to the indexing system 112. The intake system 110 can track which data it has sent and a location marker for the data in the intake system 110 (e.g., a marker that identifies data that has been sent to the indexing system 112 for processing).

As described herein, the intake system 110 can retain or persistently make available the sent data until the intake system 110 receives an acknowledgement from the indexing system 112 that the sent data has been processed, stored in persistent storage (e.g., shared storage system 116), or is safe to be deleted. In this way, if an indexing node 704, ingest manager 706, or partition manager 708 assigned to process the sent data becomes unresponsive or is lost, e.g., due to a hardware failure or a crash, the data that was sent to the unresponsive component will not be lost. Rather, a different indexing node 704, ingest manager 706, or partition manager 708, can obtain and process the data from the intake system 110.

In some embodiments, as the data records from a partition of the ingest buffer 610 may be processed by different indexing nodes 704, the intake system 110 can retain or persistently make available a data record until the intake system 110 receives an acknowledgement from the indexing system 112 that the data record and other data records sent prior to the data record from the same partition have been processed. For example, if data records 1-5 are sent (in that order) to a partition manager 708 and distributed to five indexing nodes 704, the intake system 110 can retain data record 5 until it receives an acknowledgement that data records 1-4 have been processed and relevant data is stored in shared storage system 116. The intake system 110 can retain data record 5 even if the corresponding indexing node 704 completes its processing of data record 5 before the other indexing nodes 704 complete the processing of data records 1-4.

As the indexing system 112 stores the data in shared storage system 116, it can report the storage to the intake system 110. In response, the intake system 110 can update its marker to identify different data that has been sent to the indexing system 112 for processing, but has not yet been stored. By moving the marker, the intake system 110 can indicate that the previously-identified data has been stored in shared storage system 116, can be deleted from the intake system 110 or, otherwise, can be allowed to be overwritten, lost, etc. In certain embodiments, the indexing system 112 can report the storage of a particular data record once it determines that any records received prior to it from the same partition have also been stored.

With reference to the example above, in some embodiments, the ingest manager 706 can track the marker used by the ingestion buffer 610, and the partition manager 708 can receive data records from the ingestion buffer 610 and forward one or more data records to an indexing node 704, for example to an indexer 710, for processing (or use the data in the ingestion buffer to obtain data from a referenced storage location and forward the obtained data to the indexer). The partition manager 708 can monitor the amount of data being processed and instruct the indexing node 704 to copy the data to shared storage system 116. Once the data is stored in shared storage system 116, the partition manager 708 can report the storage to the ingestion buffer 610, so that the ingestion buffer 610 can update its marker. In addition, the ingest manager 706 can update its records with the location of the updated marker. In this way, if partition manager 708 become unresponsive or fails, the ingest manager 706 can assign a different partition manager 708 to obtain the data from the data stream without losing the location information, or if the indexer 710 becomes unavailable or fails, the ingest manager 706 can assign a different indexer 710 to process and store the data.

In some cases, the partition manager 708 dynamically distributes data records to different indexing nodes based on an indexing node assignment. In some embodiments, the partition manager 708 receives an indexing node assignment from the resource monitor 718, or other component of the data intake and query system 102 to determine which indexing node 704 to forward a data record. In certain embodiments, the partition manager 708 can determine the indexing node assignment itself, or include or consult an indexing node assignment listing that stores recent indexing node assignments. The table or list can be stored as a lookup table or in a database, etc.

In certain embodiments, the partition manager 708 can consult the indexing node assignment listing to determine whether a data identifier (non-limiting example: tenant identifier) relating to a particular data record to be distributed to an indexing node is already associated with a particular indexing node 704 or group of indexing nodes 704. If it is, the partition manager 708 can communicate the particular data record to the particular indexing node 704. If it is not, the partition manager 708 can determine the indexing node assignment or request one from the resource monitor 718, or other component of the data intake and query system 102 to determine which indexing node 704 to forward a data record.

In some cases, the indexing node assignment listing can include an indication of the data identifiers associated with data records that have been assigned to an indexing node 704 over a certain period of time, such as the last 15, 30, 60, or 90 seconds. In some cases, the indexing node assignment listing is cleared or deleted periodically, such as every 15, 30, 60, or 90 seconds be updated. In this way, the indexing node assignment listing can store the more recent indexing node assignments.

In some cases, a different indexing node assignment listing can be stored on or associated with each different partition manager 708. For example, a particular partition manager 708 can manage its own indexing node assignment listing by cataloging the indexing node assignments, which in some embodiments, can be received from the resource catalog 720. As another example, the ingest manager 706 can manage some or all of the indexing node assignment listings of the partition managers 708. In some cases, an indexing node assignment listing can be associated with some or all of the partition managers 708. For example, the ingest manager 706 or the partition managers 708 can manage the indexing node assignment listing by cataloging the indexing node assignments for all of the partition managers 708 associated with the ingest manager 706.

5.3.4. Indexing Nodes

The indexing nodes 704 can include one or more components to implement various functions of the indexing system 112. For example, in the illustrated embodiment of FIG. 7A, the indexing node 704 includes one or more ingest managers 706, partition managers 708, indexers 710, data stores 712, and/or bucket managers 714. As another example, in the illustrated embodiment of FIG. 7B, the indexing node 704 includes an indexer 710, a data store 712, and a bucket manager 714. As described herein, the indexing nodes 704 can be implemented on separate computing devices or as containers or virtual machines in a virtualization environment.

In some embodiments, an indexing node 704, can be implemented as a distinct computing device, virtual machine, container, pod, or a process or thread associated with a container, or using multiple-related containers. In certain embodiments, such as in a Kubernetes deployment, each indexing node 704 can be implemented as a separate container or pod. For example, one or more of the components of the indexing node 704 can be implemented as different containers of a single pod, e.g., on a containerization platform, such as Docker, the one or more components of the indexing node can be implemented as different Docker containers managed by synchronization platforms such as Kubernetes or Swarm. Accordingly, reference to a containerized indexing node 704 can refer to the indexing node 704 as being a single container or as one or more components of the indexing node 704 being implemented as different, related containers or virtual machines.

In certain embodiments, each indexing node 704 can include a monitoring module. In some cases, the monitoring modulate can communicate one or more of an indexing node identifier, metrics, status identifiers, network architecture data, or indexing node assignments to the resource monitor 718. For example, as described herein, the monitoring module can indicate a utilization rate of an indexing node 704, an amount of processing resources in use by an indexing node 704, an amount of memory used by an indexing node 704, an availability or responsiveness of an indexing node 704, etc.

5.3.4.1. Indexer and Data Store

As described herein, the indexer 710 can be the primary indexing execution engine, and can be implemented as a distinct computing device, container, container within a pod, etc. For example, the indexer(s) 710 can be tasked with parsing, processing, indexing, and storing the data received from the intake system 110 via the partition manager(s) 708. Specifically, in some embodiments, the indexer 710 can parse the incoming data to identify timestamps, generate events from the incoming data, group and save events into buckets, generate summaries or indexes (e.g., time series index, inverted index, keyword index, etc.) of the events in the buckets, and store the buckets in shared storage system 116. In some embodiments, the indexer 710 of the indexing node 704 can perform the functions described herein with reference to blocks 204, 206, and 208 of FIG. 2. Further, in some embodiments, block 202 of FIG. 2 can refer to the indexer 710 receiving data from the intake system 110 and/or the partition manager 708 or ingest manager 716.

As used herein, an index can refer to different data structures. In some cases, index can refer to a logical division of data similar to a partition. In certain cases, index can refer to a data structure, such as a file, that stores information about other data (non-limiting examples: a time series index, inverted index, keyword index). In addition, when used as a verb, index can refer to the processing and/or storing of data by the indexing system 112 and/or intake system 110. For example, in some cases, the indexing system 112 can index data associated with a particular index (non-limiting example: main index) to generate events and one or more indexes that include information about the generated events (non-limiting example: time series index). As part of the indexing, the generated events and indexes can be stored as part of or in association with the particular index. In some cases, one indexer 710 can be assigned to each partition manager 708 such that the single indexer 710 processes some or all of the data from its assigned partition manager 708. In certain embodiments, one indexer 710 can receive and process the data from multiple partition managers 708 in the indexing system. For example, with reference to FIG. 7A, one indexer 710 can receive and process the data from partition managers 708 on the same indexing node 704, on multiple indexing nodes 704, on the same ingest manager 706, or multiple ingest managers 706. As another example, with reference to FIG. 7B, an indexer 710 can receive and process data from multiple partition managers 708 and/or ingest managers 706. In some cases, multiple indexing nodes 704 or indexers 710 can be assigned to a single partition manager 708. In certain embodiments, the multiple indexing nodes 704 or indexers 710 can receive and process the data received from the single partition manager 708, as well as data from other partition managers 708.

In some embodiments, the indexer 710 can store the events and buckets in the data store 712 according to a bucket creation policy. The bucket creation policy can indicate how many buckets the indexer 710 is to generate for the data that it processes. In some cases, based on the bucket creation policy, the indexer 710 generates at least one bucket for each unique combination of a tenant and index (which may also be referred to as a partition) associated with the data that it processes. For example, if the indexer 710 receives data associated with three tenants A, B, C, then the indexer 710 can generate at least three buckets: at least one bucket for each of Tenant A, Tenant B, and Tenant C. As another example, if the indexer 710 receives data associated with index A of Tenant A from one partition or shard, and receives data associated with index A of Tenant A and index B of Tenant B from a second partition or shard, then the indexer 710 can generate at least two buckets: at least one bucket for Tenant A (including data corresponding to index A from partition 1 and partition 2) and Tenant B (including data corresponding to index B from partition 2).

In some cases, based on the bucket creation policy, the indexer 710 generates at least one bucket for each combination of tenant and index associated with the data that it processes. For example, if the indexer 710 receives data associated with three tenants A, B, C, each with two indexes X, Y, then the indexer 710 can generate at least six buckets: at least one bucket for each of Tenant A::Index X, Tenant A::Index Y, Tenant B::Index X, Tenant B::Index Y, Tenant C::Index X, and Tenant C::Index Y. Additional buckets may be generated for a tenant/index pair based on the amount of data received that is associated with the tenant/partition pair.

It will be understood that the indexer 710 can generate buckets using a variety of policies. For example, the indexer 710 can generate one or more buckets for each tenant, partition, source, sourcetype, etc.

In some cases, if the indexer 710 receives data that it determines to be "old," e.g., based on a timestamp of the data or other temporal determination regarding the data, then it can generate a bucket for the "old" data. In some embodiments, the indexer 710 can determine that data is "old," if the data is associated with a timestamp that is earlier in time by a threshold amount than timestamps of other data in the corresponding bucket (e.g., depending on the bucket creation policy, data from the same partition and/or tenant) being processed by the indexer 710. For example, if the indexer 710 is processing data for the bucket for Tenant A::Index X having timestamps on 7/23 between 16:23:56 and 16:46:32 and receives data for the Tenant A::Index X bucket having a timestamp on 7/22 or on 7/23 at 08:05:32, then it can determine that the data with the earlier timestamps is "old" data and generate a new bucket for that data. In this way, the indexer 710 can avoid placing data in the same bucket that creates a time range that is significantly larger than the time range of other buckets, which can decrease the performance of the system as the bucket could be identified as relevant for a search more often than it otherwise would.

The threshold amount of time used to determine if received data is "old," can be predetermined or dynamically determined based on a number of factors, such as, but not limited to, time ranges of other buckets, amount of data being processed, timestamps of the data being processed, etc. For example, the indexer 710 can determine an average time range of buckets that it processes for different tenants and indexes. If incoming data would cause the time range of a bucket to be significantly larger (e.g., 25%, 50%, 75%, double, or other amount) than the average time range, then the indexer 710 can determine that the data is "old" data, and generate a separate bucket for it. By placing the "old" bucket in a separate bucket, the indexer 710 can reduce the instances in which the bucket is identified as storing data that may be relevant to a query. For example, by having a smaller time range, the query system 114 may identify the bucket less frequently as a relevant bucket then if the bucket had the large time range due to the "old" data. Additionally, in a process that will be described in more detail herein, time-restricted searches and search queries may be executed more quickly because there may be fewer buckets to search for a particular time range. In this manner, computational efficiency of searching large amounts of data can be improved. Although described with respect detecting "old" data, the indexer 710 can use similar techniques to determine that "new" data should be placed in a new bucket or that a time gap between data in a bucket and "new" data is larger than a threshold amount such that the "new" data should be stored in a separate bucket.

In some cases, based on a bucket roll-over policy, the indexer 710 periodically determines to convert editable groups of data or buckets to non-editable groups or buckets and/or copy the data associated with the partition or tenant identifier to shared storage system 116. As described herein and in the Incorporated Applications, each of which is incorporated herein by reference for all purposes, the bucket roll-over policy can use any one or any combination of a time-based schedule, threshold size(s), data/tenant identifiers, to indicate when buckets are to be rolled over. In certain embodiments, the partition manager(s) 708 or ingest manager(s) 706 can instruct the indexer 710 to copy the data to shared storage system 116 based on the bucket roll-over policy, as described in the Incorporated Applications, each of which is incorporated herein by reference for all purposes.

In some embodiments, once an indexer 710 determines that a hot bucket is to be copied to shared storage system 116, it can convert the hot (editable) bucket to a warm (non-editable) bucket, and then move or copy the warm bucket to the shared storage system 116 based on a bucket roll-over policy. Once the warm bucket is moved or copied to shared storage system 116, an indexer 710 can notify a partition manager 708 that the data associated with the warm bucket has been processed and stored. As mentioned, a partition manager 708 can relay the information to the intake system 110. In addition, an indexer 710 can provide a partition manager 708 with information about the buckets stored in shared storage system 116, such as, but not limited to, location information, tenant identifier, index identifier, time range, etc. As described herein, a partition manager 708 can use this information to update the data store catalog 520. In certain embodiments, the indexer 710 can update the data store catalog 520. For example, the indexer 710 can update the data store catalog 520 based on the information it receives from the shared storage system 116 about the stored buckets.

5.3.4.2. Bucket Manager

The bucket manager 714 can manage the buckets stored in the data store 712, and can be implemented as a distinct computing device, virtual machine, container, container of a pod, or a process or thread associated with a container. In some cases, the bucket manager 714 can be implemented as part of the indexer 710, indexing node 704, the ingest manager 706, or as a separate component of the indexing system 112.

As described herein, the indexer 710 stores data in the data store 712 as one or more buckets associated with different tenants, indexes, etc. In some cases, the contents of the buckets are not searchable by the query system 114 until they are stored in shared storage system 116. For example, the query system 114 may be unable to identify data responsive to a query that is located in hot (editable) buckets in the data store 712 and/or the warm (non-editable) buckets in the data store 712 that have not been copied to shared storage system 116. Thus, query results may be incomplete or inaccurate, or slowed as the data in the buckets of the data store 712 are copied to shared storage system 116.

To decrease the delay between processing and/or indexing the data and making that data searchable, the indexing system 112 can use a bucket roll-over policy to determine when to convert hot buckets to warm buckets more frequently (or convert based on a smaller threshold size) and/or copy the warm buckets to shared storage system 116. While converting hot buckets to warm buckets more frequently or based on a smaller storage size can decrease the lag between processing the data and making it searchable, it can increase the storage size and overhead of buckets in shared storage system 116. For example, each bucket may have overhead associated with it, in terms of storage space required, processor power required, or other resource requirement. Thus, more buckets in shared storage system 116 can result in more storage used for overhead than for storing data, which can lead to increased storage size and costs. In addition, a larger number of buckets in shared storage system 116 can increase query times, as the opening of each bucket as part of a query can have certain processing overhead or time delay associated with it.

To decrease search times and reduce overhead and storage associated with the buckets (while maintaining a reduced delay between processing the data and making it searchable), the bucket manager 714 can monitor the buckets stored in the data store 712 and/or shared storage system 116 and merge buckets according to a bucket merge policy. For example, the bucket manager 714 can monitor and merge warm buckets stored in the data store 712 before, after, or concurrently with the indexer copying warm buckets to shared storage system 116.

The bucket merge policy can indicate which buckets are candidates for a merge or which bucket to merge (e.g., based on time ranges, size, tenant, index, or other identifiers), the number of buckets to merge, size or time range parameters for the merged buckets, and/or a frequency for creating the merged buckets. For example, the bucket merge policy can indicate that a certain number of buckets are to be merged, regardless of size of the buckets. As another non-limiting example, the bucket merge policy can indicate that multiple buckets are to be merged until a threshold bucket size is reached (e.g., 750 MB, or 1 GB, or more). As yet another non-limiting example, the bucket merge policy can indicate that buckets having a time range within a set period of time (e.g., 30 sec, 1 min., etc.) are to be merged, regardless of the number or size of the buckets being merged.

In addition, the bucket merge policy can indicate which buckets are to be merged or include additional criteria for merging buckets. For example, the bucket merge policy can indicate that only buckets having the same tenant identifier and/or index are to be merged, or set constraints on the size of the time range for a merged bucket (e.g., the time range of the merged bucket is not to exceed an average time range of buckets associated with the same source, tenant, partition, etc.). In certain embodiments, the bucket merge policy can indicate that buckets that are older than a threshold amount (e.g., one hour, one day, etc.) are candidates for a merge or that a bucket merge is to take place once an hour, once a day, etc. In certain embodiments, the bucket merge policy can indicate that buckets are to be merged based on a determination that the number or size of warm buckets in the data store 712 of the indexing node 704 satisfies a threshold number or size, or the number or size of warm buckets associated with the same tenant identifier and/or partition satisfies the threshold number or size. It will be understood, that the bucket manager 714 can use any one or any combination of the aforementioned or other criteria for the bucket merge policy to determine when, how, and which buckets to merge.

Once a group of buckets is merged into one or more merged buckets, the bucket manager 714 can copy or instruct the indexer 710 to copy the merged buckets to shared storage system 116. Based on a determination that the merged buckets are successfully copied to the shared storage system 116, the bucket manager 714 can delete the merged buckets and the buckets used to generate the merged buckets (also referred to herein as unmerged buckets or pre-merged buckets) from the data store 712 according to a bucket management policy.

In some cases, the bucket manager 714 can also remove or instruct the shared storage system 116 to remove corresponding pre-merged buckets from the shared storage system 116 according to the bucket management policy. The bucket management policy can indicate when the pre-merged buckets are to be deleted or designated as able to be overwritten from shared storage system 116 and/or in the data store 712.

In some cases, the bucket management policy can indicate that the pre-merged buckets are to be deleted immediately, once any queries relying on the pre-merged buckets are completed, after a predetermined amount of time, etc. Further, the bucket management policy can indicate different criteria for deleting data from shared storage system 116 and/or the data store 712.

In some cases, the pre-merged buckets may be in use or identified for use by one or more queries. Removing the pre-merged buckets from shared storage system 116 in the middle of a query may cause one or more failures in the query system 114 or result in query responses that are incomplete or erroneous. Accordingly, the bucket management policy, in some cases, can indicate to the shared storage system 116 that queries that arrive before a merged bucket is stored in shared storage system 116 are to use the corresponding pre-merged buckets and queries that arrive after the merged bucket is stored in shared storage system 116 are to use the merged bucket.

Further, the bucket management policy can indicate that once queries using the pre-merged buckets are completed, the buckets are to be removed from shared storage system 116. However, it will be understood that the bucket management policy can indicate removal of the buckets in a variety of ways. For example, per the bucket management policy, the shared storage system 116 can remove the buckets after on one or more hours, one day, one week, etc., with or without regard to queries that may be relying on the pre-merged buckets. In some embodiments, the bucket management policy can indicate that the pre-merged buckets are to be removed without regard to queries relying on the pre-merged buckets and that any queries relying on the pre-merged buckets are to be redirected to the merged bucket. It will be understood that the bucket manager 714 can use different bucket management policies for data associated with different data identifiers. For example, the bucket manager 714 can use one bucket management policy for data associated with a first tenant and use another bucket management policy for data associated with a second tenant. In this way, the bucket manager can concurrently use different bucket management policies for different data.

In addition to removing the pre-merged buckets and merged bucket from the data store 712 and removing or instructing shared storage system 116 to remove the pre-merged buckets from the data store(s) 518, the bucket manager 714 can update the data store catalog 520 or cause the indexer 710 or partition manager 708 to update the data store catalog 520 with the relevant changes. These changes can include removing reference to the pre-merged buckets in the data store catalog 520 and/or adding information about the merged bucket, including, but not limited to, a bucket, tenant, and/or partition identifier associated with the merged bucket, a time range of the merged bucket, location information of the merged bucket in shared storage system 116, etc. In this way, the data store catalog 520 can be kept up-to-date with the contents of the shared storage system 116.

5.3.5. Resource Catalog

The resource catalog 720 can store information relating to the indexing nodes 704 of the indexing system 112, such as, but not limited to, indexing node identifiers, metrics, status identifiers, network architecture data, or indexing node assignments. The resource catalog 720 can be maintained (for example, populated, updated, etc.) by the resource monitor 718. As mentioned, in some embodiments, the resource monitor 718 and resource catalog 720 can be separate or independent of the indexing system 112.

In some cases, the resource catalog 720 includes one or more indexing node identifiers. As mentioned, the indexing system 112 can include a plurality of indexing nodes 704. In some cases, the resource catalog 720 can include a different indexing node identifier for each indexing node 704 of the indexing system 112. In some cases, for example if the resource monitor 718 or the control plane system 524 generates a new indexing node 704, the resource monitor 718 can update the resource catalog 720 to include an indexing node identifier associated with the new indexing node 704. In some cases, for example, if an indexing node 704 is removed from the indexing system 112 or the indexing node 704 becomes unresponsive or unavailable, the resource monitor 718 can update the resource catalog 720 to remove an indexing node identifier associated with that indexing node 704. In this way, the resource catalog 720 can include up-to-date information relating to which indexing nodes 704 are instantiated in the indexing system 112.

In some cases, the resource catalog 720 includes one or more metrics associated with one or more of the indexing nodes 704 in the indexing system 112. For example, the metrics can include, but are not limited to, one or more performance metrics such as CPU-related performance metrics, memory-related performance metrics, availability performance metrics, or the like. For example, the resource catalog 720 can include information relating to a utilization rate of an indexing node 704, such as an indication of which indexing nodes 704, if any, are working at maximum capacity or at a utilization rate that satisfies utilization threshold, such that the indexing node 704 should not be used to process additional data for a time. As another example, the resource catalog 720 can include information relating to an availability or responsiveness of an indexing node 704, an amount of processing resources in use by an indexing node 704, or an amount of memory used by an indexing node 704.

In some cases, the information relating to the indexing nodes 704 includes one or more status identifiers associated with one or more of the indexing nodes 704 in the indexing system 112. For example, in some cases, a status identifier associated with one or more of the indexing nodes 704 can include information relating to an availability of an indexing node. For example, the information relating to the indexing nodes 704 can include an indication of whether an indexing node 704 is available or unavailable. In some instances, as described herein, this indication of availability can be based on a status update (or absence of a status update) from the indexing node 704. In some instances, an indexing node 704 is considered available if it is instantiated in the indexing system 112, provides periodic status updates to the resource monitor 718, and/or is responsive communications from the resource monitor 718. In some cases, an indexing node 704 is considered available if one or more metrics associated with the indexing node 704 satisfies a metrics threshold. For example, an indexing node 704 can considered available if a utilization rate of the indexing node 704 satisfies a utilization rate threshold. As another example, an indexing node 704 can considered available if an amount of memory used by or available to the indexing node 704 satisfies a memory threshold (non-limiting example: available memory>10% of total memory, etc.). As another example, an indexing node 704 can be considered available if an amount of available processing resources of the indexing node 704 satisfies a processing resources threshold (non-limiting example: CPU usage<90% of capacity, etc.). Similarly, in some cases, an indexing node 704 can be considered unavailable if one or more, or some or all, metrics associated with the indexing node 704 do not satisfy a metrics threshold.

In some cases, the information relating to the indexing nodes 704 includes information relating to a network architecture associated with one or more of the indexing nodes 704 in the indexing system 112. For example, information relating to a network architecture can include an indication of when, where, or on what host machine, an indexing node is instantiated. As another example, information relating to a network architecture can include an indication of a location of an indexing node 704, for example with reference to other indexing nodes 704. As another example, information relating to a network architecture can include an indication of computing resources shared with other indexing nodes 704, such as data stores, processors, I/O, etc.

In some cases, the information relating to the indexing nodes 704 includes information relating to one or more indexing node assignments. As described herein, an indexing node assignment can include an indication of a mapping between a particular indexing node 704 and an identifier (for example, a tenant identifier, a partition manager identifier, etc.) or between a particular node and a data record received from the intake system 110. In this way, an indexing node assignment can be utilized to determine to which indexing node 704 a partition manager 708 should send data to process. For example, an indexing node assignment can indicate that a particular partition manager 708 should send its data to one or more particular indexing nodes 704. As another example, an indexing node assignment can indicate that some or all data associated with a particular identifier (for example, data associated with a particular tenant identifier) should be forwarded to one or more a particular indexing node 704 for processing. In some cases, a computing device associated with the resource catalog 720 can determine an indexing node assignment and can store the indexing node assignment in the resource catalog 720. In some cases, an indexing node assignment, is not stored in the resource catalog 720. For example, each time the resource monitor 718 receives a request for an indexing node assignment from a partition manager 708, the resource monitor 718 can use information stored in the resource catalog 720 to determine the indexing node assignment, but the indexing node assignment may not be stored in the resource catalog 720. In this way, the indexing node assignments can be altered, for example if necessary based on information relating to the indexing nodes 704.

5.3.6 Resource Monitor

The resource monitor 718 can monitor indexing nodes 704, populate and maintain the resource catalog 720 with relevant information, receive requests for indexing node 704 availability or assignments, identify indexing nodes 704 that are available to process data, and/or communicate information relating to available indexing nodes (or indexing node assignments). The resource monitor 718 can be implemented as a distinct computing device, virtual machine, container, container of a pod, or a process or thread associated with a container.

The resource monitor 718 maintains the resource catalog 720. For example, the resource monitor 718 can communicate with or monitor the indexing nodes 704 to determine or identify information relating to the indexing nodes 704, such as indexing node identifiers, metrics, status identifiers, network architecture data, or indexing node assignments, that it can used to build or update the resource catalog 720. The resource monitor 718 can populate the resource catalog 720 and/or update it over time. For example, as information relating to the indexing nodes 704 changes for the different indexing nodes 704, the resource monitor 718 can update the resource catalog 720. In this way, the resource catalog 720 can retain an up-to-date database of indexing node information.

In some cases, the resource monitor 718 can maintain the resource catalog 720 by pinging the indexing nodes 704 for information or passively receiving it based on the indexing nodes 704 independently reporting the information. For instance, the resource monitor 718 can ping or receive information from the indexing nodes 704 at predetermined intervals of time, such as every 1, 2, 5, 10, 60, or 60 seconds. In addition or alternatively, the indexing nodes 704 can be configured to automatically send their data to the resource monitor 718 and/or the resource monitor 718 can ping a particular indexing node 704 after the passage of a predetermined period of time (for example, 1, 2, 5, 10, 60, or 60 seconds) since the resource monitor 718 requested and/or received data from that particular indexing node 704. In some cases, the resource monitor 718 can determine that an indexing node 704 is unavailable or failing based on the communications or absence of communications from the indexing node 704, and can update the resource catalog 720 accordingly.

The resource monitor 718 can identify available indexing nodes 704 and provide indexing node assignments for processing data records. In some embodiments, the resource monitor 718 can respond to requests from partition managers 708 for an indexing node 704 to process one or more data records. As described herein, a partition manager 708 can receive data records from the ingestion buffer 610. For each data record (or for a group of data records), the partition manager 708 can request the resource monitor 718 for an indexing node 704 to process a particular data record or group of data records, such as data records from the same tenant. In some cases, the resource monitor can respond with an indexing node identifier that identifies an available indexing node 704 for the partition manager 708 to send the data. In certain cases, the request can include a data identifier associated with the data to be processed, such as a tenant identifier. The resource monitor 718 can use the data identifier to determine which indexing node 704 is to process the data.

The resource monitor 718 can identify available indexing nodes using one or more of various techniques. For example, in some cases, the resource monitor 718 identifies an available indexing node 704 based on data in the resource catalog 720 such as, but not limited to, indexing node identifiers, metrics, status identifiers, network architecture data, or indexing node assignments. In some cases, the resource monitor 718 can determine that an indexing node 704 is available if data relating to that indexing node satisfies a certain threshold. For example, the resource monitor 718 can determine that an indexing node 704 is available if it is instantiated in the indexing system 112, has recently reported data to the resource monitor 718, and/or is responsive to communications from the resource monitor 718.

In some cases, the resource monitor 718 can determine that an indexing node 704 is available if one or more metrics associated with the indexing node 704 satisfies a metrics threshold. For example, the resource monitor 718 can determine that an indexing node 704 is available if a utilization rate of the indexing node 704 satisfies a utilization rate threshold and/or if an amount of available memory available to the indexing node 704 satisfies a memory threshold. As another example, the resource monitor 718 can determine that an indexing node 704 is available if an amount of available processing resources of the indexing node 704 satisfies a processing resources threshold. Similarly, in some cases, an indexing node 704 can be considered unavailable if one or more, or some or all, metrics associated with the indexing node 704 do not satisfy a metrics threshold.

In addition to identifying available indexing nodes 704, the resource monitor 718 can identify to which indexing node a particular data record or group of records is to be sent. The resource monitor 718 can map or assign a data record to an indexing node to using one or more techniques. In some embodiments, the resource monitor 718 can use an indexing node mapping policy to determine how to map, link, or associate an indexing node to a data record.

In some embodiments, the indexing node mapping policy can indicate that data records are to be assigned to indexing nodes randomly, in a simple sequence (e.g., a first indexing nodes 704 is mapped to a first data identifier, a second indexing node 704 is mapped to a second data identifier, etc.), based on an order (e.g., sequentially assign indexing nodes 704 as requests are received), based on previous assignments, based on a data identifier associated with the data records, based on availability, based on a hash function, consistent hash, or other function, etc. Additional details regarding the indexing node mapping policy (including indexing node assignment listing, etc.), is described in the Incorporated Applications, each of which is incorporated herein by reference for all purposes.

Based on the determined mapping of a data identifier to an indexing node 704, the resource monitor 718 can respond to a partition manager 708. The response can include an identifier for the assigned indexing node that is to process the data record or the data records associated with a particular data identifier. In certain embodiments, the response can include instructions that the identified indexing node 704 is to be used for a particular length of time, such as one minute, five minutes, etc.

5.4. Query System

Figure 8:
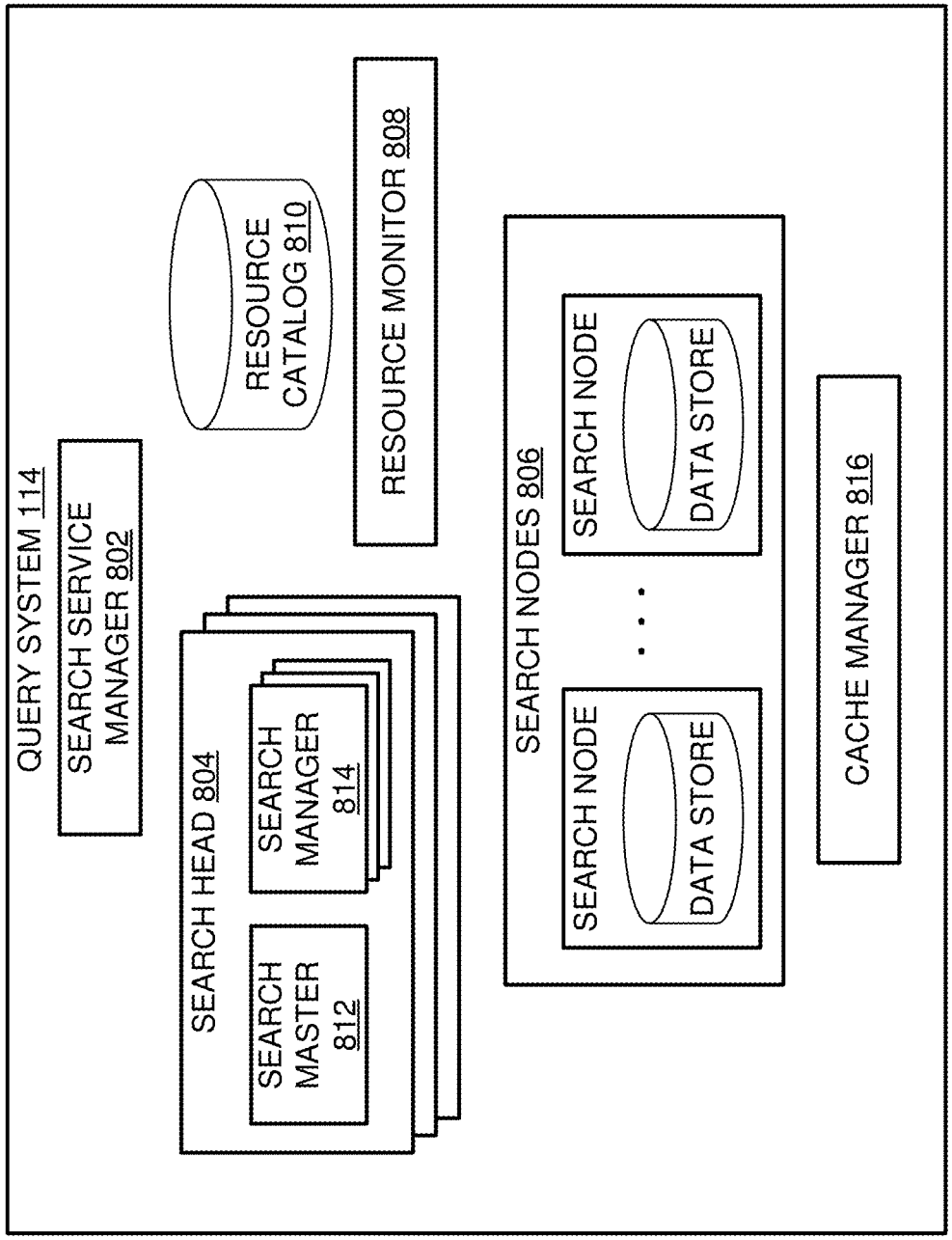
FIG. 8 is a block diagram illustrating an embodiment of a query system.

FIG. 8 is a block diagram illustrating an embodiment of a query system 114 of the data intake and query system 102. The query system 114 can receive, process, and execute queries from multiple client devices 106, which may be associated with different tenants, users, etc. Similarly, the query system 114 can execute the queries on data from the intake system 110, indexing system 112, shared storage system 116, acceleration data store 522, or other system. Moreover, the query system 114 can include various components that enable it to provide a stateless or state-free search service, or search service that is able to rapidly recover without data loss if one or more components of the query system 114 become unresponsive or unavailable.

In the illustrated embodiment, the query system 114 includes one or more search service managers 802 (collectively or individually referred to as search service manager 802), one or more search heads 804 (collectively or individually referred to as search head 804 or search heads 804), one or more search nodes 806 (collectively or individually referred to as search node 806 or search nodes 806), a resource monitor 808, and a resource catalog 810. However, it will be understood that the query system 114 can include fewer or more components as desired. For example, in some embodiments, the shared storage system 116, data store catalog 520, or query acceleration data store 522 can form part of the query system 114, etc. In some embodiments, the search heads 804, search master 812, and/or search manager 815 can perform the functions described herein with reference to blocks 402, 404, and 410 of FIG. 4A and the search nodes 806 can perform the functions described herein with reference to block 408 of FIG. 4A.

As described herein, each of the components of the query system 114 can be implemented using one or more computing devices as distinct computing devices or as one or more container instances or virtual machines across one or more computing devices. For example, in some embodiments, the search service manager 802, search heads 804, and search nodes 806 can be implemented as distinct computing devices with separate hardware, memory, and processors. In certain embodiments, the search service manager 802, search heads 804, and search nodes 806 can be implemented on the same or across different computing devices as distinct container instances, with each container having access to a subset of the resources of a hosting computing device (e.g., a subset of the memory or processing time of the processors of the hosting computing device), but sharing a similar operating system. In some cases, the components can be implemented as distinct virtual machines across one or more computing devices, where each virtual machine can have its own unshared operating system but shares the underlying hardware with other virtual machines on the same hosting computing device.

5.4.1. Search Service Manager

As mentioned, the search service manager 802 can manage the receipt and assignment of queries to other components of the query system 114, and can be implemented as a distinct computing device, virtual machine, container, container of a pod, or a process or thread associated with a container. For example, the search service manager 802 can determine which search head 804 is to handle an incoming query. In some embodiments, the search service manager 802 can parse incoming queries, authenticate a user/datasets for the query, generate a system query from a user query, communicate the system query to a search head 804, etc.

5.4.2. Search Head

As described herein, the search heads 804 can manage the execution of queries received by the query system 114. For example, the search heads 804 can parse the queries to identify the set of data to be processed and the manner of processing the set of data, identify the location of the data (non-limiting examples: intake system 110, shared storage system 116, acceleration data store 522, etc.), identify tasks to be performed by the search head and tasks to be performed by the search nodes 806, distribute the query (or sub-queries corresponding to the query) to the search nodes 806, apply extraction rules to the set of data to be processed, aggregate search results from the search nodes 806, store the search results in the query acceleration data store 522, return search results to the client device 106, etc.

As described herein, the search heads 804 can be implemented on separate computing devices or as containers or virtual machines in a virtualization environment. In some embodiments, the search heads 804 may be implemented using multiple-related containers. In certain embodiments, such as in a Kubernetes deployment, each search head 804 can be implemented as a separate container or pod. For example, one or more of the components of the search head 804 can be implemented as different containers of a single pod, e.g., on a containerization platform, such as Docker, the one or more components of the indexing node can be implemented as different Docker containers managed by synchronization platforms such as Kubernetes or Swarm. Accordingly, reference to a containerized search head 804 can refer to the search head 804 as being a single container or as one or more components of the search head 804 being implemented as different, related containers.

In the illustrated embodiment, the search heads 804 includes a search master 812 and one or more search managers 814 to carry out its various functions. However, it will be understood that the search heads 804 can include fewer or more components as desired. For example, the search head 804 can include multiple search masters 812.

In some embodiments, the search heads 804 can provide information to the resource monitor 808 in order to update the information stored in the resource catalog 810, which may include information such as an identifier for each search head 804, as well as availability information. For example, the information in the resource catalog 810 may identify and indicate search heads 804 that are instantiated and available (e.g., have sufficient bandwidth to process/execute a query), instantiated but are unavailable or unresponsive, and so forth. The updated information may indicate the amount of processing resources currently in use by each search head 804, the current utilization rate of each search head 804, the amount of memory currently used by each search head 804, the number of queries being processed/executed by a search head 804, etc. It should be noted that the information can be provided ad hoc or on a periodic basis. In some such embodiments, the information considered "current" (e.g., the amount of processing resources currently in use) may refer to the most-recent updated information (e.g., the information last provided), the accuracy of which may depend on the how recently the information as reported. The search heads 804 may provide information upon request (e.g., in response to a ping) or may provide information based on a set schedule (e.g., send information to the resource monitor 808 on a periodic basis).

5.4.2.1. Search Master

The search master 812 can manage the execution of the various queries assigned to the search head 804, and can be implemented as a distinct computing device, virtual machine, container, container of a pod, or a process or thread associated with a container. For example, in certain embodiments, as the search head 804 is assigned a query, the search master 812 can generate one or more search manager(s) 814 to manage the query. In some cases, the search master 812 generates a separate search manager 814 for each query that is received by the search head 804. In addition, once a query is completed, the search master 812 can handle the termination of the corresponding search manager 814.

In certain embodiments, the search master 812 can track and store the queries assigned to the different search managers 814. Accordingly, if a search manager 814 becomes unavailable or unresponsive, the search master 812 can generate a new search manager 814 and assign the query to the new search manager 814. In this way, the search head 804 can increase the resiliency of the query system 114, reduce delay caused by an unresponsive component, and can aid in providing a stateless searching service.

In some embodiments, the search master 812 is implemented as a background process, or daemon, on the search head 804 and the search manager(s) 814 are implemented as threads, copies, or forks of the background process. In some cases, a search master 812 can copy itself, or fork, to create a search manager 814 or cause a template process to copy itself, or fork, to create each new search manager 814, etc., in order to support efficient multithreaded implementations 5.4.2.2. Search Manager As mentioned, the search managers 814 can manage the processing and execution of the queries assigned to the search head 804, and can be implemented as a distinct computing device, virtual machine, container, container of a pod, or a process or thread associated with a container. In some embodiments, one search manager 814 manages the processing and execution of one query at a time. In such embodiments, if the search head 804 is processing one hundred queries, the search master 812 can generate one hundred search managers 814 to manage the one hundred queries. Upon completing an assigned query, the search manager 814 can await assignment to a new query or be terminated.

As part of managing the processing and execution of a query, and as described herein, a search manager 814 can parse the query to identify the set of data and the manner in which the set of data is to be processed (e.g., the transformations that are to be applied to the set of data), determine tasks to be performed by the search manager 814 and tasks to be performed by the search nodes 806, identify search nodes 806 that are available to execute the query, map search nodes 806 to the set of data that is to be processed, instruct the search nodes 806 to execute the query and return results, aggregate and/or transform the search results from the various search nodes 806, and provide the search results to a user and/or to the query acceleration data store 522.

In some cases, to aid in identifying the set of data to be processed, the search manager 814 can consult the data store catalog 520 (depicted in FIG. 5). As described herein, the data store catalog 520 can include information regarding the data stored in shared storage system 116. In some cases, the data store catalog 520 can include bucket identifiers, a time range, and a location of the buckets in shared storage system 116. In addition, the data store catalog 520 can include a tenant identifier and partition identifier for the buckets. This information can be used to identify buckets that include data that satisfies at least a portion of the query.

As a non-limiting example, consider a search manager 814 that has parsed a query to identify the following filter criteria that is used to identify the data to be processed: time range: past hour, partition: _sales, tenant: ABC, Inc., keyword: Error. Using the received filter criteria, the search manager 814 can consult the data store catalog 520. Specifically, the search manager 814 can use the data store catalog 520 to identify buckets associated with the "_sales" partition and the tenant "ABC, Inc." and that include data from the "past hour." In some cases, the search manager 814 can obtain bucket identifiers and location information from the data store catalog 520 for the buckets storing data that satisfies at least the aforementioned filter criteria. In certain embodiments, if the data store catalog 520 includes keyword pairs, it can use the keyword "Error" to identify buckets that have at least one event that include the keyword "Error."

Accordingly, the data store catalog 520 can be used to identify relevant buckets and reduce the number of buckets that are to be searched by the search nodes 806. In this way, the data store catalog 520 can decrease the query response time of the data intake and query system 102. In addition, in some embodiments, using the bucket identifiers and/or the location information, the search manager 814 can identify and/or assign one or more search nodes 806 to search the corresponding buckets.

In some embodiments, the use of the data store catalog 520 to identify buckets for searching can contribute to the statelessness of the query system 114 and search head 804. For example, if a search head 804 or search manager 814 becomes unresponsive or unavailable, the control plane system 524, search service manager 802 or search master 812, as the case may be, can spin up or assign an additional resource (e.g., new search head 804 or new search manager 814) to execute the query. As the bucket information is persistently stored in the data store catalog 520, data lost due to the unavailability or unresponsiveness of a component of the query system 114 can be recovered by using the bucket information in the data store catalog 520.

In certain embodiments, to identify search nodes 806 that are available to execute the query, the search manager 814 can consult the resource catalog 810. As described herein, the resource catalog 810 can include information regarding the search nodes 806 (and search heads 804). In some cases, the resource catalog 810 can include an identifier for each search node 806, as well as utilization and availability information. For example, the resource catalog 810 can identify search nodes 806 that are instantiated but are unavailable or unresponsive. In addition, the resource catalog 810 can identify the utilization rate of the search nodes 806. For example, the resource catalog 810 can identify search nodes 806 that are working at maximum capacity or at a utilization rate that satisfies utilization threshold, such that the search node 806 should not be used to execute additional queries for a time.

In addition, the resource catalog 810 can include architectural information about the search nodes 806. For example, the resource catalog 810 can identify search nodes 806 that share a data store and/or are located on the same computing device, or on computing devices that are co-located. In some embodiments, the search manager 814 can consult the resource monitor 808, which can retrieve the relevant information from the resource catalog 810 and provide it to the search manager 814.

Accordingly, in some embodiments, based on the receipt of a query, a search manager 814 can consult the resource catalog 810 (or the resource monitor 808) for search nodes 806 that are available to execute the received query. Based on the consultation of the resource catalog 810 (or the resource monitor 808), the search manager 814 can determine which search nodes 806 to assign to execute the query.

In some embodiments, the query system 114 (non-limiting examples: search manager 814 and/or resource monitor 808) can use a search node mapping policy to identify and/or assign search nodes 806 for a particular query or to access particular buckets as part of the query. In certain embodiments, the search node mapping policy can include sub-policies, such as a search head-node mapping policy and/or a search node-data mapping policy (described below).

Although reference is made herein to search manager 814 or resource monitor 808 identifying/assigning search nodes 806 for a particular query or bucket, it will be understood that any one any combination of the components of the query system 114 can make the assignments and/or use the search node mapping policy (or one of its sub-policies). For example, the search manager 814 can request one or more available search nodes 806 from the resource monitor 808 and then assign or map one or more of the available search nodes for the query, and/or assign the search nodes 806 to process particular buckets, etc. As another example, the search manager 814 can request one or more search nodes 806 and the resource monitor 808 can identify available search nodes 806, assign or map them to the search manager 814 for the query, inform the search manager 814 of the assigned search nodes 806, and/or assign the search nodes 806 to process particular buckets, etc. As another example, the resource monitor 808 may use a one search node mapping policy (e.g., search head-node mapping policy) to identify one or more search nodes 806 for a particular query and the search manager 814 may use a different search node mapping policy (e.g., search node-data mapping policy) to determine which buckets are to be accessed by which of the assigned search nodes, etc.

As part of the query execution, the search manager 814 can instruct the search nodes 806 to execute the query (or sub-query) on the assigned buckets. As described herein, the search manager 814 can generate specific queries or sub-queries for the individual search nodes 806. The search nodes 806 can use the queries to execute the query on the buckets assigned thereto.

In some embodiments, the search manager 814 stores the sub-queries and bucket assignments for the different search nodes 806. Storing the sub-queries and bucket assignments can contribute to the statelessness of the query system 114. For example, in the event an assigned search node 806 becomes unresponsive or unavailable during the query execution, the search manager 814 can re-assign the sub-query and bucket assignments of the unavailable search node 806 to one or more available search nodes 806 or identify a different available search node 806 from the resource catalog 810 to execute the sub-query. In certain embodiments, the control plane system 524 or search service manager 802 can generate an additional search node 806 to execute the sub-query of the unavailable search node 806. Accordingly, the query system 114 can quickly recover from an unavailable or unresponsive component without data loss and while reducing or minimizing delay.

During the query execution, the search manager 814 can monitor the status of the assigned search nodes 806. In some cases, the search manager 814 can ping or set up a communication link between it and the search nodes 806 assigned to execute the query. As mentioned, the search manager 814 can store the mapping of the buckets to the search nodes 806. Accordingly, in the event a particular search node 806 becomes unavailable or is unresponsive, the search manager 814 can assign a different search node 806 to complete the execution of the query for the buckets assigned to the unresponsive search node 806.

In some cases, as part of the status updates to the search manager 814, the search nodes 806 can provide the search manager with partial results and information regarding the buckets that have been searched. In response, the search manager 814 can store the partial results and bucket information in persistent storage. Accordingly, if a search node 806 partially executes the query and becomes unresponsive or unavailable, the search manager 814 can assign a different search node 806 to complete the execution, as described above. For example, the search manager 814 can assign a search node 806 to execute the query on the buckets that were not searched by the unavailable search node 806. In this way, the search manager 814 can more quickly recover from an unavailable or unresponsive search node 806 without data loss and while reducing or minimizing delay.

As the search manager 814 receives query results from the different search nodes 806, it can process the data. In some cases, the search manager 814 processes the partial results as it receives them. For example, if the query includes a count, the search manager 814 can increment the count as it receives the results from the different search nodes 806. In certain cases, the search manager 814 waits for the complete results from the search nodes before processing them. For example, if the query includes a command that operates on a result set, or a partial result set, e.g., a stats command (e.g., a command that calculates one or more aggregate statistics over the results set, e.g., average, count, or standard deviation, as examples), the search manager 814 can wait for the results from all the search nodes 806 before executing the stats command.

As the search manager 814 processes the results or completes processing the results, it can store the results in the query acceleration data store 522 or communicate the results to a client device 106. As described herein, results stored in the query acceleration data store 522 can be combined with other results over time. For example, if the query system 114 receives an open-ended query (e.g., no set end time), the search manager 815 can store the query results over time in the query acceleration data store 522. Query results in the query acceleration data store 522 can be updated as additional query results are obtained. In this manner, if an open-ended query is run at time B, query results may be stored from initial time A to time B. If the same open-ended query is run at time C, then the query results from the prior open-ended query can be obtained from the query acceleration data store 522 (which gives the results from time A to time B), and the query can be run from time B to time C and combined with the prior results, rather than running the entire query from time A to time C. In this manner, the computational efficiency of ongoing search queries can be improved.

5.4.2.2.1. Search Head-node Mapping Policy

As described, the search node mapping policy can include one or more sub-policies. In certain embodiments, the search node mapping policy can include search head-node mapping policy, which can be used by the search manager 814 and/or resource monitor 808 to identify the search nodes 806 to use for a query or to assign search nodes 806 to a search head 804, to a search manager 814, or to a data identifier associated with the query. In some embodiments, the search head-node mapping policy can indicate that search nodes 806 are to be assigned for a particular query randomly, based on an order (e.g., sequentially assign search nodes 806 as queries are received), based on availability, based on previous assignments, based on a data identifier associated with the query, etc. Additional details regarding the search head-node mapping policy is described in the Incorporated Applications, each of which is incorporated herein by reference for all purposes.

In some embodiments, the resource monitor 808 can use different policies for queries associated with different data identifiers. For example, for queries associated with Tenant A, the resource monitor may use a consistent hashing algorithm to assign search nodes 806. For queries associated with Tenant B, the resource monitor may use a preconfigured set of search nodes 806 to execute the query. Similarly, the resource monitor 808 can assign different numbers of search nodes for different queries based on the data identifiers associated with the queries or based on some other priority indicator. For example, the resource monitor 808 may dynamically assign up to twelve search nodes for queries associated with Tenant A based on the size of the query (e.g., amount of data to be processed as part of the query) and may consistently assign four search nodes for queries associated with Tenant B regardless of the size of the query. In some cases, the number of search nodes 806 assigned can be based on a priority level associated with the data identifier or the query. For example, tenants or queries associated with a higher priority level can be allocated a larger number of search nodes 806. In certain cases, the priority level can be based on an indication received from a user, the identity of the tenant, etc.

5.4.2.2.1. Search Node-Data Mapping Policy

As described, the search node mapping policy can include a search node-data mapping policy, which can be used to map search nodes 806 to the data that is to be processed. In some embodiments, the search node-data mapping policy can indicate how search nodes 806 are to be assigned to data (e.g., buckets) and when search nodes 806 are to be assigned to (and instructed to search) the data or buckets. As mentioned, the search node-data mapping policy can be used alone or in conjunction with the search head-node mapping policy (non-limiting example: the number and identity of search nodes 806 for a query are identified based on a search head-node mapping policy and the data accessed by the assigned search nodes is determined based on a search node-data mapping policy) as part of the search node mapping policy.

In some cases, the search node-data mapping policy can indicate whether buckets are to be assigned to search nodes 806 as part of a single operation or iteratively. In certain embodiments, the search node-data mapping policy can indicate that the search manager 814 is to assign a bucket to a search node using consistent a hash function or other function to consistently map data to search nodes 806, using architectural information (utilization rate information), randomly or in a simple sequence (e.g., a first search nodes 806 is assigned a first bucket, a second search node 806 is assigned a second bucket), based on a previous assignment of the bucket to the search node 806 in a previous search, based on the existence of the bucket in storage or shared storage associated with a search node 806, based on an overlaps of computing resources between two search nodes, etc. Additional details regarding the search node-data mapping policy is described in the Incorporated Applications, each of which is incorporated herein by reference for all purposes.

In some embodiments, the resource monitor 808 can use different search node-data mapping policies for queries associated with different data identifiers. For example, for queries associated with Tenant A, the resource monitor may use a consistent hashing algorithm to assign buckets to search nodes 806. For queries associated with Tenant B, the resource monitor may iteratively assign buckets to search nodes 806 to execute the query. Similarly, as described herein with reference to the search head-node mapping policy, a different number of search nodes 806 can be assigned for queries based on a priority level of the query and/or the data identifier associated with the query.

5.4.3. Search Nodes

As described herein, the search nodes 806 can be the primary query execution engines for the query system 114, and can be implemented as distinct computing devices, virtual machines, containers, container of a pods, or processes or threads associated with one or more containers. Accordingly, each search node 806 can include a processing device (microprocessor, processor core, microcontroller, etc.) and a data store, as depicted at a high level in FIG. 8. Depending on the embodiment, the processing device and data store can be dedicated to the search node (e.g., embodiments where each search node is a distinct computing device) or can be shared with other search nodes or components of the data intake and query system 102 (e.g., embodiments where the search nodes are implemented as containers or virtual machines or where the shared data store is a networked data store, etc.).

In some embodiments, the search nodes 806 can obtain and search buckets identified by the search manager 814 that include data that satisfies at least a portion of the query, identify the set of data within the buckets that satisfies the query, perform one or more transformations on the set of data, and communicate the set of data to the search manager 814. Individually, a search node 806 can obtain the buckets assigned to it by the search manager 814 for a particular query, search the assigned buckets for a subset of the set of data, perform one or more transformation on the subset of data, and communicate partial search results to the search manager 814 for additional processing and combination with the partial results from other search nodes 806.

In some cases, the buckets to be searched may be located in a local data store of the search node 806 or a data store that is shared between multiple search nodes 806. In such cases, the search nodes 806 can identify the location of the buckets and search the buckets for the set of data that satisfies the query.

In certain cases, the buckets may be located in the shared storage system 116. In such cases, the search nodes 806 can search the buckets in the shared storage system 116 and/or copy the buckets from the shared storage system 116 to a local or shared data store and search the locally stored copy for the set of data. As described herein, the cache manager 816 can coordinate with the search nodes 806 to identify the location of the buckets (whether in a local or shared data store or in shared storage system 116) and/or obtain buckets stored in shared storage system 116.

Once the relevant buckets (or relevant files of the buckets) are obtained, the search nodes 806 can search their contents to identify the set of data to be processed. In some cases, upon obtaining a bucket from the shared storage system 116, a search node 806 can decompress the bucket from a compressed format, and accessing one or more files stored within the bucket. In some cases, the search node 806 references a bucket summary or manifest to locate one or more portions (e.g., records or individual files) of the bucket that potentially contain information relevant to the search.

In some cases, the search nodes 806 can use all of the files of a bucket to identify the set of data. In certain embodiments, the search nodes 806 use a subset of the files of a bucket to identify the set of data. For example, in some cases, a search node 806 can use an inverted index, bloom filter, or bucket summary or manifest to identify a subset of the set of data without searching the raw machine data of the bucket. In certain cases, the search node 806 uses the inverted index, bloom filter, bucket summary, and raw machine data to identify the subset of the set of data that satisfies the query.

In some embodiments, depending on the query, the search nodes 806 can perform one or more transformations on the data from the buckets. For example, the search nodes 806 may perform various data transformations, scripts, and processes, e.g., a count of the set of data, etc.

As the search nodes 806 execute the query, they can provide the search manager 814 with search results. In some cases, a search node 806 provides the search manager 814 results as they are identified by the search node 806, and updates the results over time. In certain embodiments, a search node 806 waits until all of its partial results are gathered before sending the results to the search manager 814.

In some embodiments, the search nodes 806 provide a status of the query to the search manager 814. For example, an individual search node 806 can inform the search manager 814 of which buckets it has searched and/or provide the search manager 814 with the results from the searched buckets. As mentioned, the search manager 814 can track or store the status and the results as they are received from the search node 806. In the event the search node 806 becomes unresponsive or unavailable, the tracked information can be used to generate and assign a new search node 806 to execute the remaining portions of the query assigned to the unavailable search node 806.

The search nodes 806 may provide information to the resource monitor 808 in order to update the information stored in the resource catalog 810, which may include information such as an identifier for each search node 806, as well as availability, responsiveness, and utilization information. For example, the updated information in the resource catalog 810 may identify and indicate search nodes 806 that are instantiated and currently available (e.g., currently not being used to execute queries), instantiated but are currently unavailable or unresponsive, and so forth. The updated information may indicate the amount of processing resources currently in use by each search node 806, the current utilization rate of each search node 806, the amount of memory currently used by each search node 806, etc. The updated information may also indicate a node type associated with each search node 806, the cache hit ratio for each search node 806, and so forth. It should be noted that the information can be provided on-the-fly or on a periodic basis, and in the latter case, the information considered "current" (e.g., the amount of processing resources currently in use) may refer to the most-recent updated information (e.g., the information last provided), which can be accurate if updated information is provided relatively frequently. The search nodes 806 may provide information upon request (e.g., in response to a ping) or may provide information based on a set schedule (e.g., send information to the resource monitor 808 on a periodic basis).

5.4.4. Cache Manager

As mentioned, the cache manager 816 can communicate with the search nodes 806 to obtain or identify the location of the buckets assigned to the search nodes 806, and can be implemented as a distinct computing device, virtual machine, container, a pod, or a process or thread associated with a container.

The cache manager 816 can be used to determine whether a particular bucket or file is located in a local or shared data store of a search node or is to be retrieved from the shared storage system 116. Furthermore, the cache manager 816 can determine what data and how long to retain data in the local or shared data stores of the search nodes 806 based on a bucket caching policy. In some cases, the bucket caching policy can rely on any one or any combination of a priority level of data received from the search nodes 806 for a particular file, least recently used, most recent in time, or other policies to indicate how long to retain files in the local or shared data store. Additional details regarding the cache manager 816 and bucket caching policy is described in the Incorporated Applications, each of which is incorporated herein by reference for all purposes.

5.4.5. Resource Monitor and Catalog

The resource monitor 808 can monitor search nodes and populate the resource catalog 810 with relevant information, and can be implemented as a distinct computing device, virtual machine, container, container of a pod, or a process or thread associated with a container.

Although the resource monitor 808 and resource catalog 810 are shown as separate components, it will be understood that they can be implemented as part of the same machine, host system, isolated execution environment, pod, container, virtual machine, etc. Furthermore, although separate resource monitors 718, 808 and resource catalog 720 and 810 are shown for the indexing system 112 and the query system 114, it will be understood that the resource monitors 718, 808 and resource catalog 720 and 810 can be implemented as part of the same machine, isolated execution environment, pod, container, etc. For example, the indexing system 112 and the query system 114 can interact with a resource monitor and resource catalog in a manner similar to which these systems (or their components) interact with the shared storage system 116, data store catalog 520, metadata catalog 521, etc. Thus, the illustrated embodiments, should not be construed as limiting the resource monitors 718, 808 and resource catalog 720 and 810 to a particular architecture or design.

In some cases, the resource monitor 808 can ping the search nodes 806 over time to determine their availability, responsiveness, and/or utilization rate. In certain embodiments, each search node 806 can include a monitoring module that provides performance metrics or status updates about the search node 806 to the resource monitor 808. For example, the monitoring module can indicate the amount of processing resources in use by the search node 806, the utilization rate of the search node 806, the amount of memory used by the search node 806, etc. In certain embodiments, the resource monitor 808 can determine that a search node 806 is unavailable or failing based on the data in the status update or absence of a state update from the monitoring module of the search node 806.

In certain embodiments, each search head 804 can include a monitoring module that provides performance metrics or status updates (e.g., availability information) about the search node 806 to the resource monitor 808, along with information such as an identifier for that search head 804. For example, the monitoring module can indicate the number of queries being processed by the search head 804, the amount of processing resources in use by the search head 804, the amount of memory used by the search head 804, and so forth. In certain embodiments, the resource monitor 808 can determine that a search head 804 is unavailable or failing based on the data in the status update or absence of a state update from the monitoring module of the search node 806. Thus, the resource monitor 808 may be able to identify and indicate search heads 804 that are instantiated and available (e.g., include sufficient bandwidth to process one or more additional queries), instantiated but are unavailable or unresponsive, and so forth. Using the information obtained from the search heads 804 and search nodes 806, the resource monitor 808 can populate the resource catalog 810 and update it over time.

As the availability, responsiveness, and/or utilization change for the different search heads 804 and/or search nodes 806, the resource monitor 808 can update the resource catalog 810. In this way, the resource catalog 810 can retain an up-to-date list of search heads 804 available to handle queries and/or search nodes 806 available to execute a query.

Furthermore, as search heads 804 and/or search nodes 806 are instantiated (or at other times), the newly-instantiated search heads 804 and/or search nodes 806 can provide information to the resource monitor 808, which can update the resource catalog 810 with information about the newly-instantiated search heads 804 and/or search nodes 806, such as, but not limited to its computing resources, utilization, network architecture (identification of machine where it is instantiated, location with reference to other search heads 804 and/or search nodes 806, computing resources shared with other search heads 804 and/or search nodes 806, such as data stores, processors, I/O, etc.), etc.

In some embodiments, based on the receipt of a particular query or a request from a search service or a component of the query system 114, the resource monitor 808 can identify a search head to process the particular query. In certain embodiments, the resource monitor 808 can identify the search head based on a search head mapping policy. The search head mapping policy can indicate one or more criteria for identifying or assigning a search head 804 for a query. In some cases, the search head mapping policy can indicate that a search head 804 should be assigned based on its availability, the number of concurrent searches that it is processing/managing, resource utilization, etc. As such, the query system 114 can dynamically assign search heads 804 to process queries. In some such cases, a search head 804 can process and manage queries associated with different tenants. By configuring the search head 804 to process queries associated with different tenants, the data intake and query system 102 can improve resource utilization and decrease the amount of resource used. For example, if a search head 804 is statically assigned to a tenant, then its resources may be unavailable to other tenants or other components of the data intake and query system 102, even if the tenant is not executing any searches. In contrast if a search head 804 is dynamically assigned to queries associated with different tenants then if a particular tenant is not executing any searches then the search head 804 that would otherwise be unused can be used to process/manage queries associated with other tenants thereby increasing the resource utilization of the data intake and query system 102 as a whole.

As described herein, the search manager 814 and/or resource monitor 808 can use the resource catalog 810 to identify search nodes 806 available to execute a query. In some embodiments, the search manager 814 and/or resource monitor 808 can communicate with the resource catalog 810 using an API. In some embodiments, the search manager 814 and/or resource monitor 808 assign search nodes 806 to execute queries based on one or more policies, such as a search node mapping policy, etc. Similar to the dynamic assignment of search heads 804 to queries associated with different tenants or data identifiers, dynamically assigning search nodes 806 to queries can significantly improve resource utilization and decrease compute resources used by the data intake and query system 102.

5.5. Shared Storage System

Returning to FIG. 5, the shared storage system 116 can be used to store data indexed by the indexing system 112, and can be implemented using one or more data stores 518.

In some systems, the same computing devices (e.g., indexers) operate both to ingest, index, store, and search data. The use of an indexer to both ingest and search information may be beneficial, for example, because an indexer may have ready access to information that it has ingested, and can quickly access that information for searching purposes. However, use of an indexer to both ingest and search information may not be desirable in all instances. As an illustrative example, consider an instance in which ingested data is organized into buckets, and each indexer is responsible for maintaining buckets within a data store corresponding to the indexer. Illustratively, a set of ten indexers may maintain 100 buckets, distributed evenly across ten data stores (each of which is managed by a corresponding indexer). Information may be distributed throughout the buckets according to a load-balancing mechanism used to distribute information to the indexers during data ingestion. In an idealized scenario, information responsive to a query would be spread across the 100 buckets, such that each indexer may search their corresponding ten buckets in parallel, and provide search results to a search head. However, it is expected that this idealized scenario may not always occur, and that there will be at least some instances in which information responsive to a query is unevenly distributed across data stores. As one example, consider a query in which responsive information exists within ten buckets, all of which are included in a single data store associated with a single indexer. In such an instance, a bottleneck may be created at the single indexer, and the effects of parallelized searching across the indexers may be minimized. To increase the speed of operation of search queries in such cases, it may therefore be desirable to store data indexed by the indexing system 112 in shared storage system 116 that can be accessible to any one or multiple components of the indexing system 112 or the query system 114.

The shared storage system 116 may correspond to any data storage system accessible to the indexing system 112 and the query system 114. For example, shared storage system 116 may correspond to a storage area network (SAN), network attached storage (NAS), other network-accessible storage system (e.g., a hosted storage system, such as Amazon S3 or EBS provided by Amazon, Inc., Google Cloud Storage, Microsoft Azure Storage, etc., which may also be referred to as "cloud" storage), or combination thereof. The shared storage system 116 may include, for example, hard disk drives (HDDs), solid state storage devices (SSDs), or other substantially persistent or non-transitory media. Data stores 518 within shared storage system 116 may correspond to physical data storage devices (e.g., an individual HDD) or a logical storage device, such as a grouping of physical data storage devices or a containerized or virtualized storage device hosted by an underlying physical storage device. In some embodiments, the shared storage system 116 may also be referred to as a shared storage system or shared storage environment as the data stores 518 may store data associated with multiple customers, tenants, etc., or across different systems 102 or other systems unrelated to the systems 102.

The shared storage system 116 can be configured to provide high availability, highly resilient, low loss data storage. In some cases, to provide the high availability, highly resilient, low loss data storage, the shared storage system 116 can store multiple copies of the data in the same and different geographic locations and across different types of data stores (e.g., solid state, hard drive, tape, etc.). Further, as data is received at the shared storage system 116 it can be automatically replicated multiple times according to a replication factor to different data stores across the same and/or different geographic locations.

In one embodiment, shared storage system 116 may be multi-tiered, with each tier providing more rapid access to information stored in that tier. For example, a first tier of the shared storage system 116 may be physically co-located with the indexing system 112 or the query system 114 and provide rapid access to information of the first tier, while a second tier may be located in a different physical location (e.g., in a shared computing resource or "cloud" computing environment) and provide less rapid access to information of the second tier.

Distribution of data between tiers may be controlled by any number of algorithms or mechanisms. In one embodiment, a first tier may include data generated or including timestamps within a threshold period of time (e.g., the past seven days), while a second tier or subsequent tiers includes data older than that time period. In another embodiment, a first tier may include a threshold amount (e.g., n terabytes) or recently accessed data, while a second tier stores the remaining less recently accessed data.

In one embodiment, data within the data stores 518 is grouped into buckets, each of which is commonly accessible to the indexing system 112 and query system 114. The size of each bucket may be selected according to the computational resources of the shared storage system 116 or the data intake and query system 102 overall. For example, the size of each bucket may be selected to enable an individual bucket to be relatively quickly transmitted via a network, without introducing excessive additional data storage requirements due to metadata or other overhead associated with an individual bucket. In one embodiment, each bucket is 750 megabytes in size. Further, as mentioned, in some embodiments, some buckets can be merged to create larger buckets.

As described herein, the indexing nodes 704 can generate buckets during indexing and communicate with shared storage system 116 to store the buckets. For example, data may be provided to the indexing nodes 704 from one or more ingestion buffers of the intake system 110. The indexing nodes 704 can process the information and store it as buckets in shared storage system 116, rather than in a data store maintained by an individual indexer or indexing node. Thus, the shared storage system 116 can render information of the data intake and query system 102 commonly accessible to elements of the system 102. As described herein, the shared storage system 116 can enable parallelized searching of buckets to occur independently of the operation of indexing system 112.

As noted above, it may be beneficial in some instances to separate data indexing and searching. Accordingly, as described herein, the search nodes 806 of the query system 114 can search for data stored within shared storage system 116. The search nodes 806 may therefore be communicatively attached (e.g., via a communication network) with the shared storage system 116, and be enabled to access buckets within the shared storage system 116.

Further, as described herein, because the search nodes 806 in some instances are not statically assigned to individual data stores 518 (and thus to buckets within such a data store 518), the buckets searched by an individual search node 806 may be selected dynamically, to increase the parallelization with which the buckets can be searched. For example, consider an instance where information is stored within 100 buckets, and a query is received at the data intake and query system 102 for information within ten buckets. Unlike a scenario in which buckets are statically assigned to an indexer, which could result in a bottleneck if the ten relevant buckets are associated with the same indexer, the ten buckets holding relevant information may be dynamically distributed across multiple search nodes 806. Thus, if ten search nodes 806 are available to process a query, each search node 806 may be assigned to retrieve and search within one bucket greatly increasing parallelization when compared to the low-parallelization scenarios (e.g., where a single search node 806 is required to search all ten buckets).

Moreover, because searching occurs at the search nodes 806 rather than at the indexing system 112, indexing resources can be allocated independently to searching operations. For example, search nodes 806 may be executed by a separate processor or computing device than indexing nodes 704, enabling computing resources available to search nodes 806 to scale independently of resources available to indexing nodes 704. Additionally, the impact on data ingestion and indexing due to above-average volumes of search query requests is reduced or eliminated, and similarly, the impact of data ingestion on search query result generation time also is reduced or eliminated.

As will be appreciated in view of the above description, the use of a shared storage system 116 can provide many advantages within the data intake and query system 102. Specifically, use of a shared storage system 116 can enable the system 102 to decouple functionality of data indexing by indexing nodes 704 with functionality of searching by search nodes 806. Moreover, because buckets containing data are accessible by each search node 806, a search manager 814 can dynamically allocate search nodes 806 to buckets at the time of a search in order to increase parallelization. Thus, use of a shared storage system 116 can substantially improve the speed and efficiency of operation of the system 102.

5.6. Data Store Catalog

The data store catalog 520 can store information about the data stored in shared storage system 116, and can be implemented using one or more data stores. In some embodiments, the data store catalog 520 can be implemented as a portion of the shared storage system 116 and/or using similar data storage techniques (e.g., local or cloud storage, multi-tiered storage, etc.). In another implementation, the data store catalog 52—may utilize a database, e.g., a relational database engine, such as commercially-provided relational database services, e.g., Amazon's Aurora. In some implementations, the data store catalog 520 may use an API to allow access to register buckets, and to allow query system 114 to access buckets. In other implementations, data store catalog 520 may be implemented through other means, and maybe stored as part of shared storage system 116, or another type of shared storage system, as previously described. In various implementations, requests for buckets may include a tenant identifier and some form of user authentication, e.g., a user access token that can be authenticated by authentication service. In various implementations, the data store catalog 520 may store one data structure, e.g., table, per tenant, for the buckets associated with that tenant, one data structure per partition of each tenant, etc. In other implementations, a single data structure, e.g., a single table, may be used for all tenants, and unique tenant IDs may be used to identify buckets associated with the different tenants.

As described herein, the data store catalog 520 can be updated by the indexing system 112 with information about the buckets or data stored in shared storage system 116. For example, the data store catalog can store an identifier for a sets of data in shared storage system 116, a location of the sets of data in shared storage system 116, tenant or indexes associated with the sets of data, timing information about the sets of data, etc. In embodiments where the data in shared storage system 116 is stored as buckets, the data store catalog 520 can include a bucket identifier for the buckets in shared storage system 116, a location of or path to the buckets in shared storage system 116, a time range of the data in the bucket (e.g., range of time between the first-in-time event of the bucket and the last-in-time event of the bucket), a tenant identifier identifying a customer or computing device associated with the bucket, and/or an index or partition associated with the bucket, etc.

In certain embodiments, the data store catalog 520 can include an indication of a location of a copy of a bucket found in one or more search nodes 806. For example, as buckets are copied to search nodes 806, the query system 114 can update the data store catalog 520 with information about which search nodes 806 include a copy of the buckets. This information can be used by the query system 114 to assign search nodes 806 to buckets as part of a query.

In certain embodiments, the data store catalog 520 can function as an index or inverted index of the buckets stored in shared storage system 116. For example, the data store catalog 520 can provide location and other information about the buckets stored in shared storage system 116. In some embodiments, the data store catalog 520 can provide additional information about the contents of the buckets. For example, the data store catalog 520 can provide a list of sources, sourcetypes, or hosts associated with the data in the buckets.

In certain embodiments, the data store catalog 520 can include one or more keywords found within the data of the buckets. In such embodiments, the data store catalog can be similar to an inverted index, except rather than identifying specific events associated with a particular host, source, sourcetype, or keyword, it can identify buckets with data associated with the particular host, source, sourcetype, or keyword.

In some embodiments, the query system 114 (e.g., search head 804, search master 812, search manager 814, etc.) can communicate with the data store catalog 520 as part of processing and executing a query. In certain cases, the query system 114 communicates with the data store catalog 520 using an API. As a non-limiting example, the query system 114 can provide the data store catalog 520 with at least a portion of the query or one or more filter criteria associated with the query. In response, the data store catalog 520 can provide the query system 114 with an identification of buckets that store data that satisfies at least a portion of the query. In addition, the data store catalog 520 can provide the query system 114 with an indication of the location of the identified buckets in shared storage system 116 and/or in one or more local or shared data stores of the search nodes 806.

Accordingly, using the information from the data store catalog 520, the query system 114 can reduce (or filter) the amount of data or number of buckets to be searched. For example, using tenant or partition information in the data store catalog 520, the query system 114 can exclude buckets associated with a tenant or a partition, respectively, that is not to be searched. Similarly, using time range information, the query system 114 can exclude buckets that do not satisfy a time range from a search. In this way, the data store catalog 520 can reduce the amount of data to be searched and decrease search times.

As mentioned, in some cases, as buckets are copied from shared storage system 116 to search nodes 806 as part of a query, the query system 114 can update the data store catalog 520 with the location information of the copy of the bucket. The query system 114 can use this information to assign search nodes 806 to buckets. For example, if the data store catalog 520 indicates that a copy of a bucket in shared storage system 116 is stored in a particular search node 806, the query system 114 can assign the particular search node to the bucket. In this way, the query system 114 can reduce the likelihood that the bucket will be retrieved from shared storage system 116. In certain embodiments, the data store catalog 520 can store an indication that a bucket was recently downloaded to a search node 806. The query system 114 for can use this information to assign search node 806 to that bucket.

5.7. Query Acceleration Data Store

With continued reference to FIG. 5, the query acceleration data store 522 can be used to store query results or datasets for accelerated access, and can be implemented as, a distributed in-memory database system, storage subsystem, local or networked storage (e.g., cloud storage), and so on, which can maintain (e.g., store) datasets in both low-latency memory (e.g., random access memory, such as volatile or non-volatile memory) and longer-latency memory (e.g., solid state storage, disk drives, and so on). In some embodiments, to increase efficiency and response times, the accelerated data store 522 can maintain particular datasets in the low-latency memory, and other datasets in the longer-latency memory. For example, in some embodiments, the datasets can be stored in-memory (non-limiting examples: RAM or volatile memory) with disk spillover (non-limiting examples: hard disks, disk drive, non-volatile memory, etc.). In this way, the query acceleration data store 522 can be used to serve interactive or iterative searches. In some cases, datasets which are determined to be frequently accessed by a user can be stored in the lower-latency memory. Similarly, datasets of less than a threshold size can be stored in the lower-latency memory.

In certain embodiments, the search manager 814 or search nodes 806 can store query results in the query acceleration data store 522. In some embodiments, the query results can correspond to partial results from one or more search nodes 806 or to aggregated results from all the search nodes 806 involved in a query or the search manager 814. In such embodiments, the results stored in the query acceleration data store 522 can be served at a later time to the search head 804, combined with additional results obtained from a later query, transformed or further processed by the search nodes 806 or search manager 814, etc. For example, in some cases, such as where a query does not include a termination date, the search manager 814 can store initial results in the acceleration data store 522 and update the initial results as additional results are received. At any time, the initial results, or iteratively updated results can be provided to a client device 106, transformed by the search nodes 806 or search manager 814, etc.

Furthermore, in some cases, if the query system 114 receives a query that includes a request to process data in the query acceleration data store 522, as well as data in the shared storage system 116, the search manager 814 or search nodes 806 can begin processing the data in the query acceleration data store 522, while also obtaining and processing the other data from the shared storage system 116. In this way, the query system 114 can rapidly provide initial results for the query, while the search nodes 806 obtain and search the data from the shared storage system 116.

5.8. Metadata Catalog

Figure 9:
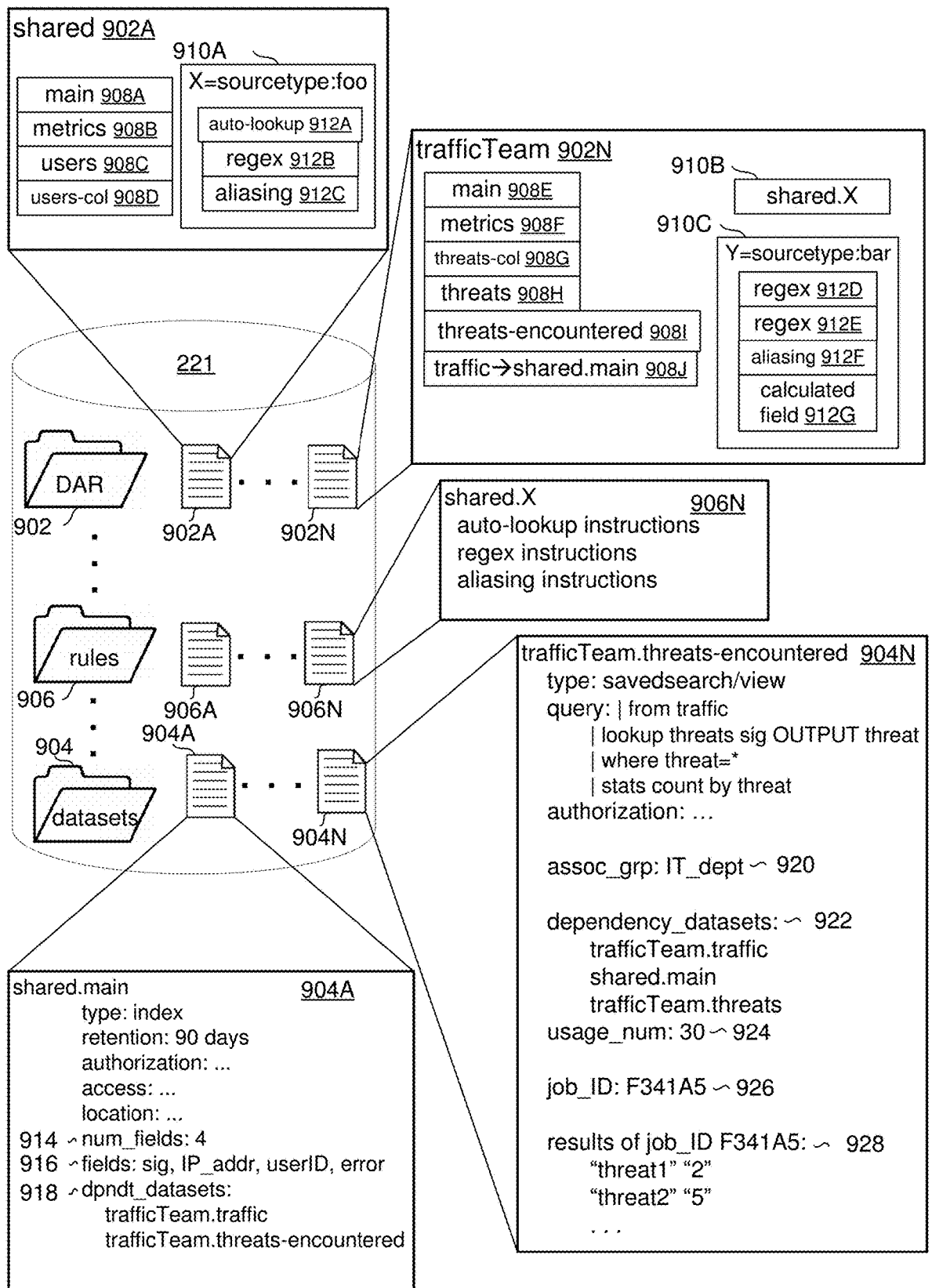
FIG. 9 is a block diagram illustrating an embodiment of a metadata catalog.

FIG. 9 is a block diagram illustrating an embodiment of a metadata catalog 521. The metadata catalog 521 can be implemented using one or more data stores, databases, computing devices, or the like. In some embodiments, the metadata catalog 521 is implemented using one or more relational databases, such as, but not limited to, Dynamo DB and/or Aurora DB.

As described herein, the metadata catalog 521 can store information about datasets and/or rules used or supported by the data intake and query system 102. Furthermore, the metadata catalog 521 can be used to, among other things, interpret dataset identifiers in a query, verify/authenticate a user's permissions and/or authorizations for different datasets, identify additional processing as part of the query, identify one or more source datasets from which to retrieve data as part of the query, determine how to extract data from datasets, identify configurations/definitions/dependencies to be used by search nodes to execute the query, etc.

In certain embodiments, the query system 114 can use the metadata catalog 521 to dynamically determine the dataset configurations and rule configurations to be used to execute the query (also referred to herein as the query configuration parameters). In certain embodiments, the query system 114 can use the dynamically determined query configuration parameters to provide a stateless search experience. For example, if the query system 114 determines that search heads 804 are to be used to process a query or if an assigned search head 804 becomes unavailable, the query system 114 can communicate the dynamically determined query configuration parameters (and query to be executed) to another search head 804 without data loss and/or with minimal or reduced time loss.

In the illustrated embodiment, the metadata catalog 521 stores one or more dataset association records 902, one or more dataset configuration records 904, and one or more rule configuration records 906. It will be understood, that the metadata catalog 521 can store more or less information as desired. Although shown in the illustrated embodiment as belonging to different folders or files, it will be understood, that the various dataset association records 902, dataset configuration records 904, and rule configuration records 906 can be stored in the same file, directory, and/or database. For example, in certain embodiments, the metadata catalog 521 can include one or more entries in a database for each dataset association record 902, dataset (or dataset configuration record 904), and/or rule (or rule configuration record 906). Moreover, in certain embodiments, the dataset configuration records 904 and/or the rule configuration records 906 can be included as part of the dataset association records 902.

In some cases, the metadata catalog 521 may not store separate dataset association records 902. Rather the datasets association records 902 shown in FIG. 9 can be considered logical associations between one or more dataset configuration records 904 and/or one or more rule configuration records 906. In some such embodiments, the logical association can be determined based on an identifier or entry of each dataset configuration record 904 and/or rule configuration record 906. For example, the dataset configuration records 904 and rule configuration records 906 that begin with "shared," can be considered part of the "shared" dataset association record 902A (even if separate data structure does not physically or logically exist on a data store) and the dataset configuration records 904 and rule configuration records 906 that begin with "trafficTeam," can be considered part of the "trafficTeam" dataset association record 902N.

In some embodiments, a user can modify the metadata catalog 521 via the gateway 515. For example, the gateway 515 can receive instruction from client device 106 to add/modify/delete dataset association records 902, dataset configuration records 904, and/or rule configuration records 906. The information received via the gateway 515 can be used by the metadata catalog 521 to create, modify, or delete a dataset association record 902, dataset configuration record 904, and/or a rule configuration record 906. However, it will be understood that the metadata catalog 521 can be modified in a variety of ways and/or without using the gateway 515.

In certain embodiments, the metadata catalog 521 can create, modify, or delete a dataset association record 902, dataset configuration record 904, and/or a rule configuration record 906 based on an explicit instruction to do so from a user.

In some embodiments, the metadata catalog 521 can create, modify, or delete a dataset association record 902, dataset configuration record 904, and/or a rule configuration record 906 based on a user's interaction with the system 102 and/or without an explicit instruction. For example, if a user enters a query in a user interface and then instructs the system 102 to execute the query, the metadata catalog 521 can create a dataset configuration record 904 based on the query and/or can add the query as a dataset to a dataset association record 902 (depending on the module that was used or identified when the query was executed). With continued reference to the example, the created dataset configuration record 904 can include the query and indicate that the type of dataset is a query, saved search, or view. In addition, the created dataset configuration record 904 can include authorization information for users that are allowed to use the query or that have access to the datasets referenced by the query, the identity of the user that entered the query, the identity of a group of users with which the user is associated, tenant information, dependency datasets, a job ID corresponding to the job ID created by the system 102 as part of executing the query, results of the query, and/or query results identifier corresponding to the query results (e.g., job ID or other identifier that can be used to identify the query results). More or less information can be determined and added to the dataset association record as desired.

Similarly, if a user enters a query, the metadata catalog 521, can edit the dataset configuration record 904. With continued reference to the example above, if another user enters the same query or the same user executes the query at a later time (with or without prompting by the system 102), the metadata catalog 521 can edit the corresponding dataset configuration record 904. For example, the metadata catalog 521 can increment a count for the number of times the query has been used, add information about the users that have used the query, include a job ID, query results, and/or query results identifier, each time the query is executed, etc.

5.8.1. Dataset Association Records

As described herein, the dataset association records 902 can indicate how to refer to one or more datasets (e.g., provide a name or other identifier for the datasets), identify associations or relationships between a particular dataset and one or more rules or other datasets and/or indicate the scope or definition of a dataset. Accordingly, a dataset association record 902 can include or identify one or more datasets 908 and/or rules 910.

In certain embodiments, a dataset association record 902 can provide a mechanism to avoid conflicts in dataset and/or rule identifiers. For example, different dataset association records 902 can use the same name to refer to different datasets, however, the data intake and query system 102 can differentiate the datasets with the same name based on the dataset association record 902 with which the different datasets are associated. Accordingly, in some embodiments, a dataset can be identified using a logical identifier or name and/or a physical identifier or name. The logical identifier may refer to a particular dataset in the context of a particular dataset association record 902. The physical identifier may be used by the metadata catalog 521 and/or the data intake and query system 102 to uniquely identify the dataset from other datasets supported or used by the data intake and query system 102.

In some embodiments, the data intake and query system 102 can determine a physical identifier for a dataset using an identifier of the dataset association record 902 with which the dataset is associated. In some embodiments, the physical name can correspond to a combination of the logical name and the name of the dataset association record 902. In certain embodiments, the data intake and query system 102 can determine the physical name for a dataset by appending the name of the dataset association record 902 to the name of the dataset. For example, if the name of the dataset is "main" and it is associated with or part of the "shared" dataset association record 902, the data intake and query system 102 can generate a physical name for the dataset as "shared-.main" or "shared__main." In this way, if another dataset association record 902 "test" includes a "main" dataset, the "main" dataset from the "shared" dataset association record will not conflict with the "main" dataset from the "test" dataset association record (identified as "test.main" or "test__main"). It will be understood that a variety of ways can be used to generate or determine a physical name for a dataset. For example, the data intake and query system 102 can concatenate the logical name and the name of the dataset association record 902, use a different identifier, etc.

In some embodiments, the dataset association records 902 can also be used to limit or restrict access to datasets and/or rules. For example, if a user uses one dataset association record 902 they may be unable to access or use datasets and/or rules from another dataset association record 902. In some such embodiments, if a query identifies a dataset association record 902 for use but references datasets or rules of another dataset association record 902, the data intake and query system 102 can indicate an error.

In certain embodiments, datasets and/or rules can be imported from one dataset association record 902 to another dataset association record 902. Importing a dataset and/or rule can enable a dataset association record 902 to use the referenced dataset and/or rule. In certain embodiments, when importing a dataset and/or rule 910, the imported dataset and/or rule 910 can be given a different name for use in the dataset association record 902. For example, a "main" dataset in one dataset association record can be imported to another dataset association record and renamed "traffic." However, it will be understood that in some embodiments, the imported dataset 908 and/or rule 910 can retain the same name.

Accordingly, in some embodiments, the logical identifier for a dataset can vary depending on the dataset association record 902 used, but the physical identifier for the dataset may not change. For example, if the "main" dataset from the "shared" dataset association record is imported by the "test" dataset association record and renamed as "traffic," the same dataset may be referenced as "main" when using the "shared" dataset association record and may be referenced as "traffic" when using the "test" dataset association record. However, in either case, the data intake and query system 102 can recognize that, regardless of the logical identifier used, both datasets refer to the "shared.main" dataset.

In some embodiments, one or more datasets and/or rules can be imported automatically. For example, consider a scenario where a rule from the "main" dataset association record 902 is imported by the "test" dataset association record and references dataset "users." In such a scenario, even if the dataset "users" is not explicitly imported by the "test" dataset association record 902, the "users" dataset can be imported by the "test" dataset association record 902. In this way, the data intake and query system 102 can reduce the likelihood that an error occurs when an imported dataset and/or rule references a dataset and/or rule that was not explicitly imported.

In certain cases, when a dataset and/or rule is automatically imported, the data intake and query system 102 can provide limited functionality with respect to the automatically imported dataset and/or rule. For example, by explicitly importing a dataset and/or rule, a user may be able to reference the dataset and/or rule in a query, whereas if the dataset and/or rule is automatically imported, a user may not be able to reference the dataset and/or rule the query. However, the data intake and query system 102 may be able to reference the automatically imported dataset and/or rule in order to execute a query without errors.

Datasets of a dataset association record 902 can be associated with a dataset type. A dataset type can be used to differentiate how to interact with the dataset. In some embodiments, datasets of the same type can have similar characteristics or be interacted with in a similar way. For example, index datasets and metrics interactions datasets may be searchable, collection datasets may be searchable via a lookup dataset, view datasets may include query parameters or a query, etc. Non-limiting examples of dataset types include, but are not limited to: index (or partition), view, lookup, collections, metrics interactions, action service, interactions, four hexagonal coordinate systems, etc.

In some cases, the datasets may or may not refer to other datasets. In certain embodiments, a dataset may refer to no other datasets, one other dataset, or multiple datasets. A dataset that does not refer to another dataset may be referred to herein as a non-referential dataset, a dataset that refers to one dataset may be referred to as a single reference dataset, and a dataset that refers to multiple datasets may be referred to as a multi-reference dataset.

In certain embodiments, some datasets can include data of the data intake and query system 102. Some such datasets may also be referred to herein as source datasets. For example, index or partition datasets can include data stored in buckets as described herein. Similarly, collection datasets can include collected data. As yet another example metrics interactions datasets can include metrics data. In some cases, a source dataset may not refer to another dataset or otherwise identified as a non-referential dataset or non-referential source dataset. However, it will be understood that in certain embodiments, a source dataset can be a single reference dataset (or single reference source dataset) and/or a multi-reference dataset (or multi-reference source dataset).

In some embodiments, certain datasets can be used to reference data in a particular source dataset. Some such datasets may be referred to herein as source reference datasets. For example, a source dataset may include certain restrictions that preclude it from making its data searchable generally. In some such cases, a source reference dataset can be used to access the data of the source dataset. For example, a collection dataset may not make its data searchable except via a lookup dataset. As such, the collection dataset may be referred to as a source dataset and the lookup dataset may be referred to as a source reference dataset. In some embodiments, a source reference dataset can correspond to or be paired with a particular source dataset. In certain embodiments, each source reference dataset references only one other (source) dataset. In such embodiments, the source reference dataset can be referred to as a single reference dataset or single source reference dataset. However, it will be understood that source reference datasets can be configured in a variety of ways and/or may reference multiple datasets (and be referred to as a multi-reference dataset or multi-source reference dataset).

In certain embodiments, a dataset can include one or more query parameters. Some such datasets may be referred to as query datasets. For example a view dataset can include a query that identifies a set of data and how to process the set of data and/or one or more query parameters. When referenced, the data intake and query system 102 can incorporate the query parameters of the query dataset into a query to be processed/executed by the query system 114. Similar to a query, a query dataset can reference one dataset (single reference dataset or single reference query dataset) or multiple datasets (multi-reference dataset or multi-reference query dataset) and/or include an instruction to access one or more datasets (e.g., from, lookup, search, etc.). Moreover, the query dataset can include multiple query parameters to process the data from the one or more datasets (e.g., union, stats, count by, sort by, where, etc.)

As mentioned, in some cases, a dataset 908 in a dataset association record 902 can be imported or inherited from another dataset association record 902. In some such cases, if the dataset association record 902 includes an imported dataset 908, it can identify the dataset 908 as an imported dataset and/or it can identify the dataset 908 as having the same dataset type as the corresponding dataset 908 from the other dataset association record 902.

Rules of a dataset association record 902 can identify types of data and one or more actions that are to be performed on the identified types of data. The rule can identify the data in a variety of ways. In some embodiments, the rule can use a field-value pair, index, or other metadata to identify data that is to be processed according to the actions of the rule. For example, a rule can indicate that the data intake and query system 102 is to perform three processes or extraction rules on data from the "main" index dataset (or multiple or all datasets of a dataset association record 902) with a field-value pair "sourcetype:foo." In certain cases, a rule can apply to one or more datasets of a dataset association record 902. In some cases, a rule can apply to all datasets of dataset association record 902. For example, the rule 910A can apply to all datasets of the shared dataset association record 902A or to all index type datasets of the shared dataset association record 902A, etc.

The actions of a rule can indicate a particular process that is to be applied to the data. Similar to dataset types, each action can have an action type. Action of the same type can have a similar characteristic or perform a similar process on the data. Non-limiting examples of action types include regex, aliasing, auto-lookup, and calculated field.

Regex actions can indicate a particular extraction rule that is to be used to extract a particular field value from a field of the identified data. Auto-lookup actions can indicate a particular lookup that is to take place using data extracted from an event to identify related information stored elsewhere. For example, an auto-lookup can indicate that when a UID value is extracted from an event, it is to be compared with a data collection that relates UIDs to usernames to identify the username associated with the UID. Aliasing actions can indicate how to relate fields from different data. For example, one sourcetype may include usernames in a "customer" field and another sourcetype may include usernames in a "user" field. An aliasing action can associate the two field names together or associate both field names with another field name, such as "username." Calculated field actions can indicate how to calculate a field from data in an event. For example, a calculated field may indicate that an average is to be calculated from the various numbers in an event and assigned to the field name "score_avg." It will be understood that additional actions can be used to process or extract information from the data as desired.

In the illustrated embodiment of FIG. 9, two dataset association records 902A, 902N (also referred to herein as dataset association record(s) 902), two dataset configuration records 904A, 904N (also referred to herein as dataset configuration record(s) 904), and two rule configuration records 906A, 906N (also referred to herein as rule configuration record(s) 906) are shown. However, it will be understood that fewer or more dataset association records 902 dataset configuration records 904, and/or rule definition records 906 can be included in the metadata catalog 521.

As mentioned, each dataset association record 902 can include a name (or other identifier) for the dataset association record 902, an identification of one or more datasets 908 associated with the dataset association record 902, and one or more rules 910. As described herein, the datasets 908 of a dataset association record 902 can be native to the dataset association record 902 or imported from another dataset association record 902. Similarly, rules of a dataset association record 902 can be native to the dataset association record 902 and/or imported from another dataset association record 902.

In the illustrated embodiment, the name of the dataset association record 902A is "shared" and includes the "main" dataset 908A, "metrics" dataset 908B, "users" dataset 908C, and "users-col" dataset 908D. In addition, the "main" dataset 908A and "metrics" dataset 908B are index datasets, the "users" dataset 908C is a lookup dataset associated with the collection "users-col" dataset 908D. Moreover, in the illustrated embodiment, the "main" dataset 908A, "metrics" dataset 908B, and "users-col" dataset 908D are non-referential source datasets and the "users" dataset 908C is a source reference dataset (and single reference dataset) that references the "users-col" dataset 908D.

In addition, in the illustrated embodiment, the dataset association record 902A includes the "X" rule 910A associated with the "main" dataset 908A and "metrics" dataset 908B. The "X" rule 910A uses a field-value pair "sourcetype:foo" to identify data that is to be processed according to an "auto lookup" action 912A, "regex" action 912B, and "aliasing" action 912C. Accordingly, in some embodiments, when data from the "main" dataset 908A is accessed, the actions 912A, 912B, 912C of the "X" rule 910A are applied to data of the sourcetype "foo."

Similar to the dataset association record 902A, the dataset association record 902N includes a name ("trafficTeam") and various native index datasets 908E, 908F ("main" and "metrics," respectively), a collection dataset 908G ("threats-col") and a lookup dataset 908H ("threats"), and a native rule 910C ("Y"). In addition, the dataset association record 902 includes a view dataset 908I ("threats-encountered"). The "threats-encountered" dataset 908I includes a query (shown in the dataset configuration record 904N) "|from traffic|lookup threats sig OUTPUT threat|where threat=*|stats count by threat" that references two other datasets 908J, 908H ("traffic" and "threats"). Thus, when the "threats-encountered" dataset 908I is referenced, the data intake and query system 102 can process and execute the identified query. Moreover, in the illustrated embodiment, the "main" dataset 908E, "metrics" dataset 908E, and "threats-col" dataset 908G are non-referential source datasets, the "threats" dataset 908H is a single source reference dataset (source reference and single reference dataset) that references the "threats-col" dataset 908G, and the "threats-encountered dataset" 908I is a multi-reference query dataset.

The dataset association record 902N also includes an imported "traffic" dataset 908J and an imported "shared.X" rule 910B. In the illustrated embodiment, the "traffic" dataset 908J corresponds to the "main" dataset 908A from the "shared" dataset association record 902A. As described herein, in some embodiments, to associate the "main" dataset 908A (from the "shared" dataset association record 902A) with the "traffic" dataset 908J (from the "trafficTeam" dataset association record 902N), the name of the dataset association record 902A ("shared") is placed in front of the name of the dataset 908A ("main"). However it will be understood that a variety of ways can be used to associate a dataset 908 from one dataset association record 902 with the dataset 908 from another dataset association record 902. As described herein, by importing the dataset "main" dataset 908A, a user using the dataset association record 902 and can reference the "main" dataset 908A and/or access the data in the "main" dataset 908A.

Similar to the "main" dataset 908A, the "X" rule 910A is also imported by the "trafficTeam" dataset association record 902N as the "shared.X" rule 910B. As described herein, by importing "X" rule 910A, a user using the "trafficTeam" dataset association record 902N can use the "X" rule 910A. Furthermore, in some embodiments, if the "X" rule 910A (or a dataset) references other datasets, such as, the "users" dataset 908C and the "users-col" dataset 908D, these datasets can be automatically imported by the "trafficTeam" dataset association record 902N. However, a user may not be able to reference these automatically imported rules (datasets) in a query.

5.8.2. Dataset Configuration Records

The dataset configuration records 904 can include the configuration and/or access information for the datasets associated with the dataset association records 902 or otherwise used or supported by the data intake and query system 102. In certain embodiments, the metadata catalog 521 includes the dataset configuration records 904 for all of the datasets 908 used or supported by the data intake and query system 102 in one or more files or entries. In some embodiments, the metadata catalog 521 includes a separate file, record, or entry for each dataset 908 or dataset configuration record 904.

The dataset configuration record 904 for each dataset 908 can identify a physical and/or logical name for the dataset, a dataset type, authorization information indicating users or credentials that have to access the dataset, access information (e.g., IP address, end point, indexer information), and/or location information (e.g., physical location of data) to enable access to the data of the dataset, etc. Furthermore, depending on the dataset type, each dataset configuration record 904 can indicate custom fields or characteristics associated with the dataset. In some embodiments, index, metrics, lookup, and collection datasets may include location information, while view datasets do not. For example, in some cases view datasets may not have data except that which is access via an index, metrics, lookup, and collection datasets. Accordingly, the content and information for the dataset association records 902 can vary depending on the dataset type.

In the illustrated embodiment, the "shared.main" dataset configuration record 904A for the "shared.main" dataset 908A indicates that it is an index data type, and includes authorization information indicating the entities that have access to the "shared.main" dataset 908A, access information that enables the data intake and query system 102 to access the data of the "shared.main" dataset 908A, and location information that indicates the location where the data is located. In some cases, the location information and access information can overlap or be combined. In addition, the dataset configuration record 904A includes a retention period indicating the length of time in which data associated with the "shared.main" dataset 908A is to be retained by the data intake and query system 102. In some embodiments, because "shared.main" is imported into the "trafficTeam" dataset association record 902N as the dataset "traffic," it may also be identified as the "trafficTeam.traffic" dataset 908J. Accordingly, in some such embodiments, the dataset configuration record 904A may include an additional identifier for "trafficTeam.traffic" or as is shown in the illustrated embodiment, it may indicate that the "trafficTeam.traffic" dataset is a dependent dataset.

Similarly, in the illustrated embodiment, the "trafficTeam.threats-encountered" dataset configuration record 904N for the "trafficTeam.threats-encountered" dataset 908I indicates that it is a view type of dataset and includes authorization information indicating the entities that have access to it. In addition, the dataset configuration record 904N includes the query for the "trafficTeam.threats-encountered" dataset 908I.

The dataset configuration record 904 can also include additional information or metadata (also referred to herein as annotations). The annotations can correspond to user annotations added by a user or to system annotations that are automatically generated by the system.

In the illustrated embodiment of FIG. 9, the dataset configuration record 904A includes a system annotation 914 that indicates the number of identified fields of the "shared.main" dataset (4), a system annotations 916 that identify the fields of the "shared.main" dataset (sig, IP_addr, userID, error), and a system annotation 918 that identifies the datasets that depend on the "shared.main" dataset ("trafficTeam.traffic" and "trafficTeam.threats-encountered"). In the illustrated embodiment, the dependent datasets annotation 918 includes reference to the "trafficTeam.traffic" dataset 908J even though it is only an identifier to import the "shared.main" dataset to the dataset association record 902N. However, in some embodiments, datasets that only import another dataset or are merely identifiers for another dataset may not be identified as dependent datasets and/or may not be included as part of a system annotation.

With further reference to the illustrated embodiment of FIG. 9, the dataset configuration record 904N includes a user annotation 920 that identifies a group associated with the dataset "trafficTeam.threats-encountered" 908I (also referred to herein as "threats-encountered"). This annotation can be used by the system to determine which group is responsible for the dataset associated with the dataset association record 902N and/or should be charged for its use. The dataset configuration record 904N also includes a system annotation 922 that identifies the datasets on which the "threats-encountered" dataset depends ("trafficTeam.traffic," which is also "shared.main" and "trafficTeam.threats"), and a system annotation 924 that identifies the number of times the "threats-encountered" dataset 908I has been used and/or accessed. In some embodiments, because trafficTeam.traffic merely imports "shared.main" it may not be considered a related dataset or may be omitted from the dependency dataset annotation 922.

In some embodiments, the data intake and query system 102 (e.g., the query system 114) creates a job ID each time a query is run or executed (e.g., each time a dataset is used or accessed). The job ID may reference a specific query run at a specific time, or in reference to a specific time, and point to results of the query. The data intake and query system 102 (e.g., the query system 114) can store the job ID in a dataset configuration record that includes the query that is run. In general, a dataset configuration record associated with a dataset that is of the type "savedsearch/view" or any other type on which a query can be run includes at least one job ID once the query included in dataset configuration record is run at least once. For example, the query included in a dataset configuration record can be run one or more times. The dataset configuration record can include the job ID for the most recent query that is run, the job ID for the first query that is run, the job IDs for some, but not all, of the queries that are run, the job IDs for all of the queries that are run, and/or any combination thereof. With further reference to the illustrated embodiment of FIG. 9, the system annotation 924 indicates that the "trafficTeam.threats-encountered" dataset 908I has been used and/or accessed 30 times. Thus, the query included in the dataset configuration record 904N may have been run 30 times. In the illustrated embodiment, the dataset configuration record 904N includes a system annotation 926 that identifies a job ID ("F341A5") of the most recent query that is run on the "trafficTeam.threats-encountered" dataset 908I. In other embodiments not illustrated, however, the dataset configuration record 904N can include a system annotation 926 that identifies the job ID of the first query that is run on the "trafficTeam.threats-encountered" dataset 908I, job IDs of some, but not all, of the queries run on the "trafficTeam.threats-encountered" dataset 908I, job IDs of all of the queries run on the "trafficTeam.threats-encountered" dataset 908I, and/or any combination thereof.

In some embodiments, the data intake and query system 102 (e.g., the query system 114) includes in a dataset configuration record not only some or all of the job IDs of a query that is run or executed, but also the results of each executed query that has a job ID present in the dataset configuration record. With further reference to the illustrated embodiment of FIG. 9, the dataset configuration record 904N includes a system annotation 928 that identifies the results of the query associated with the job ID identified by the system annotation 926 ("F341A5"). For example, the most recent results of running the dataset configuration record 904N query on the "trafficTeam.threats-encountered" dataset 908I can be a count of 2 for "threat1," a count of 8 for "threat2," and so on. In other embodiments not illustrated, the dataset configuration record 904N can include the query result of the first query that is run on the "trafficTeam.threats-encountered" dataset 908I, the query results of some, but not all, of the queries that are run on the "trafficTeam.threats-encountered" dataset 908I, the query results of all of the queries that are run on the "trafficTeam.threats-encountered" dataset 908I, and/or any combination thereof. For example, if the dataset configuration record 904N includes one or more system annotations 926 identifying multiple job IDs, then the dataset configuration record 904N may also include one or more system annotations 928 identifying the results of each job ID identified by the system annotation(s) 926. The query results can be represented in a JSON format, as a table, or in some other format, as desired.

In addition to the job ID and query results, a dataset configuration record can store additional information related to a query, such as, but not limited to, the user that executed a query, the tenant associated with the query, the time the query was executed, or the time the job ID was created, etc. The system 102 can use this information to generate statistical information about different queries and/or provide recommendations to users. For example, the system 102 can provide query recommendations based on the most frequently used queries generally or by the user, or users from the same tenant, users with similar administrative privileges or access controls, etc.

It will be understood that fewer or more annotations can be included in the dataset configuration record 904N. For example, the dataset configuration record 904N can include the identity and number of fields used by the "threats-encountered" dataset.

It will be understood that more or less information or annotations can be included in each dataset configuration record 904. For example, the dataset configuration records 904 can indicate whether the dataset is a non-referential, single reference or multi-reference dataset and/or identify any datasets that it references (by the physical or logical identifier of the datasets or other mechanism), is dependent on or that depend on it, its usage, etc. As another example, the dataset configuration records 904 can identify one or more rules associated with the dataset. Additional information regarding example annotations that can be generated and/or included in dataset configuration records 904 or in the metadata catalog 521 are described herein.

Although not illustrated in FIG. 9, it will be understood that the metadata catalog 521 can include a separate dataset configuration record 904 for the datasets 908B, 908C, 908D, 908E, 908F, 908G, 908H, and 908J. Furthermore, it will be understood that the metadata catalog 521 can include data from multiple tenants. In some cases, the data (e.g., dataset association records, dataset configuration records, and/or rule configuration records, etc.) from different tenants can be logically and/or physically segregated within the metadata catalog 521.

In some embodiments, some datasets may not have a separate dataset configuration record 904. For example, imported datasets and/or view datasets may not include a separate dataset configuration record 904. In certain embodiments, view datasets can include a query identified in a dataset association record 902, but may not have a separate dataset configuration record 904 like index, metrics, collection, and/or lookup datasets.

In some embodiments, the dataset configuration record 904 for the "traffic" dataset 908J (or other imported datasets) can indicate that the "traffic" dataset 908J is an imported version of the "shared.main" dataset 908A. In certain cases, the dataset configuration record 904 for the "traffic" dataset 908J can include a reference to the dataset configuration record 904 for the "shared.main" dataset 908A and/or can include all of the configuration information for the "shared.main" dataset 908A. In certain embodiments, the metadata catalog 521 may omit a separate dataset configuration record 904 for the "traffic" dataset 908J because that dataset is an imported dataset of the "main" dataset 908A from the "share" dataset association record 902A.

As described herein, although the dataset association records 902A, 902N each include a "main" dataset 908B, 908E and a "metrics" dataset 908B, 908F, the data intake and query system 102 can differentiate between the datasets from the different dataset association records based on the dataset association record 902 associated with the datasets. For example, the metadata catalog 521 can include separate dataset configuration records 904 for the "shared.main" dataset 908A, "trafficTeam.main" dataset 908E, "shared.metrics" dataset 908B, and the "trafficTeam.metrics" dataset 908F.

5.8.4. Annotations

In some embodiments, the system 102 stores data without type or as unstructured data. Thus, the system 102 may not "know" or have insight (e.g., include a table or other stored information) into the content of the data. For example, the system 102 may not have any insight into what fields (e.g., IP address, error code, userID, etc.) can be found in which datasets or what rules are related to what datasets. While it may be advantageous for a variety of reasons to store data without type or as unstructured data and use late binding schema to query the data, this can result in longer query times and the use of greater processing resources during query processing and execution. To decrease query times and/or processing resources used during a query, the system 102 can dynamically add information or metadata (also referred to herein as annotations) to the metadata catalog as it is learned.

In some embodiments, the annotations can be added to the dataset configuration records 904, the rule configuration records 906 or as a separate annotation entry in the metadata catalog 521, or elsewhere in the system 102. For example, as changes are made to the metadata catalog 521 or as queries are executed on the data, the system 102 can infer information or learn about the datasets and rules and update the dataset configuration records 904 and rule configuration records 906 with this information. In the illustrated embodiment of FIG. 9, dynamically generated annotations 914, 916, 918, 922, 924 are included as part of the dataset configuration records 904A, 904N. However, as mentioned, the annotations can be stored as a separate entry or data structure. For example, the system 102 can update or create an annotation entry for each annotation and store the annotations in a database, such as a relational database or table of the metadata catalog 521, or elsewhere in the system 102. When stored in a separate data structure, the annotations can identify any datasets or fields to which they are associated or related.

The updated datasets configuration records 904 (or annotation entries) can be used by the system 102 to propagate annotations to related datasets, protect datasets from deletion, improve portability, and make recommendations to a user and/or process additional queries as they are received, etc. In this way, the system 102 can provide an incrementally evolving schema or map of the data and can enable more efficient queries and/or reduce the amount of processing resources used during query execution.

5.8.4.1. Generating Annotations

In some cases, the annotations can be added to the metadata catalog 521 (in dataset configuration records 904 or as annotation entries) manually by a user or automatically by the system 102.

It will be understood that a user can manually add a variety of annotations (also referred to herein as "user annotations") to the metadata catalog 521, which can be used by the system 102 to dynamically make user recommendations, improve query processing, and/or search time. For example, a user can add or revise a dataset configuration record 904 to the metadata catalog 521 for a dataset. As part of adding/revising the dataset configuration record, the user can add annotations about the capabilities of the dataset source associated with the dataset (e.g., speed, bandwidth, parallelization, size, etc.), one or more fields of the dataset and one or more relationships between the fields, one or more datasets related to the new/revised dataset, users or groups associated with the dataset, units or preferred units for data from the dataset, etc.

In certain embodiments, the annotations can be added automatically by the system 102 in response to monitoring system 102 use and/or based on detected changes to the metadata catalog 521 (also referred to herein as "system annotations"). To generate the various system annotations, the system 102 can use one or more processes, threads, containers, isolated execution environments, etc. (generically referred to as processes). In some cases, the system 102 can use multiple processes to generate system annotations. For example, a separate process can be used to generate annotations based on parsing a query, monitoring query execution, monitoring user/groups, monitoring applications, etc. Similarly, separate processes can be used to generate annotations based on detected changes to the metadata catalog 521. For example, separate processes can be used to generate annotations in response to detecting the addition or removal of a field, dataset, unit or preferred unit, field-dataset relationship, inter-field relationship, inter-dataset relationship, etc.

Moreover, the various processes can communicate with each other to generate the system annotations. For example, consider the scenario where one process is used to generate annotations based on parsing a query and another process is used to generate annotations based on the identification of a new field or new field-dataset relationship in the metadata catalog 521. If the process that parses the query identifies and generates an annotation based on a new field for a dataset, it can alert the process that generates annotations based on new fields added to the dataset. In this way, the system 102 can effectively increase its knowledge or understanding of the data stored thereon, and use this understanding to facilitate more effective searching of the data.

5.8.4.1.1. System Annotations Based on System Use

A variety of system annotations can be generated based on monitoring system use. As non-limiting examples, system annotations can be automatically added to the metadata catalog 521 in response to parsing a query, executing a query, tracking user interactions with the system 102, tracking the use of different applications executing in the system 102, or other system use monitoring, etc.

The system annotations generated based on monitoring system use can be used for a variety of functions. For example, the system annotations generated based on monitoring system use can be used to track field use, dataset use, suggest fields or datasets to a user (e.g., frequently/infrequently used fields or datasets, related fields or datasets, similar fields or datasets, datasets that satisfy the criteria of another dataset, such as datasets that satisfy the field criteria of a view dataset, etc.), display similar datasets, suggest applications, identify groups or individuals responsible for the use of a particular dataset (e.g., determine charge back distribution), cost-based optimizations (e.g., when querying data from multiple datasets, how to prioritize which dataset to obtain first), propagate annotations to related datasets or fields, etc. Additional information regarding techniques for generating system annotations based on system use is described in the Incorporated Applications, each of which is incorporated herein by reference for all purposes.

5.8.4.1.2. System Annotations Based on Changes to the Metadata Catalog

As mentioned, in some embodiments, system 102 annotations can be added automatically to the metadata catalog 521 in response to changes in the metadata catalog 521. The changes may be the result of a manual change by a user, such as a user annotation, or an automated change by the system 102, such as a system annotation. For example, when a user adds or revises information about a first dataset, the system 102 can compare information about the first dataset with other information of other datasets to identify potential relationships or similarities. If a relationship or similarity is detected, the system 102 can add an annotation to the dataset configuration record 904 (or annotation entry) of the first dataset as well as to the dataset configuration records 904 of the other identified datasets. As another example, if the system 102 updates information for the first dataset based on a query, the system 102 can identify other datasets that are related to the first dataset and update metadata of the other identified datasets. In this way, as the system 102 is used, it can learn about the datasets, and use the information to improve search time or search capabilities. As described herein, in some cases, the system 102 can use one or more processes to identify the change to the metadata catalog 521 and generate additional annotations based on the change.

Additional information regarding techniques for generating system annotations based on changes to the metadata catalog 521 is described in the Incorporated Applications, each of which is incorporated herein by reference for all purposes.

5.8.4.2. Example Annotations

As mentioned, the metadata catalog 521 can include annotations or information about the datasets, fields, users, or applications of the system 102 and can be revised as additional information is learned. Non-limiting examples of annotations that can be added to the dataset configuration records 904, other configurations, annotation tables or entries, or other locations of the metadata catalog 521 or system 102, include but are not limited to, the identification and use of fields in a dataset, number of fields in a dataset, related fields, related datasets, number (and identity) of dependent datasets, number (and identity) of datasets depended on, capabilities of a dataset or related dataset source or provider, the identification of datasets with similar configurations or fields, units or preferred units of data obtained from a dataset, alarm thresholds, data categories (e.g., restrictions), users or groups, applications, popular field, datasets, and applications (in total or by user or group), etc. In certain cases, the annotations can be added as the system 102 monitors system use (e.g., processing queries, monitoring query execution, user interaction, etc.) or as the system 102 detects changes to the metadata catalog 521 (e.g., one manual/automated change can lead to another automated change), etc. Additional information regarding example annotations are described in the Incorporated Applications, each of which is incorporated herein by reference for all purposes.

5.8.5. Rule Configuration Records

The rule configuration records 906 can include the rules, actions, and instructions for executing the rules and actions for the rules referenced of the dataset association records 902 or otherwise used or supported by the data intake and query system 102. In some embodiments, the metadata catalog 521 includes a separate file or entry for each rule configuration record 906. In certain embodiments, the metadata catalog 521 includes the rule configuration records 906 for all of the rules 910 in one or more files or entries.

In the illustrated embodiment, a rule configuration records 906N is shown for the "shared.X" rule 910A. The rule configuration record 906N can include the specific parameters and instructions for the "shared.X" rule 910A. For example, the rule configuration record 906N can identify the data that satisfies the rule (sourcetype:foo of the "main" dataset 908A). In addition, the rule configuration record 906N can include the specific parameters and instructions for the actions associated with the rule. For example, for the "regex" action 912B, the rule configuration record 906N can indicate how to parse data with a sourcetype "foo" to identify a field value for a "customerID" field, etc. With continued reference to the example, for the "aliasing" action 912C, the rule configuration record 906N can indicate that the "customerID" field corresponds to a "userNumber" field in data with a sourcetype "roo." Similarly, for the "autolookup" action 912A, the rule configuration record 906N can indicate that the field value for the "customerID" field can be used to lookup a customer name using the "users" dataset 908C and "users-col" dataset 908D.

It will be understood that more or less information can be included in each rule configuration record 906. For example, the rule configuration records 906 can identify the datasets or dataset association records 902 to which the rule applies, indicate whether a rule is imported, indicate include authorizations and/or access information to use the rule, etc.

Similar to the dataset configuration records 904, the metadata catalog 521 can include rule configuration records 906 for the various rules 910 of the dataset association record 902 or other rules supported for use by the data intake and query system 102. For example, the metadata catalog 521 can include rule configuration record 906 for the "shared.X" rule 910A and the "trafficTeam.Y" rule 910C.

As described herein, the dataset association records 902, dataset configuration records 904, and/or rule configuration records 906 can be used by the system 102 to interpret dataset identifiers in a query, verify/authenticate a user's permissions and/or authorizations for different datasets, identify additional processing as part of the query, identify one or more source datasets from which to retrieve data as part of the query, determine how to extract data from datasets, identify configurations/definitions/dependencies to be used by search nodes to execute the query, etc.

In certain embodiments, the dataset association records 902, dataset configuration records 904, and/or rule configuration records 906 can be used to identify primary datasets and secondary datasets. The primary datasets can include datasets that are to be used to execute the query. The secondary datasets can correspond to datasets that are directly or indirectly referenced by the query but are not used to execute the query. Similarly, the dataset association records 902, dataset configuration records 904, and/or rule configuration records 906 can be used to identify rules (or primary rules) that are to be used to execute the query.

Accordingly, the metadata catalog 521 can be used to identify datasets and configuration parameters to be used in a particular query. As a non-limiting example, the query system 114 can receive a user query from a client device 106. While the user query may refer to one or more datasets, based on the data in the metadata catalog 521, the query system 114 can determine whether the referenced datasets in the user query are primary datasets or secondary datasets. After identifying the primary datasets, the query system 114 can determine the configuration data to use to access the primary datasets (e.g., location, authorizations, etc.). In addition, based on the information in the metadata catalog 521, the query system 114 can generate a system query from the user query. The system can then process and execute the system query. In this way, the query system 114 can abstract away some of the complexities related to the datasets that it stores, thereby making it easier for a user to learn about their data. Additional information and examples regarding the parsing of the metadata catalog based on a query to generate a system query and configuration data is described in the Incorporated Applications, each of which is incorporated herein by reference for all purposes.

5.9. Control Plane System

The control plane system 524 can monitor and manage the various components of the data intake and query system 108, and can be implemented as a distinct computing device, virtual machine, container, container of a pod, or a process or thread associated with a container. In certain embodiments, the control plane system 524 can be implemented using Kubernetes or Swarm. In some embodiments, the control plane system 524 may be part of a sidecar or sidecar container that allows communication between various components of the data intake and query system 102. In some cases, the control plane system 524 can be implemented in a shared computing resource environment (e.g., separate Kubernetes cluster or namespace) that is separate from and in communication with the (other components) data intake and query system 102.

The control plane system 524 can handle resource management, creation/destruction of the components of the data intake and query system 102, high availability, load balancing, application or component upgrades/rollbacks (e.g., version upgrades, rollbacks, etc.), logging and monitoring, storage, networking, service discovery, and performance and scalability, etc., and otherwise handle the management and configuration of the control aspects of the components of the indexing system 112, query system 114, or any of the components of the data intake and query system 102, especially in a shared computing resource environment. For example, in a containerized environment, the control plane system can provide containerization management of the containers used to instantiate the components of the data intake and query system 102.

As a non-limiting example, the control plane system 524 can configure and/or determine whether to generate or terminate one or more instances of the buffers 606, 610, streaming data processors 608, indexing nodes 704, ingest managers 706, partition manager 708, indexers 710, bucket managers 714, search service managers 802, search heads 804, search nodes 806, cache manager 816, etc., or other components of the data intake and query system 102. In some cases, the control plane system 524 can monitor the use of various components by tenant and generate/terminate components of the data intake and query system 102 for individual components based on individual uses and/or needs of different tenants.

In certain embodiments, the control plane system 524 can determine to generate or destroy one or more instances of a component of the data intake and query system based on a utilization rate or availability, or a user request. In some cases, the control plane system 524 can monitor the available resources of a hosting computing device and request additional resources in a shared resource environment, based on workload of a component instantiated on the hosting computing device (e.g., indexing nodes 704, search heads 804, search nodes 806, etc.) or create, destroy, or reassign components based on workload. Similarly, in certain embodiments, the control plane system 524 can monitor or communicate with the resource catalog 720, 810 to identify the workload of one or more of the indexing nodes 704 or search nodes 806. The control plane system 524 can make any of the aforementioned changes on a tenant-by-tenant basis.

In certain cases, the control plane system 524 can determine whether to generate an additional indexing node 704 based on the amount of data being indexed by the indexing nodes 704. If the amount satisfies a threshold, the control plane system 524 can generate an additional indexing node 704. Similarly, if one or more of the indexing nodes 704 are underutilized, the control plane system 524 can de-allocate or terminate an indexing node 704. The control plane system 524 can make any of the aforementioned changes on a tenant-by-tenant basis.

In some cases, the control plane system 524 can determine whether to generate an additional search node 806 based on the number of queries received by the query system 114 or based on another search node 806 becoming unavailable or unresponsive. Similarly, the control plane system 524 can determine that additional search heads 804 should be generated to handle an influx of queries (or number of queries satisfying a threshold) or that some search heads 804 can be de-allocated or terminated based on a reduction in the number of queries received (or number of queries satisfying a different threshold). The control plane system 524 can make any of the aforementioned changes on a tenant-by-tenant basis.

As instances of components are instantiated, the control plane system 524 can configure the components for use with other components. This can include configuring the component itself. For example, if a new indexing node 704 is generated, the control plane system 524 can configure the indexing node 704 for use, such as, by providing it configuration information related to various policies of the indexing node 704, or by instructing the indexing node 704 to provide a status update to a resource catalog 720 informing the resource catalog that it is available for indexing, etc.

The control plane system 524 can configure components for use by updating a resource catalog 720, 810 regarding the existence/termination of a component. As described herein, the resource catalog 720, 810 can be used to assign tasks to components of the data intake and query system 102. For example, the control plane system 524 can update a resource catalog 720 regarding a new indexing node 704 that is available for indexing data or update the resource catalog 810 (as noted in some cases resource catalog 720 and 810 can be the same resource catalog) regarding a new search node 806 that is available for searching. As such the new indexing node 704 can be assigned to index incoming data.

In some embodiments, the control plane system 524 can instruct a hosting computing device to generate instances of a component based on an image that the control plane system 524 provides to the hosting computing device. For example, to generate a new search node 806, the control plane system 524 can provide an image of the search node 806 to a hosting computing device. The hosting computing device can generate an instance of the search node 806 using the image.

It certain embodiments, developers or tenants can use the control plane system 524 to update various components of the data intake and query system 102 to provide modified components. For example, the developer or tenant can request the control plane system 524 to update various components to a new version of software or to modify the configurations of one or more components. The control plane system 524 can communicate with the relevant components to provide them with the new version or configurations. In some cases, the control plane system 524 can have new instances of modified components instantiated for one or more tenants based on configurations received by those tenants. In some such cases, the pre-modified components can be terminated and/or assigned to process data for different tenants.

In some cases, tenants can use the control plane system to obtain tenant-specific components. For example, if a tenant does not want to share components with other tenants in a multi-tenant environment, the tenant can request the control plane system 524 to instantiate some or all of the other components of a data intake and query system 102 for use by the tenant. Similarly, if developers have created a new version of software, they can use the control plane system 524 to instantiate and test the new version on some or all components of the data intake and query system 102. In some such cases, the control plane system 524 can generate a separate data intake and query system 102 for testing the new version of the components or system 102.

In some embodiments, the various systems of the data intake and query system 102 can each have a separate control plane system 524 and/or the functionality of the control plane system 524 can be implemented by another component. For example, the indexing system 112 can include a distinct control plane system 524 (or indexing system manager) that is separate from a control plane system (or query system manager) of the query system 114. In certain embodiments, control plane systems 524 can be implemented for different components of the data intake and query system 102 (e.g., one control plane systems 524 for indexing nodes 704 and another for ingestion managers 716, etc.).

6.0. Data Intake and Query System Functions

As described herein, the various components of the data intake and query system 102 can perform a variety of functions associated with the intake, indexing, storage, and querying of data from a variety of sources. It will be understood that any one or any combination of the functions described herein can be combined as part of a single routine or method. For example, a routine can include any one or any combination of one or more data ingestion functions, one or more indexing functions, and/or one or more searching functions.

6.1 Intake

Figure 10:
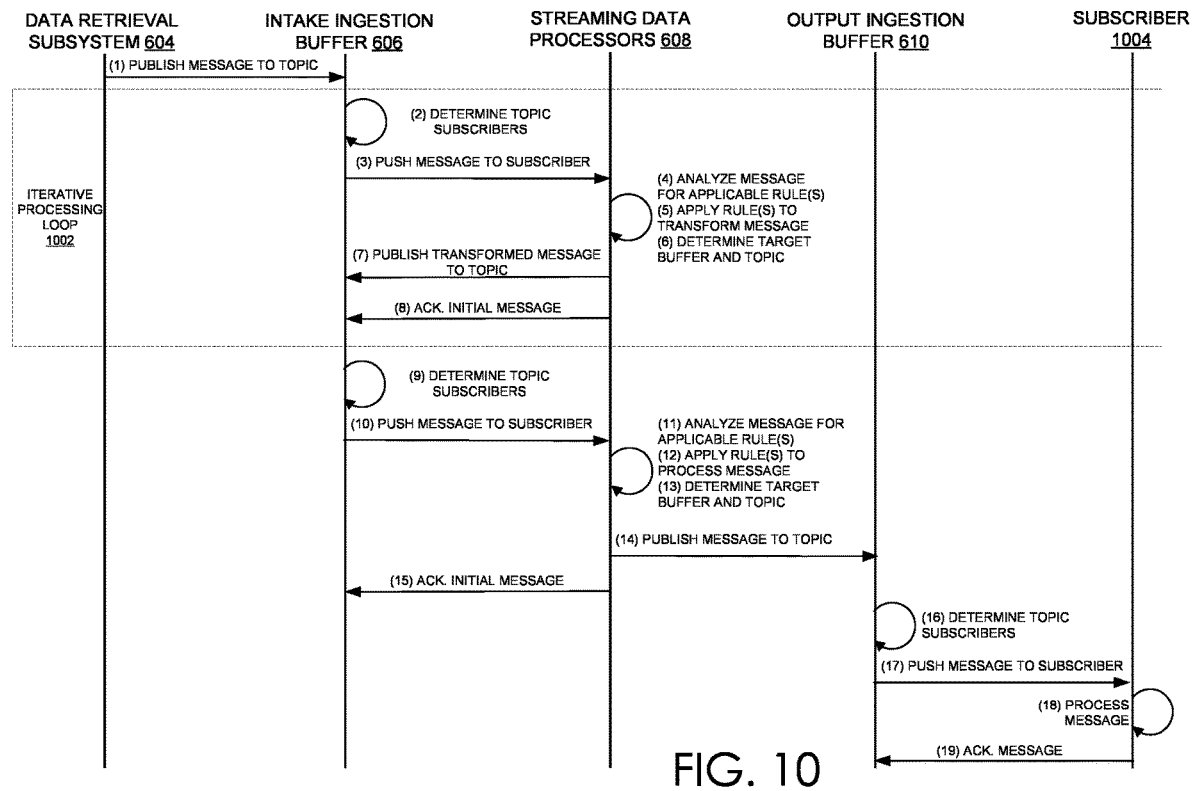
FIG. 10 is a data flow diagram depicting illustrative interactions for processing data through an intake system.

As discussed above, ingestion into the data intake and query system 102 can be facilitated by an intake system 110, which functions to process data according to a streaming data model, and make the data available as messages on an output ingestion buffer 610, categorized according to a number of potential topics. Messages may be published to the output ingestion buffer 610 by a streaming data processors 608, based on preliminary processing of messages published to an intake ingestion buffer 606. The intake ingestion buffer 606 is, in turn, populated with messages by one or more publishers, each of which may represent an intake point for the data intake and query system 102. The publishers may collectively implement a data retrieval subsystem 604 for the data intake and query system 102, which subsystem 604 functions to retrieve data from a host device 104 and publish the data in the form of a message on the intake ingestion buffer 606. A flow diagram depicting an illustrative embodiment for processing data at the intake system 110 is shown at FIG. 10. While the flow diagram is illustratively described with respect to a single message, the same or similar interactions may be used to process multiple messages at the intake system 110. Additional details regarding an embodiment for processing data at the intake system is described in the Incorporated Applications, each of which is incorporated herein by reference for all purposes.

As shown in FIG. 10, processing of data at the intake system 110 can illustratively begin at (1), where a data retrieval subsystem 604 or a host device 104 publishes a message to a topic at the intake ingestion buffer 606. The publication of a message at (1) is intended to include publication under either push- or pull-based models.

As discussed above, the data retrieval subsystem 604 may generate the message based on data received from a forwarder 602 and/or from one or more host devices 104. In some instances, generation of a message may include converting a format of the data into a format suitable for publishing on the intake ingestion buffer 606. Generation of a message may further include determining a topic for the message. In one embodiment, the data retrieval subsystem 604 selects a topic based on a host device 104 from which the data is received, or based on the specific publisher (e.g., intake point) on which the message is generated. For example, each host device 104 or specific publisher may be associated with a particular topic on the intake ingestion buffer 606 to which corresponding messages are published. In some instances, the same source data may be used to generate multiple messages to the intake ingestion buffer 606 (e.g., associated with different topics).

After receiving a message from a publisher, the intake ingestion buffer 606, at (2), determines subscribers to the topic. For the purposes of example, it will be associated that at least one device of the streaming data processors 608 has subscribed to the topic (e.g., by previously transmitting to the intake ingestion buffer 606 a subscription request). As noted above, the streaming data processors 608 may be implemented by a number of (logically or physically) distinct devices. As such, the streaming data processors 608, at (2), may operate to determine which devices of the streaming data processors 608 have subscribed to the topic (or topics) to which the message was published.

Thereafter, at (3), the intake ingestion buffer 606 publishes the message to the streaming data processors 608 in accordance with the pub-sub model. This publication may correspond to a "push" model of communication, whereby an ingestion buffer determines topic subscribers and initiates transmission of messages within the topic to the subscribers. While interactions of FIG. 10 are described with reference to such a push model, in some embodiments, a pull model of transmission may additionally or alternatively be used. Illustratively, rather than an ingestion buffer determining topic subscribers and initiating transmission of messages for the topic to a subscriber (e.g., the streaming data processors 608), an ingestion buffer may enable a subscriber to query for unread messages for a topic, and for the subscriber to initiate transmission of the messages from the ingestion buffer to the subscriber. Thus, an ingestion buffer (e.g., the intake ingestion buffer 606) may enable subscribers to "pull" messages from the buffer. As such, interactions of FIG. 10 (e.g., including interactions (2) and (3) as well as (9), (10), (16), and (17) described below) may be modified to include pull-based interactions (e.g., whereby a subscriber queries for unread messages and retrieves the messages from an appropriate ingestion buffer).

On receiving a message, the streaming data processors 608, at (4), analyze the message to determine one or more rules applicable to the message. As noted above, rules maintained at the streaming data processors 608 can generally include selection criteria indicating messages to which the rule applies. This selection criteria may be formatted in the same manner or similarly to extraction rules, discussed in more detail below, and may include any number or combination of criteria based on the data included within a message or metadata of the message, such as regular expressions based on the data or metadata.

On determining that a rule is applicable to the message, the streaming data processors 608 can apply to the message one or more processing sub-rules indicated within the rule. Thus, at (5), the streaming data processors 608 applies the rule (or sub-rule) to transform the data of the message.

At (6), the streaming data processors 608 can determine a target ingestion buffer and topic for the transformed message based on the rule determined to apply to the message. Thereafter, the streaming data processors 608 publishes the message to the destination buffer and topic.

For the purposes of illustration, the interactions of FIG. 10 assume that, during an initial processing of a message, the streaming data processors 608 determines (e.g., according to a rule of the data processor) that the message should be republished to the intake ingestion buffer 606, as shown at (7). The streaming data processors 608 further acknowledges the initial message to the intake ingestion buffer 606, at (8), thus indicating to the intake ingestion buffer 606 that the streaming data processors 608 has processed the initial message or published it to an intake ingestion buffer. The intake ingestion buffer 606 may be configured to maintain a message until all subscribers have acknowledged receipt of the message. Thus, transmission of the acknowledgement at (8) may enable the intake ingestion buffer 606 to delete the initial message.

It is assumed for the purposes of these illustrative interactions that at least one device implementing the streaming data processors 608 has subscribed to the topic to which the transformed message is published. Thus, the streaming data processors 608 is expected to again receive the message (e.g., as previously transformed the streaming data processors 608), determine whether any rules apply to the message, and process the message in accordance with one or more applicable rules. In this manner, interactions (2) through (8) may occur repeatedly, as designated in FIG. 10 by the iterative processing loop 1002. By use of iterative processing, the streaming data processors 608 may be configured to progressively transform or enrich messages obtained at host devices 104. Moreover, because each rule may specify only a portion of the total transformation or enrichment of a message, rules may be created without knowledge of the entire transformation. For example, a first rule may be provided by a first system to transform a message according to the knowledge of that system (e.g., transforming an error code into an error descriptor), while a second rule may process the message according to the transformation (e.g., by detecting that the error descriptor satisfies alert criteria). Thus, the streaming data processors 608 enable highly granulized processing of data without requiring an individual entity (e.g., user or system) to have knowledge of all permutations or transformations of the data.

After completion of the iterative processing loop 1002, the interactions of FIG. 10 proceed to interaction (9), where the intake ingestion buffer 606 again determines subscribers of the message. The intake ingestion buffer 606, at (10), the transmits the message to the streaming data processors 608, and the streaming data processors 608 again analyze the message for applicable rules, process the message according to the rules, determine a target ingestion buffer and topic for the processed message, and acknowledge the message to the intake ingestion buffer 606, at interactions (11), (12), (13), and (15). These interactions are similar to interactions (4), (5), (6), and (8) discussed above, and therefore will not be re-described. However, in contrast to interaction (13), the streaming data processors 608 may determine that a target ingestion buffer for the message is the output ingestion buffer 610. Thus, the streaming data processors 608, at (14), publishes the message to the output ingestion buffer 610, making the data of the message available to a downstream system.

FIG. 10 illustrates one processing path for data at the streaming data processors 608. However, other processing paths may occur according to embodiments of the present disclosure. For example, in some instances, a rule applicable to an initially published message on the intake ingestion buffer 606 may cause the streaming data processors 608 to publish the message out ingestion buffer 610 on first processing the data of the message, without entering the iterative processing loop 1002. Thus, interactions (2) through (8) may be omitted.

In other instances, a single message published to the intake ingestion buffer 606 may spawn multiple processing paths at the streaming data processors 608. Illustratively, the streaming data processors 608 may be configured to maintain a set of rules, and to independently apply to a message all rules applicable to the message. Each application of a rule may spawn an independent processing path, and potentially a new message for publication to a relevant ingestion buffer. In other instances, the streaming data processors 608 may maintain a ranking of rules to be applied to messages, and may be configured to process only a highest ranked rule which applies to the message. Thus, a single message on the intake ingestion buffer 606 may result in a single message or multiple messages published by the streaming data processors 608, according to the configuration of the streaming data processors 608 in applying rules.

While the rules above are described as making various illustrative alterations to messages, various other alterations are possible within the present disclosure. For example, rules in some instances be used to remove data from messages, or to alter the structure of the messages to conform to the format requirements of a downstream system or component. Removal of information may be beneficial, for example, where the messages include private, personal, or confidential information which is unneeded or should not be made available by a downstream system. In some instances, removal of information may include replacement of the information with a less confidential value. For example, a mailing address may be considered confidential information, whereas a postal code may not be. Thus, a rule may be implemented at the streaming data processors 608 to replace mailing addresses with a corresponding postal code, to ensure confidentiality. Various other alterations will be apparent in view of the present disclosure.

As discussed above, the rules applied by the streaming data processors 608 may eventually cause a message containing data from a host device 104 to be published to a topic on an output ingestion buffer 610, which topic may be specified, for example, by the rule applied by the streaming data processors 608. The output ingestion buffer 610 may thereafter make the message available to downstream systems or components. These downstream systems or components are generally referred to herein as "subscribers." For example, the indexing system 112 may subscribe to an indexing topic 642, the query system 114 may subscribe to a search results topic 648, a client device 106 may subscribe to a custom topic 652A, etc. In accordance with the pub-sub model, the output ingestion buffer 610 may transmit each message published to a topic to each subscriber of that topic, and resiliently store the messages until acknowledged by each subscriber (or potentially until an error is logged with respect to a subscriber). As noted above, other models of communication are possible and contemplated within the present disclosure. For example, rather than subscribing to a topic on the output ingestion buffer 610 and allowing the output ingestion buffer 610 to initiate transmission of messages to the subscriber 1004, the output ingestion buffer 610 may be configured to allow a subscriber 1004 to query the buffer 610 for messages (e.g., unread messages, new messages since last transmission, etc.), and to initiate transmission of those messages form the buffer 610 to the subscriber 1004. In some instances, such querying may remove the need for the subscriber 1004 to separately "subscribe" to the topic.

Accordingly, at (16), after receiving a message to a topic, the output ingestion buffer 610 determines the subscribers to the topic (e.g., based on prior subscription requests transmitted to the output ingestion buffer 610). At (17), the output ingestion buffer 610 transmits the message to a subscriber 1004. Thereafter, the subscriber may process the message at (18). Illustrative examples of such processing are described below, and may include (for example) preparation of search results for a client device 106, indexing of the data at the indexing system 112, and the like. After processing, the subscriber can acknowledge the message to the output ingestion buffer 610, thus confirming that the message has been processed at the subscriber.

In accordance with embodiments of the present disclosure, the interactions of FIG. 10 may be ordered such that resiliency is maintained at the intake system 110. Specifically, as disclosed above, data streaming systems (which may be used to implement ingestion buffers) may implement a variety of techniques to ensure the resiliency of messages stored at such systems, absent systematic or catastrophic failures. Thus, the interactions of FIG. 10 may be ordered such that data from a host device 104 is expected or guaranteed to be included in at least one message on an ingestion system until confirmation is received that the data is no longer required.

For example, as shown in FIG. 10, interaction (8)—wherein the streaming data processors 608 acknowledges receipt of an initial message at the intake ingestion buffer 606—can illustratively occur after interaction (7)—wherein the streaming data processors 608 republishes the data to the intake ingestion buffer 606. Similarly, interaction (15)—wherein the streaming data processors 608 acknowledges receipt of an initial message at the intake ingestion buffer 606—can illustratively occur after interaction (14)—wherein the streaming data processors 608 republishes the data to the intake ingestion buffer 606. This ordering of interactions can ensure, for example, that the data being processed by the streaming data processors 608 is, during that processing, always stored at the ingestion buffer 606 in at least one message. Because an ingestion buffer 606 can be configured to maintain and potentially resend messages until acknowledgement is received from each subscriber, this ordering of interactions can ensure that, should a device of the streaming data processors 608 fail during processing, another device implementing the streaming data processors 608 can later obtain the data and continue the processing.

Similarly, as shown in FIG. 10, each subscriber 1004 may be configured to acknowledge a message to the output ingestion buffer 610 after processing for the message is completed. In this manner, should a subscriber 1004 fail after receiving a message but prior to completing processing of the message, the processing of the subscriber 1004 can be restarted to successfully process the message. Thus, the interactions of FIG. 10 can maintain resiliency of data on the intake system 102 commensurate with the resiliency provided by an individual ingestion buffer 606.

While message acknowledgement is described herein as an illustrative mechanism to ensure data resiliency at an intake system 110, other mechanisms for ensuring data resiliency may additionally or alternatively be used.

As will be appreciated in view of the present disclosure, the configuration and operation of the intake system 110 can further provide high amounts of security to the messages of that system. Illustratively, the intake ingestion buffer 606 or output ingestion buffer 610 may maintain an authorization record indicating specific devices or systems with authorization to publish or subscribe to a specific topic on the ingestion buffer. As such, an ingestion buffer may ensure that only authorized parties are able to access sensitive data. In some instances, this security may enable multiple entities to utilize the intake system 110 to manage confidential information, with little or no risk of that information being shared between the entities. The managing of data or processing for multiple entities is in some instances referred to as "multi-tenancy."

Illustratively, a first entity may publish messages to a first topic on the intake ingestion buffer 606, and the intake ingestion buffer 606 may verify that any intake point or host device 104 publishing to that first topic be authorized by the first entity to do so. The streaming data processors 608 may maintain rules specific to the first entity, which the first entity may illustrative provide through authenticated session on an interface (e.g., GUI, API, command line interface (CLI), etc.). The rules of the first entity may specify one or more entity-specific topics on the output ingestion buffer 610 to which messages containing data of the first entity should be published by the streaming data processors 608. The output ingestion buffer 610 may maintain authorization records for such entity-specific topics, thus restricting messages of those topics to parties authorized by the first entity. In this manner, data security for the first entity can be ensured across the intake system 110. Similar operations may be performed for other entities, thus allowing multiple entities to separately and confidentially publish data to and retrieve data from the intake system.

6.2. Indexing

Figure 11:
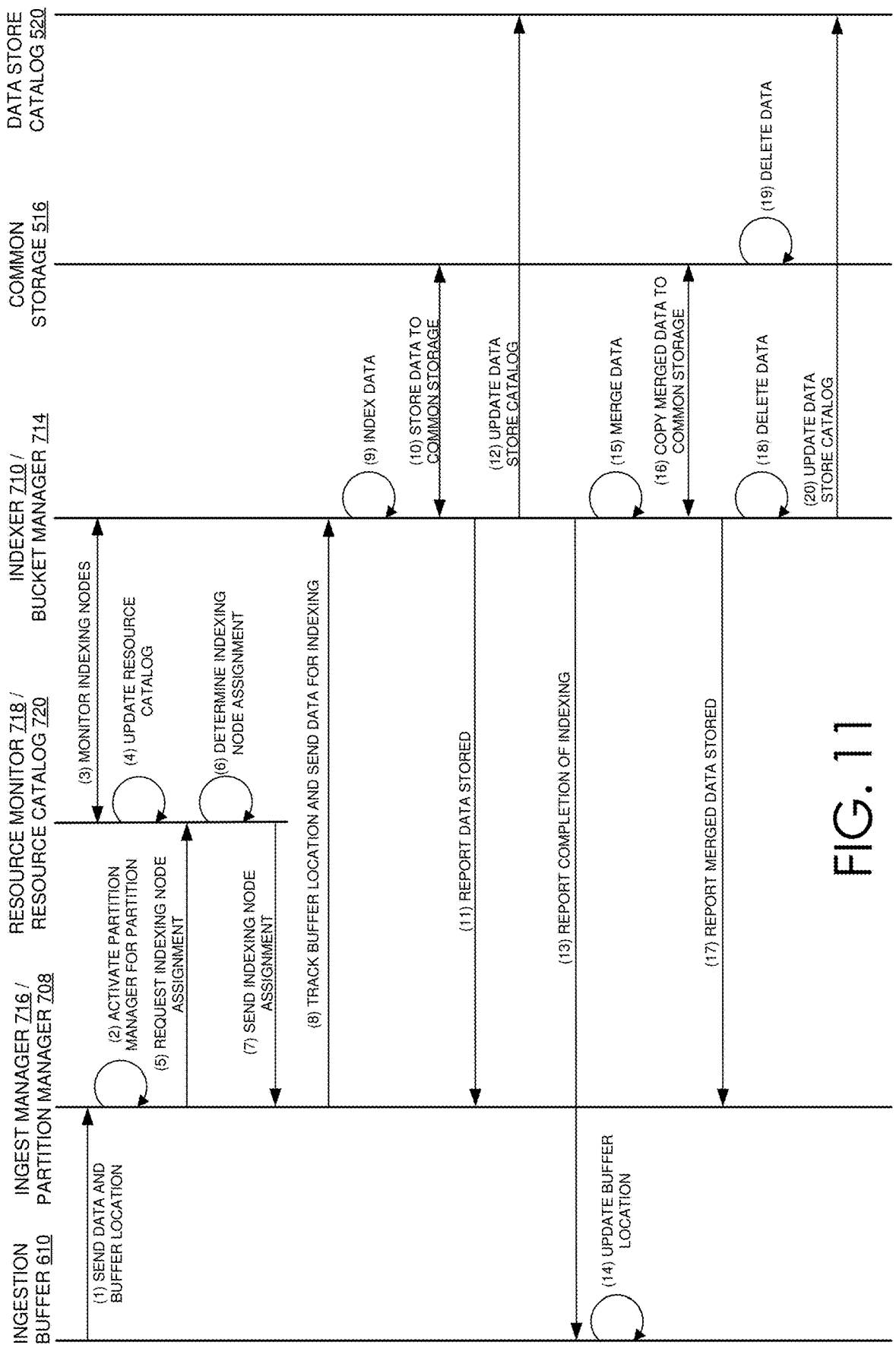
FIG. 11 is a data flow diagram illustrating an embodiment of the data flow and communications between a variety of the components of the data intake and query system during indexing.

FIG. 11 is a data flow diagram illustrating an embodiment of the data flow and communications between a variety of the components of the data intake and query system 102 during indexing. Specifically, FIG. 11 is a data flow diagram illustrating an embodiment of the data flow and communications between an ingestion buffer 610, an ingest manager 706, a partition manager 708, a resource monitor 718, a resource catalog 720, an indexing node 704 or an indexer 710 or bucket manager 714, shared storage system 116, and/or a data store catalog 520. However, it will be understood, that in some of embodiments, one or more of the functions described herein with respect to FIG. 11 can be omitted, performed in a different order and/or performed by a different component of the data intake and query system 102. Accordingly, the illustrated embodiment and description should not be construed as limiting. Additional details regarding an embodiment of the data flow and communications between a variety of the components of the data intake and query system 102 during indexing is described in the Incorporated Applications, each of which is incorporated herein by reference for all purposes.

At (1), the ingestion buffer 610 of the intake system 110 sends data records and buffer locations using one or more partitions to the ingest manager 706. A buffer location can refer to the location in the ingestion buffer 610 where a particular data record can be accessed. In some embodiments, a data record can include data associated with a particular tenant or a reference to a location (e.g. physical or logical directory, file name, etc.) that stores the data associated with the tenant that is to be processed by the indexing system 112, a tenant identifier, etc.

At (2), the ingest manager 706 activates a partition manager 708 for a partition. As described herein, the ingest manager 706 can receive data records from the ingestion buffer 610 across multiple partitions. In some embodiments, the ingest manager 706 can activate (for example, generate or assign) a particular partition manager 708 for a particular partition of the ingestion buffer 610. In this way, the particular partition manager 708 receives the data records corresponding to the particular partition of the ingestion buffer 610. In some cases, the ingest manager 706 activates a different partition manager 708 for each of the partitions of the ingestion buffer 610. In some cases, the ingest manager 706 activates a partition manager 708 to manage data records from multiple partitions. In some embodiments, the ingest manager 706 can activate a partition manager 708 based on the output of an additional partition from the intake system 110, based on a partition manager 708 becoming unresponsive or unavailable, etc. In some embodiments, the partition manager 708 can be a copy of the ingest manager 706 or a copy of a template process. In certain embodiments, the partition manager 708 can be instantiated in a separate container from the ingest manager 706.

At (3), the resource monitor 718 monitors the indexing nodes 704 of the indexing system 112. As described herein, monitoring the indexing nodes 704 can include requesting and/or receiving status information from the indexing nodes 704. In some embodiments, the resource monitor 718 passively receives status information from the indexing nodes 704 without explicitly requesting the information. For example, the indexing nodes 704 can be configured to periodically send status updates to the resource monitor. In certain embodiments, the resource monitor 718 receives status information in response to requests made by the resource monitor 718. As described herein, the status information can include any one or any combination of indexing node identifiers, metrics (e.g., CPU utilization, available memory), network architecture data, or indexing node assignments, etc.

At (4), the resource monitor 718 can use the information received from the indexing nodes 704 to update the resource catalog 720. As the status of indexing nodes 704 change over time, the resource monitor 718 can update the resource catalog 720. In this way, the resource monitor 718 can maintain the resource catalog 720 with information about the indexing nodes 704 of the indexing system 112.

It will be understood that (3) and (4) may be repeated together periodically, according to a schedule, policy, or algorithm, such that the current (or reasonably current) availability, responsiveness, and/or utilization rate of the indexing nodes 704 and/or indexers 710 is stored in resource catalog 720. For example, a time-based schedule may be used so that (3) and (4) may be performed every X number of seconds, or every X minute(s), and so forth. The performance of (3) on a periodic basis may be referred to as a "heartbeat."

At (5), a partition manager 708 assigned to distribute one or more data records from a partition of the ingestion buffer 610 to one or more indexers 710 requests an indexing node assignment from the resource monitor 718 and/or resource catalog 720. In some cases, the partition manager 708 requests an indexing node assignment based on an indexing node mapping policy. The indexing node mapping policy can use any one or any combination of data identifiers, time period, etc. to indicate how indexing nodes 704 should be assigned to process data records. In some cases, based on the indexing node mapping policy, the partition manager 708 requests an indexing node assignment for each data record or for a group of data records. For example, the partition manager 708 can request an indexing node assignment for some or all data records associated with the same tenant identifier or other data identifier. In some such cases, the partition manager 708 can include the data identifier associated with the data record(s) in its request for an indexing node assignment.

At (6) the resource monitor 718 identifies the indexing node assignment based on the indexing node mapping policy. As described herein, the indexing node mapping policy can use a variety of techniques to make an indexing node assignment. In some cases, the indexing node mapping policy can indicate that indexing node assignments are to be made based on any one or any combination of: a data identifier associated with the data record(s), availability of indexing nodes or other information from the resource catalog 720 such as indexing node identifiers associated with the indexing nodes 704, a hashing or consistent hashing scheme, a time period, etc.

In some embodiments, based on the indexing node mapping policy, the resource monitor 718 identifies available indexing nodes using the information from the resource catalog 720 and assigns one of the available indexing nodes 704 to process the data record. As described herein, the resource monitor 718 can identify an available indexing node using various techniques. For example, the resource monitor 718 can consult the resource catalog 720 to identify an available indexing node.

At (7), the resource monitor 718 communicates the indexing node assignment to the partition manager 708. In some cases, the indexing node assignment can include an identifier of the indexing node 704 that is to process the data record. In certain embodiments, the indexing node assignment can include other information, such as a time interval for which the assignment is to last, a backup indexing node 704 in the event the assigned indexing node 704 is not available or fails, etc. The partition manager 708 can use the information from the indexing node assignment to communicate the data records to a particular indexing node.

In some embodiments, (5), (6), and (7) can be omitted. For example, instead of requesting and receiving an indexing node assignment from the resource monitor 718, the partition manager 708 can consult an indexing node assignment listing that identifies recent indexing node assignments. The indexing node assignment listing can include a table or list of data identifiers and indexing nodes 704 that have processed, or are assigned to process, data associated with the data identifiers. The table or list can be stored as a lookup table or in a database, etc. In some embodiments, if the partition manager 708 determines that an indexing node 704 is already assigned to process data associated with the data identifier, the partition manager 708 can omit (5), (6), and (7), and send the data to the assigned indexing node 704 for processing. In certain embodiments, if the partition manager 708 determines that an indexing node 704 is not assigned to process data associated the data identifier, the partition manager 708 can proceed with steps (5), (6), and (7), and store the results of the indexing node assignment in the indexing node assignment listing.

In some cases, a different indexing node assignment listing can be stored on or associated with each different partition manager 708. For example, a particular partition manager 708 can manage its own indexing node assignment listing by cataloging the indexing node assignments received from the resource monitor 718. As another example, the ingest manager 706 can manage some or all of the indexing node assignment listings of its partition managers 708. In some cases, an indexing node assignment listing can be associated with some or all of the partition managers 708. For example, the ingest manager 706 or the partition managers 708 can manage the indexing node assignment listing by cataloging the indexing node assignments received from the resource monitor 718.

At (8), the ingest manager 706 tracks the buffer location and the partition manager(s) 708 communicate the data to the indexer(s) 710. As described herein, the ingest manager 706 can track (and/or store) the buffer location for the various partitions received from the ingestion buffer 610. In addition, as described herein, the partition manager 708 can forward the data received from the ingestion buffer 610 to the indexer(s) 710 for processing. In various implementations, as previously described, the data from ingestion buffer 610 that is sent to the indexer(s) 710 may include a path to stored data, e.g., data stored in shared storage system 116 or another shared storage system, which is then retrieved by the indexer 710 or another component of the indexing node 704.

At (9), the indexer 710 processes the data records. As described herein, in some cases, the data records include the data that is to be further processed by the indexing node 704. In some such embodiments, the indexing node 704 can process the data in the data records. In certain embodiments, the data records include a reference to the data that is to be further processed by the indexing node 704. In some such embodiments, the indexing node 704 can access and process the data using the reference in the data record. As described herein, the indexer 710 can perform a variety of functions, enrichments, or transformations on the data as it is indexed. For example, the indexer 710 can parse the data, identify events from the data, identify and associate timestamps with the events, associate metadata or one or more field values with the events, group events (e.g., based on time, partition, and/or tenant ID, etc.), etc. Furthermore, the indexer 710 can generate buckets based on a bucket creation policy and store the events in the hot buckets, which may be stored in a data store 712 of the indexing node 704 associated with that indexer 710 (see FIGS. 7A and/or 7B). As described herein, when generating buckets, the indexer 710 can generate separate buckets for data associated with different tenants and/or indexes.

With reference to (1), (8), and (9), it will be understood that data associated with different data identifiers can be concurrently received, distributed, and/or processed by the same partition of the ingestion buffer 610, the same partition manager 708 and/or the same indexer 710. Similarly, data associated with the same data identifier can be concurrently received, distributed, and/or processed by different partitions of the ingestion buffer 610, different partition managers 708 and/or different indexers 710.

At (10), the indexer 710 copies and/or stores the data to shared storage system 116. For example, the indexer 710 can determine (and/or the partition manager 708 can instruct the indexer 710) to copy the data to shared storage system 116 based on a bucket roll-over policy. The bucket roll-over policy can use any one or any combination of bucket size, data size, time period, etc. to determine that the data is to be copied to shared storage system 116.

As described herein, the partition manager and/or indexer 710 can use different bucket roll-over policies for buckets associated with different data identifiers. For example, the indexer 710 can use one bucket roll-over policy (or thresholds) for buckets associated with one tenant and a bucket roll-over policy (or thresholds) for buckets associated with a different tenant. As such, an indexer 710 may copy data associated with one data identifier more or less frequently than data associated with another identifier, or use different criteria to determine when to copy data associated with the different data identifiers.

As part of storing the data to shared storage system 116, the indexer 710 can verify or obtain acknowledgements that the data is stored successfully. When storing the data to shared storage system 116, the indexer 710 can physically and/or logically separate data or buckets associated with different data identifiers. For example, the indexer 710 can store buckets associated with Tenant A in a separate directory, file structure, or data store from buckets associated with Tenant B. In this way, the indexer 710 can maintain the mutual exclusivity and/or independence between data from different tenants. Similarly, the indexer 710 can physically and/or logically separate data or buckets associated with different indexes of a tenant.

At (11), the indexer 710 reports or acknowledges to the partition manager 708 that the data is stored in the shared storage system 116. In various implementations, this can be in response to periodic requests from the partition manager 708 to the indexer 710 regarding which buckets and/or data have been stored to shared storage system 116. The indexer 710 can provide the partition manager 708 with information regarding the data stored in shared storage system 116 similar to the data that is provided to the indexer 710 by the shared storage system 116. In some cases, (11) can be replaced with the shared storage system 116 acknowledging or reporting the storage of the data to the partition manager 708 and/or the indexer 710.

At (12), the indexer 710 updates the data store catalog 520. As described herein, the indexer 710 can update the data store catalog 520 with information regarding the data or buckets stored in shared storage system 116. For example, the indexer 710 can update the data store catalog 520 to include location information, a bucket identifier, a time range, and tenant and partition information regarding the buckets copied to shared storage system 116, etc. In this way, the data store catalog 520 can include up-to-date information regarding the buckets stored in shared storage system 116.

At (13), the partition manager 708 reports the completion of the storage to the ingestion buffer 610 and/or another data store (for example, DynamoDB) that stores that stores the location marker information, and at (14), the ingestion buffer 610 updates the buffer location or marker and/or the another store updates it marker. Accordingly, in some embodiments, the ingestion buffer 610 and/or the another database system can maintain the location marker for a particular data record until the ingestion buffer 610 (or other data store) receives an acknowledgement that the data that the ingestion buffer 610 sent to the indexing node 704 has been indexed by the indexing node 704 and stored to shared storage system 116. In addition, the updated buffer location or marker can be communicated to and stored by the ingest manager 706. In this way, a data intake and query system 102 can use the ingestion buffer 610 to provide a stateless environment for the indexing system 112. For example, as described herein, if an ingest manager 706, partition manager 708, indexing node 704 or one of its components (e.g., indexer 710, data store 712, etc.) becomes unavailable or unresponsive before data from the ingestion buffer 610 is copied to shared storage system 116, the indexing system 112 can generate or assign a new component, to process the data that was assigned to the now unavailable component while reducing, minimizing, or eliminating data loss.

At (15), a bucket manager 714, which may form part of the indexer 710, the indexing node 704, or indexing system 112, merges multiple buckets into one or more merged buckets according to a bucket merge policy.

At (16), the bucket manager 714 stores and/or copies the merged data or buckets to shared storage system 116, and obtains information about the merged buckets stored in shared storage system 116. Similar to (7), the obtained information can include information regarding the storage of the merged buckets, such as, but not limited to, the location of the buckets, one or more bucket identifiers, tenant or partition identifiers, etc. At (17), the bucket manager 714 reports the storage of the merged data to the partition manager 708, similar to the reporting of the data storage at (11).

At (18), the indexer 710 deletes data from the data store (e.g., data store 712). As described herein, once the merged buckets have been stored in shared storage system 116, the indexer 710 can delete corresponding buckets that it has stored locally according to a bucket management policy. For example, the indexer 710 can delete the merged buckets from the data store 712, as well as the pre-merged buckets (buckets used to generate the merged buckets).

At (19), the shared storage system 116 deletes data according to a bucket management policy. At (20), the indexer 710 updates the data store catalog 520 with the information about the merged buckets. Similar to (12), the indexer 710 can update the data store catalog 520 with the merged bucket information.

As mentioned previously, in some of embodiments, one or more of the functions described herein with respect to FIG. 11 can be omitted, performed in a variety of orders and/or performed by a different component of the data intake and query system 102. For example, the indexer 710 can (12) update the data store catalog 520 before, after, or concurrently with the deletion of the data in the (18) indexer 710 or (19) shared storage system 116. Similarly, in certain embodiments, the indexer 710 can (15) merge buckets before, after, or concurrently with (10)-(14), etc. As another example, the partition manager 708 can perform (12) and/or (14). In some cases, the indexer 710 can update the data store catalog 520 before, after, or concurrently with (17)-(19), etc.

In some cases, (1)-(4) can be performed in any order, or concurrently with each other. For example, the ingest manager 716 can generate the partition managers 708 before or after receiving data from the ingestion buffer 610, while the resource monitor 718 concurrently monitors the indexers 710 and updates the resource catalog 720.

In certain embodiments, such as when an indexing system 112 is instantiated for a single tenant, (3)-(7) may be omitted. For example, in some such embodiments, the indexing system 112 may not include a resource monitor 718 and/or resource catalog 720 and/or the indexing system 112 may have dedicated indexing nodes 704 for the tenant. In some such cases, the partition manager 708 can be configured to send the data to a particular indexer 710.

In some embodiments, the one or more components of the indexing system 112 and/or the ingestion buffer 610 can concurrently process data from multiple tenants. For example, each partition of the ingestion buffer 610 can include data records associated with different tenants. In some cases, a data record can include data associated with one tenant and different data records can include data from different tenants. In certain cases, a data record can include location and/or identification information of data or a file with data from a particular tenant and/or a tenant identifier corresponding to the particular tenant. For each data record, the partition manager 708 can request an indexing node assignment to process the data record, the resource monitor 718 can provide an indexing node assignment for the data record, and the assigned indexing node 704 can process the data record (including any data referenced by the data record). The ingest manager 706/partition manager 708, the resource monitor 718, and/or the indexer 710 can concurrently process multiple data records in this manner. As different data records can be associated with different tenants, the ingest manager 706 ingest manager 706/partition manager 708, the resource monitor 718, and/or the indexer 710 can concurrently process data associated with different tenants.

In certain embodiments, the components of the indexing system 112 may only process data from one tenant. For example, the ingestion buffer 610 can be configured to only process data from one tenant. Correspondingly, the data records received and processed by the ingest manager 706/partition manager 708 and/or indexer 710 can correspond to the same tenant. In some embodiments in which the components of the indexing system 112 only process data from one tenant, the resource monitor 718 and/or resource catalog 720 (and corresponding (3), (4), (5), (6)) can be omitted. In some such embodiments, the ingest manager 706/partition manager 708 may form part of an indexing node 704 as illustrated at FIG. 7A and/or the data records from the partition manager 708 can be sent to one of a group of indexers 710 designated for the particular tenant using a load balancing scheme. Further, in some embodiments in which the components of the indexing system 112 only process data from one tenant, separate ingestion buffer(s) 610, ingest manager(s) 706/partition manager(s) 708, resource monitor(s) 718, resource catalog(s) 720, indexer(s) 710, and bucket manager(s) 714 can be instantiated for each tenant.

6.3. Querying

Figure 12:
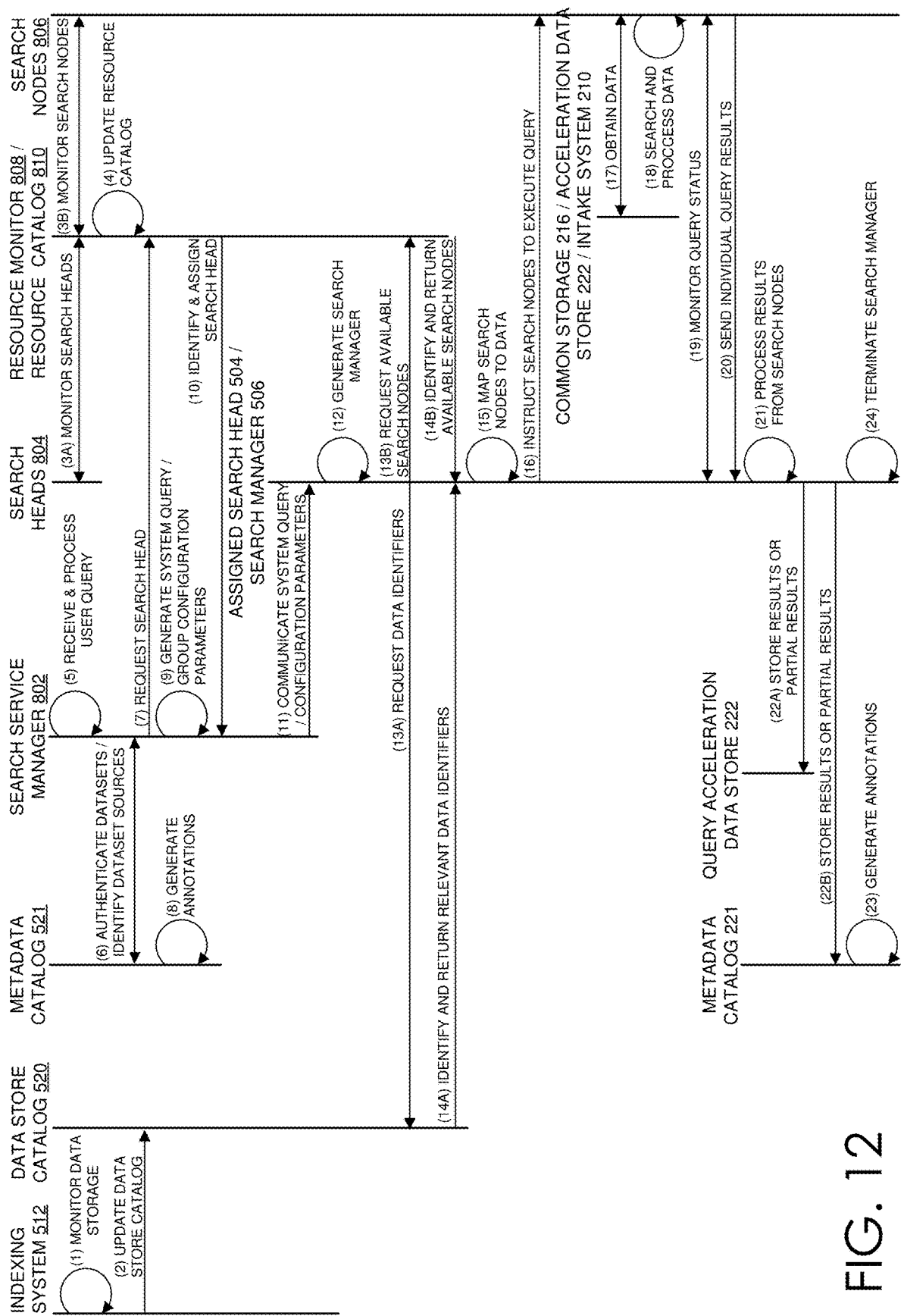
FIG. 12 is a data flow diagram illustrating an embodiment of the data flow and communications between a variety of the components of the data intake and query system during execution of a query.

FIG. 12 is a data flow diagram illustrating an embodiment of the data flow and communications between a variety of the components of the data intake and query system 102 in relation to a query. Specifically, FIG. 12 is a data flow diagram illustrating an embodiment of the data flow and communications between the indexing system 112, data store catalog 520, metadata catalog 521, search service manager 802, search head(s) 804, resource monitor 808, resource catalog 810, search nodes 806, shared storage system 116, and the query acceleration data store 522. However, it will be understood, that in some of embodiments, one or more of the functions described herein with respect to FIG. 12 can be omitted, performed in a different order and/or performed by a different component of the data intake and query system 102. For example, in some embodiments, the steps identified as being performed by the search service manager 802 and search head 804 can be performed by the same component (e.g., the search service manager 802, the search head 804, or another component of the data intake and query system 102). In some such embodiments, (6) can be omitted. Accordingly, the illustrated embodiment and description should not be construed as limiting. Additional details regarding an embodiment of the data flow and communications between a variety of the components of the data intake and query system 102 in relation to a query is described in the Incorporated Applications, each of which is incorporated herein by reference for all purposes.

Further, it will be understood that the various functions described herein with respect to FIG. 12 can be performed by one or more distinct components of the data intake and query system 102. For example, for simplicity, reference is made to a search head 804 performing one or more functions. However, it will be understood that these functions can be performed by one or more components of the search head 804, such as, but not limited to, the search master 812 and/or the search manager 814. Similarly, reference is made to the indexing system 112 performing one or more functions. However, it will be understood that the functions identified as being performed by the indexing system 112 can be performed by one or more components of the indexing system 112.

At (1) and (2), the indexing system 112 monitors the storage of processed data and updates the data store catalog 520 based on the monitoring.

At (3A) the resource monitor 808 monitors some or all of the search heads 804 and (3B) search nodes 806 (in the query system 114), including the specific search head 804 and search nodes 806 used to execute the query, and (4) updates the resource catalog 810. As described herein, the resource monitor 808 can monitor the availability, responsiveness, and/or utilization rate of the search heads 804 and search nodes 806. Based on the status of the search heads 804 and the search nodes 806, the resource monitor 808 can update the resource catalog 810. In this way, the resource catalog 810 can retain information regarding a current status of each of the search heads 804 and the search nodes 806 in the query system 114. It will be understood that (3A), (3B), and (4) may be repeated together periodically, according to a schedule, policy, or algorithm, such that the current (or reasonably current) availability, responsiveness, and/or utilization rate of the search heads 804 and the search nodes 806 is stored in resource catalog 810. For example, a time-based schedule may be used so that (3A), (3B), and (4) may be performed every X number of seconds, or every X minute(s), and so forth. The performance of (3A), (3B), and (4) on a periodic basis may be referred to as a "heartbeat."

The monitoring of the search heads 804 and search nodes 806 may allow for improved resource utilization through the implementation of dynamic resource scaling. Resource scaling can be performed by provisioning additional search heads 804 and/or search nodes 806 ("spinning up") or decommissioning idle search heads 804 and/or search nodes 806 ("spinning down") based on various individual or aggregate capacity utilization metrics, such as CPU/memory utilization, the number of concurrent running searches, and so forth.

At (5), a search service manager 802 receives and processes a user query. The user query can correspond to a query received from a client device 106 and can include one or more query parameters. In some cases, the user query can be received via the gateway 515 and/or via the network 508. The query can identify (and the query parameters can include) a set of data and manner processing the set of data. In certain embodiments the set of data of a query can include multiple datasets. For example, the set of data of the query can include one or more source datasets, source reference datasets and/or query datasets. In turn a dataset can include one or more queries (or subqueries). For example, a query dataset can be identified as at least a portion of the set of data of a received query, and can include a query (or subquery) that identifies a set of data and a manner of processing the set of data. As another example, the query dataset could reference one or more additional query datasets that in turn include one or more subqueries.

Furthermore, the query can include at least one dataset identifier and/or dataset association record identifier. In some embodiments, the dataset identifier can be a logical identifier of a dataset. In certain embodiments, the dataset identifier and/or dataset association record identifier can follow a particular query parameter, such as "from" "datasetID," "moduleID," etc. In some embodiments, the dataset identifier and/or dataset association record identifier can be included as a parameter of a command received by the search service manager 802. For example, in some embodiments, the data intake and query system 102 can receive the query as one parameter and the dataset identifier and/or the dataset association record as another parameter.

As part of processing the user query, the search service manager 802 can identify the dataset identifier(s) and/or the dataset association record identifier. In some embodiments, the search service manager 802 can parse the query to identify the dataset identifier and/or dataset association record identifier. For example, the search service manager 802 can identify "from" (or some other query parameter) in the query and determine that the subsequent string is the dataset identifier. Furthermore, it will be understood that the search service manager 802 can identify multiple dataset identifier(s) and/or dataset association record identifier(s) as part of processing the user query.

At (6), the search service manager 802 communicates with the metadata catalog 521 to authenticate the datasets identified in the query (and other datasets parsed during the query processing), identify primary datasets (e.g. datasets with configurations used to execute the query), secondary datasets (datasets referenced directly or indirectly by the query but that do not include configurations used to execute the query) and/or identify query configuration parameters.

In some embodiments, upon identifying a dataset association record 902 associated with the query, the search service manager 802 uses the dataset association record 902 to identify additional information associated with the user query, such as one or more datasets and/or rules. In some embodiments, using the dataset association record, the search service manager 802 can determine whether a user associated with the query has the authorizations and/or permissions to access the datasets identified in the query.

Once the search service manager 802 identifies the dataset of the dataset association record 902 referenced in the query, the search service manager 802 can determine whether the identified dataset identifies one or more additional datasets (e.g., is a single or multi-reference dataset), includes additional query parameters, is a source dataset, a secondary dataset, and/or a primary dataset that will be used by the data intake and query system 102 to execute the query.

In the event the dataset is a single or multi-reference dataset, with each additional dataset identified, the search service manager 802 can recursively review information about the dataset to determine whether it is a non-referential, single, or multi-reference dataset, a secondary dataset, and/or a primary dataset until it has identified any dataset referenced directly or indirectly by the query (e.g., all primary and secondary datasets). For example, as described in herein, the dataset identifier used in the user query may refer to a dataset that is from another dataset association record. Based on the determination that the dataset is imported, the search service manager 802 can review the other dataset association record to identify any additional datasets, identify configuration parameter (e.g., access information, dataset type, etc.) of the imported dataset, and/or determine whether the referenced dataset was imported from a third dataset. The search service manager 802 can continue to review the dataset association records 902 until it has identified the dataset association record where the dataset is native.

As another example, the dataset identifier in the user query may refer to a multi-reference dataset, such as a query dataset that refers to one or more source datasets, source reference datasets, and/or other query datasets. Accordingly, the search service manager 802 can recursively review the datasets referred to in the multi-reference dataset until it identifies datasets that do not rely on any other datasets (e.g., non-referential datasets) and/or identifies the source datasets that include the data that forms at least a portion of the set of data or other primary datasets.

With each new dataset identified from the dataset association records, the search service manager 802 can authenticate the dataset. As part of authenticating the datasets, the search service manager 802 can determine whether the dataset referred to is imported by the dataset association record and/or whether the user has the proper credentials, authorizations, and/or permissions to access the dataset.

In addition to identifying additional datasets, the search service manager 802 can identify additional query parameters. For example, one or more datasets, such as a query dataset, may include additional query parameters. Accordingly, as the search service manager 802 parses the various datasets, it can identify additional query parameters that are to be processed and/or executed.

Furthermore, as the search service manager 802 parses the dataset association records 902, it can identify one or more rules that are to be used to process data from one or more datasets. As described herein, the rules can be imported by different dataset association records 902. Accordingly, the search service manager 802 can recursively parse the rules to identify the dataset association record 902 from which the rule originated. Furthermore, as the search service manager 802 parses the dataset association records 902 and identifies additional rules, it can determine whether the user has the proper credentials permissions etc. to access the identified rules. In addition, the search service manager 802 can identify one or more datasets associated with the rules (e.g., that reference, use, are referenced by, or used by, the additional rules). As described herein, in some embodiments these datasets may not be explicitly imported in a dataset association record, but may be automatically included as part of the query processing process.

In addition to identifying the various datasets and/or rules associated with the query, the search service manager 802 can identify the configurations associated with the datasets and rules associated with the query. In some embodiments, the search service manager 802 can use the dataset configuration records 904 and/or rule configuration records 906 to identify the relevant configurations for the datasets and/or rules associated with the query. For example, the search service manager 802 can refer to the dataset configuration records 904 to identify the dataset types of the various datasets associated with the query. In some embodiments, based on the dataset type, the search service manager 802 can determine how to interact with or generate commands for the dataset. For example, for a lookup dataset, the search service manager 802 may generate a "lookup" command, for an "index" dataset, the search service manager 802 may generate a "search" command, and for a metrics interaction dataset, the search service manager may generate an "mstats" command.

As described herein, in some embodiments, the dataset configuration records 904 and rule configuration records 906 can include a physical identifier for the datasets and/or rules. Accordingly, in some embodiments, the search service manager 802 can obtain the physical identifiers for each of the datasets and/or rules associated with the query. In certain embodiments, the search service manager 802 can determine the physical identifiers for each of the datasets and/or rules associated with the query based on the logical name and dataset association record 902 associated with the dataset or rule. For example, in certain embodiments, the physical identifier can correspond to a combination of the logical identifier of the dataset and the logical identifier of the associated dataset association record.

In some embodiments, when identifying the rule configuration records 906 and/or dataset configuration records 904, the search service manager 802 can obtain a subset of the dataset configuration records 904 and/or rule configuration records 906 in the metadata catalog 521 and/or a subset of the dataset configuration records 904 and/or rule configuration records 906 associated with the dataset association records 902 identified by the query or referenced while processing the query. In certain embodiments, the search service manager 802 obtains only the dataset configuration records 904 and/or rule configuration records 906 that are needed to process the query or only the primary dataset configuration records 904 and primary rule configuration records 906. For example, if the dataset association record 902 reference three datasets and two rules, but the query only uses one of the datasets and one of the rules, the search service manager 802 can obtain the dataset configuration record 904 of the dataset referenced and the rule configuration record 906 in the query but not the dataset configuration records 904 and rule configuration records 906 of the datasets and rule not referenced in or used by the query.

At (7), the search service manager 802 requests a search head. As described herein the search heads 804 can be dynamically assigned to process queries associated with different tenants. Accordingly, prior to a search head 804 processing a query, the search service manager 802 can request an identification of a search head for the (system) query from the resource monitor 808. In some cases, (7) can be done before, after, or concurrently with (6). For example, the search service manager 802 can request the search head 804 before, after, or concurrently with authenticating the datasets and/or identifying dataset sources.

At (8), the metadata catalog 521 generates annotations. As described herein, the metadata catalog 521 can generate annotations based on interactions with or changes to the metadata catalog 521. The annotations can be generated at any time.

At (9), the search service manager 802 generates a system query and/or groups query configuration parameters. The query configuration parameters can include the dataset configuration records 904 corresponding to the primary datasets and/or the rule configuration records 906 corresponding to the rules associated with the query or primary rules. In some cases, (9) can be done before, after, or concurrently with (7), (8), (10), and the like. In certain embodiments (9) is done after (6) and before (11).

In some embodiments, the system query can be based on the user query, one or more primary or secondary datasets, the physical name of a primary dataset(s), the dataset type of the primary dataset(s), additional query parameters identified from the datasets, and/or based on information about the search head 804, etc. In certain embodiments, the system query corresponds to the user query modified to be compatible with the search head 804. For example, in some embodiments, the search head 804 may not be able to process one or more commands in the user query. Accordingly, the search service manager 802 can replace the commands unsupported by the search head 804 with commands that are supported by the search head 804.

In some embodiments, as the query system 114 parses the dataset association records 902 and/or dataset configuration records 904, it identifies the datasets to be included in the query. In certain embodiments, the search service manager 802 identifies the datasets to be included based on the dataset identifier(s) included in the query. Similarly, if the query identifies a single or multi-reference dataset, the search service manager 802 can include an identifier for the single or multi-reference dataset in the system query and/or may include an identifier for one or more (primary) datasets referenced by the single or multi-reference dataset in the system query In some embodiments, the search service manager 802 identifies the datasets to be included based on the dataset identifier(s) included in the query and/or one or more query parameters of a dataset referenced by the query. For example, if the query identifies (or references) a query dataset, the search service manager 802 can include the query parameters (including any referenced primary datasets) of the query dataset in the query. As another example, the search service manager 802 can recursively parse the query parameters (including any referenced datasets) of the query dataset to identify primary datasets and instructions for processing data from (or referenced by) the primary datasets, and include the identified primary datasets and instructions for processing the data in the query. Similarly, if a query dataset references one or more single reference or multi-reference datasets, the search service manager 802 can recursively process the single reference or multi-reference datasets referenced by the query dataset until it identifies the query parameters referenced by any dataset referenced by the query dataset and the primary datasets that include (or reference) the data to be processed according to the identified query parameters.

In certain embodiments, the system query replaces any logical dataset identifier of the user query (such as a query dataset) with the physical dataset identifier of a primary dataset or source dataset identified from the metadata catalog 521. For example, if the logical name of a dataset is "main" and the dataset association record 902 is "test," the search service manager 802 can replace "main" with "test.main" or "test__main," as the case may be. Accordingly, the search service manager 802 can generate the system query based on the physical identifier of the primary datasets or source datasets.

In some embodiments, the search service manager 802 generates the system query based on the dataset type of one or more primary datasets, source datasets, or other datasets to be referenced in the system query. For example, datasets of different types may be interacted with using different commands and/or procedures. Accordingly, the search service manager 802 can include the command associated with the dataset type of the dataset in the query. For example, if the dataset type is an index type, the search service manager 802 can replace a "from" command with a "search" command. Similarly, if the dataset type is a lookup type, the search service manager 802 can replace the "from" command with a "lookup" command. As yet another example, if the dataset type is a metrics interactions type, the search service manager 802 can replace the "from" command with an "mstats" command. As yet another example, if the dataset type is a view dataset, the search service manager 802 can replace the "from" and dataset identifier with a query identified by the view dataset. Accordingly, in certain embodiments, the search service manager 802 can generate the system query based on the dataset type of one or more primary datasets.

In certain embodiments, the search service manager 802 can identify query configuration parameters (configuration parameters associated with the query) based on the primary datasets and/or rules associated with the query. For example, as the search service manager 802 parses the dataset configuration records 904 of the datasets referenced (directly or indirectly) by the user query it can determine whether the dataset configuration records 904 are to be used to execute the system query.

In some embodiments, the search service manager 802 can identify and obtain rules configurations 906 for any rules referenced by: the (system or otherwise) query, a dataset included in the system (or other generated) query, a dataset for which a dataset configuration record 904 is obtained as part of the query configuration parameters, and/or a dataset association record referenced (directly or indirectly) by the user query. In some cases, the search service manager 802 includes all rules associated with the dataset association record(s) associated with the query in the query configuration parameters. In certain cases, the search service manager 802 includes a subset of the rules associated with the dataset a dataset association record(s) associated with the query. For example, the search service manager 802 can include rule configuration records 906 for only the rules referenced by or associated with a dataset that is also being included in the query configuration parameters.

As described herein, the search service manager 802 can obtain the dataset configuration records 904 and/or rule configuration records 906 from the metadata catalog 521 based on a dynamic parsing of the user query. Accordingly, in some embodiments, the search service manager 802 can dynamically identify the query configuration parameters to be used to process and execute the query.

At (10), the resource monitor 808 can assign a search head 804 for the query. In some embodiments, the resource monitor 808 can dynamically select a search head 804 and assign it in response to the search request based on a search head mapping policy. For example, based on the search head mapping policy, the resource monitor 808 may identify a search head 804 for the query based on a current availability, responsiveness, and/or utilization rate of the search heads 804 identified in the resource catalog 810. As described herein, the resource catalog 810 can include metrics like concurrent search count, CPU/memory capacity, and so forth. In some embodiments, based on the search head mapping policy, the research catalog 810 may be queried to identify an available search head 804 with free capacity for processing the search request.

At (11), the search service manager 802 communicates the system query and/or query configuration parameters to the search head 804. As described herein, in some embodiments, the search service manager can communicate the system query to the search head 804. In certain embodiments, the search service manager 802 can communicate the query configuration parameters to the search head 804. Accordingly, the search service manager 802 can communicate either the system query, the query configuration parameters, or both.

The assigned search head 804 receives and processes the query and (12) generates a search manager 814. In some embodiments, once the search head 804 is selected (non-limiting example: based on a search head mapping policy), the query can be forwarded to it from the resource monitor 808 search service manager 802, etc. As described herein, in some cases, a search master 812 can generate the search manager 814. For example, the search master 812 can spin up or instantiate a new process, container, or virtual machine, or copy itself to generate the search manager 814, etc. As described herein, in some embodiments, the search manager 814 can perform one or more of functions described herein with reference to FIG. 12 as being performed by the search head 804 to process and execute the query.

The search head 804 (13A) requests data identifiers from the data store catalog 520. As described, the data store catalog 520 can include information regarding the data stored in shared storage system 116. Accordingly, the search head 804 ca query the data store catalog 520 to identify data or buckets that include data that satisfies at least a portion of the query.

The search head 804 (13B) requests an identification of available search nodes from the resource monitor 808 and/or resource catalog 810. As described herein, the resource catalog 810 can include information regarding the search nodes 806 of the query system 114. The search head 804 can either directly query the resource catalog 810 in order to identify a number of search nodes available to execute the query, or the search head 804 may send a request to the resource monitor 808, which will identify a number of search nodes available to execute the query by consulting the resource catalog 810. In some cases, the (13A) and (13B) requests can be done concurrently or in any order.

In some cases, the search head 804 requests a search node assignment based on a search node mapping policy. The search node mapping policy can use any one or any combination of data identifiers associated with the query, search node identifiers, priority levels, etc. to indicate how search nodes 806 should be assigned for a query. In some cases, based on the search node mapping policy, the search head 804 requests a search node assignment for the query. In some such cases, the search head 804 can include the data identifier associated with the query in its request for a search node assignment.

At (14A), the data store catalog 520 provides the search head 804 with an identification of data that satisfies at least a portion of the query. As described herein, in response to the request from the search head 804, the data store catalog 520 can be used to identify and return identifiers of buckets in shared storage system 116 and/or location information of data in shared storage system 116 that satisfy at least a portion of the query or at least some filter criteria (e.g., buckets associated with an identified tenant or partition or that satisfy an identified time range, etc.).

In some cases, as the data store catalog 520 can routinely receive updates by the indexing system 112, it can implement a read-write lock while it is being queried by the search head 804. Furthermore, the data store catalog 520 can store information regarding which buckets were identified for the search. In this way, the data store catalog 520 can be used by the indexing system 112 to determine which buckets in shared storage system 116 can be removed or deleted as part of a merge operation.

At (14B), the resource catalog 810 (or the resource monitor 808, by consulting the resource catalog 810) provides the search head 804 with a search node assignment and/or an identification of available search nodes 806. As described herein, in response to the request from the search head 804, the resource catalog 810 and/or the resource monitor 808 can be used to identify and return identifiers for search nodes 806 that are available to execute the query. In some embodiments, the resource monitor 808 or resource catalog 810 determines the search node assignment based on a search node mapping policy, which can include a search head-node mapping policy. As described herein, the search node assignment can be based on numerous factors, including the availability and utilization of each search node 806, a data identifier associated with the query, search node identifiers, etc.

In some embodiments, all the search nodes 806 may be mapped out to various different tenants (e.g., using tenant identifiers), such that each search node 806 can be mapped to one or more specific tenants. Thus, in certain embodiments, a specific tenant can have a group of one or more search nodes 806 assigned to it.

At (15) the search head 804 maps the identified search nodes 806 to the data according to a search node mapping policy, which can include a search node-data mapping policy. In some cases, per the search node-data mapping policy, the search head 804 can dynamically map search nodes 806 to the identified data or buckets. As described herein, the search head 804 can map the identified search nodes 806 to the identified data or buckets at one time or iteratively as the buckets are searched according to the search node-data mapping policy. In certain embodiments, per the search node-data mapping policy, the search head 804 can map the identified search nodes 806 to the identified data based on previous assignments, data stored in a local or shared data store of one or more search heads 804, network architecture of the search nodes 806, a hashing algorithm, etc.

In some cases, as some of the data may reside in a local or shared data store between the search nodes 806, the search head 804 can attempt to map that was previously assigned to a search node 806 to the same search node 806. In certain embodiments, to map the data to the search nodes 806, the search head 804 uses the identifiers, such as bucket identifiers, received from the data store catalog 520. In some embodiments, the search head 804 performs a hash function to map a bucket identifier to a search node 806. In some cases, the search head 804 uses a consistent hash algorithm, similar to a consistent hashing used to assign search nodes 806 to queries using a data identifier, to increase the probability of mapping a bucket identifier to the same search node 806. In certain embodiments, the search head 804 or query system 114 can maintain a table or list of bucket mappings to search nodes 806. In such embodiments, per the search node-data mapping policy, the search head 804 can use the mapping to identify previous assignments between search nodes and buckets.

At (16), the search head 804 instructs the search nodes 806 to execute the query. As described herein, based on the assignment of buckets to the search nodes 806, the search head 804 can generate search instructions for each of the assigned search nodes 806. These instructions can be in various forms, including, but not limited to, JSON, DAG, etc. In some cases, the search head 804 can generate sub-queries for the search nodes 806. Each sub-query or instructions for a particular search node 806 generated for the search nodes 806 can identify any one or any combination of: the buckets that are to be searched, the filter criteria to identify a subset of the set of data to be processed, and the manner of processing the subset of data, etc. Accordingly, the instructions can provide the search nodes 806 with the relevant information to execute their particular portion of the query.

At (17), the search nodes 806 obtain the data to be searched. As described herein, in some cases the data to be searched can be stored on one or more local or shared data stores of the search nodes 806. In some embodiments, the data to be searched is located in the intake system 110 and/or the acceleration data store 522. In certain embodiments, the data to be searched is located in the shared storage system 116. In such embodiments, the search nodes 806 or a cache manager 816 can obtain the data from the shared storage system 116.

At (18), the search nodes 806 search and process the data. As described herein, the sub-queries or instructions received from the search head 804 can instruct the search nodes 806 to identify data within one or more buckets and perform one or more transformations on the data. Accordingly, each search node 806 can identify a subset of the set of data to be processed and process the subset of data according to the received instructions. This can include searching the contents of one or more inverted indexes of a bucket or the raw machine data or events of a bucket, etc. In some embodiments, based on the query or sub-query, a search node 806 can perform one or more transformations on the data received from each bucket or on aggregate data from the different buckets that are searched by the search node 806.

At (19), the search head 804 monitors the status of the query of the search nodes 806. As described herein, the search nodes 806 can become unresponsive or fail for a variety of reasons (e.g., network failure, error, high utilization rate, etc.). Accordingly, during execution of the query, the search head 804 can monitor the responsiveness and availability of the search nodes 806. In some cases, this can be done by pinging or querying the search nodes 806, establishing a persistent communication link with the search nodes 806, or receiving status updates from the search nodes 806 (non-limiting example: the "heartbeat"). In some cases, the status can indicate the buckets that have been searched by the search nodes 806, the number or percentage of remaining buckets to be searched, the percentage of the query that has been executed by the search node 806, etc. In some cases, based on a determination that a search node 806 has become unresponsive, the search head 804 can assign a different search node 806 to complete the portion of the query assigned to the unresponsive search node 806.

In certain embodiments, depending on the status of the search nodes 806, the search manager 814 can dynamically assign or re-assign buckets to search nodes 806. For example, as search nodes 806 complete their search of buckets assigned to them, the search manager 814 can assign additional buckets for search. As yet another example, if one search node 806 is 85% complete with its search while another search node 806 is less than 80% complete, the query manager can dynamically assign additional buckets to the search node 806 that is 85% complete or re-assign buckets from the search node 806 that is less than 80% complete to the search node that is 85% complete. In this way, the search manager 814 can improve the efficiency of how a computing system performs searches through the search manager 814 increasing parallelization of searching and decreasing the search time.

At (20), the search nodes 806 send individual query results to the search head 804. As described herein, the search nodes 806 can send the query results as they are obtained from the buckets and/or send the results once they are completed by a search node 806. In some embodiments, as the search head 804 receives results from individual search nodes 806, it can track the progress of the query. For example, the search head 804 can track which buckets have been searched by the search nodes 806. Accordingly, in the event a search node 806 becomes unresponsive or fails, the search head 804 can assign a different search node 806 to complete the portion of the query assigned to the unresponsive search node 806.

At (21), the search head 804 processes the results from the search nodes 806. As described herein, the search head 804 can perform one or more transformations on the data received from the search nodes 806. For example, some queries can include transformations that cannot be completed until the data is aggregated from the different search nodes 806. In some embodiments, the search head 804 can perform these transformations.

At (22A), the search head 804 communicates or stores results in the query acceleration data store 522. As described herein, in some cases some, all, or a copy of the results of the query can be stored in the query acceleration data store 522. The results stored in the query acceleration data store 522 can be combined with other results already stored in the query acceleration data store 522 and/or be combined with subsequent results. At (22B), the search head 804 communicates the results to the metadata catalog 521. In some cases, (22A) and (22B) can be done concurrently.

At (23), the metadata catalog 521 generates annotations. As mentioned, the metadata catalog 521 can generate annotations each time changes are made to it. Accordingly, based on the receipt of the query results, the metadata catalog 521 can generate annotations that include the query results.

At (24), the search head 804 terminates the search manager 814. As described herein, in some embodiments a search head 804 or a search master 812 can generate a search manager 814 for each query assigned to the search head 804. Accordingly, in some embodiments, upon completion of a search, the search head 804 or search master 812 can terminate the search manager 814. In certain embodiments, rather than terminating the search manager 814 upon completion of a query, the search head 804 can assign the search manager 814 to a new query. In some cases, (24) can be performed before, after, or concurrently with (23).

As mentioned previously, in some of embodiments, one or more of the functions described herein with respect to FIG. 12 can be omitted, performed in a variety of orders and/or performed by a different component of the data intake and query system 102. For example, the search head 804 can monitor the status of the query throughout its execution by the search nodes 806 (e.g., during (17), (18), and (20)). Similarly, (1), (2), (3A), (3B), and (4), can be performed concurrently with each other and/or with any of the other steps. In some cases, are being performed consistently or repeatedly. Steps (13A) and (13B) and steps (14A) and (14B) can be performed before, after, or concurrently with each other. Further, (13A) and (14A) can be performed before, after, or concurrently with (14A) and (14B). As yet another example, (17), (18), and (20) can be performed concurrently. For example, a search node 806 can concurrently receive one or more files for one bucket, while searching the content of one or more files of a second bucket and sending query results for a third bucket to the search head 804. Similarly, the search head 804 can (15) map search nodes 806 to buckets while concurrently (15) generating instructions for and instructing other search nodes 806 to begin execution of the query. In some cases, such as when the set of data is from the intake system 110 or the acceleration data store 522, (13A) and (14A) can be omitted. Furthermore, in some such cases, the data may be obtained (17) from the intake system 110 and/or the acceleration data store 522.

In some embodiments, such as when one or more search heads 804 and/or search nodes 806 are statically assigned to queries associated to a tenant and/or with a particular data identifier, (3A), (3B), (7), and (10) may be omitted. For example, in some such embodiments, there may only be one search head 804 associated with the data identifier or tenant. As such, the query system 114 may not dynamically assign a search head 804 for the query. In certain embodiments, even where search heads 804 and/or search nodes 806 are statically assigned to a tenant or a data identifier, (3A), (3B), (7), and (10) may be used to determine which of multiple search heads 804 assigned to the tenant or data identifier is to be used for the query, etc.

In certain embodiments, the query system can use multiple sub-policies of a search node mapping policy to identify search nodes for a query and/or to process data. For example, the query system 114 may use a search head-node mapping policy to identify search nodes 806 to use in the query and/or may use a search node-data policy to determine which of the assigned search nodes 806 is to be used to process certain data of the query. In some cases, the search node mapping policy may only include a search head-node mapping policy or a search node-data policy to identify search nodes 806 for the query, etc. Moreover, it will be understood that any one or any combination of the components of the query system 114 can be used to implement a search node mapping policy. For example, the resource monitor 808 or search head 804 can implement the search node mapping policy, or different portions of the search node mapping policy, as desired.

7.0. Shared Computing Resource Environment

As described herein, various components of the data intake and query system 102 can be instantiated as or in isolated execution environments. While this can provide a number of benefits, including scalability, it can complicate the process for updating the different components. For example, if a tenant desires to modify the configurations of a component (e.g., indexing node 704), they may have to log in to each specific instance of that component that is instantiated in the shared computing resource environment, and make the desired changes. In an environment with tens or hundreds of components, this can be time consuming and increase the likelihood of an error. Furthermore, in a multi-tenant environment, where multiple tenants may be relying on or using the same instance of a component, enabling one tenant to modify the component can adversely affect the other tenants who are using the component.

To address this issue, a control plane system can be provided to enable a tenant to modify components without having to manually make changes to each instance of the component. Further, the control plane system can enable the tenant to customize components without adversely affecting other tenants in a multi-tenant environment.

Figure 13:
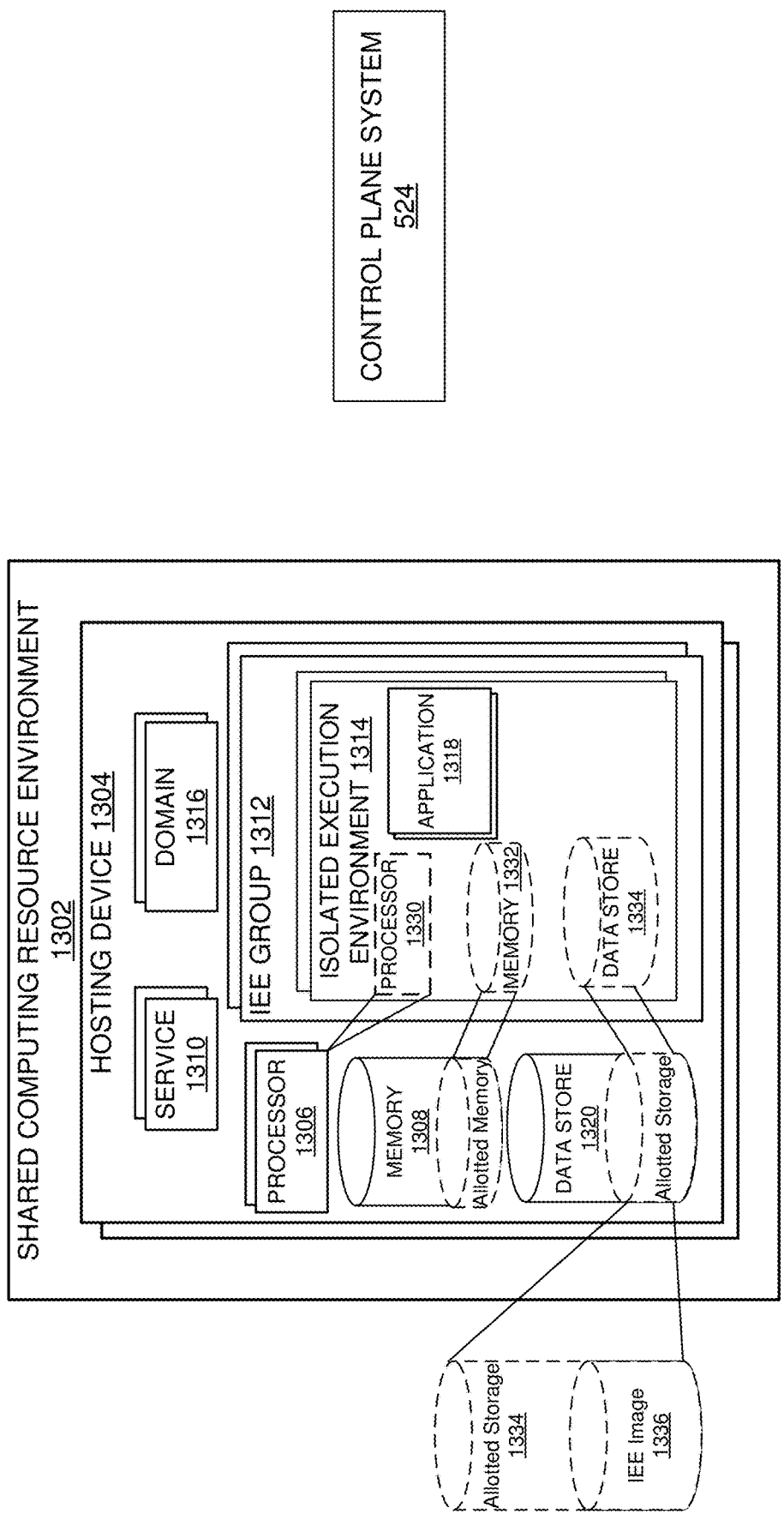
FIG. 13 is a block diagram of an embodiment of a shared computing resource environment and a control plane system.

As described herein, any one or any combination of the components of the data intake and query system 102 can be implemented in a shared computing resource environment. FIG. 13 is a block diagram of an embodiment of a shared computing resource environment 1302 and a control plane system 524. The shared computing resource environment 1302 can include one or more hosting devices 1304 and, although not illustrated in FIG. 13, one or more data stores, catalogs, services, or application programming interfaces (APIs).

The control plane system 524 can include one or more computing devices used to manage images that are to be instantiated in the shared computing resource environment 1302, such as on one or more of the one or more hosting devices 1304 or in one or more isolated execution environments 1314. In certain embodiments, the control plane system 524 can be implemented on a computing device or in a hosted device, such as an isolated execution environment 1314, or as a service 1310.

A hosting device 1304 can include one or more processors 1306, one or more data stores 1320, and memory 1308 (e.g., RAM, volatile memory, etc.), used to implement one or more services 1310 and one or more isolated execution environment (IEE) groups 1312 associated with (or segregated using) one or more domains 1316. An IEE group 1312 can include one or more isolated execution environments 1314.

In addition, the components may be related with each other. For example, multiple isolated execution environments 1314 can be related as part of the same IEE group 1312 (thus related to each other and to the IEE group 1312) and/or related to one or more services 1310, a domain 1316, and a hosting device 1304. Similarly, multiple IEE groups 1312 can be related to one or more services 1310 and to a domain 1316, and one or more domains 1316 can be related to a hosting device 1304.

As a non-limiting example, in the Kubernetes environment, a Kubernetes cluster can include one or more nodes, a node can include one or more pods, and a pod can include one or more containers. The clusters, nodes, pods, and containers can occupy layers within the Kubernetes shared computing resource environment. In addition, a Kubernetes node can include one or more services used by or associated with one or more pods or containers. A Kubernetes node can also include or use one or more namespaces to distinguish certain services, containers, and pods from each other. For example, a container associated with one namespace can be distinguished from a container with the same name that is associated with a different namespace.

The hosting devices 1304 of the shared computing resource environment 1302 can be implemented in a variety of ways. For example, one or more hosting devices 1304 of a shared computing resource environment 1302 can be implemented using one or more physical machines having one or more processors and/or data stores (non-limiting examples: rack server, tower server, or other physical servers or computing devices having one or more processor cores, memory, and a data store, etc.), or implemented using one or more virtual machines sharing the one or more processors and/or data stores with other virtual machines. For example, a hosting device 1304 can be implemented on a bare server, EC2 instance, and the like or on a virtual machine.

Hosting devices 1304 can also be master nodes that can orchestrate the configuration of the shared computing resource environment 1302 on the hosting devices 1304, coordinate IEE groups 1312, migrate IEE groups 1312 to a new hosting device 1304 if a hosting device 1304 is unhealthy, assign classless inter-domain routing blocks, maintain a list of available hosting devices 1304, and/or check hosting device health.

In the illustrated embodiment, at least one hosting device 1304 of the shared computing resource environment 1302 includes one or more processors 1306, memory 1308, and data stores 1320, used to implement one or more services 1310 and one or more IEE groups 1312 (having one or more isolated execution environments 1314) associated with (or segregated using) one or more domains 1316.

Isolated execution environments 1314 can be long lived or ephemeral and/or can be a subsection of compute used to run a process, application, or service for the duration of its usefulness. Each isolated execution environment 1314 can include one or more applications 1318 which may be executed in the respective isolated execution environment 1314. The one or more applications 1318 may correspond to an isolated execution environment image configured to run on the isolated execution environment 1314. Each isolated execution environment 1314 can have certain resources (e.g., memory, processor, data store, etc.) of the underlying hosting device 1304 assigned to it, but may share the same operating system and may use the operating system's system call interface. Each isolated execution environment 1314 can be assigned a certain portion of one or more of the resources of the underlying hosting device 1304. For example, an isolated execution environment 4124 may be allotted a portion of the processing time or computational ability of the processor 1306 (illustrated as processor 1330), a portion of the memory 1308 (illustrated as memory 1332), and a portion of the data store 1320 (illustrated as data store 1334) of an underlying hosting device 1304. The allotted storage 1334 can include an isolated execution environment image 1336. For example, an isolated execution environment may be assigned 1% of a data store 1320 of an underlying hosting device 1304 and $1/10^{th}$ of the 1% store the isolated execution environment image of the isolated execution environment. The isolated execution environment image can include binary code or other machine readable instructions, system tools, system libraries, and settings, to instantiate the isolated execution environment 1314 and/or run a process, application 1318, or service for the particular isolated execution environment 1314. In some embodiments, the isolated execution environment image comprises executable computer code, that when executed by the isolated execution environment, causes an application 1318 to run on the isolated execution environment 1314. The format of the isolated execution environment image can depend on the format of the isolated execution environment 1314 and/or the underlying hosting device 1304 (e.g., the operating system on which the isolated execution environment is instantiated).

In some embodiments, the portion of the resources of the underlying hosting device 1304 assigned to a particular isolated execution environment 1314 may depend on the needs of the particular isolated execution environment 1314. For example, the portions of the resources of the underlying hosting device 1304 assigned to each particular isolated execution environment 1314 may vary based on the process, application 1318, or service being run by an isolated execution environment 1314. In some embodiments, the portions of the resources of the underlying hosting device 1304 assigned to a particular isolated execution environment 1314 may be dynamic and/or be modified according to present or past requirements of the particular isolated execution environment 1314.

In some embodiments, the isolated execution environments 1314 can include, but are not limited to, containers or operating-system-level virtualizations, or other virtualization techniques. For example, each isolated execution environment 1314 can correspond to a software container or a container instance. Each container may provide an isolated execution environment 1314 on the hosting device 1304, such as by providing a memory space on the hosting device 1304 that is logically isolated from memory space of other isolated execution environments 1314. Further, each isolated execution environment 1314 may run the same or different computer applications concurrently or separately, and may interact with each other.

Although reference is made herein to containerization and container instances, it will be understood that other virtualization techniques can be used. For example, virtual machines using full virtualization or paravirtualization, etc., can be instantiated on the hosting device 1304. Thus, where reference is made to "containerized" components, it should be understood that such components may additionally or alternatively be implemented in other isolated execution environments 1314, such as a virtual machine environment.

The IEE groups 1312 can comprise one or more isolated execution environments 1314. In some embodiments, the IEE groups 1312 can include isolated execution environments 1314 that are related in some way and/or interact with each other. For example, the isolated execution environments 1314 of an IEE group 1312 can share storage, use shared volumes, share an IP address, and/or port space, and/or be co-located and/or co-scheduled. Moreover, applications executing in one isolated execution environment 1314 of an IEE group 1312 may have access to shared volumes of the IEE group 1312 and may be mounted to the application's file system. In some embodiments, the volumes can be storage volumes shared by one or more isolated execution environments 1314, such as isolated execution environments 1314 of an IEE group 1312, to ensure that files written to disk persist. In some non-limiting embodiments, an IEE group 1312 can be implemented using a Kubernetes pod.

In some embodiments, a service 1310 can identify one or more IEE groups 1312. In certain embodiments, the service 1310 can provide a mechanism or policy for accessing the group of IEE groups 1312. For example, the service 1310 can provide an IP address and port combination along with a name to access the IEE groups 1312 of the service 1310. In certain embodiments, a service 1310 can be used to tag data as being associated with a particular application. In some embodiments, a service 1310 can be implemented using a REST object. In certain cases, a service 1310 can identify IEE groups 1312 across different hosting devices as part of the same service 1310.

The domains 1316 can be a (logical) subdivision of the shared computing resource environment 1302 for multiple users, groups, or customers. The domains 1316 can be used to logically group or isolate the services 1310, IEE groups 1312, and/or isolated execution environments 1314. In certain embodiments, a domain 1316 can be used to group one or more services 1310, IEE groups 1312, and/or isolated execution environments 1314, or to segregate one group of services 1310, IEE groups 1312, and isolated execution environments 1314 from another group of services 1310, IEE groups 1312, and isolated execution environments 1314. In certain cases, the grouping of the services 1310, IEE groups 1312, and/or isolated execution environments 1314 can be a logical grouping that may not affect the physical execution of the components. In this regard, a domain 1316 may be considered external or separate from the execution layers of the shared computing resource environment 1302.

In addition, the domains 1316 can be used to avoid conflicts between different components of the shared computing resource environment 1302. For example, if an isolated execution environment 1314 of one domain 1316 has the same name as an isolated execution environment 1314 of another domain 1316, the hosting device 1304 and/or shared computing resource environment 1302 can distinguish the two shared computing resource environments based on the domain 1316 with which they are associated.

7.1. Instantiating Isolated Execution Environments

In some embodiments, a user may instantiate an isolated execution environment 1314 by generating an image, sending the image to a master node, and requesting the master node to instantiate one or more isolated execution environments using the image. In some cases, the master node can include or have access to multiple images and a user can specify which of the images are to be used to generate an isolated execution environment 1314. In some cases, a user can specify that multiple isolated execution environments 1314 are to be instantiated concurrently or at the same time with different images. For example, in some embodiments, a user can provide the master node with images corresponding to an indexing node, search head, search node, and/or other components of the data intake and query system 102. The user can then request the master node to instantiate isolated execution environments 1314 with the different components of the data intake and query system 102. In some such cases, the user can request the master node to instantiate different numbers of different components (e.g., two search heads, five indexing nodes, seven search nodes, etc.). In this way, a user can instantiate an entire data intake and query system 102 in a shared computing resource environment 1302.

While the image used to instantiate an isolated execution environment 1314 may be immutable, different images can be created with different configurations. In some embodiments, an image may not include any applications 1318. In such embodiments, after the isolated execution environment 1314 is instantiated a user can access the isolated execution environment 1314 to install applications (e.g., install applications 1318 to configure the isolated execution environment 1314 as a web server or as some component of the data intake and query system 102, like an indexing node or search node, etc.). In certain embodiments, an image may include multiple applications 1318 with unique parameters. For example, an image may include a particular version of an indexing node application and/or specific parameters for the indexing node (e.g., bucket size, storage location of buckets, etc.). In such embodiments, when the isolated execution environment 1314 is instantiated it can be preconfigured or auto-configured as an indexing node at the particular version and/or with the specific parameters.

Once an isolated execution environment 1314 is instantiated or configured as a particular component, a user can modify the component as desired. For example, a user can update a software version of the component (e.g., update an indexing node to the latest software version) or modify parameters of the component (e.g., for an indexing node: alter a maximum bucket size, bucket roll-over policy, bucket management policy, storage location for the buckets, etc.). Like changes to configurations on a physical computing device, changes made to a component instantiated in an isolated execution environment 1314 may not be automatically propagated to similar components instantiated on different isolated execution environments 1314. For example, changes to configurations of an isolated execution environment 1314 configured as an indexing node will not be automatically propagated to other isolated execution environments 1314 configured as indexing nodes. Further, if the isolated execution environment 1314 is terminated and the same image is used to create it again, any changes to the configurations (e.g., software version changes, parameter changes, etc.) will not be reflected in the new isolated execution environment 1314.

As described herein, any one or any combination of the components of the data intake and query system 102 can be implemented as an isolated execution environment 1314. For example, one or more components of the intake system (e.g., forwarder 602, data retrieval subsystems 604, buffer 606, 610, and/or streaming data processor 608), indexing system (e.g., indexing system manager 702, indexing node 704, indexing node manager 706, partition manager 708, indexer 710, bucket manager 714, ingest manager 716, resource monitor 718, etc.), query system (e.g., search service manager 802, search head 804, search master 812, search manager 814, resource monitor 808, search nodes 806, cache manager 816, etc.), catalog 220, 221, etc., can be implemented as an isolated execution environment 1314.

Similar to components of a data intake and query system 102 instantiated on different computing devices, components of the data intake and query system 102 instantiated in different isolated execution environments 1314 can have different configurations. For example, some components may have one version of software, whereas, other components have a different version of software. The different versions of software may enable different functionalities. For example, later versions of a software may run more efficiently, or allow for more configurability (or less), enable additional functions, deprecate functions, etc.

Further, different types of components can have different responsibilities within the data intake and query system 102 (e.g., components of the indexing system are used to index data, components of the query system are used to query data). For different responsibilities, the components can have different parameters. For example, an indexing node may include parameters to indicate a maximum bucket size, authentication criteria, where buckets are to be stored in the shared storage system, or other parameters dictating the bucket creation policy, bucket roll-over policy, bucket merge policy, bucket management policy, etc. As another example, a search head may include parameters to indicate the quantity of concurrent queries that are allowed, the number of search nodes to use for each query, authentication criteria, or other parameters dictating the search node mapping policy, etc.

In a data intake and query system 102 there may be tens or hundreds of the same component. For example, a data intake and query system 102 may include tens or hundreds of indexing nodes, search nodes, or search heads, etc. In addition to all of the different components in the data intake and query system 102, their versions and parameters, in a multi-tenant environment, one component can be used to process data from multiple tenants or one tenant can manage various components. Accordingly, in a multi-tenant environment there may exist many different type components with different responsibilities using an infinite combination of configurations. For example, each tenant may use different configurations for their components in the multi-tenant environment. Managing the number of different components, different configurations for each component, and tenants associated with the different components can be very complicated.

In some cases, when a tenant desires to modify a component that is processing their data, the tenant (reference herein to a tenant performing a particular step or activity can refer to a user associated with the tenant performing the particular step or activity) can access the component to update its software version, change parameters, etc. In some cases, this may include using a secure shell to communicate locally with the component. However, if there are multiple instances of that component in the shared computing resource environment 1302, the tenant may have to access each instance to modify/configure it. If there are tens or hundreds of instances of the component, this can be very time consuming. Furthermore, as the component may be shared by multiple tenants in a multi-tenant environment, allowing one tenant to modify the component may disrupt another tenant's ability to use the same component.

To facilitate a tenant's ability to customize their experience, the control plane system 524 can enable the tenant to configure a component (pre-modified component) according to their preferences. In some cases, the component that the tenant is allowed to configure may not be deployed or used to process data. Rather, the component that the tenant is allowed to configure may be a copy of a deployed component. Alternatively, the tenant may be provided with a variety of configuration options related to a particular component. Once the tenant has configured the component as desired (e.g., selected/installed the desired version of the component, modified parameters for the component, etc.), the control plane system 524 can generate an image of a modified version of the component (by itself or by requesting another device or system to generate the image), also referred to herein as a modified component. The image of the modified component can include all of the configurations that the tenant modified for the component as well as any underlying or default configurations. For example, the image of the modified component can include the software version for the modified component, any particular parameters selected or modified by the tenant, software add-ons, system configurations, libraries, etc., to enable a host device 1304 to generate an isolated execution environment 1314 configured as the modified component. The parameters and/or software add-ons may be preconfigured or preinstalled with the pre-modified component or may have been installed/configured after the pre-modified component was instantiated (e.g., an image generated from the pre-modified component when it is first instantiated may be different from an image generated from the pre-modified component at a later time after one or more add-ons are installed, newer software versions are installed or parameters are changed).

The control plane system 524 can provide the modified component (e.g., image of the modified component) to a master node and instruct the master node to deploy one or more instances of the modified component. The control plane system 524 can then configure the one or more instances of the modified component for the tenant. In some cases, the control plane system 524 can configure the instances for the tenant by updating one or more resource catalog 720, 810 to associate the tenant with the instances of the modified component.

The master node can deploy the modified component in a number of ways. In some embodiments, the master node can generate multiple instances of the modified component based on the image. In certain embodiments, the control plane system 524 can instruct the master node with the quantity of instances of the modified component that are to be generated.

For simplicity, an "instance of a component" may also be referred to as a component. Thus, generating multiple components can refer to generating multiple instances of the same component, such as multiple instances of an indexing node with the same configurations, or redirecting data from a pre-modified component to a modified component can refer to redirecting data from an instance of a pre-modified component to an instance of a modified component. Similarly, generating different components can refer to generating instances of different types of components, such as an instance of an indexing node and an instance of a search node.

In some cases, the control plane system 524 can replace instances of the pre-modified or original component with instances of the modified component and/or generate instances of the modified component while retaining the instances of the pre-modified component for some time. As part of this process the control plane system 524 can inform relevant components of the data intake and query system 102 that new data or requests should be directed to the new instances. In this way, the instances of the pre-modified component can complete their (previously assigned) processing task assignments for the tenant naturally or gracefully and then be terminated, assigned to different tenants (or continue serving other tenants), or disassociated with the tenant. In some embodiments, to disassociate the component with the tenant, the control plane system 524 can update the resource catalog 720, 810. For example, the control plane system 524 can change tenant-component associations in the resource catalog 720, 810 to indicate that data/tasks associated with the tenant are to be processed by the modified component.

In some embodiments, in a multi-tenant environment, as multiple other tenants may be using the instances of the pre-modified components, those instances may continue to perform tasks for the other tenants (e.g., continue to index, store, or search data) and may not be terminated. However, once the already-assigned tasks for the tenant associated with the modified component are complete, the pre-modified components may no longer accept additional tasks associated with that tenant.

In some cases, the control plane system 524 generates an instance of the modified component for each instance of the pre-modified component. For example, if the tenant had thirty indexing nodes then the control plane system 524 generates thirty modified indexing nodes (e.g., instructs the master node to generate thirty instances of the modified indexing node). In some such cases, the control plane system 524 can replace all of the pre-modified components with the modified components or discontinue the use of the pre-modified components for the tenant. As will be understood, in a shared computing resource environment, the modified components may be instantiated on the same or different hosting devices 1304 as the pre-modified components.

In certain cases, the control plane system 524 can generate the modified components one at a time, ensure that it is working properly and that data is no longer being sent to the corresponding pre-modified component before generating another modified component. In this way, the control plane system 524 can enable a tenant to terminate the replacement process in the event any issues or errors are encountered.

In some cases, the modified components can be generated such that a tenant is unable to modify them directly. For example, the control plane system 524 can limit access to the components of the data intake and query system 102. In some such cases, the control plane system 524 can require users to provide configurations separately, and then the control plane system 524 handles the replacement of the components (e.g., in the manner described herein). This can increase security and resiliency, especially in multi-tenancy environments where a component may be shared by multiple tenants and changes made to a component by one tenant can disrupt another tenant. However, it will be understood that in some cases, the control plane system 524 can enable tenants to directly modify components (e.g., by logging into the component, etc.) that are shared by multiple tenants.

In some cases, the control plane system 524 can enable a tenant to modify multiple different components concurrently. For example, the tenant may want to update one or more indexing system components and one or more query system components concurrently. In some such cases, the tenant can modify those components, provide images for the modified components to the master node (via the control plane system 524), and then request the master node to generate isolated execution environments 1314 for the different components.

In certain cases, rather than generating new instances of the modified components, the control plane system 524 may determine whether there are instances of other components with the same configurations as the modified component. These "matching" components may already be processing data for other tenants or may be awaiting assignment to a tenant. If matching components are found, the control plane system 524 can update the data intake and query system 102 to direct future tasks to the matching components so that the pre-modified components are no longer used to process data associated with the tenant. In some cases, the control plane system 524 can identify matching components by comparing an image of the modified component with images of other components of which it is aware. In certain cases, the control plane system 524 can identify matching components by comparing information about the modified components, such as its type (e.g., search node, indexing node, etc.), version, specific parameters, etc., with similar information about other components of which it is aware.

The control plane system 524 can determine whether there are other matching components in a variety of ways. For example, the control plane system 524 can determine a fingerprint of the image of the modified component and compare the fingerprint with other images. In some case, the control plane system 524 can determine the fingerprint by performing a hash function, lossy compression, or other function that can be used to uniquely identify the image.

In certain embodiments, the control plane system 524 can determine whether there are other matching components without generating an image. For example, the tenant can provide the control plane system 524 with information regarding the type of the component (e.g., indexing node, search node, search head, etc.) and the desired version and particular parameters. The control plane system 524 can compare this information with similar information that it has for other components of the data intake and query system 102.

As will be apparent, by enabling tenants to configure individual components of a data intake and query system 102 in a multi-tenant environment, the data intake and query system 102 can provide a highly customizable experience. For example, some tenants may not share any components of the data intake and query system 102 with other tenants (e.g., single tenant or sandbox), other tenants may share some components of the data intake and query system 102 with other tenants (e.g., partial multi-tenant), while other tenants share all components of the data intake and query system 102 with other tenants (e.g., full multi-tenant). Accordingly, in some cases, while a tenant may be in a shared computing resource environment 1302 and multi-tenant environment it can have a single-tenant or sandboxed experience (e.g., not share data intake and query system 102 components with other tenants). However, in some such cases, while the tenant may not share data intake and query system 102 components with other tenants, it may still share underlying computing resources with other components as it is in a shared computing resource environment 1302.

In some cases, if a tenant customizes any component then the control plane system 524 can generate an instance of that modified component for that tenant (non-limiting example for use only by that tenant or to process data/tasks only from that tenant). In such a scenario, the tenant may not share that modified component with any other tenants (e.g., the modified component may process data/tasks associated only with the tenant), but may still share other components of the data intake and query system 102 with other tenants (e.g., components may process data/tasks associated with different tenants). In some such embodiments, the tenant may have some components acting as if they are in a single tenant environment (process data/tasks associated with one tenant) and others in a multi-tenant environment (concurrently process data/tasks associated with multiple tenants). For example, if a tenant modifies parameters of an indexing node, then modified indexing nodes for that tenant may not be shared with other tenants (e.g., may only process data associated with that tenant), but search nodes and search heads for that may be shared with other tenants (e.g., the search nodes and search heads may process data associated with multiple tenants). In certain cases, after generating a modified component, the control plane system 524 can have other tenants share the modified component. For example, the control plane system 524 can identify tenants with the same configuration as the modified component and have tenant data processed on the recently generated modified component.

In some cases, the control plane system 524 can group tenants together based on the configurations of their components. For example, tenants that use a first set of configurations for components can share a first group of components and tenants that use a second set of configurations for components can share a second group of components. Similar to the above, it will be understood that the first group of components and second group of components can correspond to distinct data intake and query systems 102 or just different components of a data intake and query system 102 (e.g., indexing nodes, search nodes, etc.). Similarly, different components of the data intake and query system 102 can have different groups. For example, Tenant1 and Tenant2 may be in the same group for indexing nodes, but different group for search nodes (e.g., they may use the same configurations for indexing nodes but different configurations for search nodes).

In certain embodiments, by changing one component, the control plane system 524 can automatically configure an entire instance of the data intake and query system 102 for the tenant. For example, if the tenant modifies an indexing node, then the control plane system 524 may require that all components of a data intake and query system 102 be instantiated for that tenant. In this way, the control plane system 524 can sandbox different tenants or data.

In some embodiments, the control plane system 524 can automatically configure some of the components of the data intake and query system 102 for single tenancy. For example, if a search node is modified, then the control plane system 524 may make the search nodes single tenant and leave the other components as multi-tenant. In certain embodiments, the control plane system 524 can automatically configure multiple components of the data intake and query system 102 to be single tenant based on changes made to one component. For example, based on a change to a search head, the control plane system 524 can make all components of the indexing system and query system single tenant while leaving the intake system and shared storage system multi-tenant. Any combination of the aforementioned configurations or setups can be used as desired.

In some cases, generating instances of components can be done for reasons other than at a tenant's request. For example, as developers of the components of the data intake and query system 102 make improvements or create new versions, the control plane system 524 can create instances of the newer or testing versions of the components, test the components, generate results, and then terminate the instances. In some cases, the control plane system 524 can have the instances of the test versions executing on the same hosting devices 1304 as instances of the components that are being used by tenants. In some cases, to test the newer versions of the components, the control plane system 524 can instantiate all the components of a data intake and query system 102 and use the newly instantiated data intake and query system 102 to test the components. In this way, the control plane system 524 can sandbox the components that are being tested from the components that are being used to process customer/tenant data. By having the test versions executed in the same shared computing resource environment 1302 as the versions used by customers (e.g., on the same host devices 1304), the control plane system 524 can improve the confidence that a test version will work when it is released to customers.

The control plane system 524 can also be used to implement a multi-component or distributed system in a shared computing resource environment 1302. In some cases, developers develop multi-component or distributed systems for an unshared computing resource environment where different components are instantiated on different computing devices or machines that do not share underlying computing resources. In certain scenarios, it can be difficult for a developer to re-design or re-purpose such a multi-component or distributed system for use in a shared computing resource environment 1302. For example, if the data intake and query system 102 is designed so that each indexing node 704 is to be run on a separate computing device or machine, it can be difficult to modify the indexing node 704 (and other components of the data intake and query system 102) to run in a container on a hosting computing device.

The control plane system 524 can be used to aid a developer in converting systems from an unshared computing resource environment for use in a shared computing resource environment 1302. For example, for each component of the system, the control plane system 524 can be used to generate an image of the component. The image can include all of the configurations of the component, such that an instance of the component executing in a shared computing resource environment 1302 can execute in a similar (or same) way as the component in the unshared computing resource environment. In some cases, the image may include some differences that enable the component to operate in the shared computing resource environment 1302. Once an image has been created for the relevant components of the unshared computing resource environment system, the control plane system 524 can instruct a master node to instantiate instances of the different components. In some cases, based on the images, the instantiated instances of the different components can begin communicating with each other. In certain cases, the control plane system 524 can be used to configure the different instances, such as, by communicating directly with the different instances or shared resources or catalogs.

As a non-limiting example, consider a scenario in which an unshared computing resource version of the data intake and query system 102 is configured for use in an unshared computing resource environment. In such a scenario, the various components of the data intake and query system 102 can be instantiated on different computing devices or machines that do not share computing resources. Further, such components could have direct access to the processors and memory of the computing devices and machines on which they are instantiated. Using the control plane system 524, a user can generate an image for each of the components of the data intake and query system (e.g., an image of the buffers 606, 610, streaming data processors 608, indexing node 704, ingest manager 706, partition manager 708, bucket manager 714, search service manager 802, search head 804, search node 806, cache manager 816, etc., or other components of the data intake and query system 102). In some cases, images of only a subset of the components are generated, such as those components that perform processing tasks. For example, images for the shared storage system 116 or other storage systems or catalogs may not be generated. As described herein, the images can include the various configurations that exist in the component of the unshared computing resource environment. For example, an image of the indexing node 704 can include the same version and parameters (e.g., same policy configurations) as the indexing node of the unshared computing resource version of the data intake and query system 102.

The control plane system 524 can provide the images of the various components of the data intake and query system 102 to a master node and instruct the master node to generate isolated execution environments 1314 using each of the images. The control plane system 524 can also instruct the master node to generate a particular number of instances for each of the images. For example, if the unshared computing resource version of the system 102 had six indexing nodes/search nodes and two search heads, the control plane system 524 can instruct the master node to generate six indexing nodes 704, six search nodes 806, and two search heads 804 from the indexing node, search node, and search head images, respectively. Based on the configurations, the components may begin communicating with each other or the control plane system 524 may interface with individual components to configure them for use as a multi-component, distributed system. In some such cases, the control plane system 524 can update relevant resource catalogs 720, 810 with information about the various components and/or instruct the resource monitors 718, 808 to use the components for processing tasks.

7.2. Isolated Execution Environment Image Flow

Figure 14:
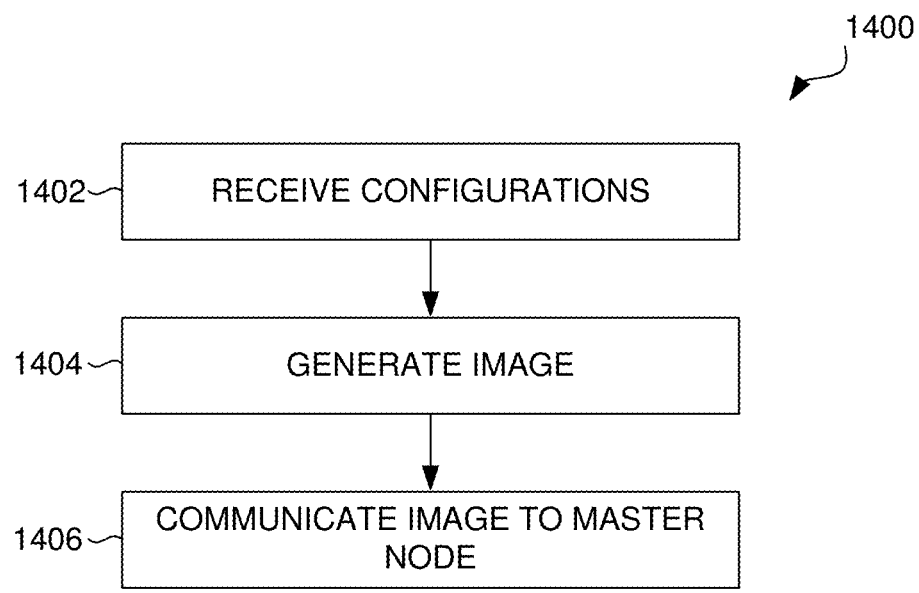
FIG. 14 is a flow diagram illustrative of an embodiment of a routine implemented by the control plane system to generate an updated image for use in a shared computing resource environment.

FIG. 14 is a flow diagram illustrative of an embodiment of a routine 1400 implemented by the control plane system 524 to generate an updated image for use in a shared computing resource environment 1302.

At block 1402, the control plane system 524 receives configurations of a component. In some embodiments, the component can correspond to a component of the data intake and query system 102, such as an indexing node 704, ingest manager 716, partition manager 708, search node 806, search head 804, bucket manager 714, etc. However, it will be understood that the configurations can correspond to any component that can be instantiated in a shared computing resource environment 1302.

The configurations can correspond to versions (e.g., software versions, releases, etc.) and/or parameters of the component. In some cases, the configurations can be based on the type of the component, a tenant associated with the component, and/or a type of the shared computing resource environment, or provider of the shared computing resource environment in which the component is to be instantiated. In some cases, the type of the component can correspond to its responsibilities within a data intake and query system 102. For example, the type of the component may be any one of: forwarder 602, data retrieval subsystems 604, buffer 606, 610, and/or streaming data processor, indexing system manager 702, indexing node 704, indexing node manager 706, partition manager 708, indexer 710, bucket manager 714, ingest manager 716, resource monitor 718, query system manager 802, search head 804, search master 812, search manager 814, resource monitor 808, search nodes 806, cache manager 816, catalog 520, 521, etc., and the configurations can be based on the functions of the component in the data intake and query system 102.

As described herein, the configurations can correspond to different versions of the component (e.g., version 1.0, 1.2, 2.0, 2.5, etc.). The versions may correspond to different software versions of an application that when executed configures the computing device or an isolated execution environment as the component. For example, the configuration can be the software version 8.5 of an indexing node or Apache HTTP Server 2.4.41, etc.

As described herein, in certain embodiments, the configurations can correspond to specific parameters of the component. As mentioned, different components of the data intake and query system 102 can have different parameters associated with them. For example, indexing nodes 704 can have parameters associated with its various indexing policies (e.g., bucket creation policy, bucket merge policy, bucket roll-over policy, bucket management policy), bucket sizes, or authorizations, etc. Similarly, a search head 804 can have parameters associated with its various searching policies (e.g., search node mapping policy, etc.), the number of search nodes to use for a query, number of concurrent queries to support, etc. Similarly, other components of the data intake and query system 102 can have parameters specific to their roles within the data intake and query system 102. Accordingly, the configurations received can be based on the type of the component. In addition, components unrelated to the data intake and query system 102 but that can be instantiated in a shared computing resource environment can also have different parameters associated with them.

In some embodiments, one or more of the configurations can be specific for a tenant. For example, different tenants may have different configurations for bucket paths (e.g., where data is stored in the shared storage system 116), encryption keys, cache-sizes, search concurrency (e.g., number of searches that are allowed to be executed concurrently, etc.) As another example, Tenant X may always require Tenant X configurations to be made to the component, while Tenant Y may require Tenant Y configurations to be made to the same component.

As described herein, in some cases, components of the data intake and query system 102 can be implemented in or across different shared computing resource environment providers. Accordingly, in certain embodiments, one or more of the configurations can be specific for the shared computing resource environment provider. For example, one shared computing resource environment provider may provide certain options or parameters for a component to be configured, while another shared computing resource environment provider may provide different options or parameters for a component to be configured. For example, a component executed in a Kubernetes cluster in AWS may have certain options or parameters, while a component executed in a Kubernetes cluster in Microsoft Azure or Google Cloud Platform may have different options or parameters (e.g., storage locations, startup time, etc.). Similarly, components instantiated in a Kubernetes cluster may have different options or parameters than a component instantiated in a Docker Swarm, or Apache Mesos. In some embodiments, one or more of the configurations can be specific for both the tenant and/or the shared computing resource environment provider.

In certain embodiments, the components of the data intake and query system 102 can be implemented across multiple shared computing resource environment providers. For example, the shared computing resource environment 1302 can be implemented across multiple providers (e.g., AWS, Google Cloud Platform, etc.). For example, some components may be instantiated in an AWS environment, while other may be instantiated in Google Cloud Platform, etc. In some such embodiments, the control plane system 524 can instantiate containers based on the shared computing resource environment provider in which the component is to run. Similarly, the components can be instantiated across different regions of a shared computing resource environment 1302. For example, the hosting devices 1304 of some components may be located in Virginia while the hosting devices 1304 of other components may be located in California. In some such embodiments, the different regions may have different parameters or configurations. Accordingly, in some embodiments, the control plane system 524 can instantiate components based on the region in which they will be executed.

In certain embodiments, the configurations can correspond to an unreleased version of the component. For example, as developers modify components, they may save the modifications as an alpha or beta version that is not accessible to the public, or they may save the version as a test version. In some such cases, the test version of the component can be received as a configuration. Any one or any combination of the above-described configurations can be received by the control plane system 524.

In some embodiments, the configurations are received by the control plane system 524 with the component or with the computer-executable code that when executed configures a computing device or isolated execution environment 1314 as the component. For example, changes can be made to a copy of the component that is instantiated in a shared computing resource environment. In certain embodiments, the configurations can be received as identifiers or without the component. For example, the configurations may be received as requests to use a particular version of the component, as requests to modify a particular component, or as configuration files that include modified parameters, etc.

In certain embodiments, configurations can be received for a single component or concurrently received for multiple components. For example, the control plane system 524 can concurrently receive configurations for an indexing node and a search node, etc.

The configurations can correspond to desired configurations for the one or more instances of the component. For example, a tenant may be using multiple indexing nodes version 1.5, but may desire to switch to indexing nodes version 2.0, or may desire to change the number of search nodes used for a search from two search nodes to five search nodes.

At block 1404, the control plane system 524 generates an image of a modified component. In certain embodiments, the control plane system 524 generates the image itself or requests another computing device or system to generate the image. The modified component can correspond to a modified version of the component based on the configurations received by the control plane system 524. For example, if the component is an indexer version 1.0, and the configurations include version 2.0, the modified component can be an indexer version 2.0. In such an example, the image of the indexer version 2.0 can include the computer executable instructions, system tools, system libraries, and settings, to enable an isolated execution environment 1314 to be configured as an indexer version 2.0. As another example, if the component is an indexer version 2.0 with a parameter indicating that buckets are to be converted from hot buckets to warm buckets every minute and the configurations include changing the parameter so that that buckets are converted from hot buckets to warm buckets every 45 seconds, the modified component can be an indexer version 2.0 with a parameter indicating that buckets are to be converted from hot buckets to warm buckets every 45 seconds. In such an example, the image of the can include the code, tools, libraries, and settings to enable an isolated execution environment 1314 to be configured as the indexer with the desired version and configurations.

As described herein, an image can include computer executable instructions, system tools, system libraries and settings, and other data so that when the image is instantiated or executed, an application or program is provided within an isolated execution environment 1314. A non-limiting example of an image is a Docker container image. Accordingly, the image of the modified component can include computer executable instructions, system tools, system libraries, and component parameters so that when the image of the modified component is instantiated or executed, an instance of the modified component is generated within an isolated execution environment 1314.

In some cases, the control plane system 524 can generate (including requesting another device or system to generate or otherwise causing to be generated) multiple images. As mentioned, in some cases, the control plane system 524 can receive multiple images for different components. For example, the control plane system 524 can receive configurations for a search head and an indexing node. In some such cases, the control plane system 524 can generate an image for each component for which configurations are received. In some such cases, the control plane system 524 may receive different configurations for different components. For example, the control plane system 524 may receive software versions for one component and parameters for another component, or different parameters from different components, etc. Regardless of the type of configurations received, the control plane system 524 can generate an image for each component for which configurations were received.

At block 1406, the control plane system 524 communicates the image of the modified component to a master node in the shared computing resource environment 1302. As described herein, in some cases, the master node can be a hosting device 1304 configured to manage the instantiation of images within the shared computing resource environment 1302. The master node can provide one or more instances of the modified component for use based on the image of the modified component. Although reference herein is made to the control plane system 524 providing, generating, or creating components, it will be understood that this can include instructing the master node or a hosting device 1304 to provide, generate, or create the components.

In some cases, the control plane system 524 can instruct the master node to generate one or more instances of the modified component in an isolated execution environment 1314 based on the image of the modified component. The modified components can be instantiated in different isolated execution environments on the same or different hosting devices 1304. Further the modified components may be instantiated on the same or different hosting devices 1304 as the pre-modified components. Similarly, in certain embodiments, such as when the master node receives images corresponding to different components, the master node can generate different components depending on the images received. For example, if the master node receives images for modified indexing nodes and modified search heads, it can generate or instantiate modified indexing nodes and modified search heads.

In certain cases, the control plane system 524 can instruct the master node with how many instances of the modified component to generate (e.g., a replica count). In some embodiments, the number of instances of the modified component can be the same as the number of instances of the pre-modified component. In some cases, the control plane system 524 can generate a modified component for each pre-modified component associated with the tenant. For example, if a tenant was using three search heads, the control plane system 524 can instruct the master node to generate three modified search heads from the image of the modified search head.

In some cases, the generated modified components can replace the pre-modified components. For example, once the modified components are running, the pre-modified components can be terminated immediately or terminated after they have completed processing any data that had been assigned to them (prior to the creation of the modified components). In some embodiments, the one or more instances of the modified component can be generated and the one or more instances of the pre-modified component can be gradually shutdown. For example, the one or more instances of the pre-modified component can be configured to drain local data (e.g., finish processing, storing, etc.) and the control plane system 524 may stop directing traffic to the one or more instances of the pre-modified component. In certain embodiments to stop directing traffic to the one or more instances of the pre-modified component, the control plane system 524 can update the resource catalog 720, 810 to disassociate the tenant with the one or more instances of the pre-modified component. Once the local data is drained, the pre-modified component can be terminated.

In certain cases, the modified components and pre-modified components can run concurrently. For example, in a multi-tenant environment, one tenant may use the modified components while other tenants may continue to use the pre-modified components. In some such cases, the control plane system 524 may indicate that data associated with the tenant is to be directed to the modified components (or redirected from the pre-modified component to the modified component). In some embodiments, the control plane system 524 can indicate that data associated with the tenant is to be directed to the modified components by updating the resource catalog 720, 810 (e.g., associating the tenant with the modified components and disassociating the tenant with the pre-modified components).

The control plane system 524 can redirect data or tasks from the one or more instances of the pre-modified component (or direct future data or tasks) to the one or more instances of the modified component. In some embodiments where multiple tenants can use an instance of the component to process data and one tenant provides configurations for a modified component, the control plane system 524 can have a master node generate a modified component, and then redirect the data/tasks of the tenant to the modified component, while data/tasks of the remaining tenants remains directed to the instance of the pre-modified component. In the alternative, where multiple tenants share a component and one tenant provides configurations for a modified component, the control plane system 524 can have the master node generate a pre-modified component and then transition the other tenants to the newly generated pre-modified component and modify (or have the relevant hosting device 1304 modify) the preexisting component to make it a modified component. In some cases, the preexisting component may be modified by replacing the image of the isolated execution environment 1314 corresponding to the preexisting component or by updating the preexisting component according to the received configurations.

In some embodiments, rather than generating modified components, the control plane system 524 can determine whether a component that matches the modified component is already available. For example, in a multi-tenant environment, different tenants may use components with different configurations. In some such cases, when a tenant modifies a component, the control plane system 524 can see whether other tenants are using a component with the same configurations. In some such cases, the control plane system 524 can transition the data from the component that is processing the tenant's data to a component that matches the desired configurations of the tenant. Accordingly, in some cases, the control plane system 524 can group tenants based on the configurations of the components that they use. As a non-limiting example, Tenants 1 and 2 may share the same data intake and query system 102 (e.g., all components may be shared) but after Tenant 2 makes changes to one or more components of the data intake and query system 102, Tenant 2 may share a data intake and query system 102 with Tenant 3. As another non-limiting example, Tenant 1 and 2 may share indexing nodes but not search heads or search nodes, and Tenants 1 and 3 may share search nodes but not indexing nodes or search heads, etc. After Tenant 1 modifies the configurations of his indexing nodes, he may no longer share indexing nodes with Tenant 2 but may share them with Tenant 3 or 4. In some embodiments, the control plane system 524 can transition tenant data to different components and/or group tenants by modifying the resource catalog 720, 810 so that grouped tenants are associated with the same versions of components.

In some embodiments, based on a change to a configuration of a component by the tenant, the control plane system 524 may have the master node generate a modified component, and then configure the modified component just for the tenant. In some such cases, the tenant may not share the modified component with other tenants. In certain embodiments, if other tenants later modify their configurations to match those of the first tenant, then the second tenant may end up sharing the modified component with the first tenant.

In certain embodiments, based on a change to a configuration of a component, the control plane system 524 may have the master node generate all the components of a data intake and query system 102 and then configure the components of the data intake and query system 102 just for the tenant. Such a data intake and query system 102 may include the modified component in place of the pre-modified component (e.g., a modified indexing node) and may also include other components that were not modified (e.g., unmodified search head, search node, etc.).

In some embodiments, the control plane system 524 may generate a data intake and query system 102 for a developer to test modifications made to one or more components. In some such cases, the control plane system 524 can generate the various components of the data intake and query system 102 (including the modified components based on the changes made by the developer), have test data transmitted through the data intake and query system 102 or otherwise test the data intake and query system 102, generate results, provide the results of the testing to the developer, and then terminate the data intake and query system 102. In some such embodiments, the control plane system 524 can instantiate the data intake and query system 102 for the developer on the same hosting devices 1304 that include components for tenants or customers. By testing the components on the same hosting devices 1304, the control plane system 524 can increase the accuracy of the test results and/or increase the confidence that the modified components will not create errors or otherwise disrupt the functioning of other components.

In some embodiments, the modified component can be a test version of the component for testing of the modified component in the shared computing resource environment 1302 and the modified component may be destroyed after testing has finished. The test version of the component can be deployed in the same shared computing resource environment 1302 as other components of the data intake and query system In some embodiments, the modified components can be immutable. For example, once the modified component is instantiated in an isolated execution environment, the system may prevent a tenant from modifying it locally (e.g., logging into the component to change a parameter or upgrade to a newer version, etc.). Instead, the system can require the tenant to submit configurations as described herein. Based on the submitted configurations, the system can generate modified components for use by the tenant.

In certain embodiments, the system can enable a tenant to modify one or more configurations of the component. In some such embodiments, based on the modified configurations, the control plane system 524 can move other tenants that were using the component to other components and/or use the changes made by the tenant to generate a modified component as describer herein. In some such embodiments, while the tenant may think they have modified the component, the control plane system 524 may have merely let them modify configurations and then used the configurations to generate a modified component, and transitioned the tenant to the modified component.

Fewer, more, or different steps can be used with routine 1400. For example, the control plane system 524 can generate multiple images for different components and communicate the different images to the master node. In turn the master node can generate different components based on the different images. Once generated, the control plane system 524 can associate the different components with one or more tenants.

8.0. Terminology

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. § 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A method, comprising:
   receiving configurations of a component of a data intake and query system from a client computing device associated with a tenant, wherein at least one instance of the component is configured for execution in a shared computing resource environment and is configured to process data from a plurality of tenants, wherein the plurality of tenants includes the tenant;
   generating an image of a modified component corresponding to the component based on the configurations;
   communicating the image of the modified component to a master node in the shared computing resource environment, wherein the master node provides at least one instance of the modified component for use based on the image of the modified component;
   associating the at least one instance of the modified component with the tenant, wherein the at least one instance of the modified component processes data from the tenant; and
   disassociating the at least one instance of the component with the tenant, wherein after the disassociating, the at least one instance of the component continues to process data from other tenants of the plurality of tenants.

2. The method of claim 1, wherein the configurations comprise a software version associated with the component.

3. The method of claim 1, wherein the configurations comprise a set of preconfigured, preinstalled software add-ons associated with the component.

4. The method of claim 1, wherein the configurations comprise one or more parameters associated with the component.

5. The method of claim 1, wherein the configurations comprise one or more parameters based on a provider of the shared computing resource environment.

6. The method of claim 1, wherein the configurations comprise one or more parameters based on a type of the component.

7. The method of claim 1, wherein the configurations comprise a bucket size of buckets generated by the at least one instances of the component.

8. The method of claim 1, wherein the configurations comprise an indication of a quantity of concurrent queries supported by an instance of the component.

9. The method of claim 1, wherein at least two instances of the component are configured for execution on a hosting device and configured to share computing resources of the hosting device.

10. The method of claim 1, wherein at least two instances of the modified component are configured for execution on a hosting device and configured to share computing resources of the hosting device.

11. The method of claim 1, wherein the component is a first component, the modified component is a first modified component, and the image is a first image, the method further comprising:
   receiving configurations of a second component of the data intake and query system, wherein one or more instances of the second component are configured for execution in the shared computing resource environment;
   generating a second image of a second modified component corresponding to the second component based on the received configurations of the second component; and
   communicating the second image of the second modified component to the master node with the first image, wherein the master node concurrently provides at least one instance of the second modified component for use based on the second image of the second modified component.

12. The method of claim 1, wherein the at least one instances of the modified component are immutable by the tenant of the data intake and query system.

13. The method of claim 1, wherein the at least one instances of the modified component are configurable by the tenant of the data intake and query system.

14. The method of claim 1, wherein to provide the at least one instance of the modified component, the master node generates the at least one instance of the modified component and terminates an instance of the component.

15. The method of claim 1, wherein to provide the at least one instance of the modified component, the master node generates the at least one instances of the modified component,
   wherein disassociating the at least one instances of the component with the tenant comprises disassociating the at least one instance of the component with the tenant after the at least one instances of the component has completed previously assigned processing tasks of data associated with the tenant.

16. The method of claim 1, wherein to provide the at least one instance of the modified component, the master node identifies a third component that matches the modified component, wherein the at least one instances of the modified component corresponds to at least one instance of the third component.

17. The method of claim 1, wherein the configurations are associated with the tenant, the method further comprising:
   communicating a plurality of images of other components of the data intake and query system to the master node, wherein the modified component and the other components form the data intake and query system, wherein the master node generates at least one instance of the other components for use based on the plurality of images; and
   associating the modified component and the other components with the tenant.

18. The method of claim 1, wherein the configurations are associated with the tenant, wherein to provide the at least one instances of the modified component, the master node generates the at least one instances, the method further comprising:
   associating the at least one instances of the modified component with only the tenant, wherein other components associated with the tenant are shared with other tenants.

19. The method of claim 1, wherein the configurations are associated with the tenant, wherein to provide the at least one instances of the modified component, the master node generates the at least one instance, the method further comprising:

associating the at least one instances of the modified component with the tenant;
identifying other tenants associated with a component that matches the modified component; and
associating the at least one instances of the modified component with the other tenants.

20. The method of claim 1, wherein the configurations are associated with the tenant, the method further comprising updating a resource catalog to associate the at least one instances of the modified component with the tenant.

21. The method of claim 1, wherein the at least one instance of the component and the configurations are associated with the tenant, the method further comprising updating a resource catalog to associate the at least one instance of the modified component with the tenant and to disassociate the at least one instance of the component with the tenant.

22. The method of claim 1, wherein the at least one instance of the component correspond to at least one copy of the image being executed in an isolated execution environment.

23. The method of claim 1, wherein a quantity of the least one instance of the modified component is the same as a quantity of the at least one instance of the component.

24. The method of claim 1, wherein the configurations are associated with a particular tenant that shares the at least one instance of the component with other tenants of the data intake and query system, and wherein the at least one instance of the modified component is configured for use by the particular tenant only.

25. The method of claim 1, wherein the configurations are associated with a particular tenant that shares the at least one instance of the component with other tenants of the data intake and query system, and wherein the at least one instance of the modified component is configured to be shared by the particular tenant and at least one additional tenants with a component that matches the modified component.

26. The method of claim 1, wherein the configurations are associated with a particular tenant of the data intake and query system, wherein data associated with the particular tenant is processed by the at least one instance of the component with data associated with other tenants of the data intake and query system, and wherein the at least one instance of the modified component are configured to process data associated with the particular tenant and data associated with at least one additional tenants associated with a component that matches the modified component.

27. The method of claim 1, wherein the configurations are associated with a particular tenant of the data intake and query system, wherein data associated with the particular tenant is processed by the at least one instance of the component with data associated with other tenants of the data intake and query system, and wherein the at least one instance of the modified component are configured to only process data associated with the particular tenant.

28. A system, comprising:
memory; and
a processing device configured to:
receive configurations of a component of a data intake and query system from a client computing device associated with a tenant, wherein at least one instance of the component is configured for execution in a shared computing resource environment and is configured to process data from a plurality of tenants, wherein the plurality of tenants includes the tenant;
generate an image of a modified component corresponding to the component based on the configurations;
communicate the image of the modified component to a master node in the shared computing resource environment, wherein the master node provides at least one instance of the modified component for use based on the image of the modified component;
associating the at least one instance of the modified component with the tenant, wherein the at least one instance of the modified component processes data from the tenant; and
disassociating the at least one instance of the component with the tenant, wherein after the disassociating, the at least one instance of the component continues to process data from other tenants of the plurality of tenants.

29. Non-transitory, computer-readable media storing computer-executable instructions that when executed by one or more processors, cause the one or more processors to:
receive configurations of a component of a data intake and query system from a client computing device associated with a tenant, wherein at least one instance of the component is configured for execution in a shared computing resource environment and is configured to process data from a plurality of tenants, wherein the plurality of tenants includes the tenant;
generate an image of a modified component corresponding to the component based on the configurations;
communicate the image of the modified component to a master node in the shared computing resource environment, wherein the master node provides at least one instance of the modified component for use based on the image of the modified component;
associating the at least one instance of the modified component with the tenant, wherein the at least one instance of the modified component processes data from the tenant; and
disassociating the at least one instance of the component with the tenant, wherein after the disassociating, the at least one instance of the component continues to process data from other tenants of the plurality of tenants.

* * * * *